US007984487B2

(12) United States Patent
Katsube et al.

(10) Patent No.: US 7,984,487 B2
(45) Date of Patent: Jul. 19, 2011

(54) INFORMATION PROCESSING SYSTEM, AND INFORMATION PROCESSING APPARATUS AND METHOD

(75) Inventors: Tomohiro Katsube, Chiba (JP); Naoshi Suzuki, Chiba (JP); Masato Yokobori, Chiba (JP)

(73) Assignee: Sony Corporation, Tokyo (JP)

( * ) Notice: Subject to any disclaimer, the term of this patent is extended or adjusted under 35 U.S.C. 154(b) by 1302 days.

(21) Appl. No.: 10/478,047

(22) PCT Filed: Mar. 18, 2003

(86) PCT No.: PCT/JP03/03209
§ 371 (c)(1),
(2), (4) Date: May 21, 2004

(87) PCT Pub. No.: WO03/079205
PCT Pub. Date: Sep. 25, 2003

(65) Prior Publication Data
US 2004/0249961 A1 Dec. 9, 2004

(30) Foreign Application Priority Data

Mar. 18, 2002 (JP) .................................. 2002-074018

(51) Int. Cl.
*G06F 17/30* (2006.01)

(52) U.S. Cl. ......................................................... 726/5

(58) Field of Classification Search .................... 726/5
See application file for complete search history.

(56) References Cited

U.S. PATENT DOCUMENTS

| 5,444,848 | A | * | 8/1995 | Johnson, Jr. et al. | ......... 709/241 |
| 6,108,789 | A | | 8/2000 | Dancs et al. | |
| 6,233,567 | B1 | * | 5/2001 | Cohen | ............. 705/59 |
| 6,615,254 | B1 | * | 9/2003 | Takemoto | ..................... 709/219 |
| 2002/0002503 | A1 | * | 1/2002 | Matsuoka | ......................... 705/26 |
| 2002/0017557 | A1 | | 2/2002 | Hendrick | |
| 2002/0087543 | A1 | * | 7/2002 | Saitou et al. | ..................... 707/9 |
| 2003/0065957 | A1 | * | 4/2003 | Tsuji et al. | ..................... 713/202 |
| 2004/0088696 | A1 | * | 5/2004 | Kawano et al. | ............... 717/171 |

FOREIGN PATENT DOCUMENTS

| DE | 100 02 594 | 7/2000 |
| EP | 1 061 442 | 12/2000 |
| JP | 6-22054 | 1/1994 |
| JP | 06-204998 | 7/1994 |
| JP | 11-175477 | 7/1996 |
| JP | 2000-092236 | 3/2000 |
| JP | 2000-222319 | 8/2000 |

(Continued)

*Primary Examiner* — Nasser Moazzami
*Assistant Examiner* — Michael S McNally
(74) *Attorney, Agent, or Firm* — Finnegan, Henderson, Farabow, Garrett & Dunner, LLP

(57) ABSTRACT

The present invention relates to an information processing system, and an information processing apparatus and method in which authentication processing on a network can be easily performed. A setting terminal device sends registration information input by a user to a CE-device registration setting server. The CE-device registration setting server generates connection information for connecting CE devices to the Internet based on the registration information. The setting terminal device receives the connection information from the CE-device registration setting server and stores it in a memory card. When the memory card is attached, the CE device reads the connection information so as to connect to a network. The present invention can be applied to electronic devices connected to a network.

41 Claims, 90 Drawing Sheets

FOREIGN PATENT DOCUMENTS

| | | |
|---|---|---|
| JP | 2001-43186 | 2/2001 |
| JP | 2001-177513 | 6/2001 |
| JP | 2001-209611 | 8/2001 |
| JP | 2001-265731 | 9/2001 |
| JP | 2001-306430 | 11/2001 |
| JP | 2002-007937 | 1/2002 |
| JP | 2002-015248 | 1/2002 |
| JP | 2002-055685 | 2/2002 |
| JP | 2002-064483 | 2/2002 |
| WO | WO 02 19627 | 3/2002 |

\* cited by examiner

FIG. 20

| DEVICE ID | PRODUCT-CLIENT REGISTRATION CODE |
|---|---|
| 1234 | 421321 |
| 1235 | 522361 |
| 1236 | 522341 |
| 1237 | 623381 |

FIG. 56

ADDING NEW SERVICE TO SSO.
PLEASE INPUT USER ID AND PASSWORD.

ID

PW

NEXT

FIG. 57

SSO SERVICE LIST

SERVICE A

SERVICE B

SERVICE F

FIG. 60

PLEASE INPUT USER ID AND PASSWORD.

ID [                    ]

PW [                    ]

[ NEXT ]

FIG. 62

```
SSO SERVICE LIST
FOR MR TARO SUZUKI

SERVICE A

SERVICE B
```

FIG. 63

```
MR TARO SUZUKI

SERVICE A
```

FIG. 70

IS R/W DRIVE FOR MEMORY
CARD CONNECTED?

YES                    NO

FIG. 71

PLEASE SET MEMORY
CARD IN R/W DRIVE.

OK                    CANCEL

FIG. 72

CONNECTING TO NETWORK

OK          CANCEL

FIG. 73

PLEASE INPUT REQUIRED ITEMS

NAME: [_____]~751

NAME (PHONETIC SYMBOLS): [_____]~752

. . . . . . . . . . . .

CHECK       CANCEL

FIG. 74

PLEASE CHECK INPUT INFORMATION

NAME: XXXXXXXXXXXX
NAME (PHONETIC SYMBOLS): XXXXXXXXXXXX

. . . . . . . . . . . . . . .

SEND              CANCEL

FIG. 75

DOWNLOADING THE FOLLOWING CONNECTING INFORMATION FROM SERVER AND STORING IT IN MEMORY CARD

AP TELEPHONE NO.: XXXXXXXXXXXX

SMTP: XXXXXXXXXXXX

POP: XXXXXXXXXXXX

. . . . . . . . . . . . . . .

OK              CANCEL

FIG. 76

CONNECTION INFORMATION
IS STORED IN MEMORY CARD.

DO YOU HAVE REGISTRATION ID?

YES ~821

INPUT BASIC INFORMATION

NAME: ~831

ADDRESS: ~832

E-MAIL: ~833

REGISTER ~834

FIG. 87

SERVICE-A DEPENDENT INFORMATION

AGE : [                    ] ~841

HOBBIES : [                    ] ~842

[REGISTER] ~843

FIG. 88

REGISTRATION HAS COMPLETED!

YOUR ID/PW IS:

ID : XXXXXXXX
PW : XXXXXXXXX

FIG. 91

BASIC INFORMATION CHECK

NAME: XXXX XXXXXXXX

ADDRESS: XXXXXXXXXXXXXXXXXXX

E-MAIL: XXXX@XXXXX.XXX

CHECK ~861

FIG. 92

SERVICE-B DEPENDENT INFORMATION

CREDIT NUMBER:

~871

REGISTER ~872

FIG. 93

REGISTRATION IS COMPLETED!

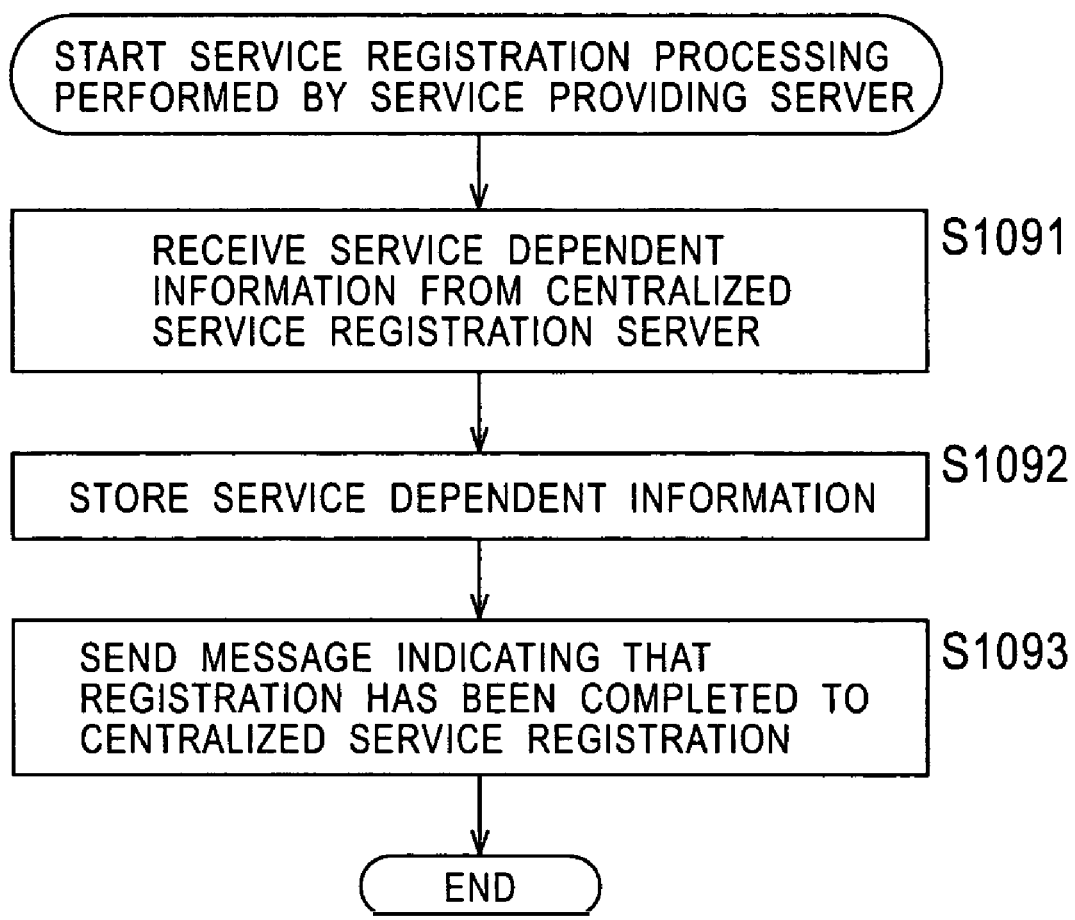

INFORMATION PROCESSING SYSTEM, AND INFORMATION PROCESSING APPARATUS AND METHOD

TECHNICAL FIELD

The present invention relates to information processing systems and information processing apparatuses and methods. More particularly, the invention relates to an information processing system and an information processing apparatus and method in which it is possible to connect to a network by a simple operation.

BACKGROUND ART

As a method for specifying a user for receiving services provided on a network, personal identification using an ID and a password is often employed. Normally, the authentication mode is independent for each service. If five different services are received, five IDs and five passwords are required, and the user has to select the ID and password according to the service.

Since the user has to employ the different IDs and passwords for the individual services, as described above, it is usually necessary for the user to write down the IDs and the passwords for the individual services, which is inconvenient. The user is able to memorize the IDs and passwords for services that he/she frequently accesses. However, the user tends to forget the IDs and passwords for services that he/she rarely accesses, and in order to access such services, the user is required to check the IDs and passwords, thereby making it difficult to speedily access the services.

In order to solve the above-described problem, a method for disposing an authentication proxy server between service providing servers and client computers so as to allow the authentication proxy server to perform simultaneous authentication for a plurality of service providing servers, and a method for installing an authentication proxy module in a service providing server are known. The first method is referred to as the "reverse proxy type", and the second method is referred to as the "agent type". Integrating a plurality of IDs and passwords into one ID and one password as stated above is referred to as "SSO (Single Sign On)". FIG. 1 illustrates the concept of SSO of the reverse proxy type.

In FIG. 1, a client 2 is a personal computer, a personal digital assistant (PDA) employed by a user, or a household electrical appliance, such as a television receiver, an audio player, a video cassette recorder, a car navigation system, a microwave oven, a refrigerator, or a washing machine, which is provided with a function for connecting to a network. In the following description, television receivers, audio players, video cassette recorders, car navigation systems, microwave ovens, refrigerators, washing machines, and other household electrical appliances provided with functions for connecting to networks are referred to as CE (Consumer Electronics) devices.

When receiving a request to connect to the Internet 1 from the client 2 with a predetermined network-connecting ID and password 6, an access server 3 conducts authentication for connecting the client 2 to the Internet 1. A web authentication proxy server 4 manages IDs and passwords required for receiving services from web servers 5-1 and 5-2 (hereinafter simply referred to as a "web server 5" when it is not necessary to individually distinguish between the web servers 5-1 and 5-2—the same applies to other devices). When receiving a request to receive a service possessed by the web server 5 from the client 2 with a predetermined representative ID and password 7, the web authentication proxy server 4 accesses the web server 5 designated by the client 2 by using the predetermined ID and password, and performs authentication for the client 2.

The web servers 5-1 and 5-2 individually possess unique services, and provide the services to the client 2 which has accessed the web servers 5-1 and 5-2 by using the predetermined ID and password.

The operation is as follows. When accessing the web server 5-1 to receive a service, the client 2 first accesses the access server 3 by using the network-connecting ID and password 6, and obtains authentication for connecting to the Internet 1. After obtaining authentication for connecting to the Internet 1 from the access server 3, the client 2 accesses the web authentication proxy server 4 via the Internet 1 by using the representative ID and password 7 so as to receive authentication from the web authentication proxy server 4.

Upon completing the authentication processing, the web authentication proxy server 4 sends an ID and a password for web server A to the web server 5-1 via the Internet 1, and requests the web server 5-1 to conduct authentication for the client 2. After authenticating the client 2 in response to this request, the web server 5-1 provides the service to the client 2.

When subsequently receiving a service by accessing the web server 5-2, the client 2 first accesses the web authentication proxy server 4 by using the representative ID and password 7 to receive authentication. When authentication is successfully conducted, the web authentication proxy server 4 sends an ID and a password for the web server 5-2 to the web server 5-2, and requests the web server 5-2 to conduct authentication for the client 2. After authenticating the client 2 in response to this request, the web server 5-2 provides the service for the client 2.

As described above, the client 2 is able to receive the services from both web servers, i.e., the web server 5-1 and the web server 5-2, by using the single representative ID and password 7.

As stated above with reference to FIG. 1, in known SSO, the network-connecting ID and password 6 for connecting to the Internet 1, and the representative ID and password 7 for connecting to the web server 5 are different, and the user has to change between the two IDs and two passwords, which is inconvenient.

Particularly when the device (client 2) employed by the user to connect to the Internet 1 is a CE device provided with an insufficient input interface for receiving input operations from the user, which is different from personal computers, inputting the network-connecting ID and password 6 or the representative ID and password 7 into the CE device every time the user connects to the access server 3 or the web authentication proxy server 4 imposes a heavy burden on the user.

In order to receive services from the web server 5, the user is sometimes required to perform user registration in the web server 5 in advance. More specifically, when receiving services from the web server 5-1, the user has to send via the client 2 his/her name, address, email address, and other information required for receiving the services from the web server 5-1 so as to receive an ID and a password. Similarly, when receiving services from the web server 5-2, the user has to send via the client 2 his/her name, address, email address, and other information required for receiving the services from the web server 5-2 so as to receive an ID and a password.

Accordingly, when performing user registration in the web server 5, the user is required to register user information in the web server 5. In this case, basic information, such as his/her name, address, and email address, is common information for registering in many web servers 5. Accordingly, if the user does not have to input the same information for performing user registration in the web server 5-2 as the information input for performing user registration in the web server 5-1, the ease of operation for the user is enhanced. Particularly when performing user registration by using a CE device provided with an insufficient input interface, it is very convenient for the user if the amount of information to be input is reduced.

DISCLOSURE OF INVENTION

The present invention has been made in view of this background. Accordingly, it is an object of the present invention to implement easy connection to various services on a network.

According to an information processing system of the present invention, a first information processing apparatus includes: first receiving means for receiving registration information from a second information processing apparatus; generating means for generating connection information used for allowing a third information processing apparatus to connect to a network based on the registration information received by the first receiving means; and first transmitting means for transmitting the connection information generated by the generating means to the second information processing apparatus, the second information processing apparatus includes: reception means for receiving input of the registration information; second transmitting means for transmitting the registration information received by the reception means to the first information processing apparatus; second receiving means for receiving the connection information from the first information processing apparatus; and recording means for recording the connection information received by the second receiving means in a recording medium, and the third information processing apparatus includes: reading means for reading the connection information recorded by the second information processing apparatus from the recording medium; and connection means for connecting to the network based on the connection information read by the reading means.

An information processing apparatus of the present invention includes: receiving means for receiving registration information from a first information processing apparatus; generating means for generating connection information used for allowing a second information processing apparatus, which is different from the first information processing apparatus, to connect to a network based on the registration information received by the receiving means; and transmitting means for transmitting the connection information generated by the generating means to the first information processing apparatus.

The above-described network may be the Internet.

The above-described registration information may include a postal code or an address at which the second information processing apparatus is connected to the network.

The generating means may select an access point for allowing the second information processing apparatus to connect to the network based on the postal code or the address so as to generate the connection information including information concerning the access point.

The information concerning the access point may include a telephone number of the access point.

The generating means may select the access point based on at least one of the conditions consisting of a communication cost, a communication speed, and a load of the access point when the second information processing apparatus is connected to the network.

The connection information may include an identifier required for the second information processing apparatus to receive authentication.

The identifier may include at least one of an identifier for logging in to an Internet service provider, an identifier for specifying a user, an identifier for specifying the second information processing apparatus, and an identifier for specifying a service on the network.

The connection information may further include a password required for the second information processing apparatus to receive the authentication.

The transmitting means may transmit, together with the connection information, a program for executing processing for allowing the second information processing apparatus to connect to the network to the first information processing apparatus.

A first information processing method of the present invention includes: a receiving step of receiving registration information from a first information processing apparatus; a generating step of generating connection information used for allowing a second information processing apparatus, which is different from the first information processing apparatus, to connect to a network based on the registration information received by processing of the receiving step; and a transmitting step of transmitting the connection information generated by processing of the generating step to the first information processing apparatus.

A program of a first recording medium of the present invention includes: a reception control step of controlling the reception of registration information from a first information processing apparatus; a generating step of generating connection information used for allowing a second information processing apparatus, which is different from the first information processing apparatus, to connect to a network based on the registration information controlled to be received by processing of the reception control step; and a transmission control step of controlling the transmission of the connection information generated by processing of the generating step to the first information processing apparatus.

A first program of the present invention allows a computer that controls an information processing apparatus to execute: a reception control step of controlling the reception of registration information from a first information processing apparatus; a generating step of generating connection information used for allowing a second information processing apparatus, which is different from the first information processing apparatus, to connect to a network based on the registration information controlled to be received by processing of the reception control step; and a transmission control step of controlling the transmission of the connection information generated by processing of the generating step to the first information processing apparatus.

Another information processing apparatus of the present invention includes: reception means for receiving the input of registration information from a user; transmitting means for transmitting the registration information received by the reception means to a first information processing apparatus; receiving means for receiving connection information for connecting to a network from the first information processing apparatus, the connection information being generated based on the registration information transmitted by the transmitting means; and recording means for recording the connection information received by the receiving means in a recording medium.

The above-described network may be the Internet.

The recording medium may be a memory card which is attached to the information processing apparatus and is also removed from the information processing apparatus and is attached to a second information processing apparatus, which is different from the first information processing apparatus.

The connection information may be information that allows a plurality of second information processing apparatuses, which are different from the first information processing apparatus, to connect to the Internet by utilizing the connection information.

The registration information may include at least a postal code or an address at which a second information processing apparatus, which is different from the first information processing apparatus, is connected to the network.

The connection information may include information concerning an access point for allowing a second information processing apparatus, which is different from the first information processing apparatus, to connect to the network.

The information concerning the access point may include a telephone number of the access point.

The connection information may include an identifier required for a second information processing apparatus, which is different from the first information processing apparatus, to receive authentication.

The identifier may include at least one of an identifier for logging in to an Internet service provider, an identifier for specifying a user, an identifier for specifying the second information processing apparatus, and an identifier for specifying a service on the network.

The connection information may further include a password required for the second information processing apparatus to receive the authentication.

The receiving means may receive, together with the connection information, a program for executing processing for allowing a second information processing apparatus, which is different from the first information processing apparatus, to connect to the network, and the recording means may record the connection information and the program received by the receiving means in the recording medium.

A second information processing method of the present invention includes: a reception step of receiving the input of registration information from a user; a transmitting step of transmitting the registration information received by processing of the reception step to a first information processing apparatus; a receiving step of receiving connection information for connecting to a network from the first information processing apparatus, the connection information being generated based on the registration information transmitted by processing of the transmitting step; and a recording step of recording the connection information received by processing of the receiving step in a recording medium.

A program of a second recording medium of the present invention includes: a reception control step of controlling the reception of the input of registration information from a user; a transmission control step of controlling the transmission of the registration information controlled to be received by processing of the reception control step to a first information processing apparatus; a receiving control step of controlling the reception of connection information for connecting to a network from the first information processing apparatus, the connection information being generated based on the registration information controlled to be transmitted by processing of the transmission control step; and a recording step of recording the connection information controlled to be received by processing of the receiving control step in a recording medium.

A second program of the present invention allows a computer that controls an information processing apparatus to execute: a reception control step of controlling the reception of the input of registration information from a user; a transmission control step of controlling the transmission of the registration information controlled to be received by processing of the reception control step to a first information processing apparatus; a receiving control step of controlling the reception of connection information for connecting to a network from the first information processing apparatus, the connection information being generated based on the registration information controlled to be transmitted by processing of the transmission control step; and a recording step of recording the connection information controlled to be received by processing of the receiving control step in a recording medium.

A further information processing apparatus of the present invention includes: holding means for detachably holding a recording medium; reading means for reading connection information for connecting to a network from the recording medium when the recording medium is held in the holding means from a first information processing apparatus while the recording medium is attached to the first information processing apparatus; and connection means for connecting to the network based on the connection information read by the reading means.

The above-described network may be the Internet.

The recording medium may be a memory card.

The connection information may be information that allows a plurality of the above-described information processing apparatuses to connect to the Internet by using the connection information.

The connection information may include information concerning an access point for allowing the information processing apparatus to connect to the network.

The information concerning the access point may include a telephone number of the access point.

The connection information may include an identifier required for the information processing apparatus to receive authentication.

The identifier may include at least one of an identifier for logging in to an Internet service provider, an identifier for specifying a user, an identifier for specifying the second information processing apparatus, and an identifier for specifying a service on the network.

The connection information may further include a password required for the information processing apparatus to receive the authentication.

The reading means may read a program for executing processing for allowing the information processing apparatus to connect to the network, the program being stored in the recording medium together with the connection information, and the connection means may connect to the network by using the connection information by executing the program read by the reading means.

The information processing apparatus may further include recording means for recording the connection information read by the reading means, and the connection means may connect to the network based on the connection information recorded by the recording means.

A third information processing method of the present invention includes: a reading step of reading connection information for connecting to a network from the recording medium when the recording medium is held in the information processing apparatus from a first information processing apparatus while the recording medium is attached to the first information processing apparatus; and a connection step of connecting to the network based on the connection information read by processing of the reading step.

A program of a third recording medium of the present invention controls an information processing apparatus to and from which a recording medium is attachable and detachable. The program includes: a reading step of reading connection information for connecting to a network from the recording medium when the recording medium is held in the information processing apparatus from a first information processing apparatus while the recording medium is attached to the first information processing apparatus; and a connection step of connecting to the network based on the connection information read by processing of the reading step.

A third program of the present invention allows a computer that controls an information processing apparatus to execute: a reading step of reading connection information for connecting to a network from a recording medium when the recording medium is held in the information processing apparatus from a first information processing apparatus while the recording medium is attached to the first information processing apparatus; and a connection step of connecting to the network based on the connection information read by processing of the reading step.

A fourth recording medium of the present invention records therein connection information for connecting an information processing apparatus to a network and a program for connecting the information processing apparatus to the network based on the connection information.

In the information processing system of the present invention, the first information processing apparatus receives registration information from the second information processing apparatus, generates connection information for connecting the third information processing apparatus to a network based on the received registration information, and sends the generated connection information to the second information processing apparatus. The second information processing apparatus receives the input of the registration information, sends the received registration information to the first information processing apparatus, receives the connection information from the first information processing apparatus, and records the received connection information in a recording medium. The third information processing apparatus reads the connection information from the recording medium, and is connected to a network based on the read connection information.

According to an information processing apparatus, a first information processing method, a first recording medium, and a first program of the present invention, registration information is received by a first information processing apparatus, connection information for connecting a second information processing apparatus, which is different from the first information processing apparatus, to a network is generated based on the received registration information, and the generated connection information is sent to the first information processing apparatus.

According to another information processing apparatus, a second information processing method, a second recording medium, and a second program of the present invention, the input of registration information is received from a user, the received registration information is sent to a first information processing apparatus, connection information for connecting to a network, the connection information being generated based on the registration information, is received from the first information processing apparatus, and the received connection information is recorded in a recording medium.

According to a further information processing apparatus, a third information processing method, a third recording medium, and a third program of the present invention, a recording medium is detachably held, and when the recording medium recording connection information for connecting to a network is held from a first information processing apparatus while the recording medium is attached to the first information processing apparatus, the connection information is read from the recording medium, and the information processing apparatus is connected to a network.

In a fourth recording medium of the present invention, connection information for connecting an information processing apparatus to a network and a program for connecting the information processing apparatus to a network based on the connection information are stored.

BRIEF DESCRIPTION OF THE DRAWINGS

FIG. 20 illustrates product-client registration codes.

FIG. 56 illustrates an example of screens of the display unit of a CE device.

FIG. 57 illustrates another example of screens of the display unit of a CE device.

FIG. 60 illustrates an example of screens of the display unit of a CE device.

FIG. 62 illustrates another example of screens of the display unit of a CE device.

FIG. 63 illustrates still another example of screens of the display unit of a CE device.

FIG. 70 illustrates an example of screens of the display unit of the setting terminal device.

FIG. 71 illustrates another example of screens of the display unit of the setting terminal device.

FIG. 72 illustrates still another example of screens of the display unit of the setting terminal device.

FIG. 73 illustrates an example of screens of the display unit of the setting terminal device.

FIG. 74 illustrates another example of screens of the display unit of the setting terminal device.

FIG. 75 illustrates still another example of screens of the display unit of the setting terminal device.

FIG. 76 illustrates an example of screens of the display unit of the setting terminal device.

FIG. 85 illustrates another example of screens of the display unit of the setting terminal device.

FIG. 86 illustrates still another example of screens of the display unit of the setting terminal device.

FIG. 87 illustrates an example of screens of the display unit of the setting terminal device.

FIG. 88 illustrates another example of screens of the display unit of the setting terminal device.

FIG. 91 illustrates another example of screens of the display unit of the setting terminal device.

FIG. 92 illustrates still another example of screens of the display unit of the setting terminal device.

FIG. 93 illustrates an example of screens of the display unit of the setting terminal device.

FIG. 103 is a flowchart illustrating service registration processing performed by the service providing server.

BEST MODE FOR CARRYING OUT THE INVENTION

Figure 2:
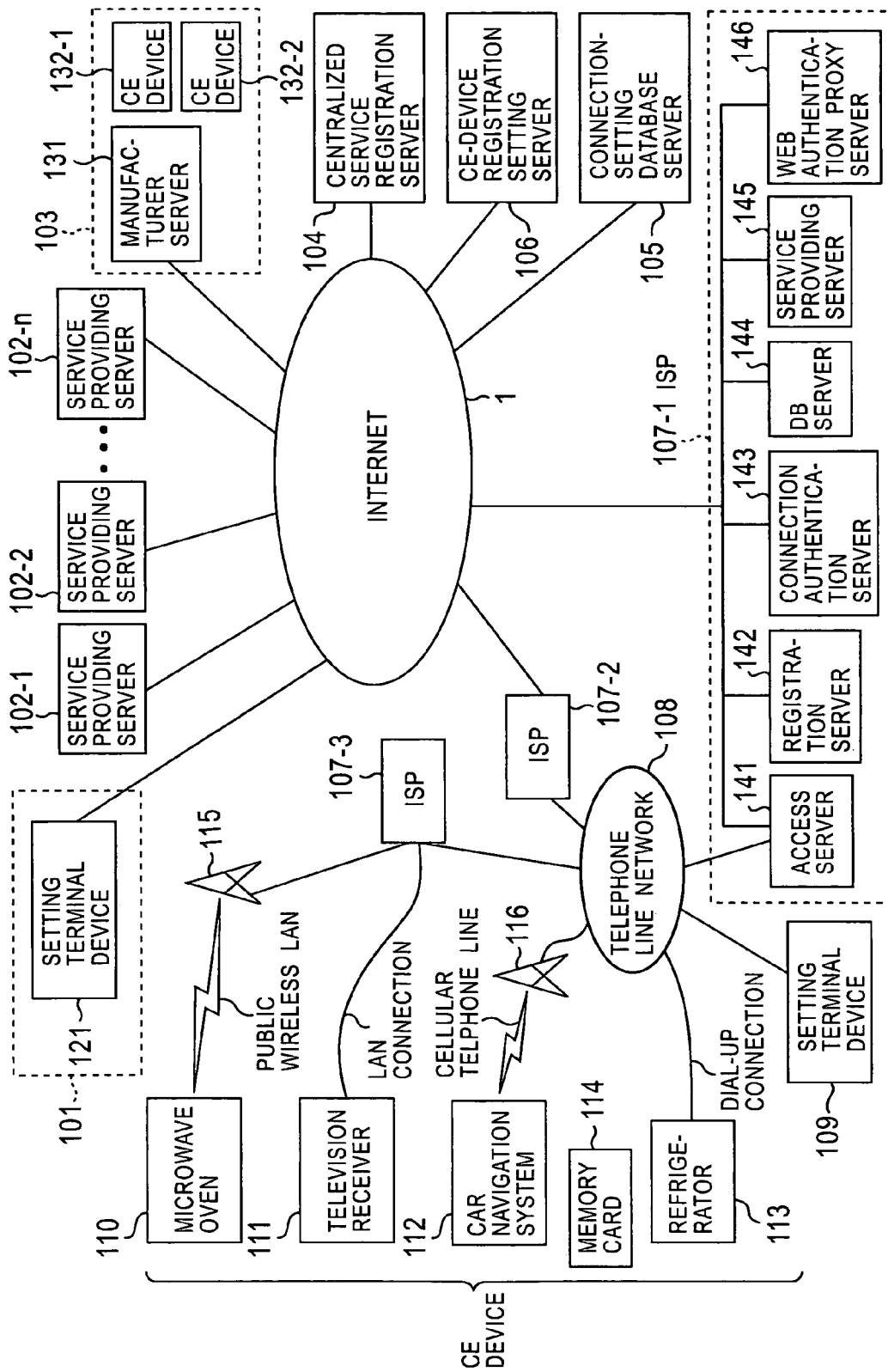
FIG. 2 is a block diagram illustrating an example of the configuration of an information-processing system to which the present invention is applied.

FIG. 2 illustrates the configuration of an embodiment of an information processing system to which the present invention is applied. In FIG. 2, a setting terminal device 121 for setting a CE device 132 is installed in an operation center 101 for setting the connection of CE devices 132-1 and 132-2 manufactured by a CE device manufacturer 103 to the Internet 1, and for setting the registration of the CE devices 132-1 and 132-2 in service providing servers 102-1 through 102-n. The operation center 101 is connected to the Internet 1. The service providing servers 102-1 through 102-n for providing various services to CE devices possessed by users, such as a microwave oven 110, a television receiver 111, a car navigation system 112, and a refrigerator 113, are connected to the Internet 1.

A manufacturer server 131 installed in the CE device manufacturer 103, a centralized service registration server 104, a CE-device registration setting server 105, and a connection-setting database server 106 are also connected to the Internet 1. ISPs (Internet Service Providers) 107-1 through 107-3 are also connected to the Internet 1. The car navigation system 112 is connected to the ISP 107-1 via a cellular telephone line 116 and a telephone line network 108. The refrigerator 113 is connected to the ISP 107-1 via the telephone line network 108 by dial-up connection.

A setting terminal device 109 possessed by a user is connected to the ISP 107-2 via the telephone line network 108. The microwave oven 110 is connected to the ISP 107-3 via a public wireless LAN (Local Area Network) base station 115, and the television receiver 111 is connected to the ISP 107-3 via a LAN.

In FIG. 2, the car navigation system 112 is connected to the ISP 107-1 via the cellular telephone line 116 and the telephone line network 108. However, this is only an example of connection modes, and the car navigation system 112 is not necessarily connected to the ISP 107-1 via the cellular telephone line 116 and the telephone line network 108. Instead, the car navigation system 112 can be connected to the ISP 107 via a certain network; for example, the car navigation system 112 can be connected to the ISP 107 via the public wireless LAN base station 115. Similarly, as stated above, the refrigerator 113 is connected to the ISP 107-1 via the telephone line network 108, the microwave oven 110 is connected to the ISP 107-3 via the public wireless LAN base station 115, and the television receiver 111 is connected to the ISP 107-3 via the LAN. However, these CE devices are not necessarily connected to the ISPs 107 via the above-described networks, and they can be connected to the ISPs 107 by using other networks.

In FIG. 2, the setting terminal device 109 is connected to the ISPs 107 via the telephone line network 108. However, the connection state is not limited to this. That is, the setting terminal device 109 can be connected to the ISPs 107 via, for example, the public wireless LAN, the LAN, the cellular telephone line, or other networks.

The microwave oven 110, the television receiver 111, the car navigation system 112, and the refrigerator 113 are CE devices provided with functions for connecting to networks, and receive services from service providing servers for providing services desired by the users among the service providing servers 102-1 through 102-n and a service providing server 145. These CE devices can be communicated with each other, and a drive for a memory card 114 is provided for each of the car navigation system 112 and the refrigerator 113.

In the ISP 107-1, an access server 141 is called from CE devices, such as the car navigation system 112 and the refrigerator 113, via the telephone line network 108 so as to be connected to such CE devices, and performs authentication processing for the CE devices. After authenticating the CE devices, the access server 141 allows the CE devices to connect to the Internet 1. The access server 141 may be connected to the CE devices via a certain network other than the telephone line network 108.

When performing user registration, a registration server 142 sends user information obtained from the user, and user ID and password to a database server 144, and stores them therein. A connection authentication server 143 performs authentication for the user ID and password. The database server 144 stores device IDs of manufactured CE devices, user information, user IDs, passwords, and period-restricted passwords for individual users. In response to a request from another server, the database server 144 searches for the stored data, and returns search results to the server that has made the request.

As in the service providing servers 102, the service providing server 145 provides the predetermined services to the car navigation system 112 and the refrigerator 113. A web authentication proxy server 146 performs authentication for the CE devices that receive services from the service providing server 145 or the service providing server 102.

Figure 3:
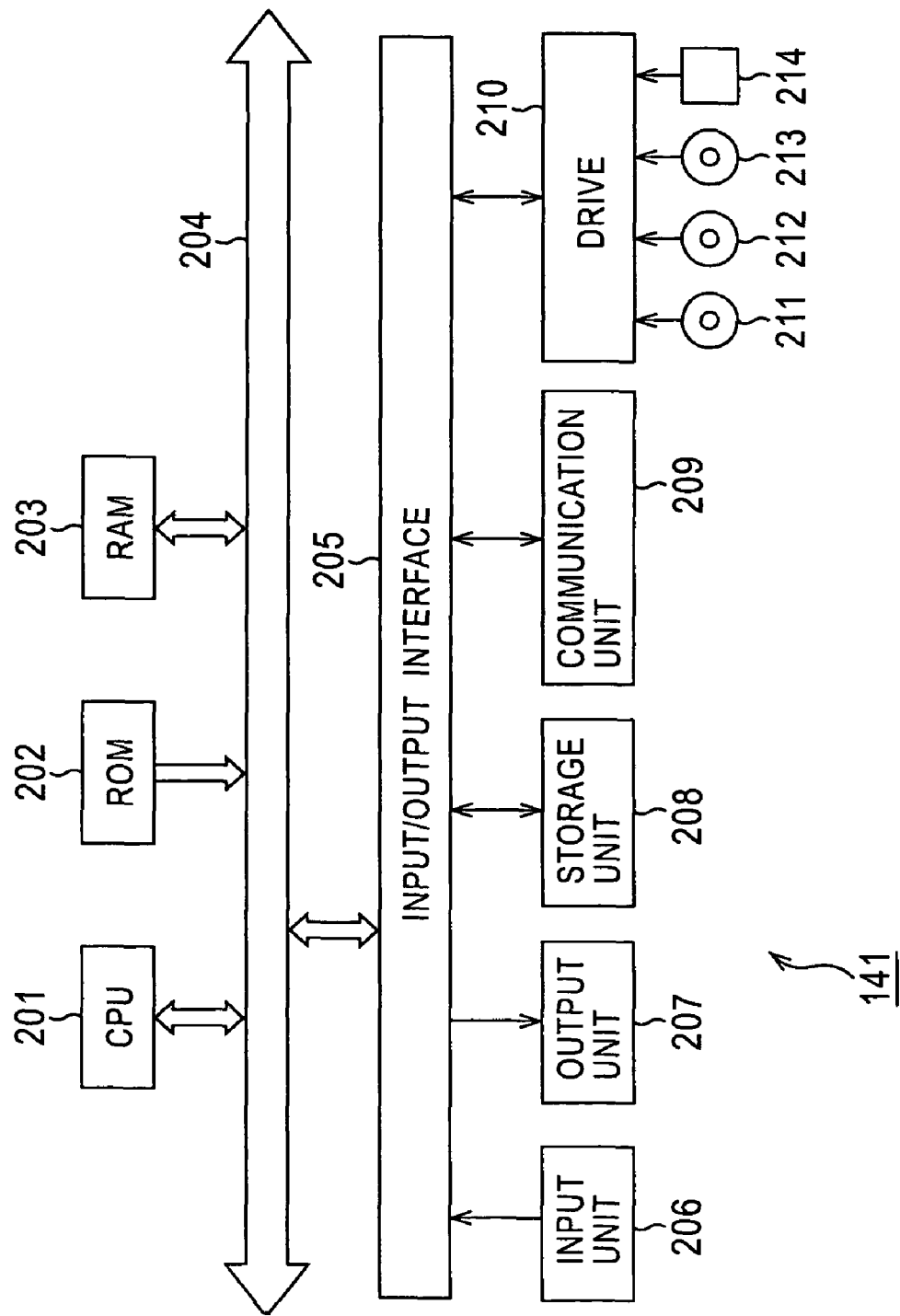
FIG. 3 is a block diagram illustrating an example of the configuration of an access server.

FIG. 3 illustrates an example of the configuration of the access server 141. In FIG. 3, a CPU 201 performs various types of processing according to programs stored in a ROM 202 or programs loaded into a RAM 203 from a storage unit 208. In the RAM 203, data required for executing various types of processing by the CPU 201 are also stored.

The CPU 201, the ROM 202, and the RAM 203 are connected to each other via a bus 204. An input/output interface 205 is also connected to this bus 204.

An input unit 206 formed of a keyboard, a mouse, etc., an output unit 207 formed of a CRT (Cathode Ray Tube) display or LCD (Liquid Crystal Display) device, a speaker, etc., the storage unit 208 formed of, for example, a hard disk, and a communication unit 209 formed of a modem, a terminal adapter, etc., are connected to the input/output interface 205. The communication unit 209 performs communication processing via networks including the Internet 1.

A drive 210 is also connected to the input/output interface 205 when necessary. A magnetic disk 211, an optical disc 212, a magneto-optical disk 213, or a memory card 214 is suitably loaded in the drive 210, and a computer program read from such a recording medium is installed into the storage unit 208 if necessary.

The basic configurations of the setting terminal device 121, the service providing server 102, the manufacturer server 131, the centralized service registration server 104, the CE-device registration setting server 105, the connection-setting database server 106, the setting terminal device 109, the registration server 142, the connection authentication server 143, the database server 144, the service providing server 145, and the web authentication proxy server 146 are similar to the configuration of the access server 141.

Figure 4:
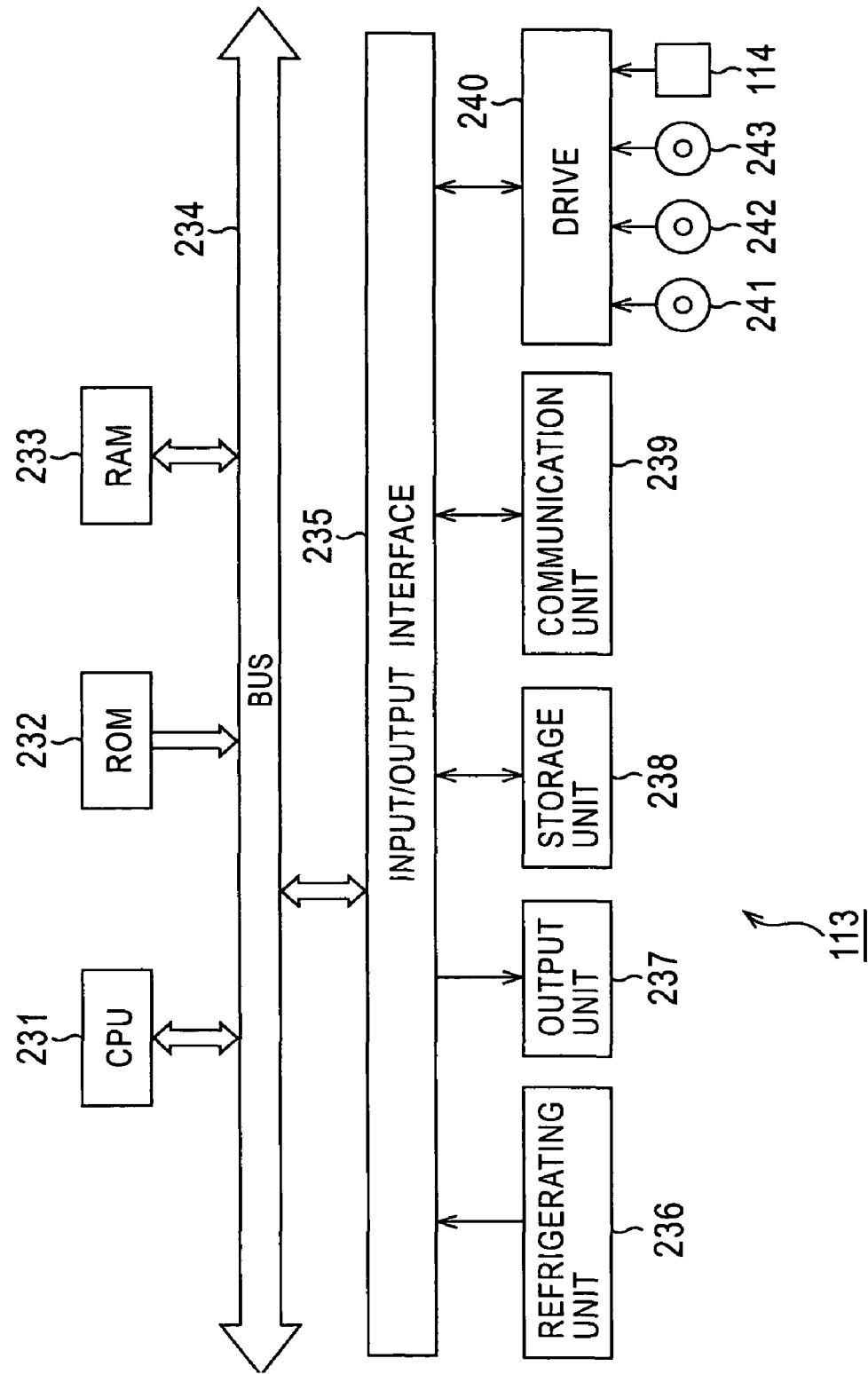
FIG. 4 is a block diagram illustrating an example of a refrigerator.

FIG. 4 illustrates an example of the configuration of the refrigerator 113. In FIG. 4, a CPU 231 performs various types of processing according to programs stored in a ROM 232 or programs loaded into a RAM 233 from a storage unit 238. In the RAM 233, data required for executing various types of processing by the CPU 231 are also stored.

The CPU 231, the ROM 232, and the RAM 233 are connected to each other via a bus 234. An input/output interface 235 is also connected to this bus 234.

A refrigerating unit 236 formed of a sensor for the temperature and the humidity in the refrigerator and a device for generating cool air and discharging it into the refrigerator, an output unit 237 formed of a CRT (Cathode Ray Tube) display or LCD (Liquid Crystal Display) device, a speaker, etc., the storage unit 238 formed of, for example, a hard disk, and a communication unit 239 formed of a modem, a terminal adapter, etc., are connected to the input/output interface 235. The communication unit 239 performs communication processing via networks including the Internet 1.

A drive 240 is also connected to the input/output interface 235 when necessary. A magnetic disk 241, an optical disc 242, a magneto-optical disk 243, or the memory card 114 is suitably loaded in the drive 240, and a computer program read from such a recording medium is installed into the storage unit 238 if necessary.

Figure 5:
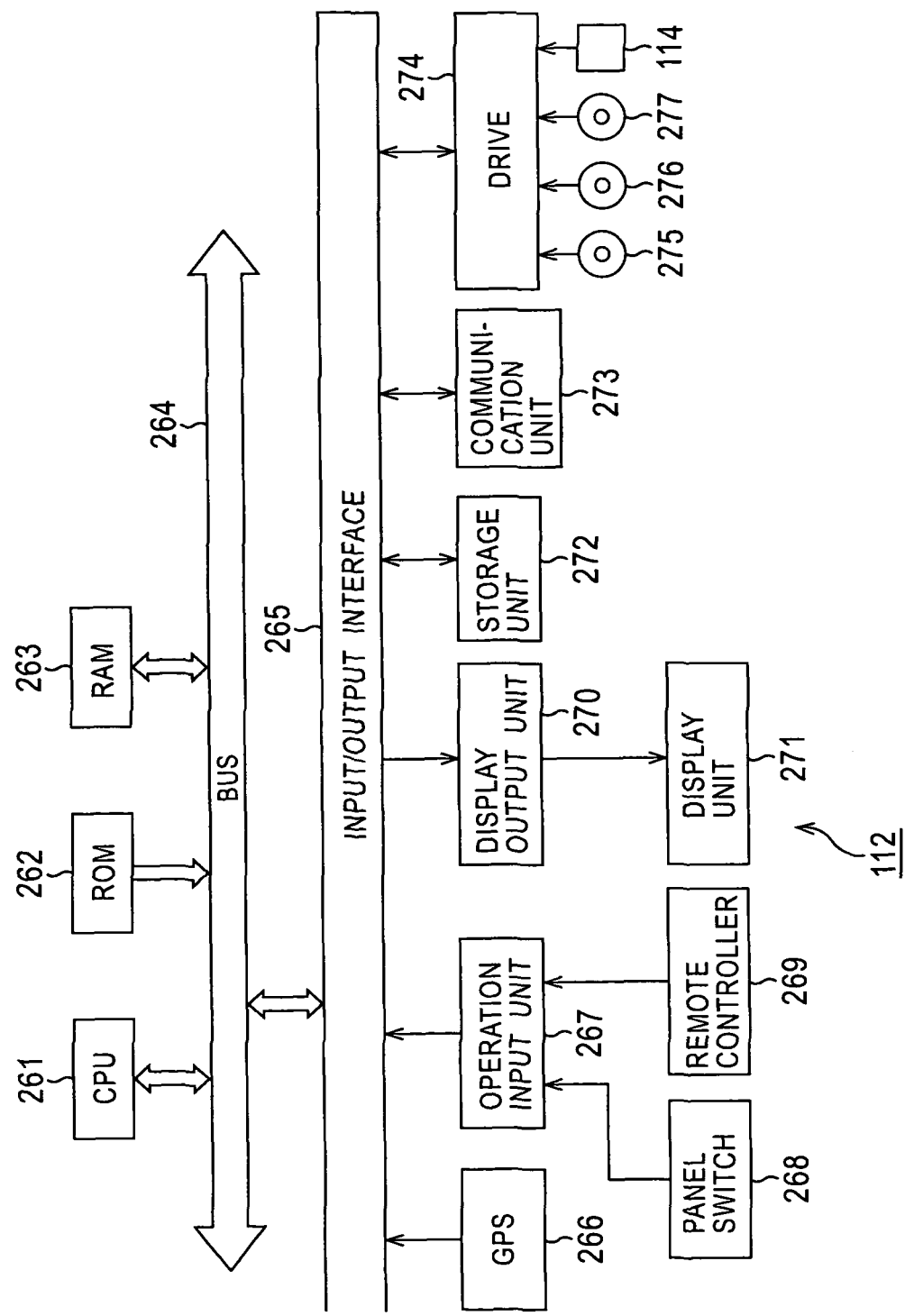
FIG. 5 is a block diagram illustrating an example of the configuration of a car navigation system.

FIG. 5 illustrates an example of the configuration of the car navigation system 112. In FIG. 5, a CPU 261 performs various types of processing according to programs stored in a ROM 262 or programs loaded into a RAM 263 from a storage unit 272. In the RAM 263, data required for executing various types of processing by the CPU 261 are also stored.

The CPU 261, the ROM 262, and the RAM 263 are connected to each other via a bus 264. An input/output interface 265 is also connected to this bus 264.

A GPS (Global Positioning System) 266 for calculating, based on communication with a satellite, the position of an automobile in which the car navigation system 112 is installed, an operation input unit 267 for receiving an operation input by a user through a panel switch 268 or a remote controller 269, a display output unit 270 for controlling the display of images on a display unit 271, such as a CRT display or LCD device, the storage unit 272 formed of, for example, a hard disk, and a communication unit 273 formed of a modem, a terminal adapter, etc., are connected to the input/output interface 265. The communication unit 273 performs communication processing via networks including the Internet 1.

A drive 274 is also connected to the input/output interface 265 when necessary. A magnetic disk 275, an optical disc 276, a magneto-optical disk 277, or the memory card 114 is suitably loaded in the drive 274, and a computer program read from such a recording medium is installed into the storage unit 272 if necessary.

Figure 6:
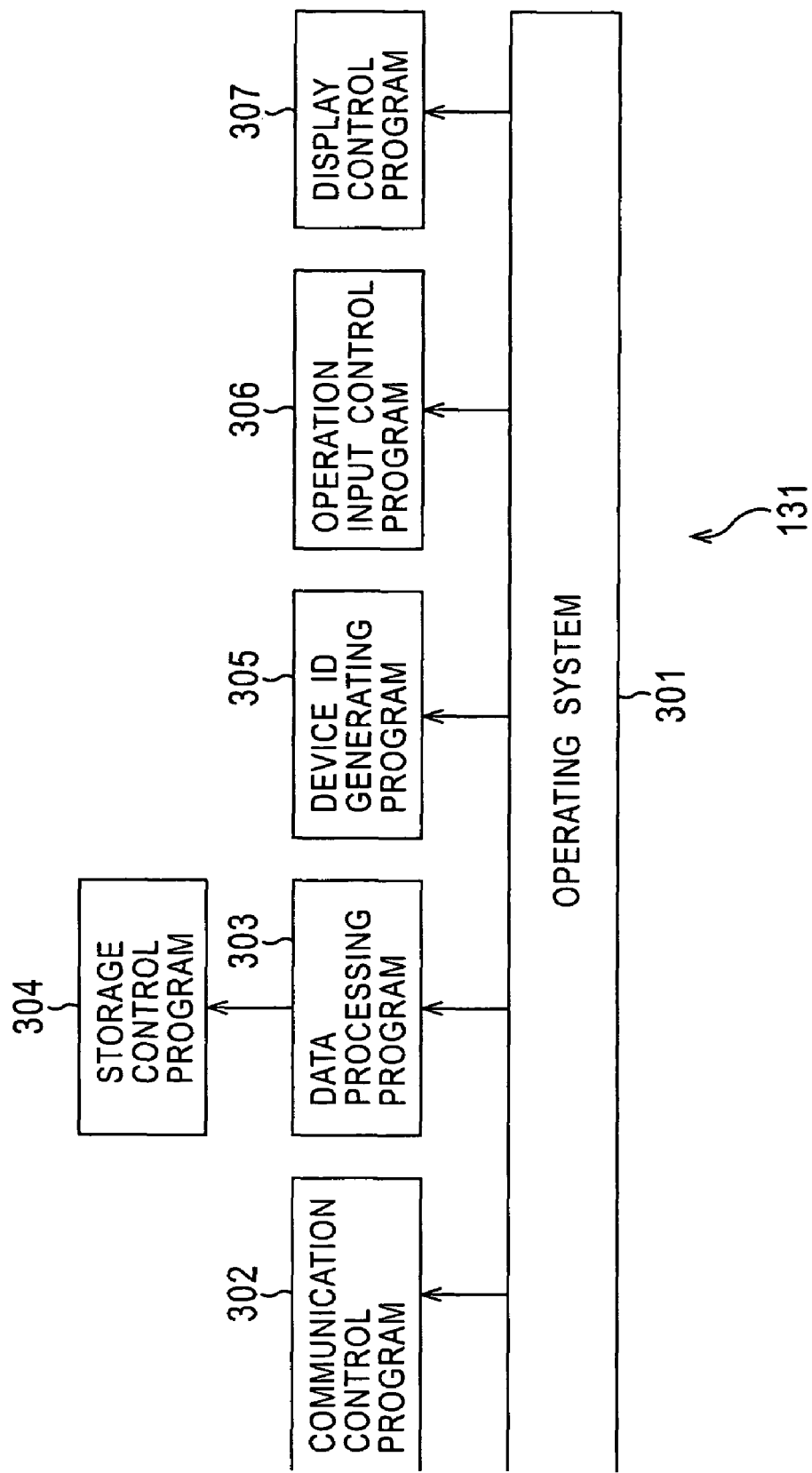
FIG. 6 illustrates the configuration of a program for controlling a manufacturer server.

FIG. 6 illustrates an example of the configuration of a program for controlling the processing executed by the manufacturer server 131. An operating system 301 manages and controls the overall processing of the manufacturer server 131. A communication control program 302 controls communication via the Internet 1. A data processing program 303 controls the storage and search for data concerning the CE devices 132 manufactured in the CE device manufacturer 103 and shipped therefrom. A storage control program 304 controls the storage of device IDs of the CE devices 132 manufactured in the CE device manufacturer 103 and shipped therefrom, and passphrases (for example, random numbers, details are given below) that cannot be identified by the user. A device-ID generating program 305 controls the generation of the device IDs of the CE devices 132 manufactured in the CE device manufacturer 103 and shipped therefrom. An operation-input control program 306 controls the reception of operations input into the manufacturer server 131. A display control program 307 controls the display operation of the manufacturer server 131.

Figure 7:
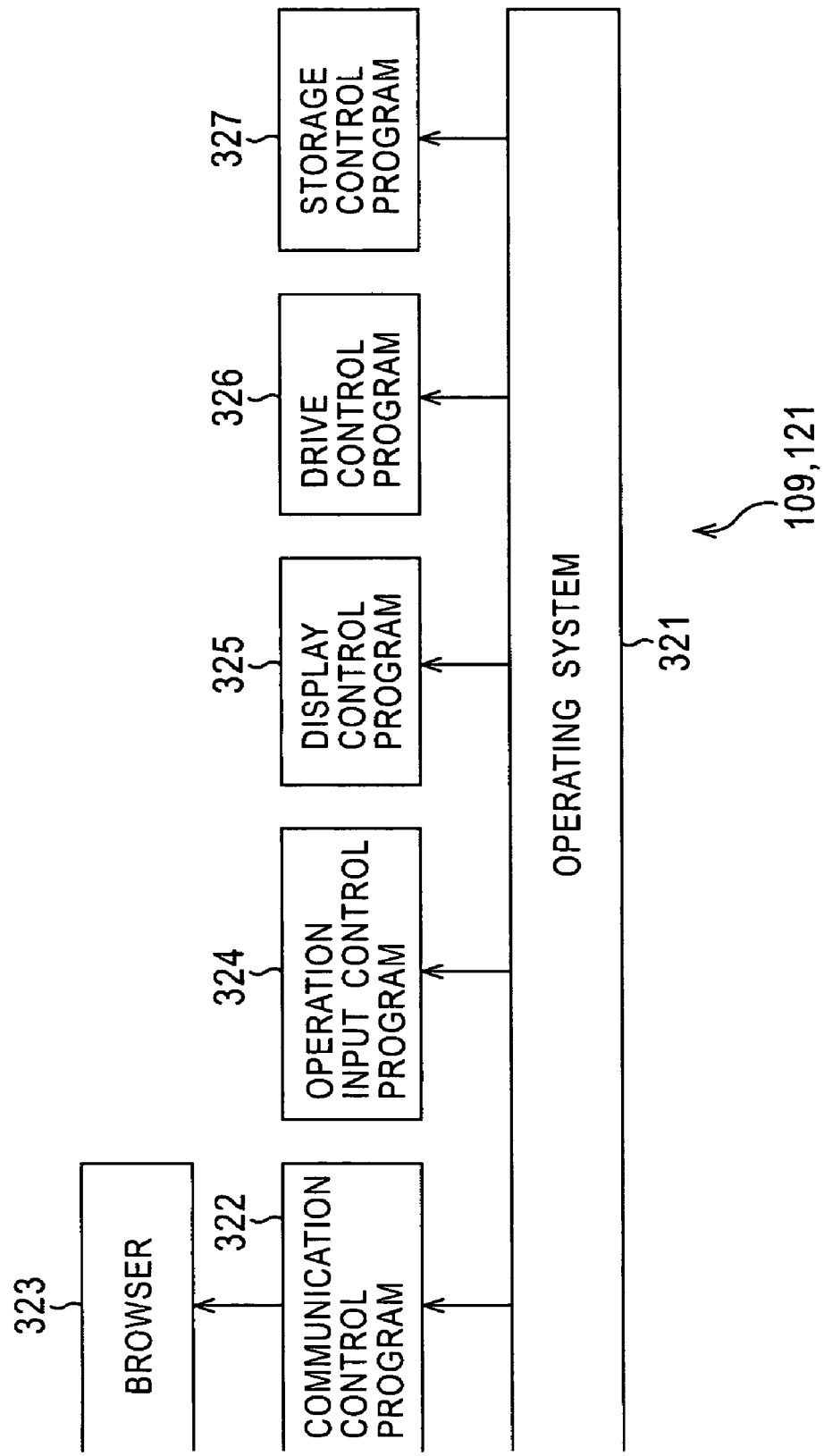
FIG. 7 illustrates the configuration of a program for controlling a setting terminal device.

FIG. 7 illustrates an example of the configuration of a program for controlling the processing executed by the setting terminal devices 109 and 121. An operating system 321 manages and controls the overall processing of the setting terminal device 109 (or setting terminal device 121). A communication control program 322 controls communication via the Internet 1. A browser 323 controls the display (playback) of HTML (Hypertext Markup Language) documents, image data including still images and moving pictures, and audio data received from networks. The browser 323 also operates application software described in programming languages, such as Java (registered trademark) Script or Java (registered trademark). The browser 323 also controls the transmission of information input into a form by the user. An operation-input control program 324 controls the reception of operations input into the setting terminal device 109 (or setting terminal device 121). A display control program 325 controls the display of images on the display unit. A drive control program 326 controls the reading and writing of information from and into the memory card 114 loaded in the drive. A storage control program 327 controls the storage of information into the storage unit.

Figure 8:
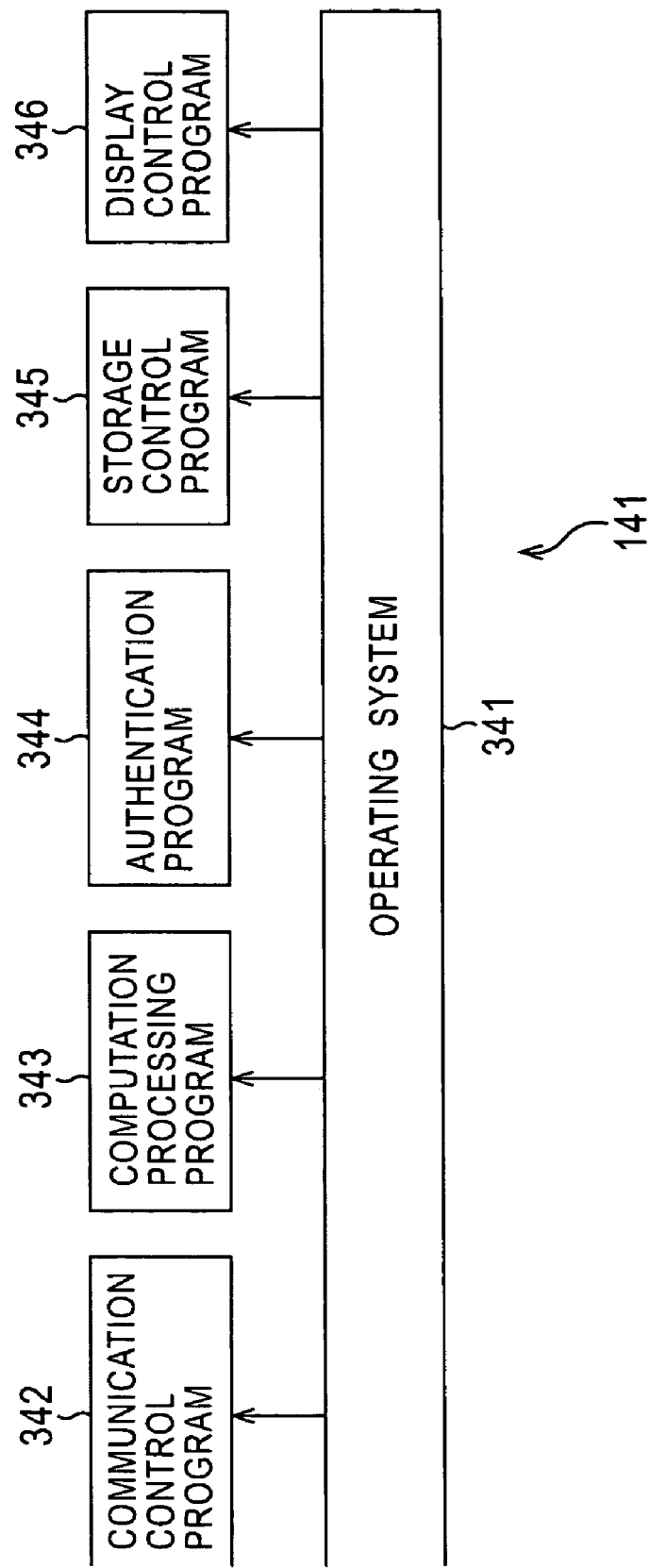
FIG. 8 illustrates the configuration of a program for controlling the access server.

FIG. 8 illustrates an example of the configuration of a program for controlling the processing executed by the access server 141. An operating system 341 manages and controls the overall processing of the access server 141. A communication control program 342 controls communication. A computation processing program 343 controls predetermined computation processing for performing authentication for CE devices. An authentication program 344 controls authentication processing for CE devices. A storage control program 345 controls the storage of information into the storage unit. A display control program 346 controls the display of images on the display unit.

Figure 9:
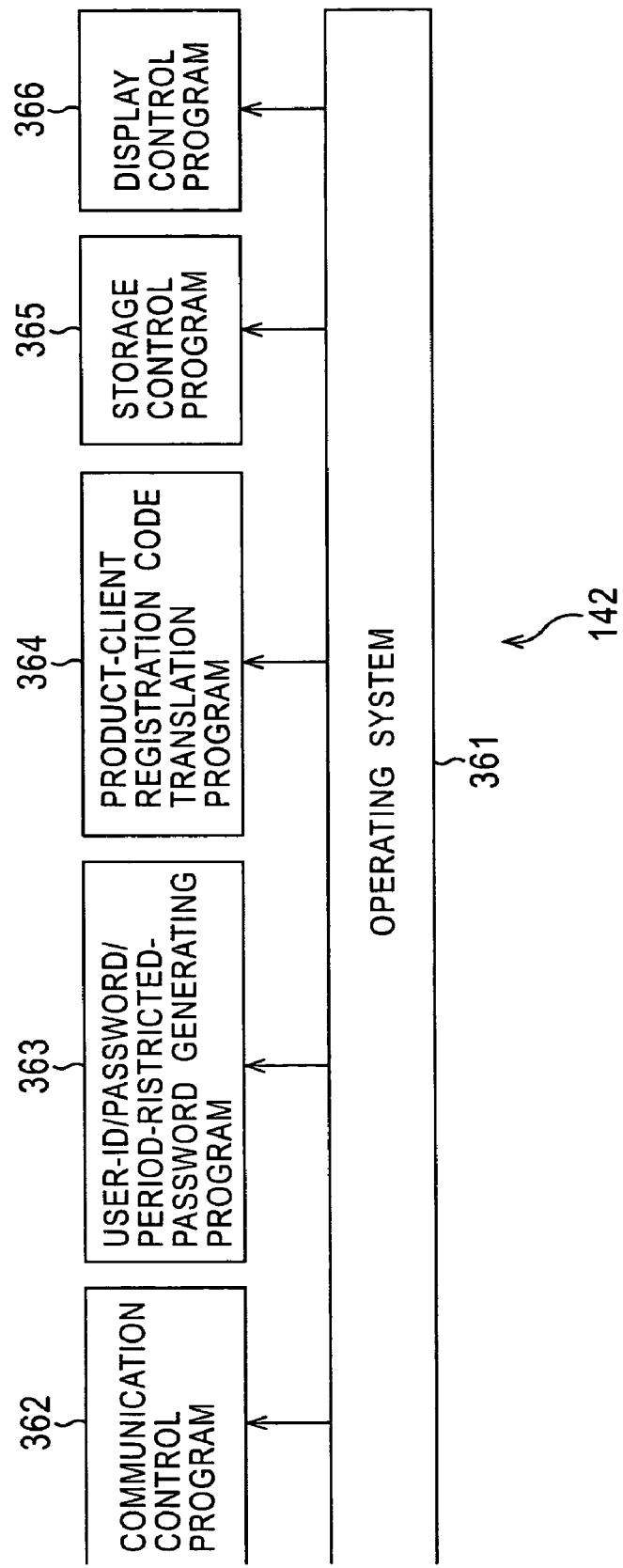
FIG. 9 illustrates the configuration of a program for controlling a registration server.

FIG. 9 illustrates an example of the configuration of a program for controlling the processing executed by the registration server 142. An operating system 361 manages and controls the overall processing of the registration server 142. A communication control program 362 controls communication. A user-ID/password/period-restricted-password generating program 363 controls the generation of user IDs, passwords, and period-restricted passwords. A product-client registration code translation program 364 controls the translation of product-client registration codes into device IDs. A storage control program 365 controls the storage of information into the storage unit. A display control program 366 controls the display of images on the display unit.

Figure 10:
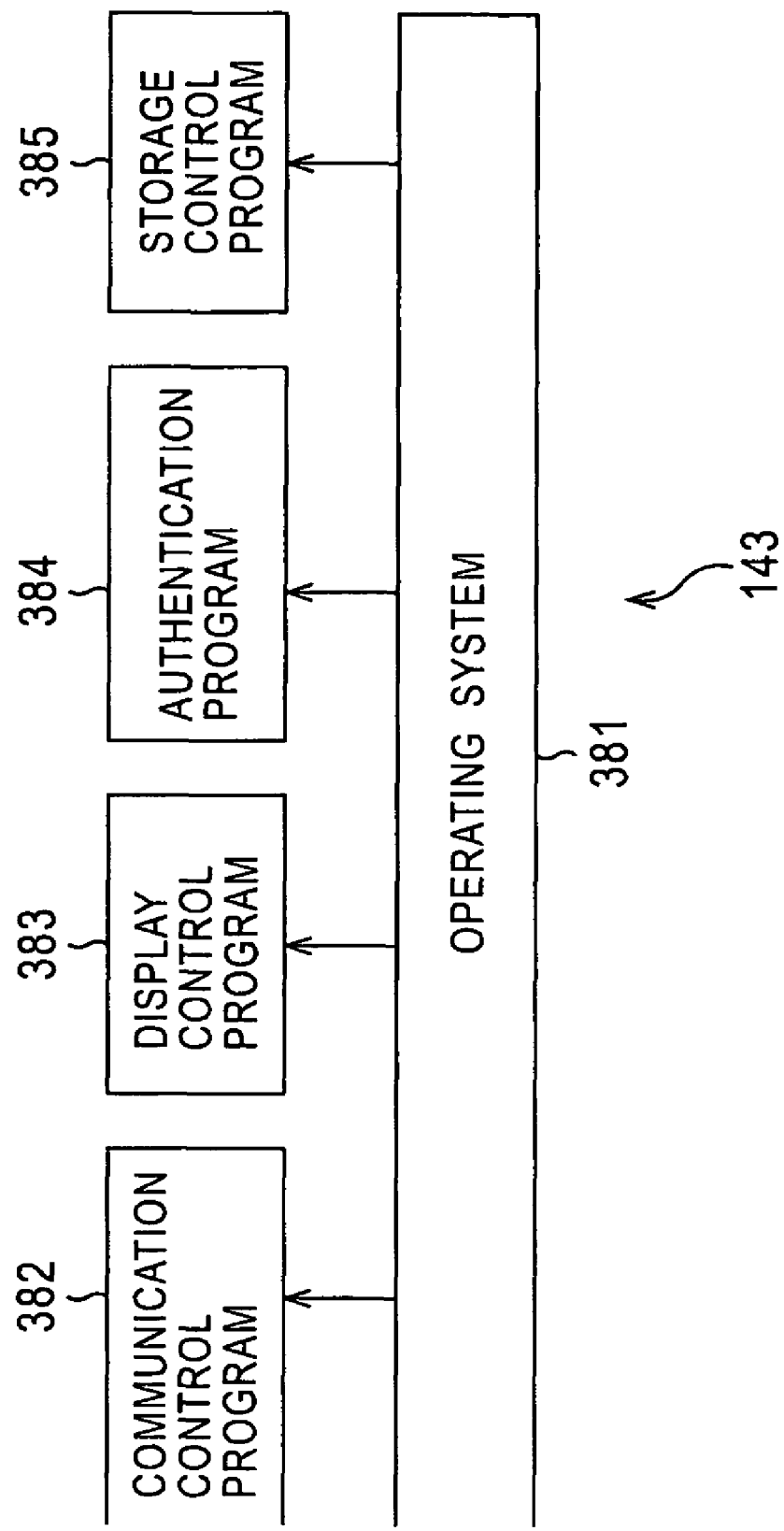
FIG. 10 illustrates the configuration of a program for controlling a connection authentication server.

FIG. 10 illustrates an example of the configuration of a program for controlling the processing executed by the connection authentication server 143. An operating system 381 manages and controls the overall processing of the connection authentication server 143. A communication control program 382 controls communication. A display control program 383 controls the display of images on the display unit. An authentication program 384 controls the authentication processing for users. A storage control program 385 controls the storage of information into the storage unit.

Figure 11:
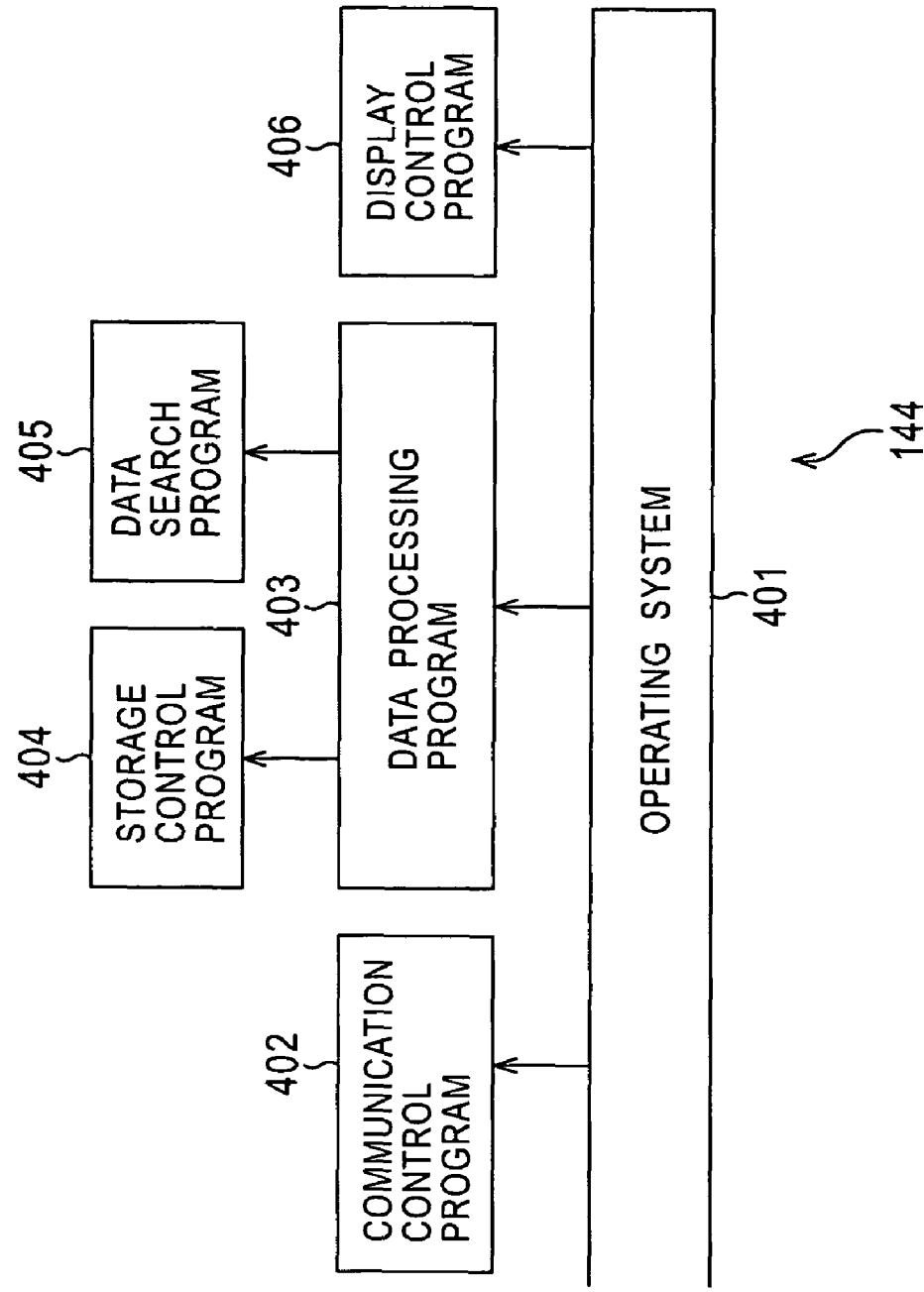
FIG. 11 illustrates the configuration of a program for controlling a database server.

FIG. 11 illustrates an example of the configuration of a program for controlling the processing executed by the database server 144. An operating system 401 manages and controls the overall processing of the database server 144. A communication control program 402 controls communication. A data processing program 403 controls the overall storage and search for information concerning users. A storage control program 404 controls the storage of information into the storage unit. A data search program 405 controls search for desired data from the data stored in the storage unit. A display control program 406 controls the display of images on the display unit.

Figure 12:
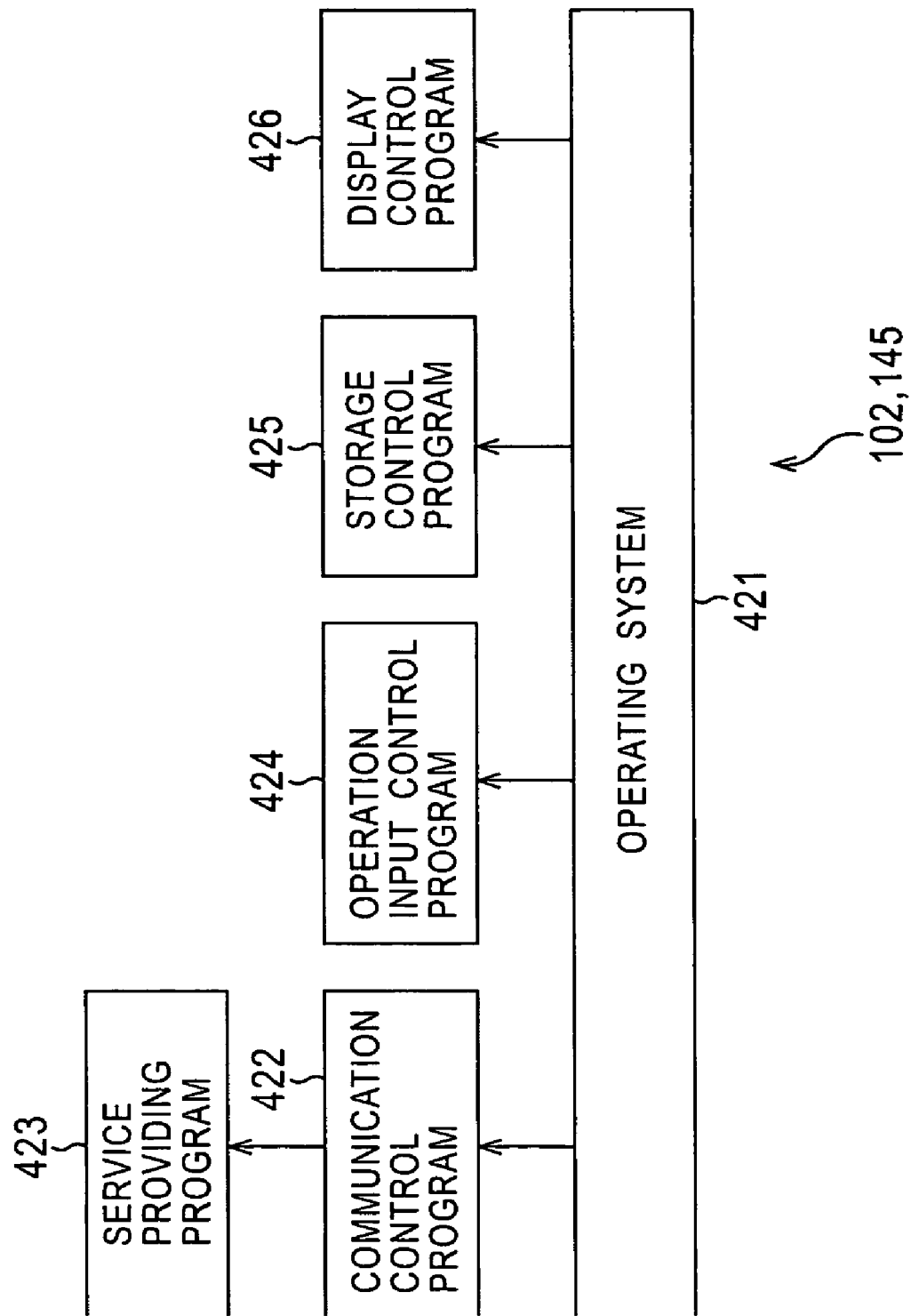
FIG. 12 illustrates the configuration of a program for controlling a service providing server.

FIG. 12 illustrates an example of the configuration of a program for controlling the processing executed by the service providing servers 102 and 145. An operating system 421 manages and controls the overall processing of the service providing server 102 (or service providing server 145). A communication control program 422 controls communication. A service providing program 423 controls processing concerning services provided via networks including the Internet 1. An operation-input control program 424 controls the execution of the processing in response to input operations. A storage control program 425 controls the storage of information into the storage unit. A display control program 426 controls the display of images on the display unit.

Figure 13:
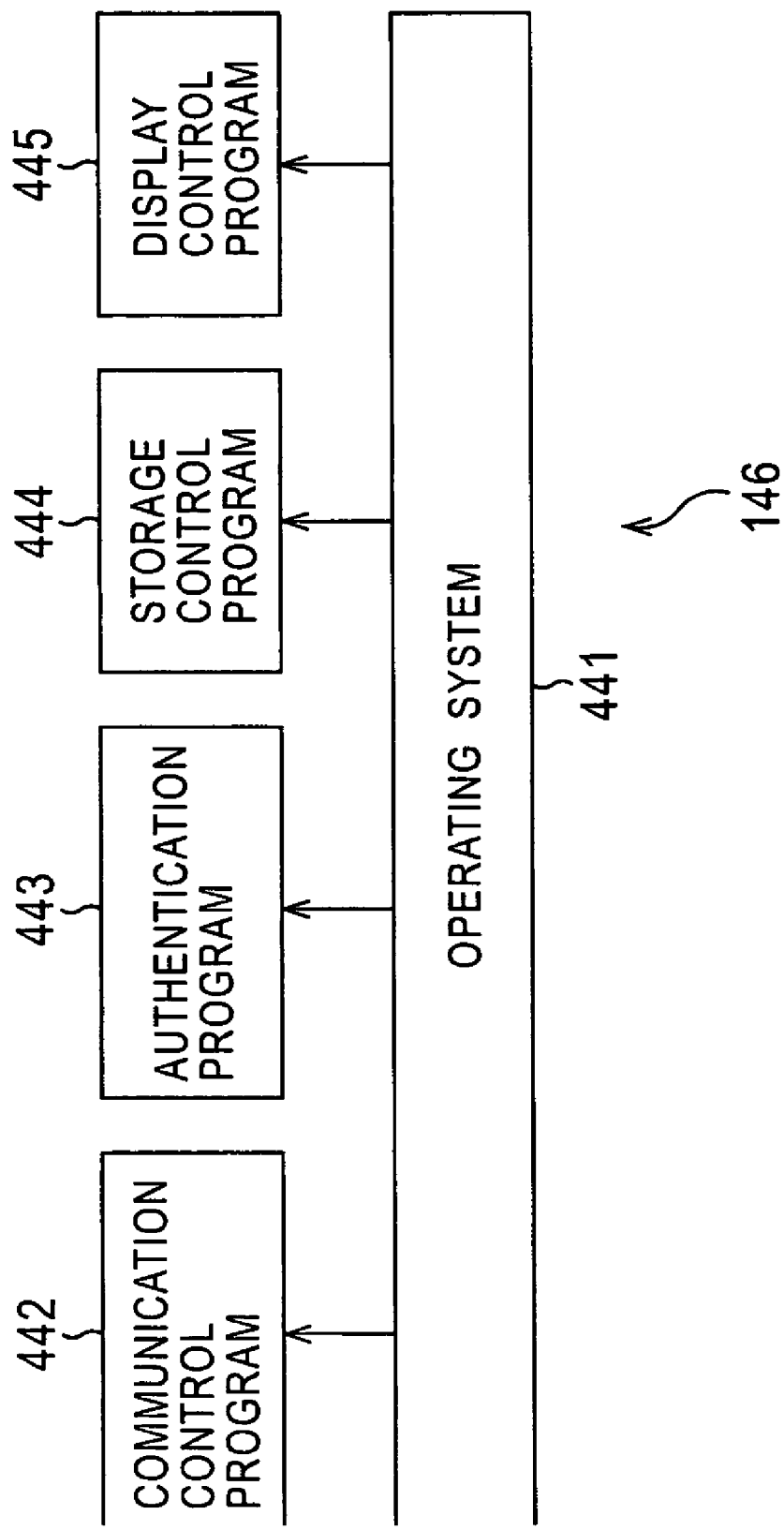
FIG. 13 illustrates the configuration of a program for controlling a web authentication proxy server.

FIG. 13 illustrates an example of the configuration of a program for controlling the processing executed by the web authentication proxy server 146. An operating system 441 manages and controls the overall processing of the web authentication proxy server 146. A communication control program 442 controls communication. An authentication program 443 controls the authentication processing for users. A storage control program 444 controls the storage of information into the storage unit. A display control program 445 controls the display of images on the display unit.

Figure 14:
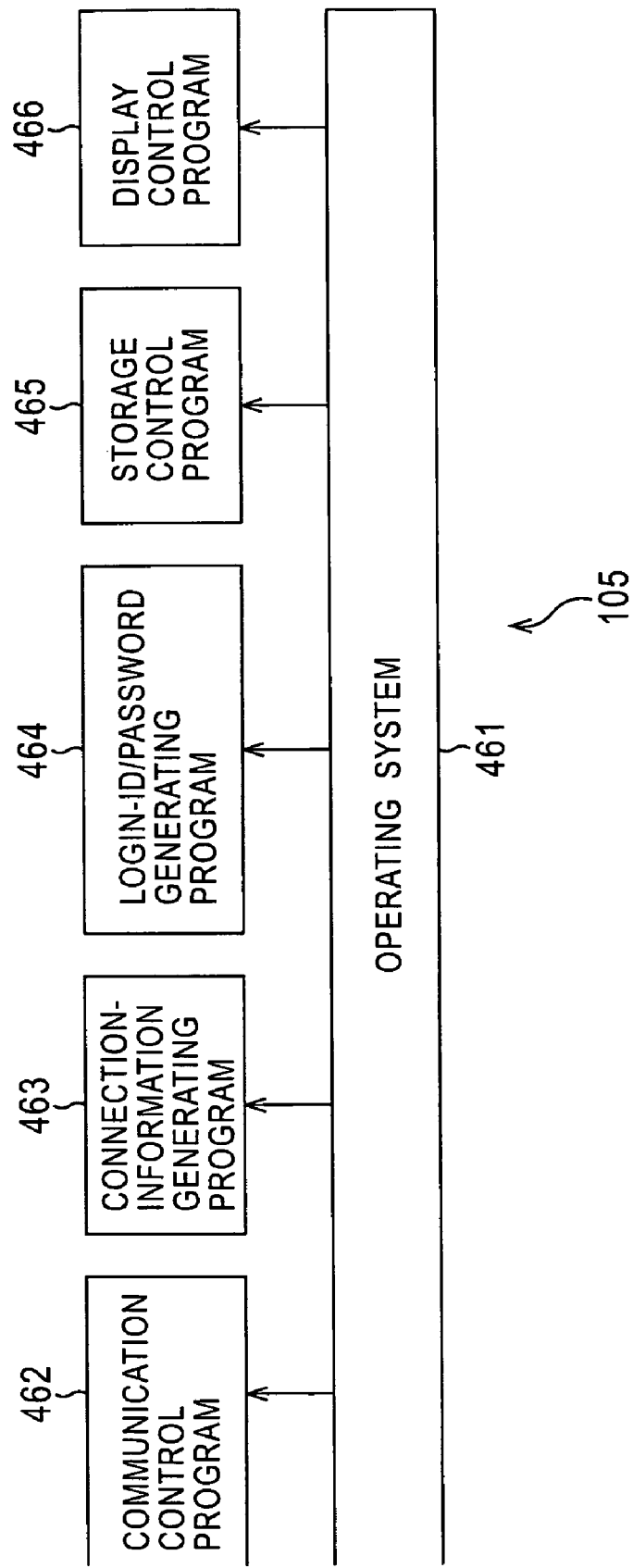
FIG. 14 illustrates the configuration of a program for controlling a CE-device registration setting server.

FIG. 14 illustrates an example of the configuration of a program for controlling the processing executed by the CE-device registration setting server 105. An operating system 461 manages and controls the overall processing of the CE-device registration setting server 105. A communication control program 462 controls communication. A connection-information generating program 463 controls the generation of connection information for connecting CE devices to networks including the Internet 1. The connection information is information required for connecting CE devices to networks, for example, an address obtaining method, ISP login ID/password, dedicated access point telephone no., DHCP (Dynamic Host Configuration Protocol) server address, DNS (Domain Name System) server address, SMTP (Simple Mail Transfer Protocol) server address, POP (Post Office Protocol) server address, IMAP (Internet Message Access Protocol) server address, proxy server address, default gateway address, login ID/password to the service providing server 102 (or service providing server 145), wireless LAN ID/password, and ESS ID (Extended Service Set Identity). A login-ID/password generating program 464 controls the generation of a login ID and password required for logging in to the ISP 107 and the service providing server 102 (or service providing server 145). A storage control program 465 controls the storage of information into the storage unit. A display control program 466 controls the display of images on the display unit.

Figure 15:
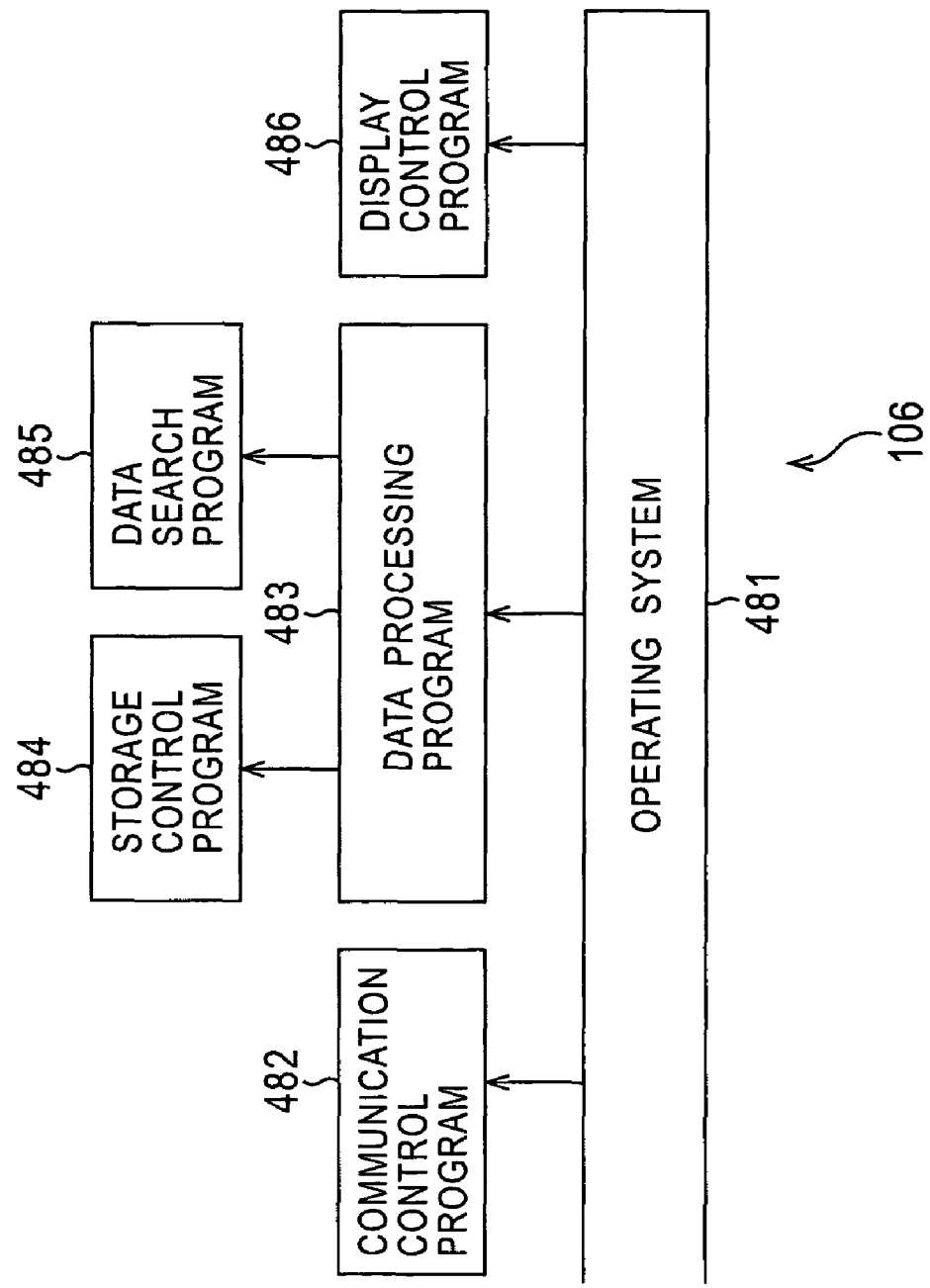
FIG. 15 illustrates the configuration of a program for controlling a connection setting database server.

FIG. 15 illustrates an example of the configuration of a program for controlling the processing executed by the connection-setting database server 106. An operating system 481 manages and controls the overall processing of the connection-setting database server 106. A communication control program 482 controls communication. A data processing program 483 controls the overall storage and search for user information. A storage control program 484 controls the storage of information into the storage unit. A data search program 485 controls search for desired data from the data stored in the storage unit. A display control program 486 controls the display of images on the display unit.

Figure 16:
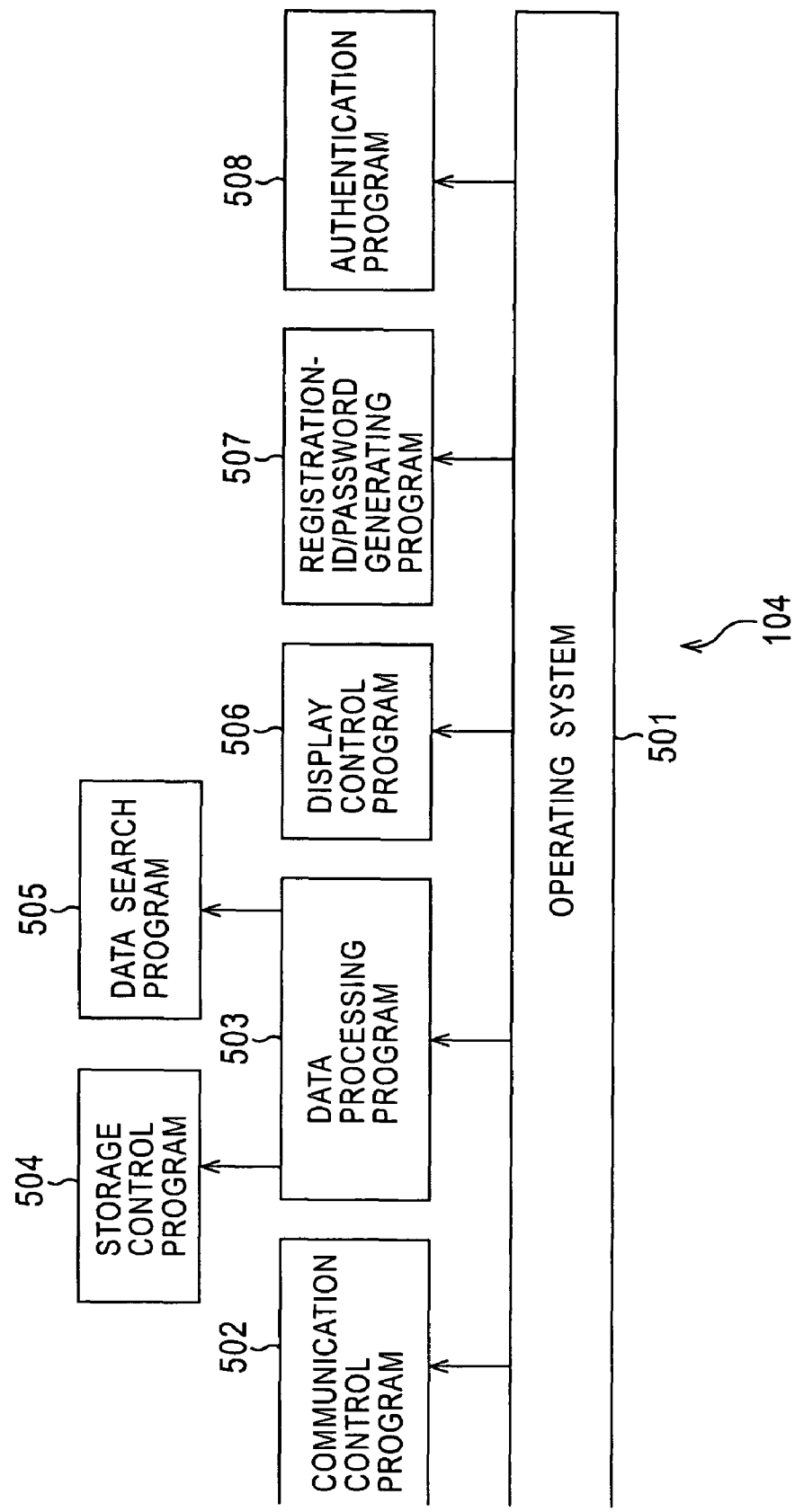
FIG. 16 illustrates the configuration of a program for controlling a centralized service registration server.

FIG. 16 illustrates an example of the configuration of a program for controlling the processing executed by the centralized service registration server 104. An operating system 501 manages and controls the overall processing of the centralized service registration server 104. A communication control program 502 controls communication. A data processing program 503 controls the overall storage and search for user information. A storage control program 504 controls the storage of information into the storage unit. A data search program 505 controls search for desired data from the data stored in the storage unit. A display control program 506 controls the display of images on the display unit. A registration-ID/password generating program 507 controls the generation of registration IDs and passwords. An authentication program 508 controls authentication processing for users.

Figure 17:
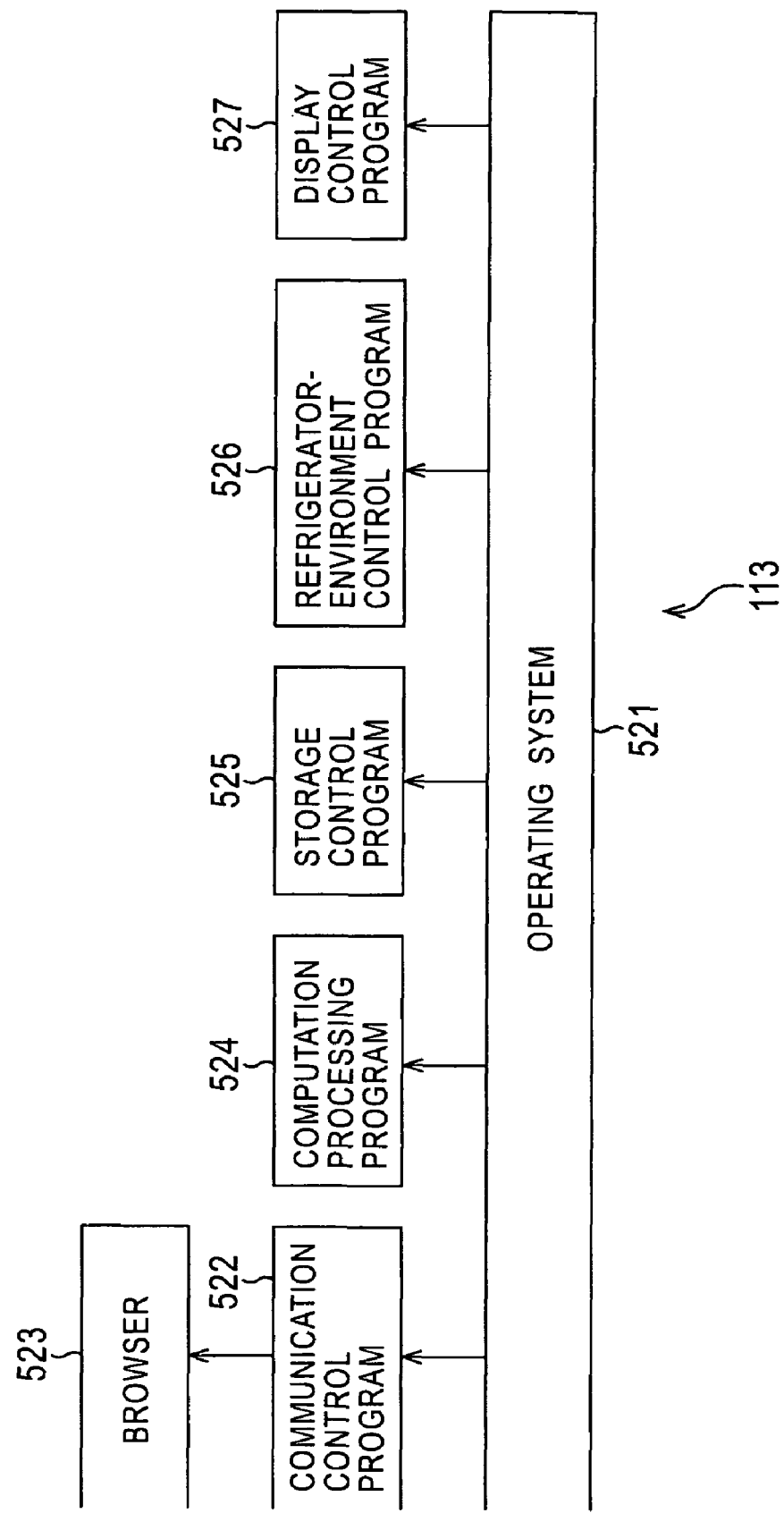
FIG. 17 illustrates the configuration of a program for controlling the refrigerator.

FIG. 17 illustrates an example of the configuration of a program for controlling the processing executed by the refrigerator 113. An operating system 521 manages and controls the overall processing of the refrigerator 113. A communication control program 522 controls communication. A browser 523 controls the display (playback) of HTML documents, image data including still images and moving pictures, and audio data received from networks. The browser 523 also operates application software described in programming languages, such as Java (registered trademark) Script or Java (registered trademark). The browser 523 also controls the transmission of information input into a form by the user. A computation processing program 524 controls predetermined computation for authentication processing for the refrigerator 113. A storage control program 525 controls the storage of information into the storage unit 238. A refrigerator-environment control program 526 controls adjustments for the temperature and humidity in the refrigerator 113. A display control program 527 controls the display of images (including characters) on the display unit.

Figure 18:
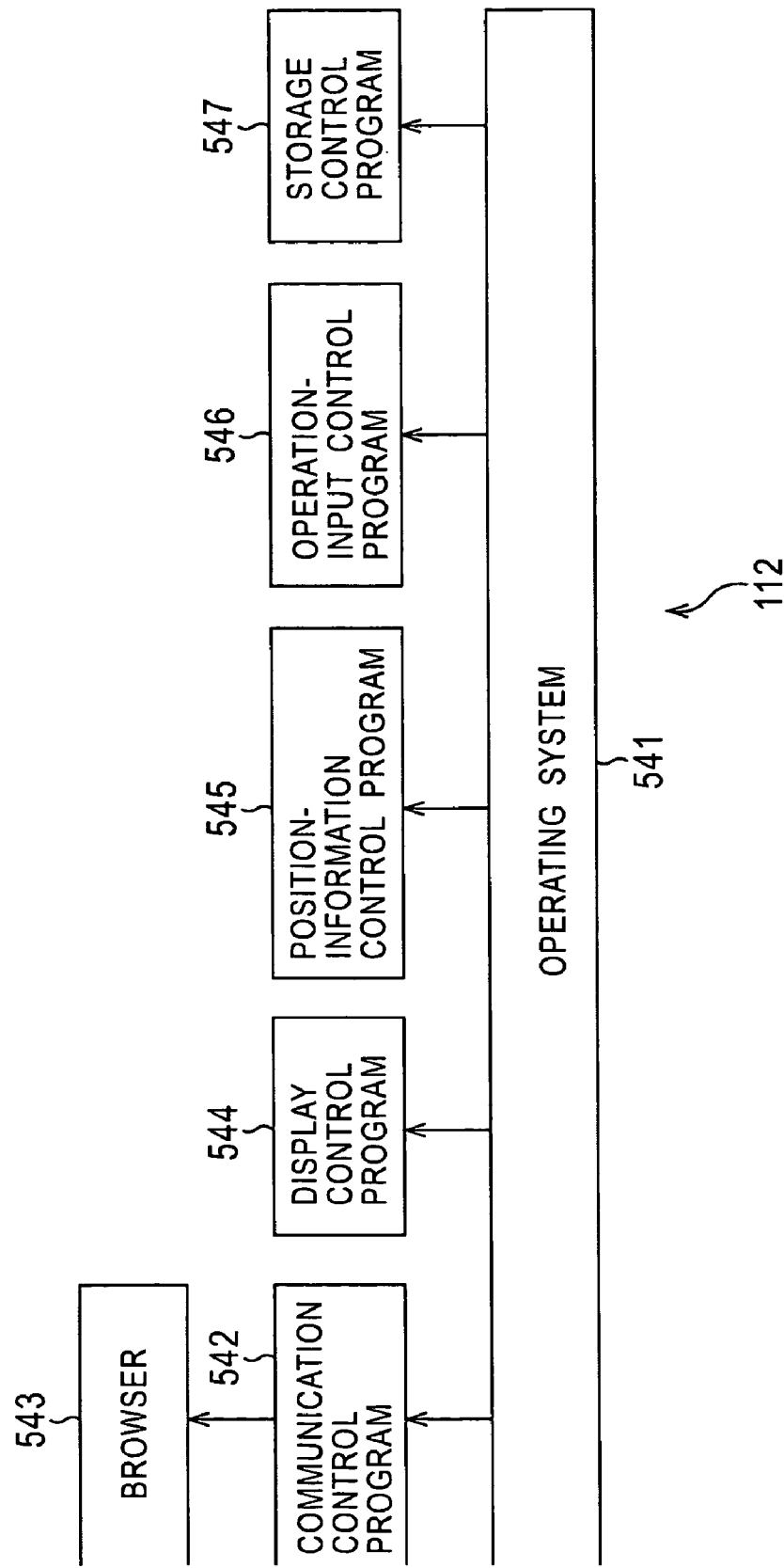
FIG. 18 illustrates the configuration of a program for controlling the car navigation system.

FIG. 18 illustrates an example of the configuration of a program for controlling the processing executed by the car navigation system 112. An operating system 541 manages and controls the overall processing of the car navigation system 112. A communication control program 542 controls communication. A browser 543 controls the display (playback) of HTML documents, image data including still images and moving pictures, and audio data received from networks. The browser 543 also operates application software described in programming languages, such as Java (registered trademark) Script or Java (registered trademark). The browser 543 also controls the transmission of information input into a form by the user. A display control program 544 displays screens of images (including characters) on the display unit 271. A position-information control program 545 calculates, based on an output from the GPS 266, the position of an automobile in which the car navigation system 112 is installed on a map. An operation-input control program 546 controls the execution of the processing in response to input operations. A storage control program 547 controls the storage of information into the storage unit 272.

An overview of one embodiment of the information processing system to which the present invention is applied is described below with reference to FIGS. 19 through 23.

Figure 19:
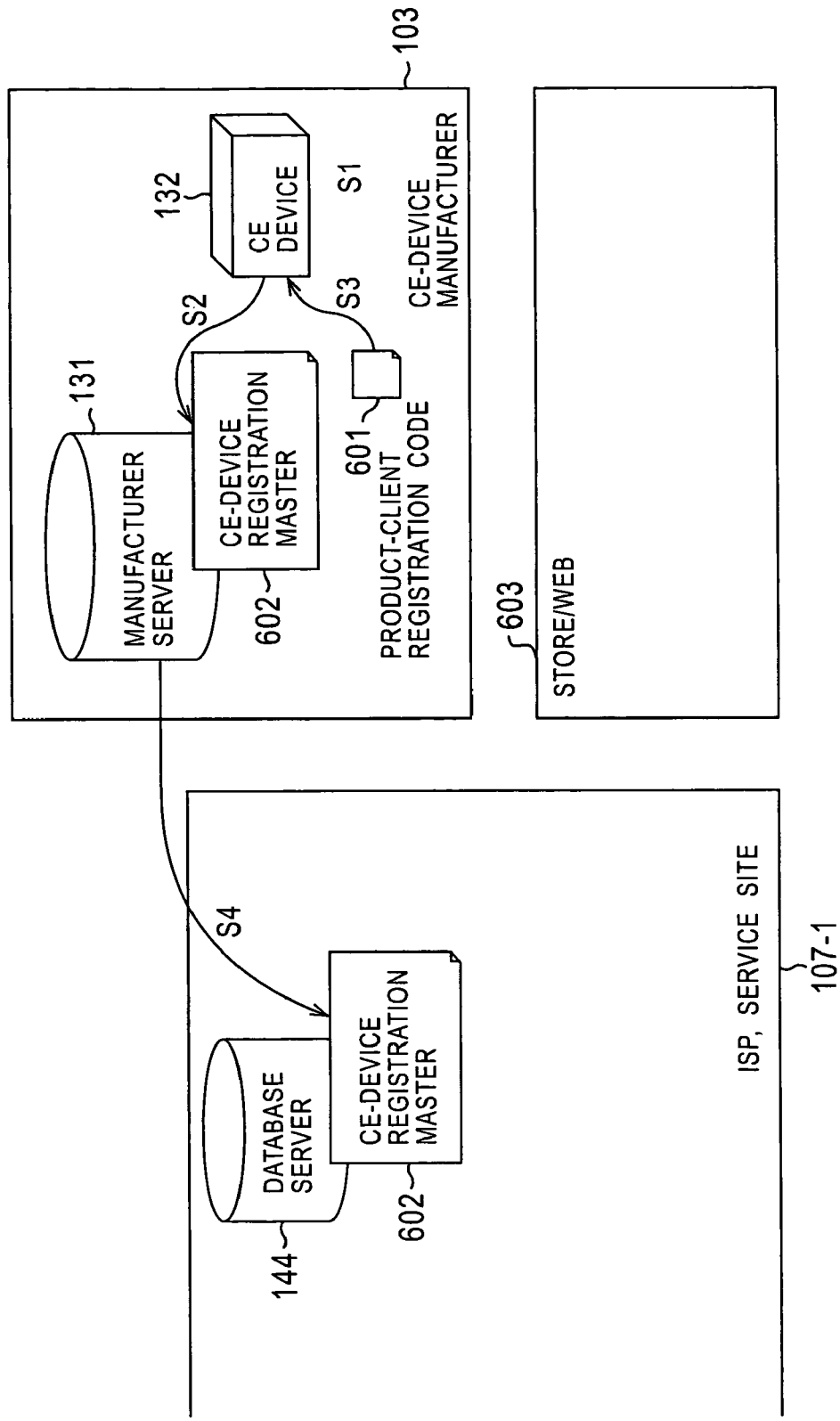
FIG. 19 illustrates processing when a CE device is manufactured.

In step S1 of FIG. 19, the CE device 132 is manufactured in the CE device manufacturer 103. In this case, in the memory of the CE device 132, the device ID for specifying the CE device generated by the device-ID generating program 305 of the manufacturer server 131, and random numbers that cannot be deciphered by users (in the following description, such random numbers are referred to as a "passphrase") are stored. In step S2, the manufacturer server 131 controls a CE-device registration master 602, which is a database, to store the device ID and passphrase of the CE device 132 manufactured in step S1.

In step S3, the CE device manufacturer 103 generates a product-client registration code 601 based on the device ID stored by the manufacturer server 131 in step S2, and attaches the product-client registration code 601 to the CE device 132. The product-client registration code 601 may be attached to the CE device 132 by, for example, placing a seal on which the product-client registration code 601 is printed into a box in which the CE device 132 is packed. FIG. 20 illustrates examples of the product-client registration codes corresponding to the device IDs. More specifically, in FIG. 20, four device IDs, i.e., 1234, 1235, 1236, and 1237, are shown at the left, and product-client registration codes, i.e., 421321, 522361, 522341, and 623381, associated with the device IDs, are shown at the right. An example of methods for computing product-client registration codes from device IDs is as follows.

When the device ID is 1234, the total of the individual digits of the device ID "1234", i.e., "10", is divided by 9, resulting in the remainder "1". This remainder "1" is inserted as the third digit, resulting in "12134". Then, the first digit and the fifth digit of this value "12134" are swapped, resulting in "42131". The total of the individual digits of this value "42131", i.e., "11", is multiplied by 2, resulting in "22". The first digit "2" of "22" is inserted as the fifth digit, resulting in product-client registration code "421321". Thereafter, calculation is similarly performed for the device IDs "1235", "1236", and "1237". That is, the remainder obtained by dividing the total of the individual digits by 9 is inserted as the third digit. The first digit and the fifth digit of the resulting value are swapped. Then, the first digit of the value obtained by doubling the total of the individual digits is inserted as the fifth digit. As a result, the product-client registration codes 522361, 522341, and 623381 are calculated.

The device IDs are serially numbered as 1234, 1235, 1236, and 1237. However, the calculated product-client registration codes are no longer consecutive, as in 421321, 522361, 522341, and 623381. If the device ID is attached to the CE device 132 as it is, and is sold, the user is able to predict the device IDs of the other shipped CE devices 132 based on the device ID of the purchased CE device 132, thereby increasing the danger of dishonest use of predicted device IDs. In contrast, the product-client registration code is generated from the device ID by predetermined calculation, and is attached to the CE device 132. The user is thus unable to predict the product-client registration codes of the other shipped CE devices 132 based on the product-client registration code of the purchased CE device 132, thereby preventing the dishonest use of the device IDs. The above-described calculation method for the product-client registration codes from the device IDs is an example only, and another method may be employed for generating the product-client registration codes from the device IDs. It has to be understood from the registration master that the device IDs and the product-client registration codes are associated with each other so that the device IDs can be determined from the product-client registration codes.

In step S4, the manufacturer server 131 of the CE device manufacturer 103 sends the CE-device (132) registration master 602, which is a database of the device IDs and passphrases of the manufactured CE devices 132, to the database server 144 of the ISP 107-1 via the Internet 1, and stores it therein. When sending the passphrases and device IDs to the database server 144, the manufacturer server 131 encrypts the passphrases and device IDs by predetermined means so as to prevent them from being eavesdropped by a third party, and then sends them to the database server 144.

Instead of using a public line, such as the Internet 1, a dedicated network may be installed between the manufacturer server 131 and the database server 144 therebetween so as to send the device IDs and passphrases to the database server 144 from the manufacturer server 131.

In the following description, communication is performed between predetermined two or more devices among the CE devices 132 (including the microwave oven 110, the television receiver 111, the car navigation system 112, and the refrigerator 113), the service providing server 102, the centralized service registration server 104, the CE-device registration setting server 105, the connection-setting database server 106, the setting terminal devices 109 and 121, the manufacturer server 131, the access server 141, the registration server 142, the connection authentication server 143, the database server 144, the service providing server 145, and the web authentication proxy server 146. In this case, information sent and received in communication may be encrypted by predetermined means, and then, information can be sent and received more securely.

In particular, it is desirable that high-security information, such as user personal information, be encrypted before being sent and received.

For simple description, for example, the sending and receiving via the Internet 1 is hereinafter simply referred to as "sending and receiving" by omitting "via the Internet 1".

Figure 21:
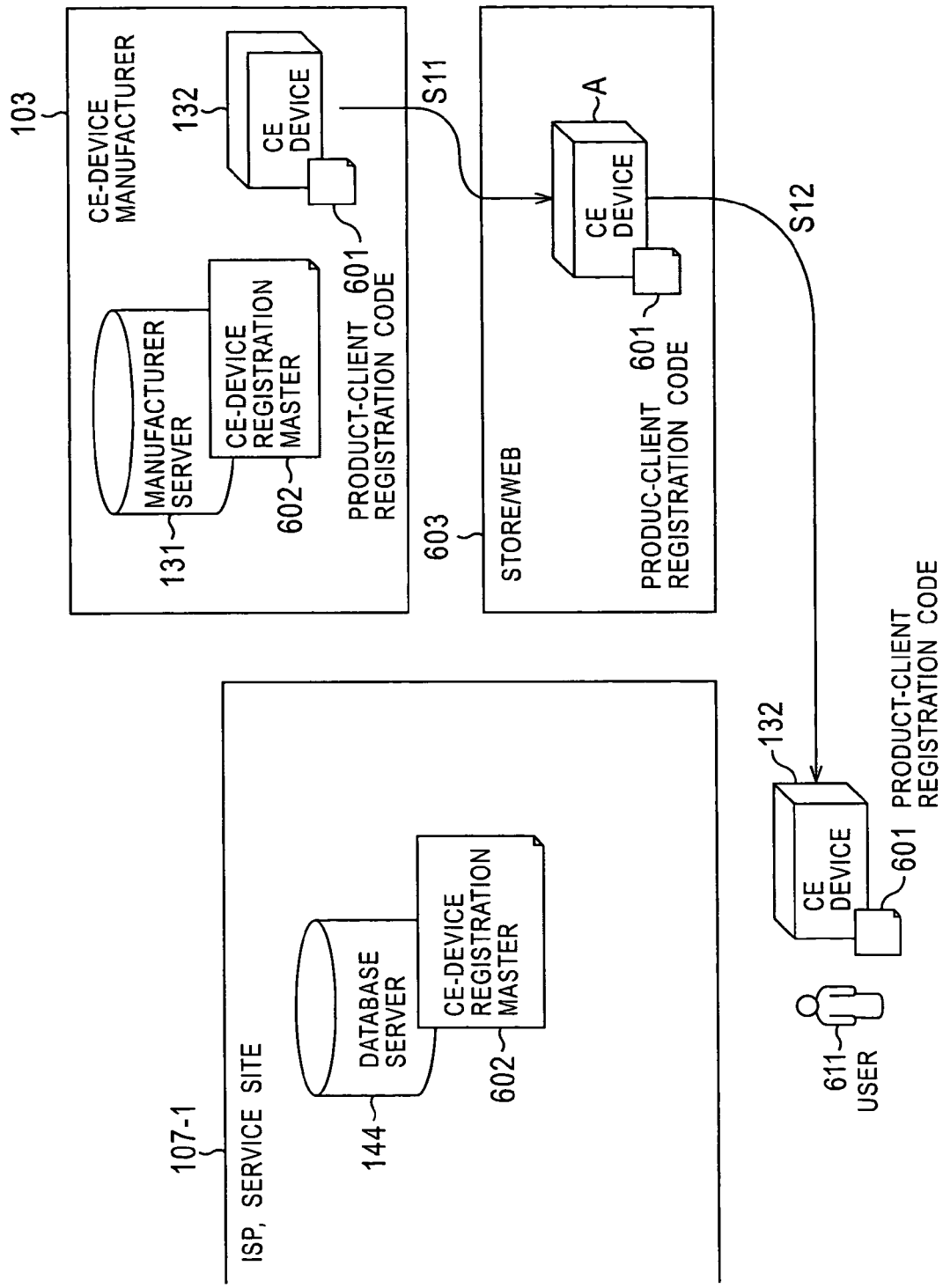
FIG. 21 illustrates processing for shipping and selling CE devices.

Subsequently, in step S11 of FIG. 21, the CE device 132 manufactured in the CE device manufacturer 103 is shipped to a store/web 603. "Web" means mail order using the Internet 1. In step S12, the CE device 132 is purchased by a user 611.

Figure 22:
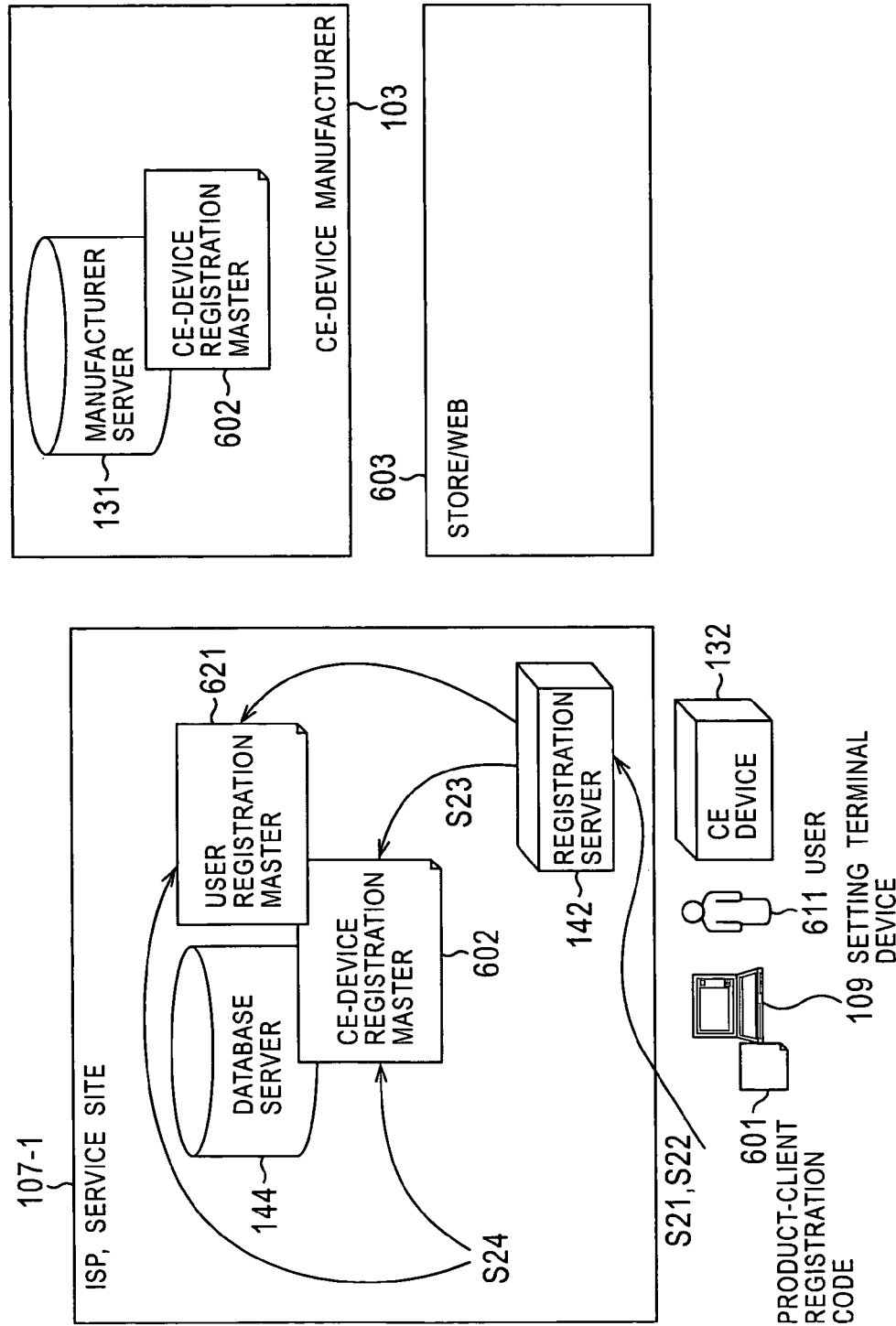
FIG. 22 illustrates processing for registering CE devices.

Then, in step S21 of FIG. 22, the user 611 starts to perform registration processing for the purchased CE device 132 by using, for example, a personal computer owned by the user 611, as the setting terminal device 109. More specifically, the setting terminal device 109 starts a registration application (for example, the browser 323 or a dedicated application for registering the CE device 132), and accesses a CE-device registration site run by the registration server 142. Then, the setting terminal device 109 receives the input of information concerning the user (hereinafter referred to as "user information"), for example, the address, postal code, name, date of birth, gender, telephone no. and the type, number, effective period, and name of a credit card, etc., from the user, and sends the input user information to the registration server 142. The registration server 142 sends the user information to the database server 144. The database server 144 stores the received user information in a user registration master 621, which is a database of user information.

The above-described dedicated application for registration is provided with a format of user information to be registered in the registration server 142, and includes a program for displaying an input screen on the display unit of the setting terminal device 109, receiving the input of user information from the user, storing the input user information, and sending the user information to the registration server 142 simultaneously or dividing the information and sequentially sending the divided portions to the registration server 142.

In step S22, the setting terminal device 109 displays a screen for instructing the user 611 to input the product-client registration code 601, and receives the input of the product-client registration code 601 from the user 611. The setting terminal device 109 sends the received product-client registration code 601 to the registration server 142. The product-client registration code translation program 364 of the registration server 142 computes the device ID from the received product-client registration code 601 according to predetermined calculations. The calculations can be made by reversing the order of the calculation process used for generating the product-client registration code from the device ID.

That is, there is a one-to-one correspondence between the product-client registration code calculation equations for the manufacturer server 131 to calculate the product-client registration codes from the device IDs and the device-ID calculation equations for the registration server 142 to calculate the device IDs from the product-client registration codes. The manufacturer server 131 possesses the product-client registration code calculation equations in advance, and the registration server 142 possesses in advance the device-ID calculation equations corresponding to the product-client registration code calculation equations possessed by the manufacturer server 131. This enables the registration server 142 to calculate the original device ID from the product-client registration code which was calculated from the device ID by the manufacturer server 131.

For example, the process for calculating the device ID "1234" from the product-client registration code "421321" shown in step S3 of FIG. 19 as an example is performed as follows. The upper fifth digit of the product-client registration code "421321" is deleted, resulting in "42131". The first and fifth digits of "42131" are swapped, resulting in "12134". Then, the third digit of "12134" is deleted, resulting in the device ID "1234".

In step S23, the registration server 142 checks with the database server 144 to see whether the same device ID as the device ID calculated in step S22 is registered in the CE-device registration master 602 so as to determine whether the CE device 132 corresponding to the device ID was actually shipped.

If it is determined that the CE device 132 corresponding to the device ID was actually shipped, in step S24, the registration server 142 instructs the database server 144 to store the device ID registered in the CE-device registration master 602 and the user information stored in the user registration master 621 in step S21 so that they can be associated with each other. In response to this instruction, the database server 144 stores the device ID and the user information so that they can be associated with each other. This makes it possible to search for the user information based on the device ID. If the product-client registration codes are simply associated with the device IDs, the database server 144 is searched for the device ID, and then, the user information is searched for.

After the above-described process, the registration processing for the CE device 132 is completed, and the user is able to connect to the Internet 1 through the CE device 132.

Figure 23:
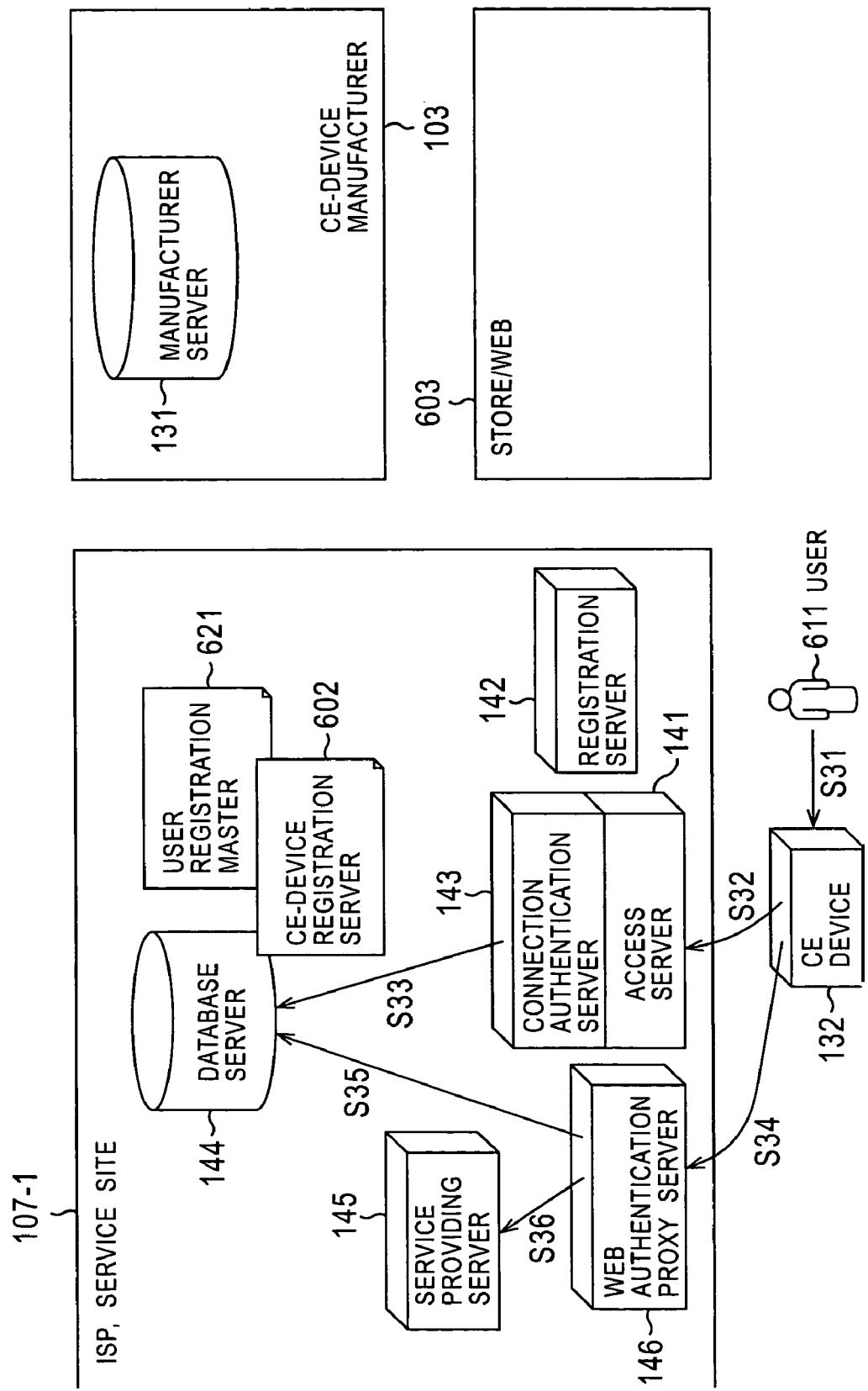
FIG. 23 illustrates processing for authenticating a CE device when being connected to the Internet and to a service providing server.

Then, in step S31 of FIG. 23, in response to an instruction from the user 611 to receive a service provided by the service providing server 145, in step S32, the CE device 132 accesses the access server 141 by HTTP.

The access server 141 generates random numbers (hereinafter referred to as "challenge"), and sends them to the CE device 132. The CE device 132 then calculates a hash function corresponding to the value obtained by adding the received challenge to the passphrase stored in the CE device 132, and then, sends the calculated hash value to the access server 141 and also stores it in the storage unit.

The access server 141 reads the passphrase corresponding to the device ID sent from the CE device 132 from the CE-device registration master 602 stored in the database server 144, and adds the generated challenge to the passphrase, thereby calculating a hash function. The access server 141 then compares the hash value sent from the CE device 132 with the hash value calculated by the access server 141. If the two hash values are the same, the access server 141 allows the CE device 132 to connect to the Internet 1. In step S33, the access server 141 sends the calculated hash value to the database server 144, and stores it therein.

The browser of the CE device 132 continuously sends a connection request for a certain period of time, and when being allowed to connect to the Internet 1, in step S34, the CE device 132 accesses the predesignated web authentication proxy server 146. Upon receiving the connection request from the CE device 132, the web authentication proxy server 146 sends an authentication request to the CE device 132. Upon receiving the authentication request, the CE device 132 sends the device ID and the hash value stored in the storage unit to the web authentication proxy server 146.

Upon receiving the device ID and the hash function from the CE device 132, in step S35, the web authentication proxy server 146 accesses the database server 144 and requests it to send the hash value stored corresponding to the device ID. Upon receiving the hash value from the database server 144, the web authentication proxy server 146 compares the hash value with the hash value received from the CE device 132. If the two hash values are the same, in step S36, the web authentication proxy server 146 specifies the user (instead of simply allowing the CE device 132 to connect to the service providing server 145, it is necessary to specify the user himself/herself according to the purpose of use, for example, purchases and sales of goods via the Internet 1), and allows the CE device 132 to connect to the service providing server 145. The CE device 132 then receives services possessed by the service providing server 145.

In this case, the services possessed by the service providing server 145 are sometimes sent to the CE device 132 via the web authentication proxy server 146, and are sometimes directly sent to the CE device 132 without the web authentication proxy server 146. Particularly when the amount of information of services provided by the service providing server 145 is large, the services may be provided directly to the CE device 132 from the service providing server 145. When the amount of information of services provided by the service providing server 145 is small, the services may be provided to the CE device 132 from the service providing server 145 via the web authentication proxy server 146.

As described above, the CE device 132 is able to connect to both the Internet 1 and the service providing server 145 by using the device ID and passphrase. As stated above, every time the access server 141 performs authentication for the CE device 132, it sends challenge, and compares a hash value calculated by the CE device 132 with a hash value calculated by the access server 141. Accordingly, the hash value sent from the CE device 132 to the access server 141 and the web authentication proxy server 146 becomes different every time the CE device 132 makes a connection request. Thus, even if a hash value is stolen by a third party, it cannot be used for subsequent authentication, thereby preventing the third party from pretending to be the user and from being authenticated by the access server 141.

The hash value calculated from the passphrase and the challenge is securely stored in the CE device 132 and the database server 144, and authentication for connecting to the Internet and authentication for connecting to a service site is conducted by using the stored hash value, thereby making it possible to log in to the service providing server 145 by one trigger.

In the above description, the hash value is calculated by adding the passphrase to challenge. However, the present invention is not restricted to this calculation method. Certain calculation equations using passphrase and challenge may be preset in both the access server 141 and the CE device 132, and the hash value can be calculated based on these equations.

Figure 24:
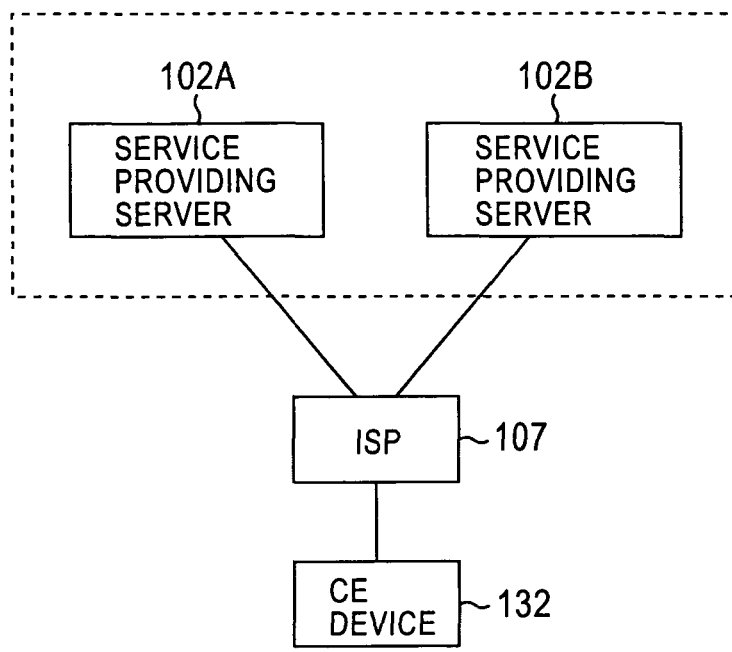
FIG. 24 illustrates a known authentication for connecting to an Internet service provider and to service providing servers in comparison with an example of FIG. 25.
Figure 25:
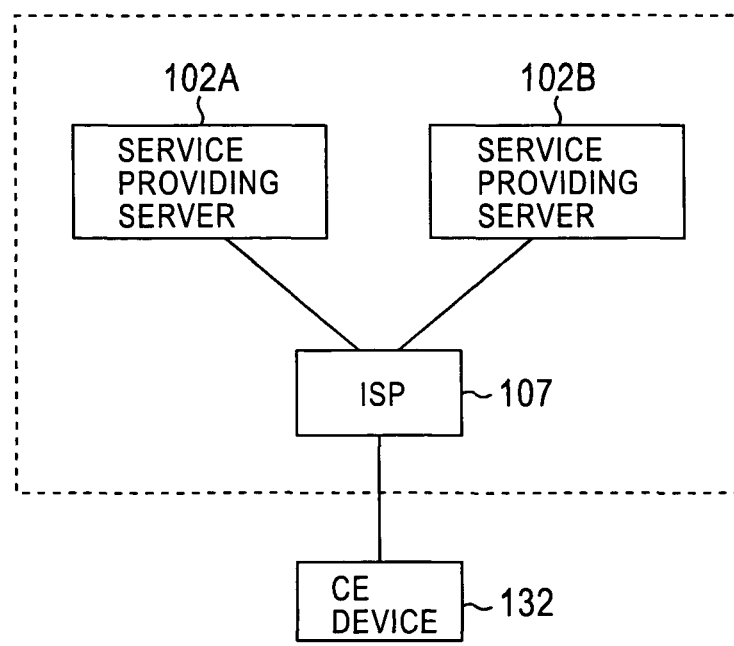
FIG. 25 illustrates authentication for connecting to an Internet service provider and service providing servers when the present invention is applied.

Conventionally, as shown in FIG. 24, an ID and a password are required for connecting to the ISP 107 and another ID and another password are required for connecting to a service providing server 102A and a service providing server 102B. In this embodiment, however, as shown in FIG. 25, only one ID and one password are required for connecting to the ISP 107 and for connecting to the service providing server 102A and the service providing server 102B. That is, in FIGS. 24 and 25, broken lines indicate a range that can be connected with the same ID and the same password.

In known authentication shown in FIG. 24, it is possible to connect to the service providing server 102A and the service providing server 102B by using the same ID and the same password. However, another ID and another password must be used for connecting to the ISP 107.

In contrast, in authentication to which the invention of this application is applied, as shown in FIG. 25, the same ID and the same password can be used to connect to the service providing server 102A, the service providing server 102B, and the ISP 107.

Figure 26:
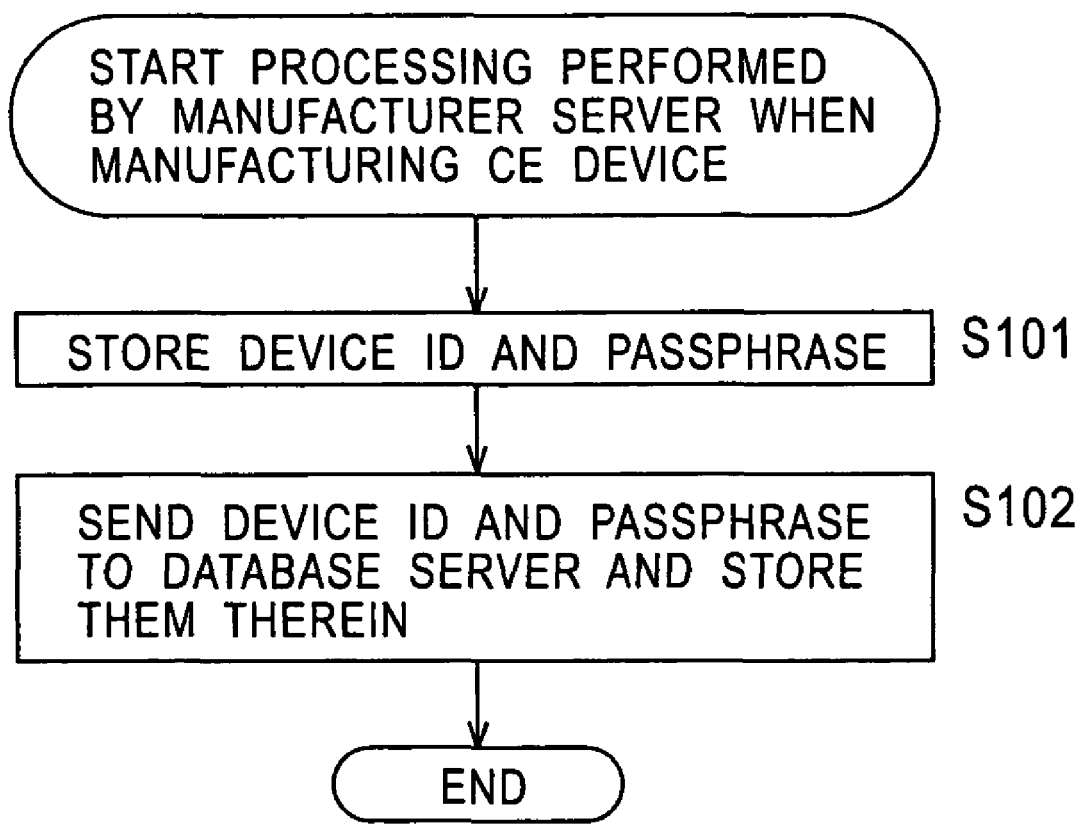
FIG. 26 is a flowchart illustrating processing performed by the manufacturer server when a CE device is manufactured.
Figure 27:
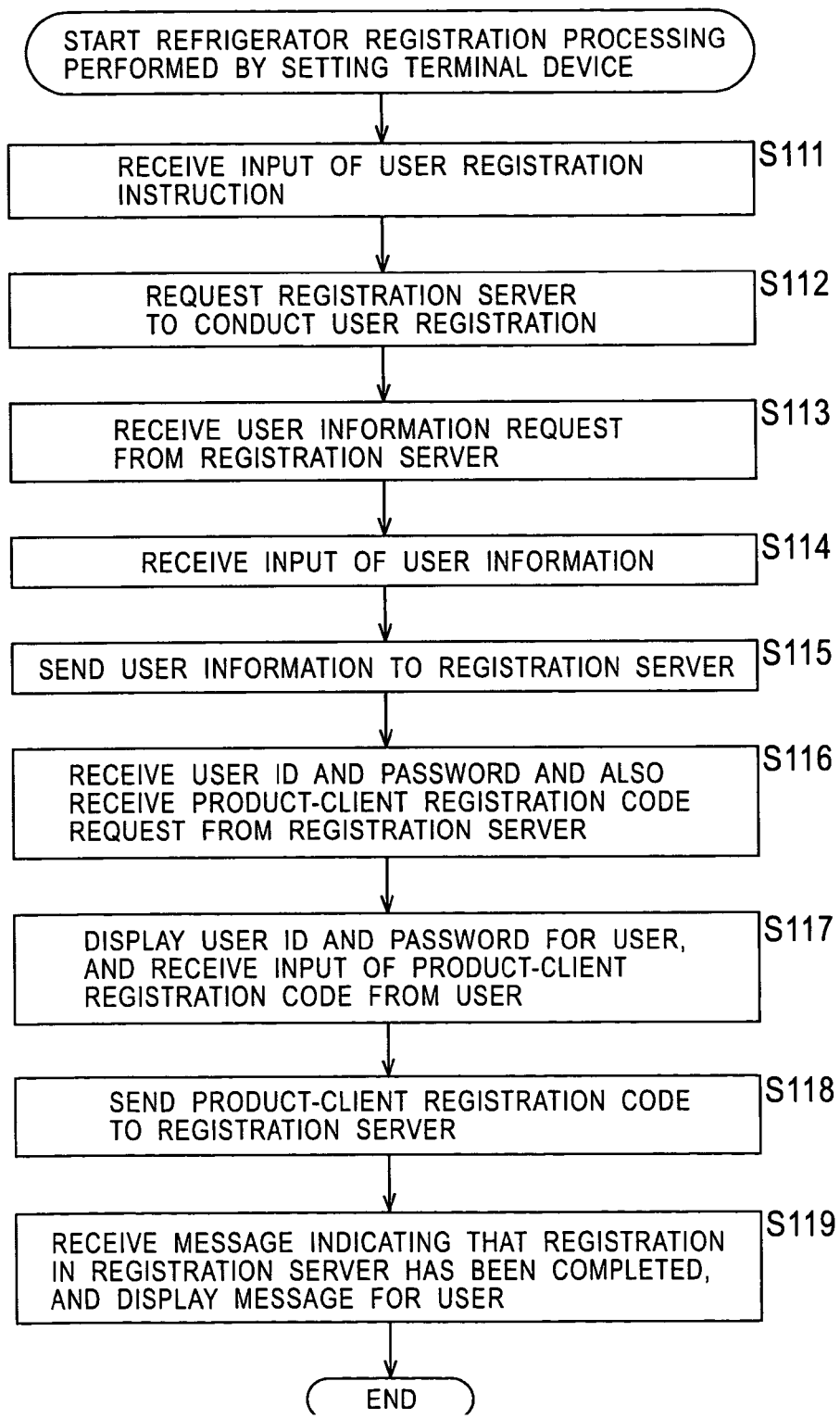
FIG. 27 is a flowchart illustrating refrigerator registration processing performed by the setting terminal device.

The processing performed by the manufacturer server 131 of the CE device manufacturer 103 is described below with reference to the flowchart of FIG. 26.

In the CE device manufacturer 103, when manufacturing the CE device 132, the device ID and passphrase are recorded in a predetermined memory of the CE device 132. Then, in step S101, the storage control program 304 of the manufacturer server 131 stores the device ID and passphrase. In step S102, the communication control program 302 of the manufacturer server 131 sends the device ID and passphrase to the database server 144, and requests it to store them. In response to this request, the database server 144 stores the device ID and passphrase. Accordingly, the device ID and passphrase of the manufactured CE device 132 are stored in the database server 144.

The method for registration processing and authentication processing for the CE device 132 is different according to whether the CE device 132 has an input interface for receiving the input of operation by the user.

A detailed description is given below, with reference to the flowcharts of FIGS. 27 through 30, of registration processing for the refrigerator 113 as an example of the CE device 132 without an input interface (input interface for receiving the input of operations).

The user who has purchased the refrigerator 113 performs registration processing for the refrigerator 113 by using a personal computer owned by the user as the setting terminal device 109. In step S111, the setting terminal device 109 receives the input of an instruction to register the refrigerator 113 from the user. In step S112, the browser 323 then accesses a predetermined registration site owned by the registration server 142, and requests user registration for the refrigerator 113.

Figure 28:
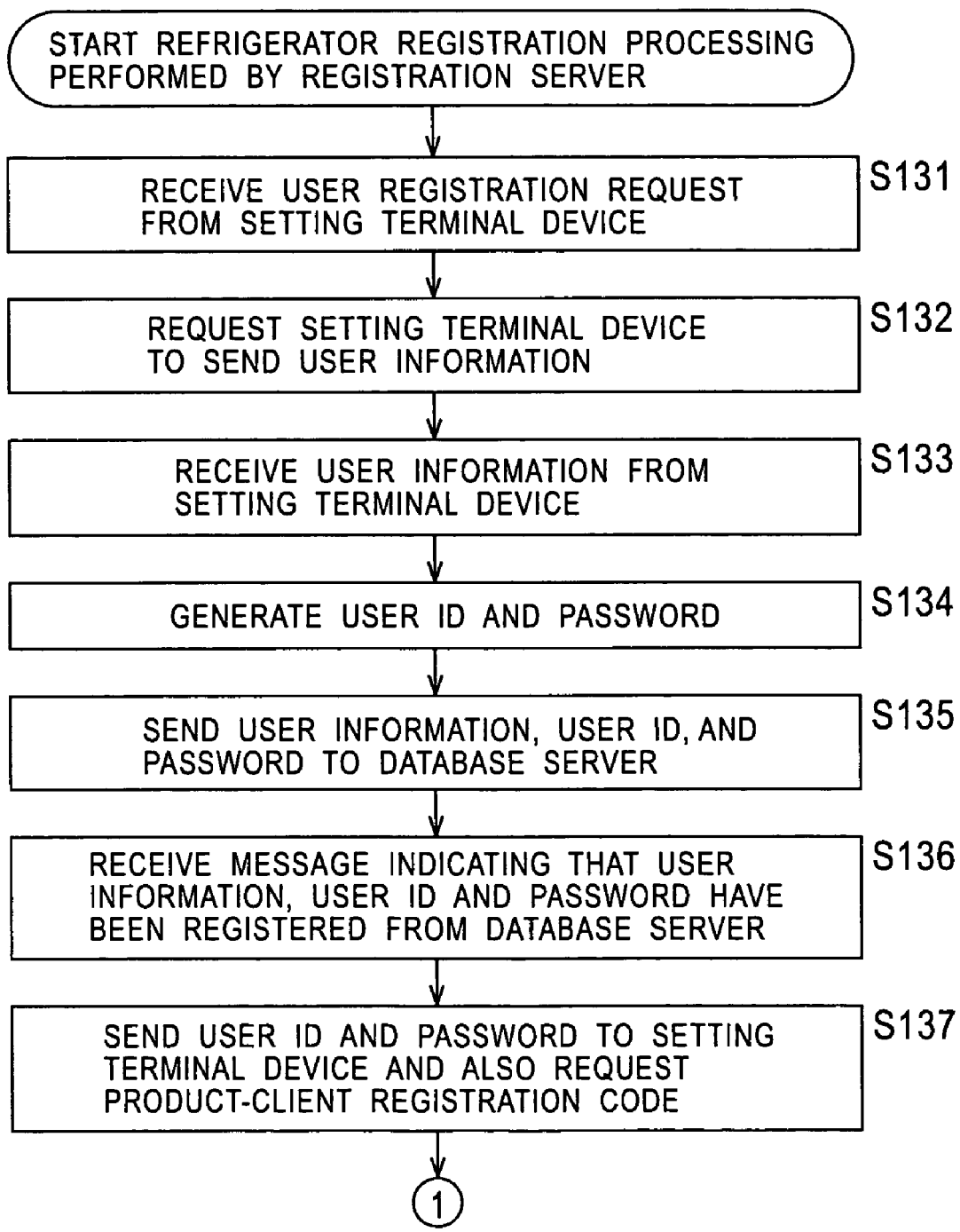
FIG. 28 is a flowchart illustrating refrigerator registration processing performed by the registration server.

In step S131 of FIG. 28, the communication control program 362 of the registration server 142 receives the user registration request for the refrigerator 113 from the setting terminal device 109. Then, in step S132, the communication control program 362 requests the setting terminal device 109 to send user information.

In step S113, the browser 323 of the setting terminal device 109 receives the user information request from the registration server 142. In step S114, the display control program 325 displays a screen for instructing the user to input user information, and the operation-input control program 324 receives the input of the user information from the user. In step S115, the browser 323 of the setting terminal device 109 sends the user information input in step S114 to the registration server 142.

In step S133, the registration server 142 receives the user information from the setting terminal device 109. Then, in step S134, the user-ID/password/period-restricted-password generating program 363 of the registration server 142 generates the user ID and password. In step S135, the communication control program 362 of the registration server 142 sends the user information and the user ID and password generated in step S134 to the database server 144.

Figure 30:
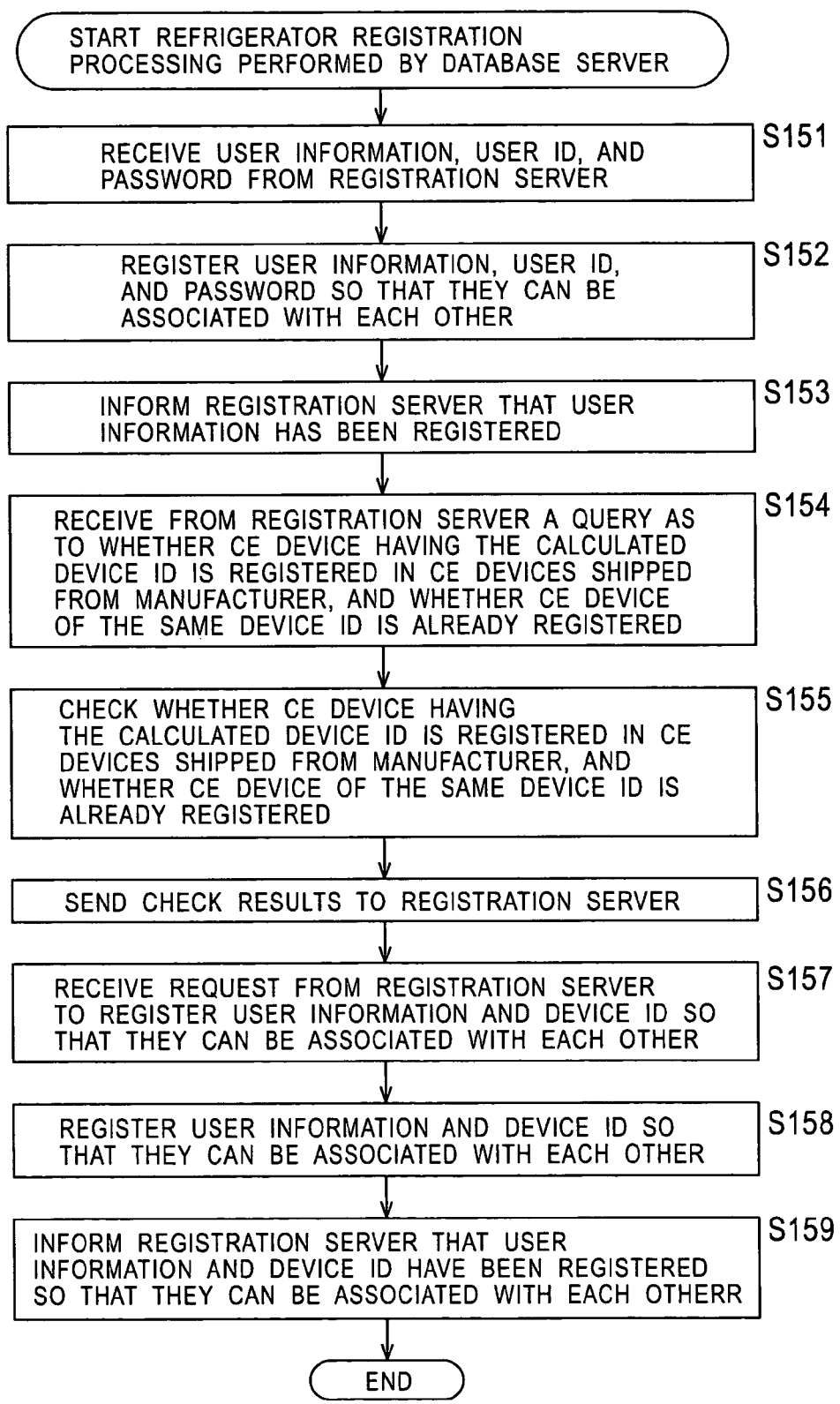
FIG. 30 is a flowchart illustrating refrigerator registration processing performed by the database server.

In step S151 of FIG. 30, the database server 144 receives the user information, and the user ID and password from the registration server 142. In step S152, the storage control program 404 of the database server 144 stores the user information, and the user ID and password received in step S151 in the storage unit so that they can be associated with each other. In step S153, the communication control program 402 of the database server 144 sends the registration server 142 a message indicating that that the user information and the user ID and password are stored so that they can be associated with each other.

In step S136, the registration server 142 receives from the database server 144 the message indicating that the user information and the user ID and password are stored so that they can be associated with each other. In step S137, the communication control program 362 of the registration server 142 sends the user ID and password generated in step S134 to the setting terminal device 109, and also requests the setting terminal device 109 to send the product-client registration code.

In step S116, the setting terminal device 109 receives the user ID and password, and also receives the product-client registration code request from the registration server 142.

In step S117, the display control program 325 of the setting terminal device 109 displays the user ID and password received in step S116, and also displays a screen for instructing the user to input the product-client registration code. After receiving the input of the product-client registration code from the user, in step S118, the browser 323 of the setting terminal device 109 sends the product-client registration code input in step S117 to the registration server 142.

Figure 29:
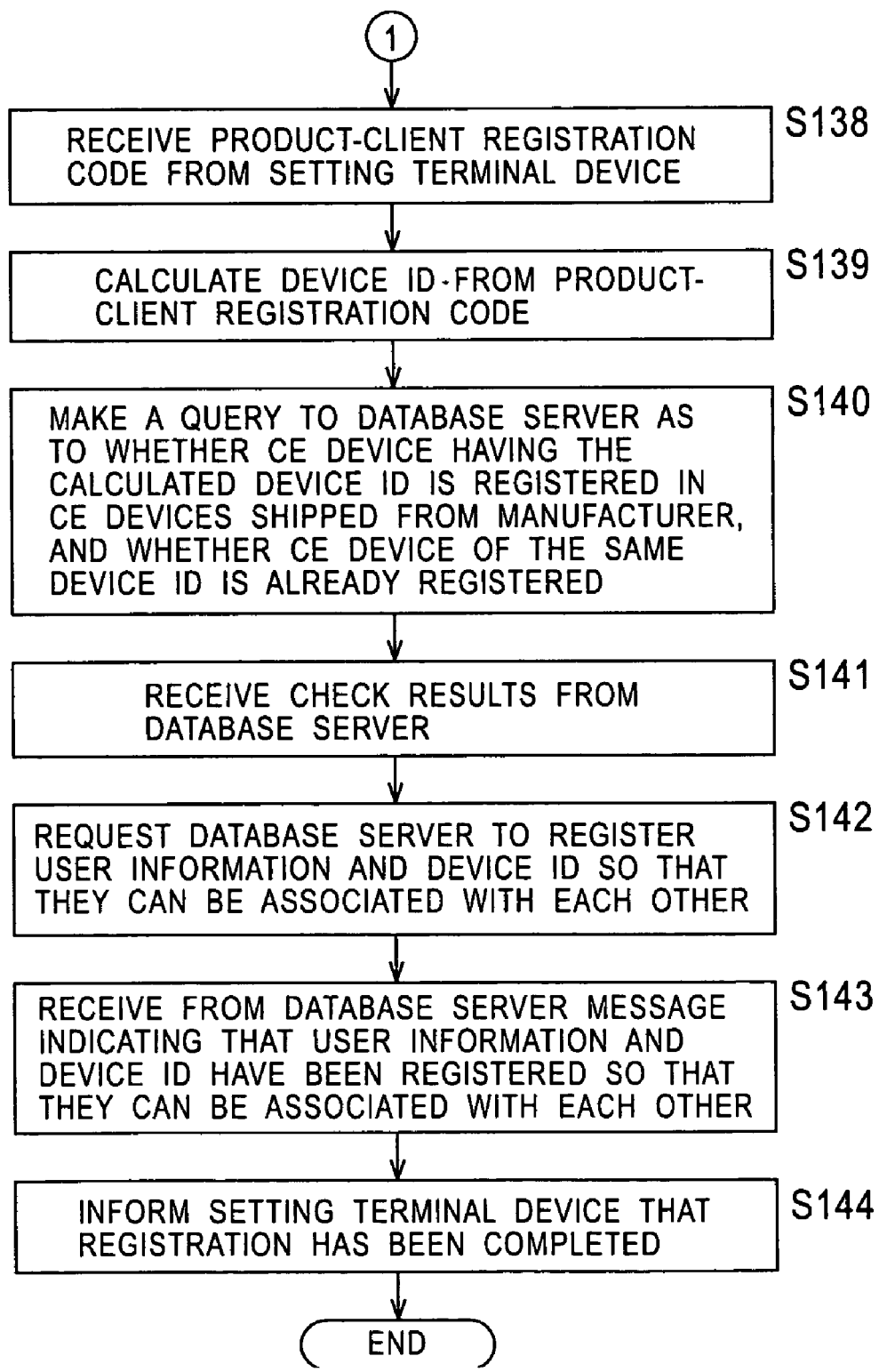
FIG. 29 is a flowchart continued from the flowchart of FIG. 28 illustrating refrigerator registration processing performed by the registration server.

In step S138 of FIG. 29, the registration server 142 receives the product-client registration code from the setting terminal device 109. Then, in step S139, the product-client registration code translation program 364 of the registration server 142 calculates the device ID from the product-client registration code received in step S138 according to predetermined calculations. In step S140, the communication control program 362 of the registration server 142 sends the device ID calculated in step S139 to the database server 144, and makes a query as to whether the CE device of the sent device ID is registered in the CE devices 132 shipped from the manufacturer, or whether the CE device 132 of the same device ID is already registered for another user.

In step S154, the database server 144 receives the device ID from the registration server 142, and also receives a query as to whether the CE device of the received device ID is registered in the CE devices 132 shipped from the manufacturer, and whether the CE device 132 of the same device ID is already registered for another user.

The database server 144 prestores the device IDs and passphrases of the CE devices 132 sent from the manufacturer server 131 when the CE devices 132 were manufactured. Then, in step S155, the data search program 405 of the database server 144 searches for the device IDs supplied from the manufacturer server 131 and stored in the database server 144 when the CE devices 132 were manufactured, and determines whether the same device ID as the device ID received in step S154 is stored. If user registration has already been conducted for the CE device 132 having the same device ID as the device ID received in step S154, the CE device 132 is to be doubly registered. In order to prevent this, the data search program 405 of the database server 144 searches for the data of the device IDs of the CE devices 132 for which user registration has already been conducted so as to determine whether the same device ID has already been registered.

If it is determined that the CE device 132 having the same device ID as the device ID received in step S154 has been shipped from the CE device manufacturer 103, and that user registration has not been conducted for the CE device 132 having the same device ID, in step S156, the communication control program 402 of the database server 144 sends determination results to the registration server 142.

In step S141, the registration server 142 receives from the database server 144 the determination results indicating that the CE device 132 having the same device ID as the device ID calculated in step S139 has been shipped from the CE device manufacturer 103, and that user registration has not been conducted for the CE device 132 having the same device ID. Then, in step S142, the communication control program 362 requests the database server 144 to register the user information sent in step S135 and the device ID sent in step S140 so that they can be associated with each other.

In step S157, the database server 144 receives from the registration server 142 a request to register the user information and the device ID so that they can be associated with each other. Then, in step S158, the storage control program 404 of the database server 144 registers the user information and the user ID and password registered in step S152 and the device ID received in step S154 so that they can be associated with each other. In step S159, the communication control program 402 of the database server 144 sends the registration server 142 a message indicating that the user information, user ID and password, and the device ID have been registered so that they can be associated with each other.

In step S143, the registration server 142 receives from the database server 144 the message indicating that the user information, the user ID and password, and the device ID have been registered so that they can be associated with each other. Then, in step S144, the communication control program 362 of the registration server 142 sends the setting terminal device 109 a message indicating that user registration for the refrigerator 113 has been completed.

In step S119, the setting terminal device 109 receives from the registration server 142 the message indicating that user registration for the refrigerator 113 has been completed. The display control program 325 displays a message screen indicating that registration has been completed.

Registration processing for the refrigerator 113 has been completed as described above. In the above description, when conducting registration processing for the refrigerator 113 (CE device 132), the setting terminal device 109 accesses the registration server 142 by using the browser 323 by way of example. However, instead of the browser 323, a dedicated application for registering the CE device 132 may be employed to access the registration server 142. That is, a dedicated application for registering the CE device 132 may be installed in the setting terminal device 109, and when registering the CE device 132, this dedicated application is run to access the registration server 142.

This dedicated application is provided with an information format for registering the CE device 132 in the registration server 142, and includes a program for storing information input into the setting terminal device 109 by the user and for sending the information to the registration server 142 simultaneously or dividing the information and sequentially sending the divided portions to the registration server 142.

Authentication processing for the refrigerator 113 is now described below with reference to the flowcharts of FIGS. 31 through 35.

Figure 31:
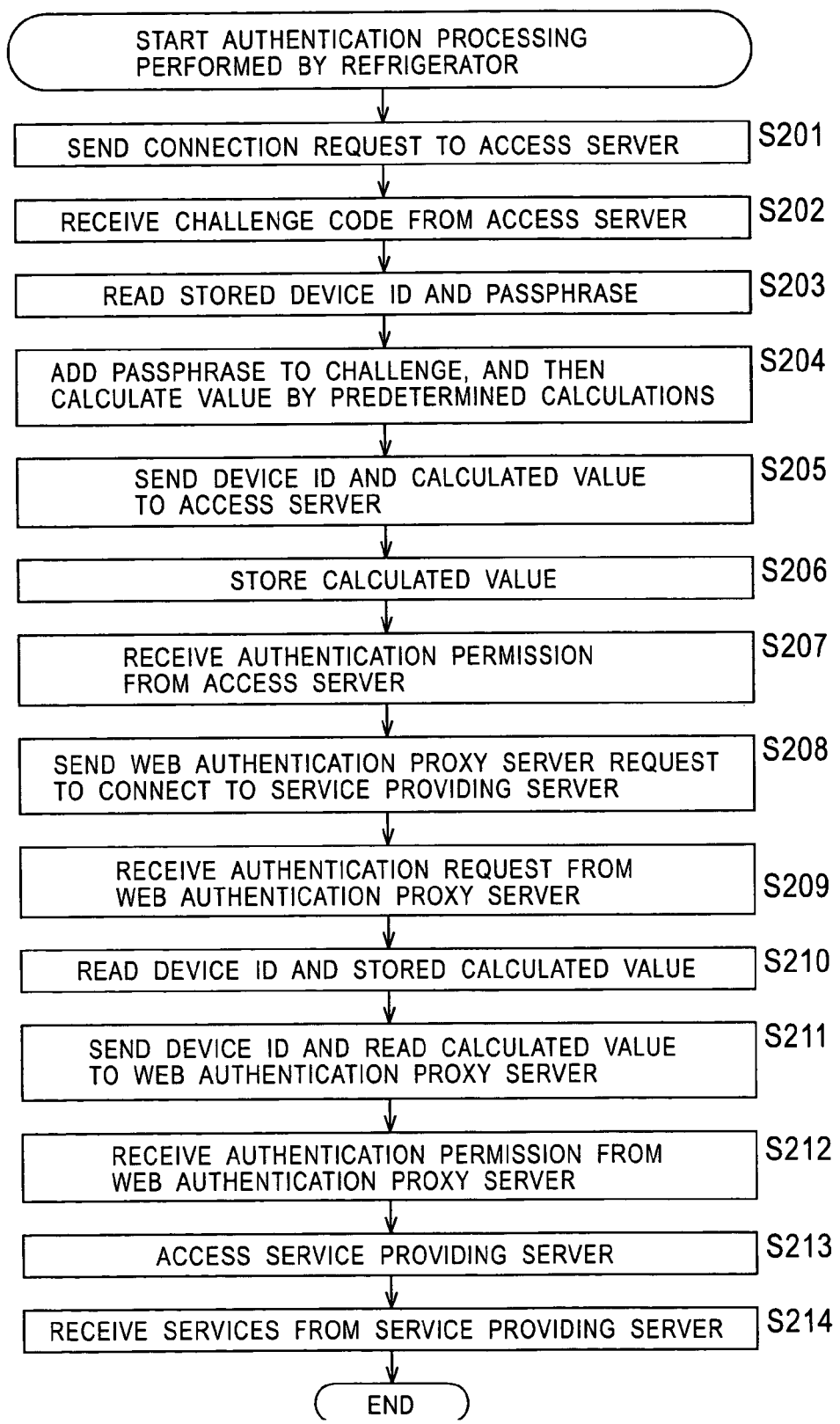
FIG. 31 is a flowchart illustrating refrigerator authentication processing performed by the refrigerator.

In step S201 of FIG. 31, the browser 523 of the refrigerator 113 sends the access server 141 a request to connect to the Internet 1.

Figure 32:
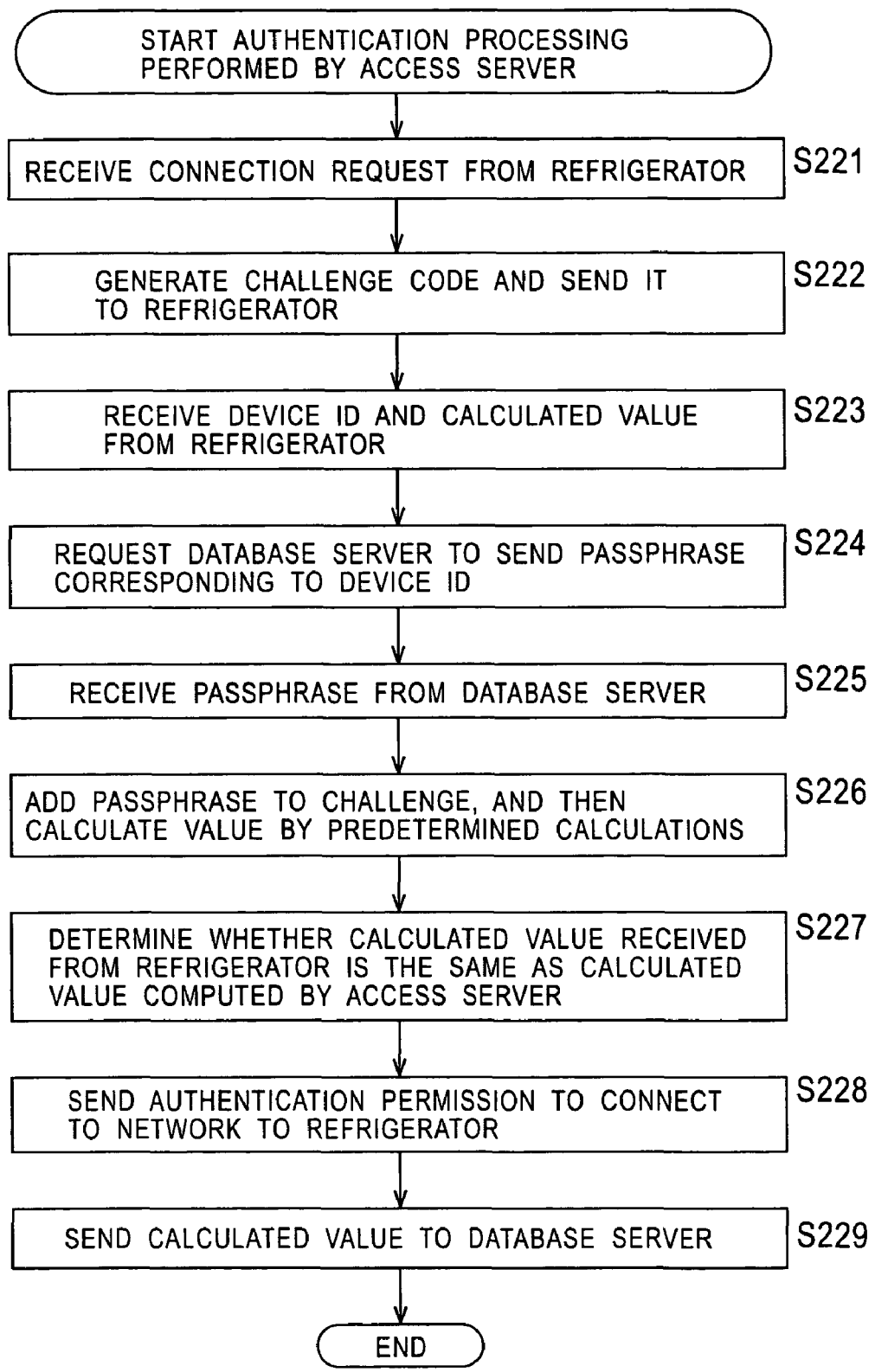
FIG. 32 is a flowchart illustrating refrigerator authentication processing performed by the access server.

In step S221 of FIG. 32, the access server 141 receives the request to connect to the Internet 1 from the refrigerator 113. In step S222, the computation processing program 343 of the access server 141 generates a challenge code, which is a random number, and the communication control program 342 sends the challenge code to the refrigerator 113.

In step S202, the refrigerator 113 receives the challenge code from the access server 141. In step S203, the storage control program 525 of the refrigerator 113 reads the device ID and passphrase stored in the storage unit 238. In step S204, the computation processing program 524 of the refrigerator 113 adds the passphrase read in step S203 to the challenge code received in step S202, and then calculates a hash value according to predetermined calculations using a hash function.

In step S205, the browser 523 of the refrigerator 113 sends the device ID read in step S203 and the hash value calculated in step S204 to the access server 141. Then, in step S206, the storage control program 525 stores the hash value calculated in step S204 in the storage unit 238.

In step S223, the access server 141 receives the device ID and the hash value from the refrigerator 113. In step S224, the communication control program 342 of the access server 141 sends the device ID received from the refrigerator 113 in step S223 to the database server 144, and also requests the database server 144 to send the passphrase corresponding to the device ID.

Figure 34:
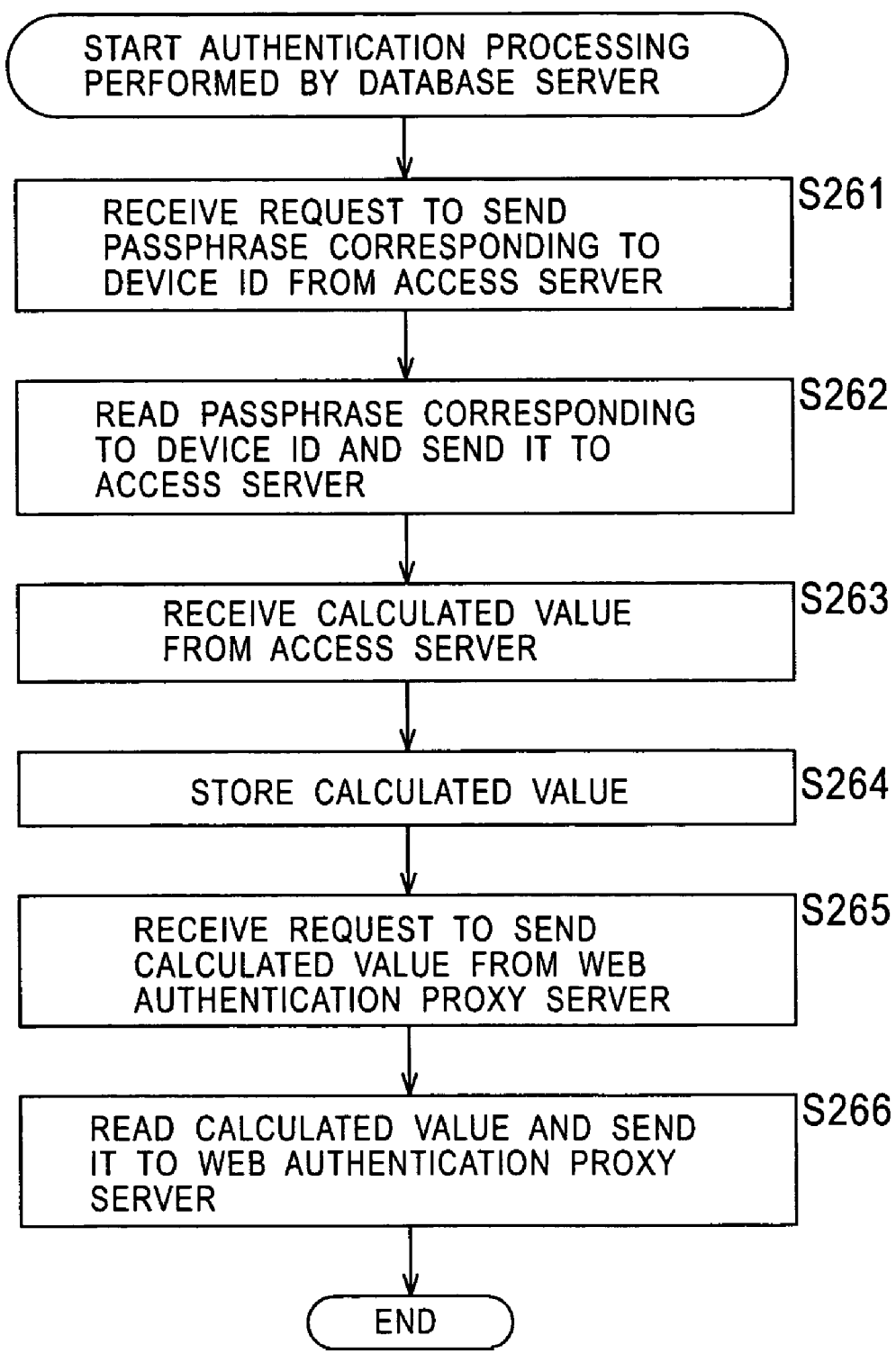
FIG. 34 is a flowchart illustrating refrigerator authentication processing performed by the database server.

In step S261 of FIG. 34, the database server 144 receives the device ID, and also receives a request to send the passphrase corresponding to the device ID from the access server 141. In step S262, the data search program 405 of the database server 144 reads the passphrase corresponding to the device ID received in step S261, and the communication control program 402 sends the passphrase read by the data search program 405 to the access server 141.

In step S225, the access server 141 receives the passphrase from the database server 144. In step S226, the computation processing program 343 of the access server 141 adds the challenge code generated in step S222 to the passphrase received in step S225 so as to calculate a hash value according to the same predetermined calculations as those used for calculating the hash value by the computation processing program 524 of the refrigerator 113 in step S204.

In step S227, the authentication program 344 of the access server 141 determines whether the hash value received from the refrigerator 113 in step S223 coincides with the hash value calculated by the computation processing program 343 in step S226. If the hash value received from the refrigerator 113 in step S223 is the same as the hash value calculated by the computation processing program 343 in step S226, in step S228, the communication control program 342 of the access server 141 sends the refrigerator 113 a message indicating that the refrigerator 113 is permitted to connect to the Internet 1. In step S207, the refrigerator 113 receives from the access server 141 the message indicating that the refrigerator 113 is permitted to connect to the Internet 1.

In step S229, the communication control program 342 of the access server 141 sends the hash value calculated in step S226 to the database server 144. In step S263, the database server 144 receives the hash value from the access server 141. In step S264, the storage control program 404 of the database server 144 stores the hash value received in step S263.

In step S208, the browser 523 of the refrigerator 113 sends the web authentication proxy server 146 a request to connect to the service providing server 145.

Figure 33:
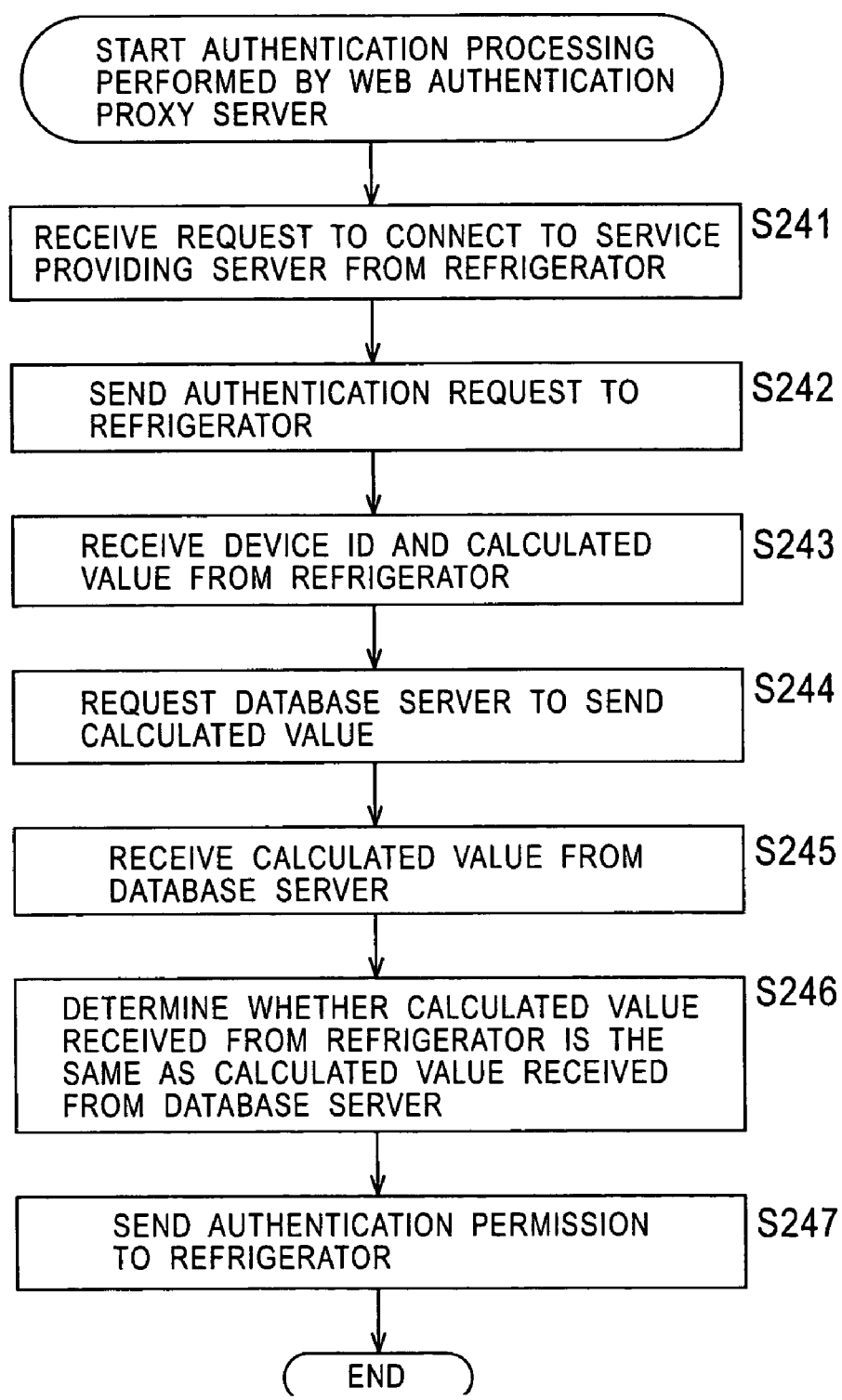
FIG. 33 is a flowchart illustrating refrigerator authentication processing performed by the web authentication proxy server.

In step S241 of FIG. 33, the web authentication proxy server 146 receives a request to connect to the service providing server 145 from the refrigerator 113. In step S242, the communication control program 442 of the web authentication proxy server 146 sends an authentication request to the refrigerator 113.

In step S209, the refrigerator 113 receives the authentication request from the web authentication proxy server 146. Then, in step S210, the storage control program 525 of the refrigerator 113 reads the device ID and the hash value stored in the storage unit 238 in step S206. In step S211, the browser 523 of the refrigerator 113 sends the device ID and the hash value read in step S210 to the web authentication proxy server 146.

In step S243, the web authentication proxy server 146 receives the device ID and the hash value from the refrigerator 113. In step S244, the communication control program 442 of the web authentication proxy server 146 sends the device ID received from the refrigerator 113 in step S243 to the database server 144, and also requests the database server 144 to send the hash value corresponding to the device ID.

In step S265, the database server 144 receives a request to send the hash value corresponding to the device ID from the web authentication proxy server 146. Then, the data search program 405 of the database server 144 reads the hash value (which is stored in step S264) corresponding to the device ID, and the user ID stored in associated with the device ID. Then, in step S266, the communication control program 402 sends the read hash value and the user ID to the web authentication proxy server 146.

In step S245, the web authentication proxy server 146 receives the hash value and the user ID from the database server 144. In step S246, the authentication program 443 of the web authentication proxy server 146 determines whether the hash value received from the refrigerator 113 in step S243 is the same as the hash value received from the database server 144 in step S245 so as to determine whether the refrigerator 113 is to be authenticated. As a result, if the hash value received from the refrigerator 113 in step S243 is the same as the hash value received from the database server 144 in step S245, the authentication program 443 specifies the user based on the user ID. Then, in step S247, the communication control program 442 of the web authentication proxy server 146 sends the refrigerator 113 a permission to connect to the service providing server 145.

In step S212, the refrigerator 113 receives a permission to connect to the service providing server 145 from the web authentication proxy server 146. Then, in step S213, the browser 523 of the refrigerator 113 accesses the service providing server 145.

Figure 35:
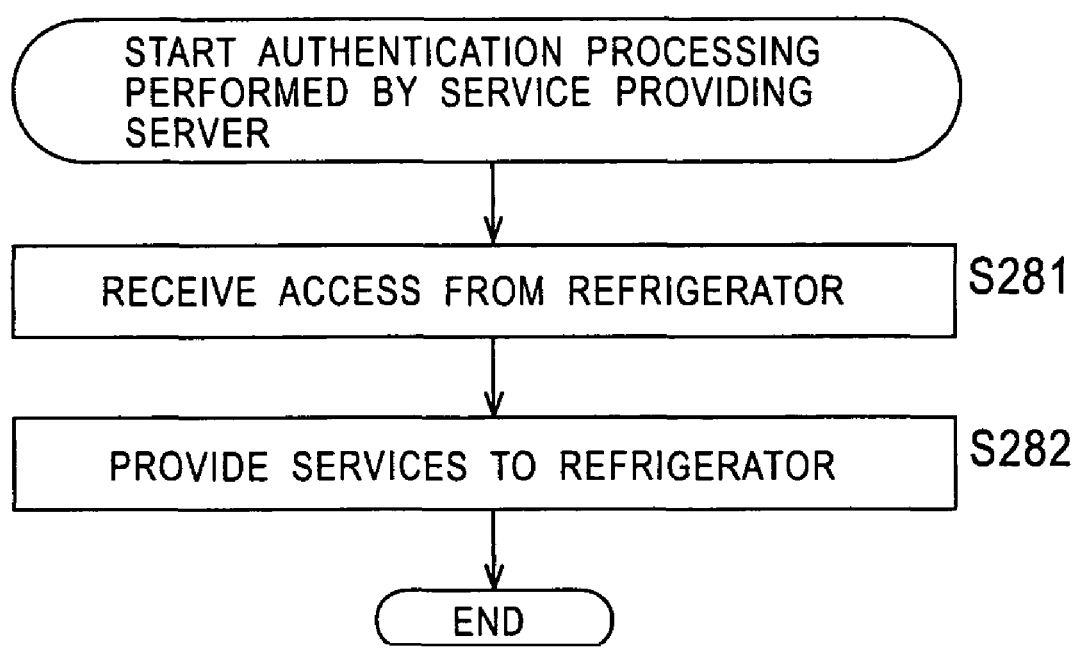
FIG. 35 is a flowchart illustrating refrigerator authentication processing performed by the service providing server.
Figure 36:
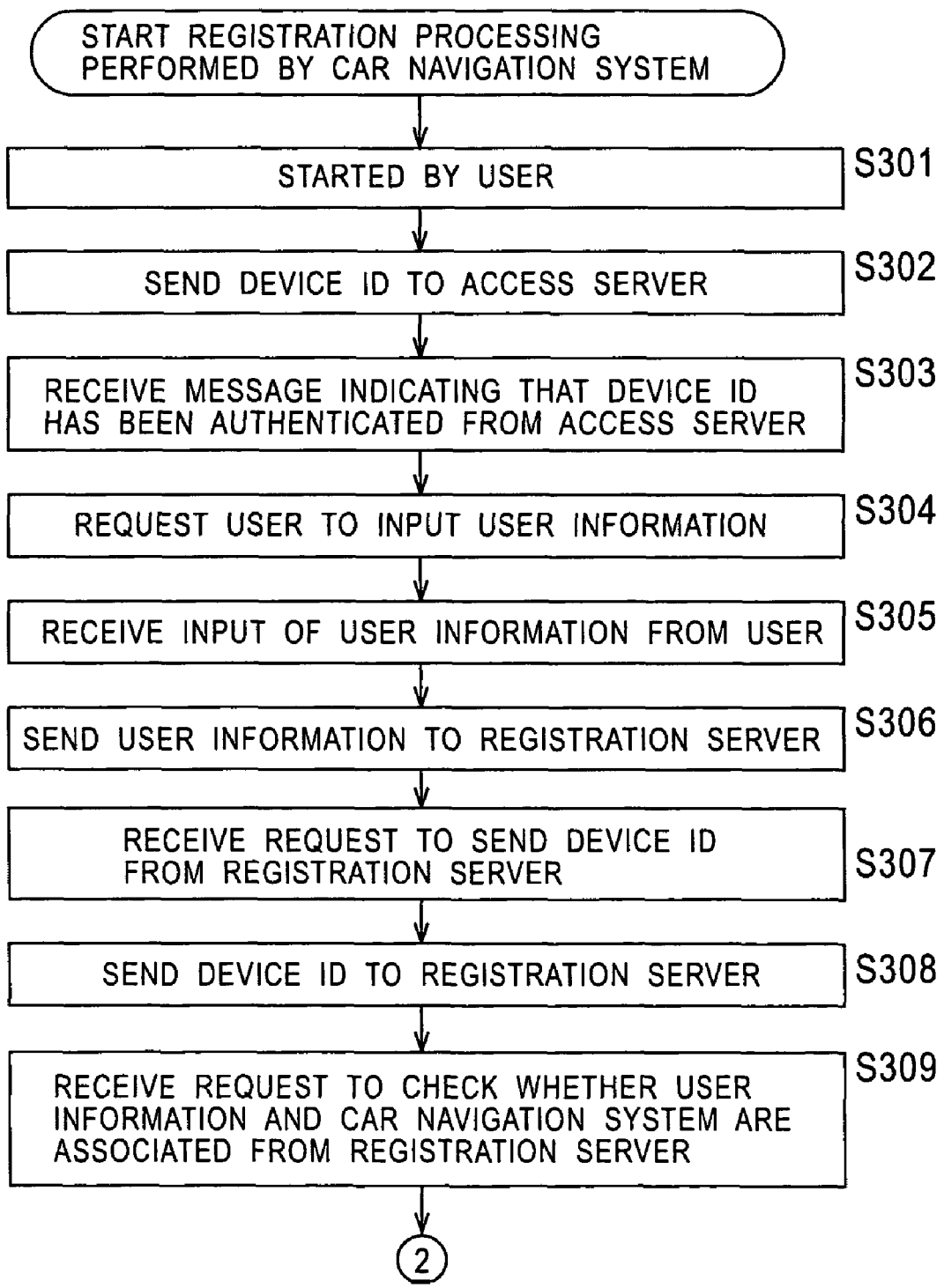
FIG. 36 is a flowchart illustrating car navigation system registration processing performed by the car navigation system.
Figure 37:
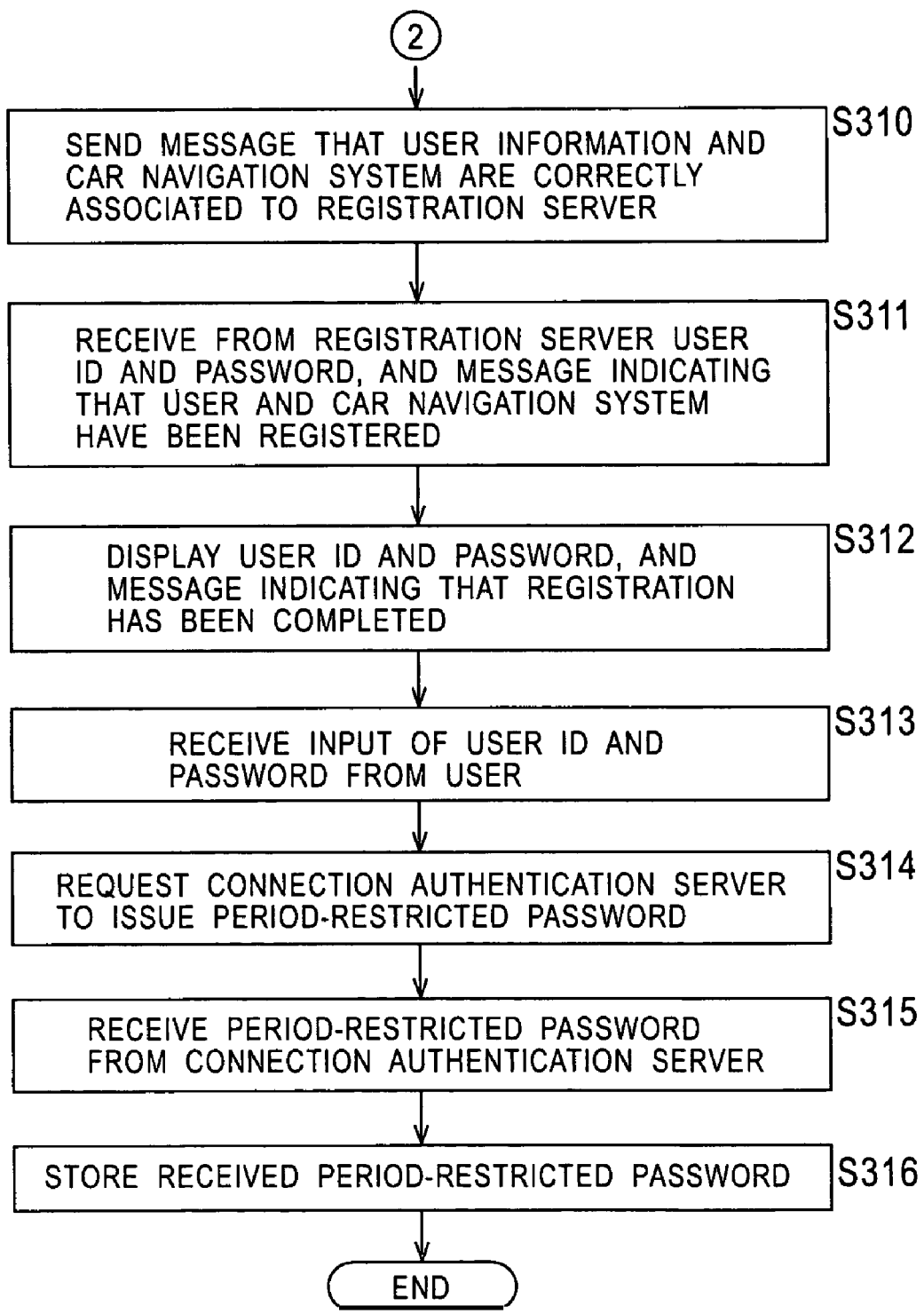
FIG. 37 is a flowchart continued from the flowchart of FIG. 36 illustrating car navigation system registration processing performed by the car navigation system.

In step S281 of FIG. 35, the service providing server 145 receives access from the refrigerator 113. In step S282, the service providing server 145 starts the service providing program 423 to provide the predetermined services possessed by the service providing server 145.

In step S214, the refrigerator 113 receives the predetermined services from the service providing server 145.

As described above, the refrigerator 113 is able to receive authentication from the access server and the web authentication proxy server 146 based on the single device ID and the single passphrase. As stated above, the user is able to connect to the Internet 1 and the service providing server 145 without the need to input the ID or password.

In the above description, the hash value is calculated by adding the passphrase to the challenge. However, the present invention is not limited to this calculation method. Certain calculation equations using the passphrase and challenge (for example, the passphrase may be multiplied with challenge, or other preset calculations may be performed) may be used to calculate the hash value.

In the case of a CE device 132 with an input interface for receiving the input of operations from the user, which is different from the refrigerator 113, user registration for the CE device 132, authentication for the CE device 132 by the access server 141, and authentication by the web authentication proxy server 146 can be, of course, performed by the above-described method. However, it is also possible to perform user registration for the CE device 132, authentication for the CE device 132 by the access server 141, and authentication by the web authentication proxy server 146 according to a method different from the above-described method.

A description is now given below of user registration processing for the CE device 132, authentication for the CE device 132 by the access server 141, and authentication processing by the web authentication proxy server 146, which can be performed for the CE device 132 with an input interface for receiving the input of operations from the user. In this case, the car navigation system 112 is taken as an example of such CE devices 132.

Registration processing performed by the car navigation system 112 is described below with reference to the flowcharts of FIGS. 36 through 42.

In step S301, the car navigation system 112 is run by the user for the first time. Then, in step S302, the browser 543 of the car navigation system 112 sends the device ID to the access server 141.

Figure 38:
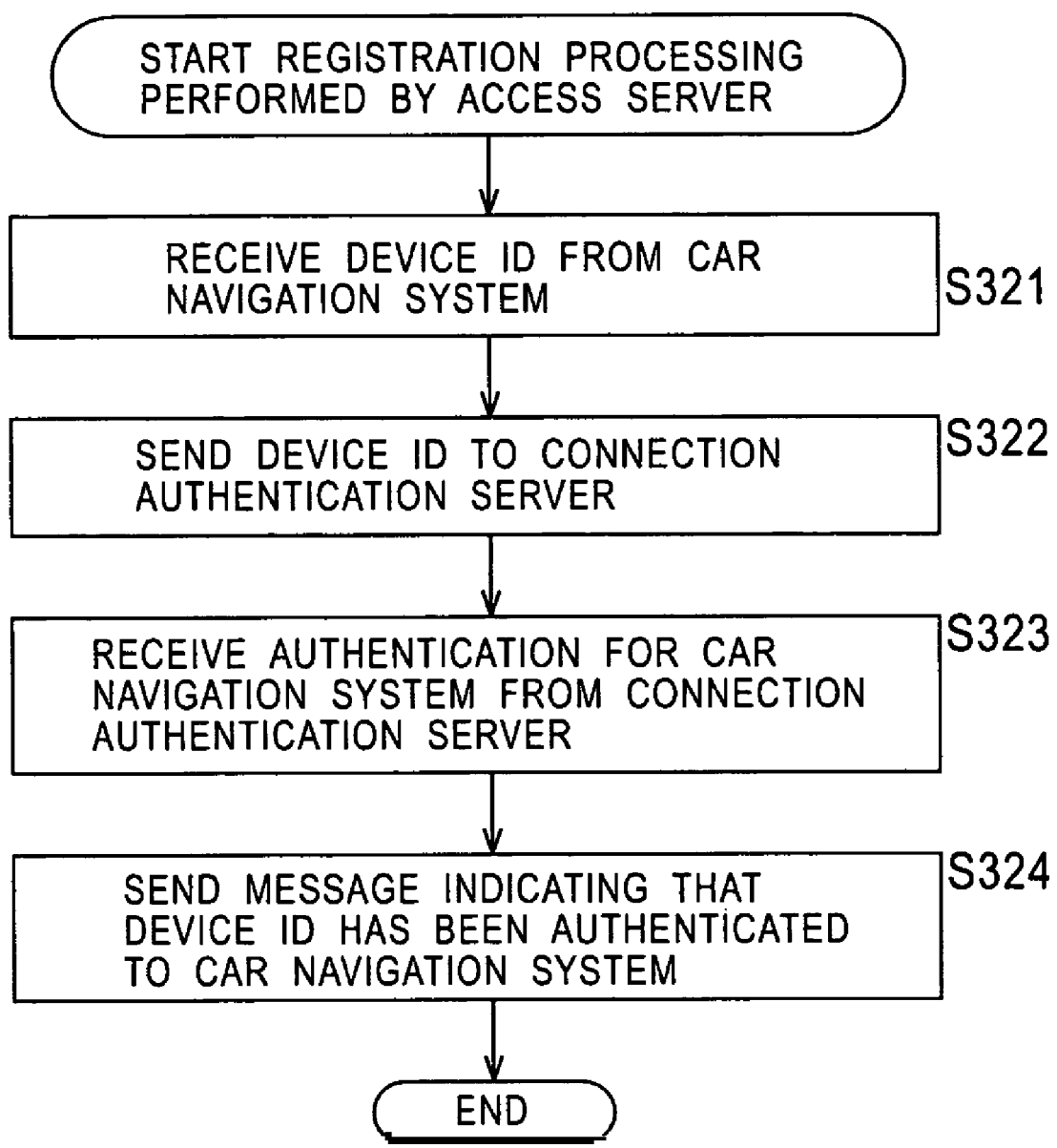
FIG. 38 is a flowchart illustrating car navigation system registration processing performed by the access server.

In step S321 of FIG. 38, the access server 141 receives the device ID from the car navigation system 112. In step S322, the communication control program 342 of the access server 141 sends the device ID received in step S321 to the connection authentication server 143.

Figure 39:
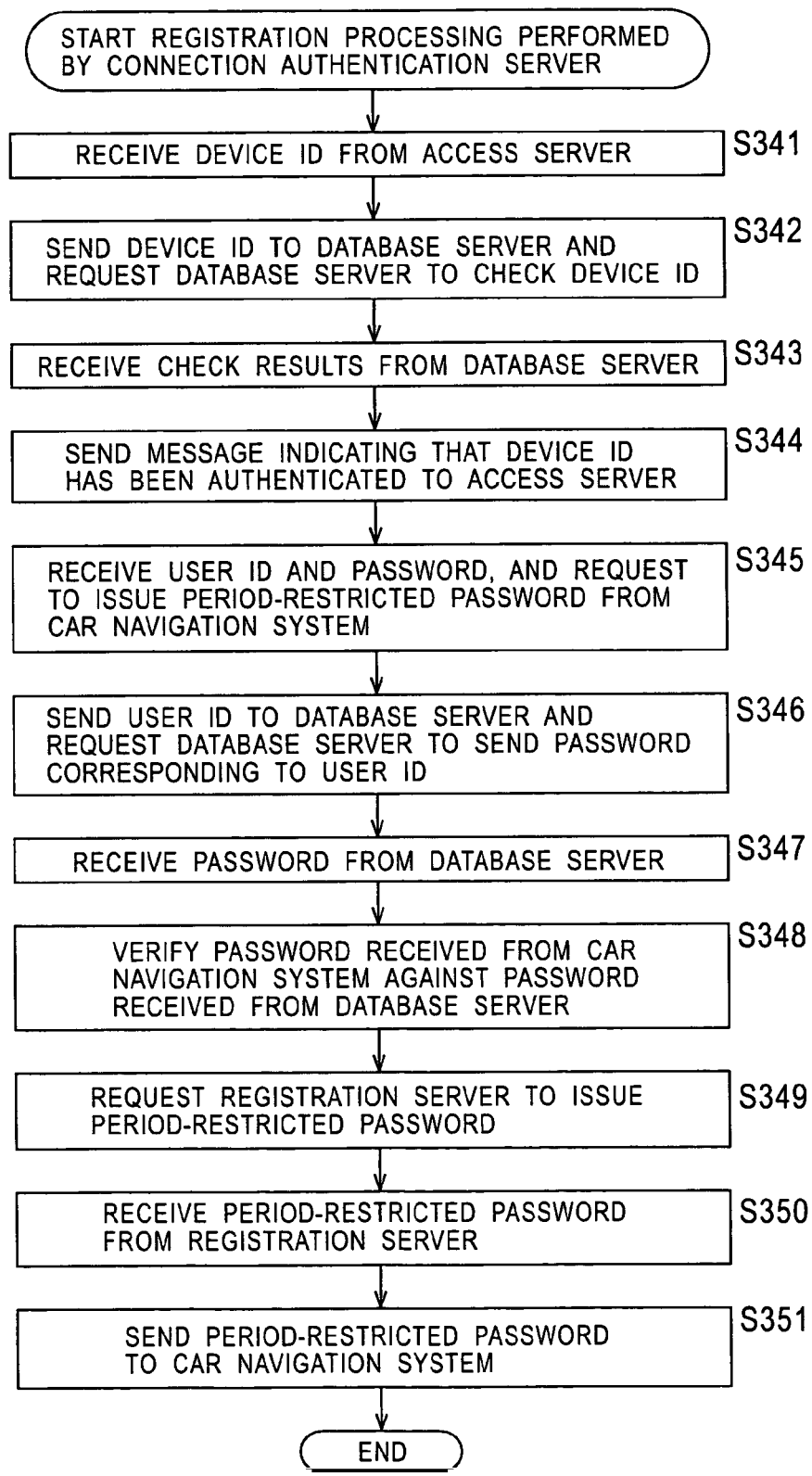
FIG. 39 is a flowchart illustrating car navigation system registration processing performed by the connection authentication server.

In step S341 of FIG. 39, the connection authentication server 143 receives the device ID from the access server 141. In step S342, the connection authentication server 143 sends the device ID received in step S341 to the database server 144, and requests the database server 144 to verify the device ID against the data of the device IDs of the manufactured CE devices 132.

Figure 42:
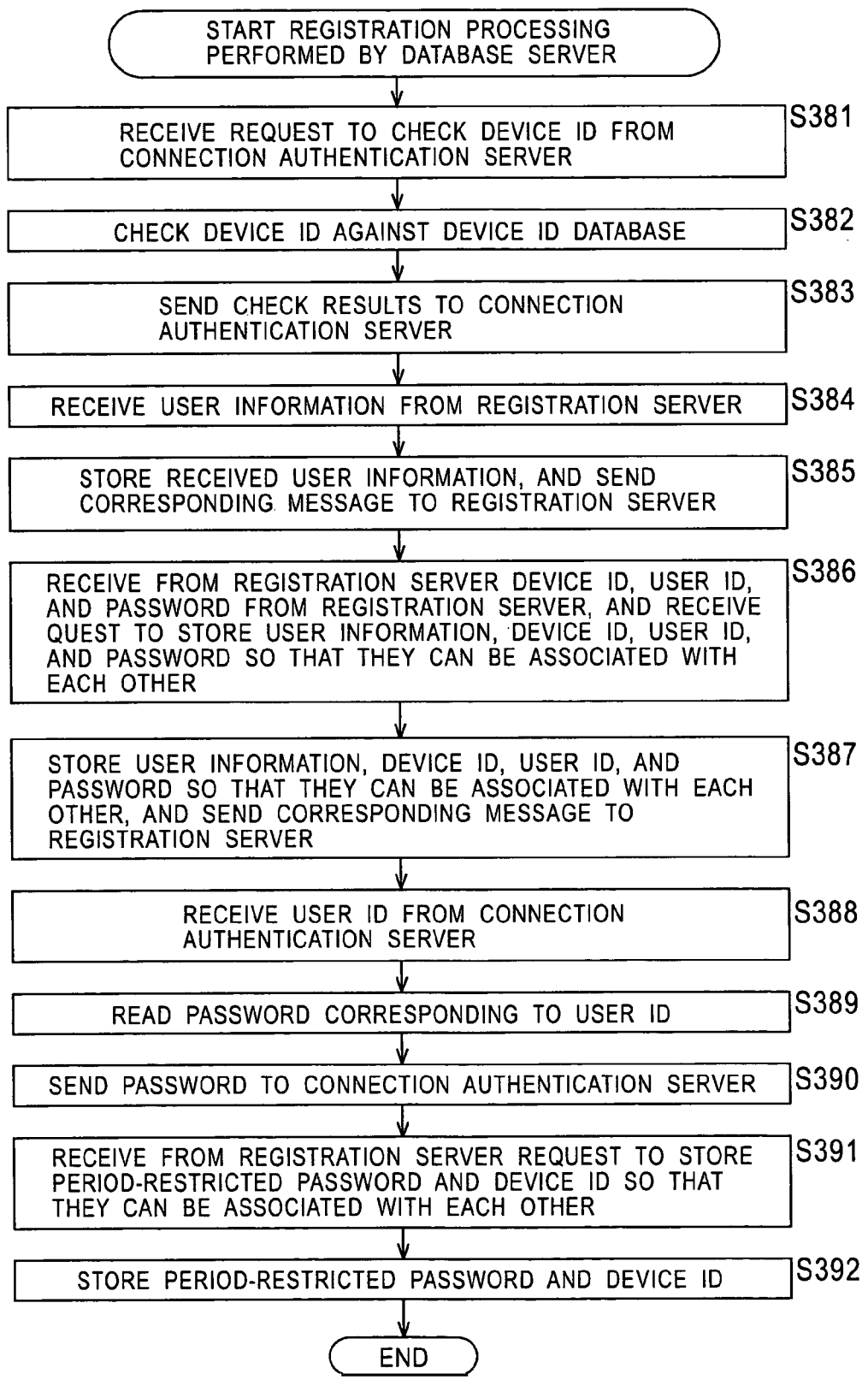
FIG. 42 is a flowchart illustrating car navigation system registration processing performed by the database server.

In step S381 of FIG. 42, the database server 144 receives the device ID from the connection authentication server 143, and also receives a request to check the device ID. The database server 144 has received and stored the device IDs of the CE devices 132 manufactured in the CE device manufacturer 103 from the manufacturer server 131. In step S382, the data search program 405 of the database server 144 checks whether the same device ID as the device ID received in step S381 is included in the device IDs received from the manufacturer server 131 so as to determine whether the device ID received in step S381 is an authorized ID. The data search program 405 of the database server 144 also checks whether the same device ID as the device ID received in step S381 is included in the device IDs of the CE devices 132 for which user registration has been conducted in the database server 144, thereby preventing the CE device 132 being doubly registered.

If it is found that the same device ID as the device ID received in step S381 is included in the device IDs received from the manufacturer server 131, and that the same device ID as the device ID received in step S381 is not included in the device IDs of the CE devices 132 for which user registration has been conducted in the database server 144, in step S383, the communication control program 402 of the database server 144 sends the connection authentication server 143 a message indicating that the same device ID as the device ID received in step S381 is included in the device IDs received from the manufacturer server 131, and that the same device ID as the device ID received in step S381 is not included in the device IDs of the CE devices 132 for which user registration has been conducted in the database server 144.

In step S343, the connection authentication server 143 receives from the database server 144 a message indicating that the same device ID as the device ID received in step S381 is included in the device IDs received from the manufacturer server 131, and that the same device ID as the device ID received in step S381 is not included in the device IDs of the CE devices 132 for which user registration has been conducted in the database server 144. In step S344, the communication control program 382 of the connection authentication server 143 sends a message indicating that the car navigation system 112 has been authenticated to the access server 141.

In step S323, the access server 141 receives a message indicating that the car navigation system 112 has been authenticated from the connection authentication server 143. In step S324, the communication control program 342 of the access server 141 sends a message indicating that the car navigation system 112 has been authenticated to the car navigation system 112.

In step S303, the car navigation system 112 receives a message indicating that the car navigation system 112 has been authenticated from the access server 141. Then, in step S304, the display control program 544 of the car navigation system 112 displays a screen for instructing the user to input user information on the display unit 271. In step S305, the operation-input control program 546 of the car navigation system 112 receives the input of user information through the panel switch 268 or the remote controller 269.

After the user information is input by the user, in step S306, the browser 543 of the car navigation system 112 sends the user information input in step S305 to the registration server 142.

Figure 40:
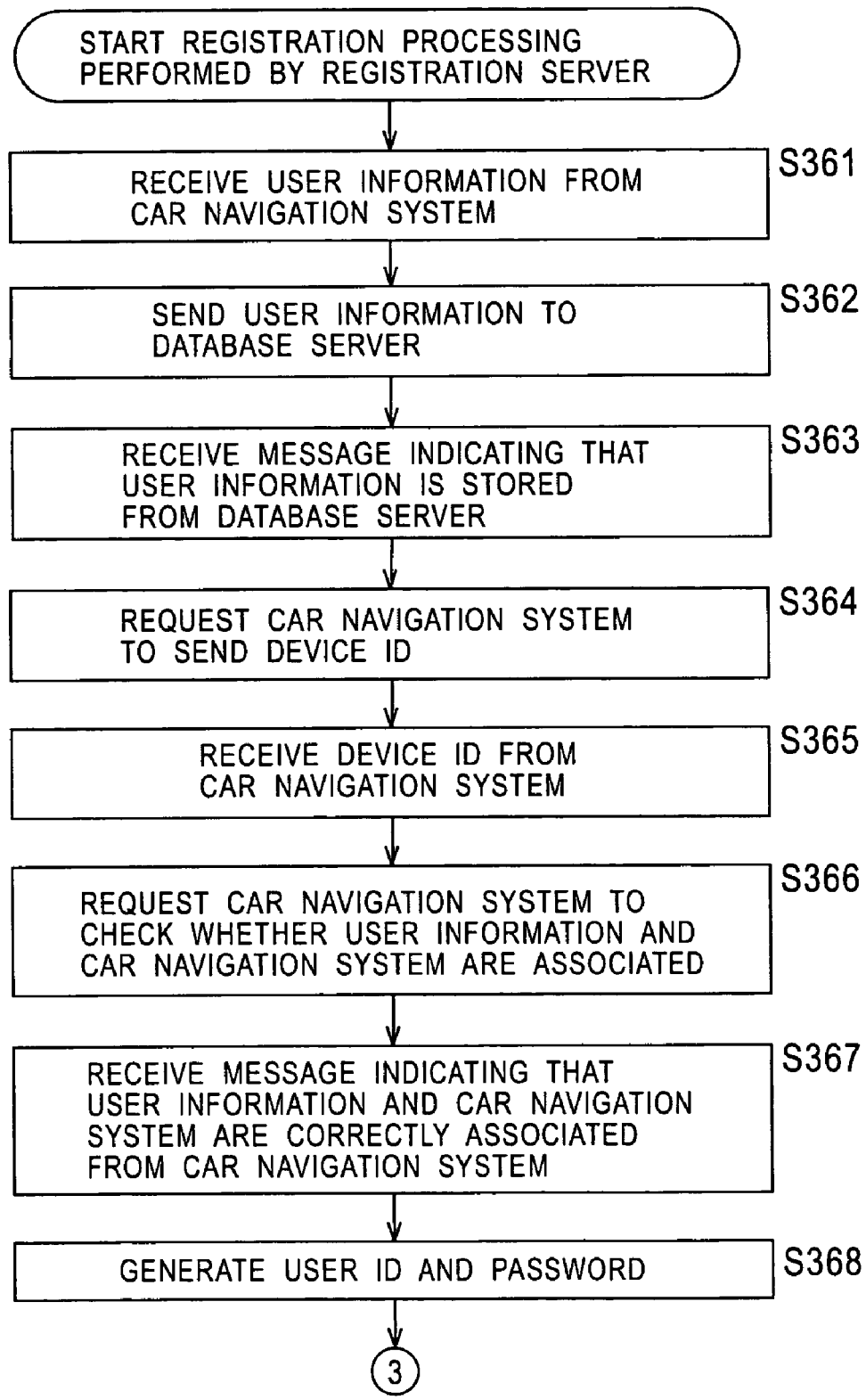
FIG. 40 is a flowchart illustrating car navigation system registration processing performed by the registration server.
Figure 41:
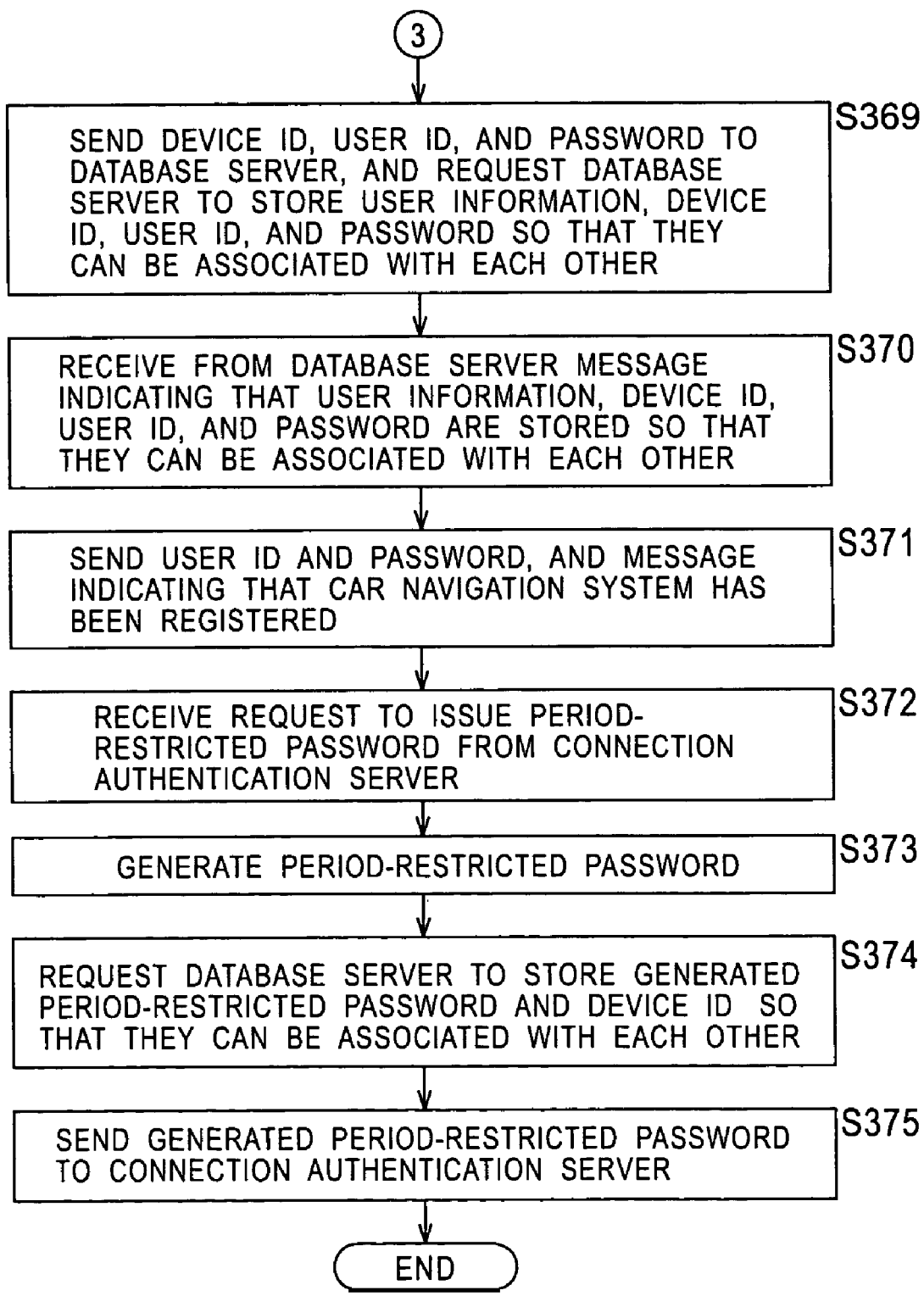
FIG. 41 is a flowchart continued from the flowchart of FIG. 40 illustrating car navigation system registration processing performed by the registration server.

In step S361 of FIG. 40, the registration server 142 receives the user information from the car navigation system 112. Then, in step S362, the communication control program 362 of the registration server 142 sends the user information received in step S361 to the database server 144.

In step S384, the database server 144 receives the user information from the registration server 142. Then, in step S385, the storage control program 404 of the database server 144 stores the user information received in step S384, and the communication control program 402 sends a message indicating that the user information is stored to the registration server 142.

In step S363, the registration server 142 receives a message indicating that the user information is stored from the database server 144. In step S364, the communication control program 362 of the registration server requests the car navigation system 112 to send the device ID.

In step S307, the car navigation system 112 receives a request to send the device ID from the registration server 142. In step S308, the communication control program 542 of the car navigation system 112 sends the device ID to the registration server 142.

In step S365, the registration server 142 receives the device ID from the car navigation system 112.

In step S366, the communication control program 362 of the registration server 142 sends the user information received in step S361 to the car navigation system 112, and requests the car navigation system 112 to check whether the user information and the car navigation system 112 are correctly associated.

In step S309, the car navigation system 112 receives from the registration server 142 a request to check whether the user information and the car navigation system 112 are associated. The display control program 544 of the car navigation system 112 displays the received user information on the display unit 271, and instructs the user to check whether the user information and the car navigation system 112 are correctly associated. When the user confirms that the user information and the car navigation system 112 are correctly associated, the process proceeds to step S310 of FIG. 37. In step S310, the communication control program 542 of the car navigation system 112 sends a message indicating that the user information and the car navigation system 112 are correctly associated to the registration server 142.

In step S367, the registration server 142 receives a message indicating that the user information and the car navigation system 112 are correctly associated from the car navigation system 112. In step S368, the user-ID/password/period-restricted-password generating program 363 of the registration server 142 generates a user ID and a password. In step S369, the communication control program 362 of the registration server 142 sends the device ID received in step S365, the user ID and password generated in step S368 to the database server 144, and also requests the database server 144 to store the user information sent in step S362, the device ID, the user ID, and the password so that they can be associated with each other.

In step S386, the database server 144 receives the user ID and password from the registration server 142, and also receives a request to store the user information received in step S384, the device ID, the user ID, and the password so that they can be associated with each other.

In step S387, the storage control program 404 of the database server 144 stores the user information that has already been stored in step S385, the device ID, the user ID, and the password received in step S386 so that they can be associated with each other, and the communication control program 402 sends the registration server 142 a message indicating that the user information, the device ID, the user ID, and the password are stored so that they can be associated with each other.

In step S370, the registration server 142 receives from the database server 144 a message indicating that the user information, the device ID, the user ID, and the password are stored so that they can be associated with each other.

In step S371, the communication control program 362 of the registration server 142 sends a message indicating that registration for the car navigation system 112 has been completed to the car navigation system 112, and sends the user ID and password generated in step S368 to the car navigation system 112.

In step S311, the car navigation system 112 receives a message indicating that registration for the car navigation system 112 has been completed from the registration server 142, and also receives the user ID and password. In step S312, the display control program 544 of the car navigation system 112 provides information indicating that registration for the car navigation system 112 has been completed, and displays a message for instructing the user to write down the user ID and password on the display unit 271.

The user writes down the user ID and password according to the message. Then, the display control program 544 of the car navigation system 112 displays a message for instructing the user to obtain a period-restricted password on the display unit 271. When the user inputs the user ID and password according to the message, in step S313, the operation-input control program 546 of the car navigation system 112 receives the input of the user ID and password.

In step S314, the browser 543 of the car navigation system 112 sends the user ID and password to the connection authentication server 143, and also requests the connection authentication server 143 to issue a period-restricted password.

In step S345, the connection authentication server 143 receives the user ID and password from the car navigation system 112, and also receives a request to issue a period-restricted password.

In step S346, the communication control program 382 of the connection authentication server 143 sends the user ID to the database server 144, and requests the database server 144 to send the password corresponding to the user ID.

In step S388, the database server 144 receives the user ID and also receives a request to send the password corresponding to the user ID from the connection authentication server 143. In step S389, the data search program 405 of the database server 144 reads the password corresponding to the user ID (password stored in correspondence with the user ID in step S387). In step S390, the communication control program 402 of the database server 144 sends the password read in step S389 to the connection authentication server 143.

In step S347, the connection authentication server 143 receives the password from the database server 144. In step S348, the authentication program 384 of the connection authentication server 143 checks whether the password received from the car navigation system 112 in step S345 is the same as the password received from the database server 144 in step S347 so as to determine whether the password is an authorized password. If the password received from the car navigation system 112 in step S345 is the same as the password received from the database server 144 in step S347, the process proceeds to step S349. In step S349, the communication control program 402 of the connection authentication server 143 requests the registration server 142 to issue a period-restricted password.

In step S372, the registration server 142 receives a request to issue a period-restricted password from the connection authentication server 143. In step S373, the user-ID/password/period-restricted-password generating program 363 of the registration server 142 generates a period-restricted password. In step S374, the communication control program 362 of the registration server 142 sends the period-restricted password generated in step S373 to the database server 144, and also requests the database server 144 to store the period-restricted password and the device ID so that they can be associated with each other.

In step S391, the database server 144 receives the period-restricted password from the registration server, and also receives a request to store the period-restricted password and the device ID so that they can be associated with each other. Then, in step S392, the storage control program 404 of the database server 144 stores the period-restricted password received in step S391 and the device ID so that they can be associated with each other.

The period-restricted password has an effective period, and when the effective period has passed, the period-restricted password can no longer be used. Then, in step S392, the storage control program 404 of the database server 144 stores, together with the period-restricted password, the time and date at the end of the effective period of the period-restricted password. The time and date at the end of the effective period of the period-restricted password can be set to, for example, one month after the date on which the period-restricted password is stored. Although in this embodiment the period-restricted password is employed, a password without an effective period may be used. That is, when the CE device 132 is manufactured in the CE device manufacturer 103, a password without an effective period may be embedded into the CE device 132.

In step S375, the communication control program 362 of the registration server 142 sends the period-restricted password generated in step S373 to the connection authentication server 143.

In step S350, the connection authentication server 143 receives the period-restricted password from the registration server 142. In step S351, the communication control program 382 of the connection authentication server 143 sends the period-restricted password received in step S350 to the car navigation system 112.

In step S315, the car navigation system 112 receives the period-restricted password from the connection authentication server 143. In step S316, the storage control program 547 of the car navigation system 112 stores the period-restricted password received in step S315 in the storage unit 272.

Registration processing for the car navigation system 112 has been completed as described above.

A description is now given, with reference to the flowcharts of FIGS. 43 through 51, of authentication processing before the car navigation system 112 is connected to the Internet 1 to receive services from the service providing server 145.

Figure 43:
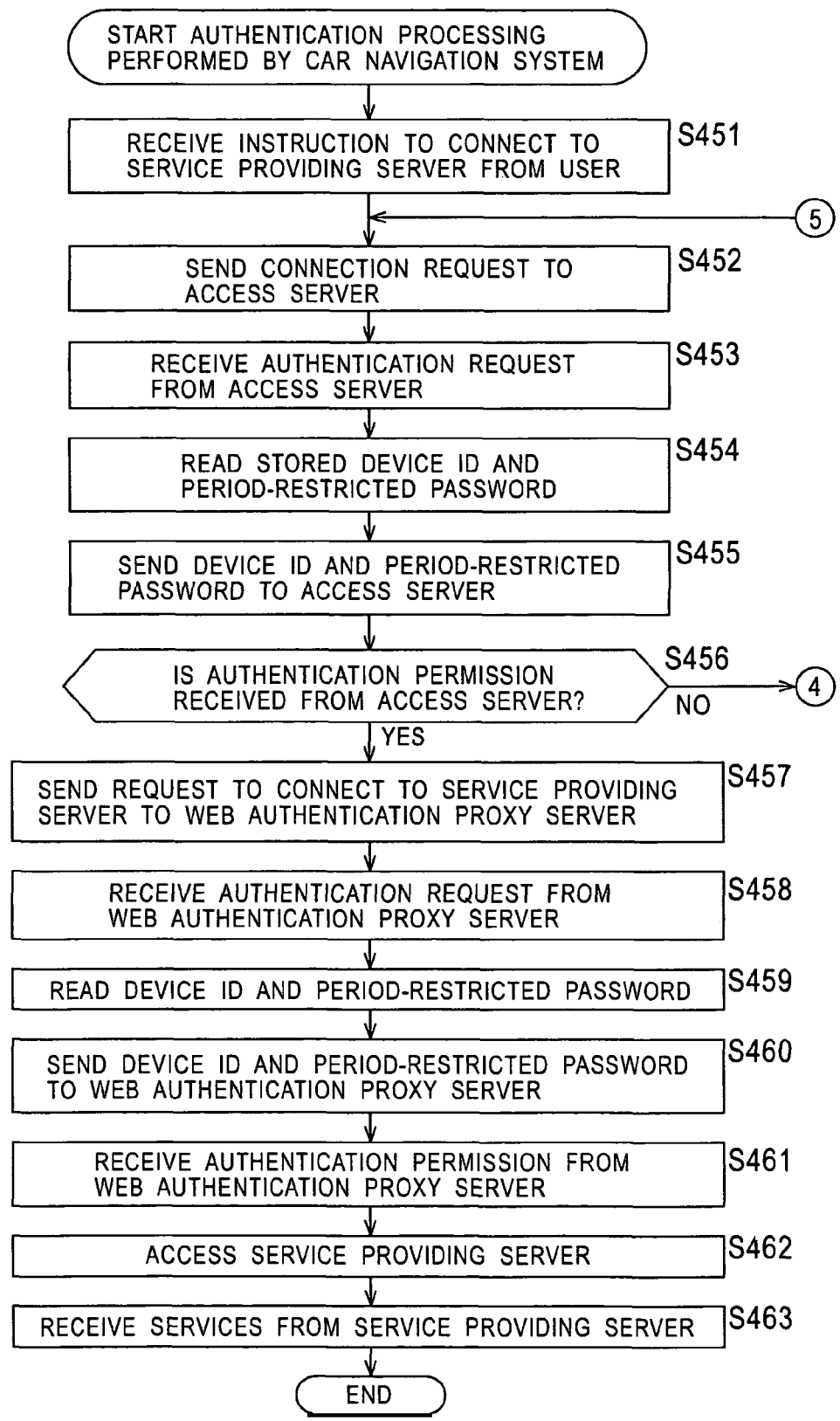
FIG. 43 is a flowchart illustrating car navigation system authentication processing performed by the car navigation system.
Figure 44:
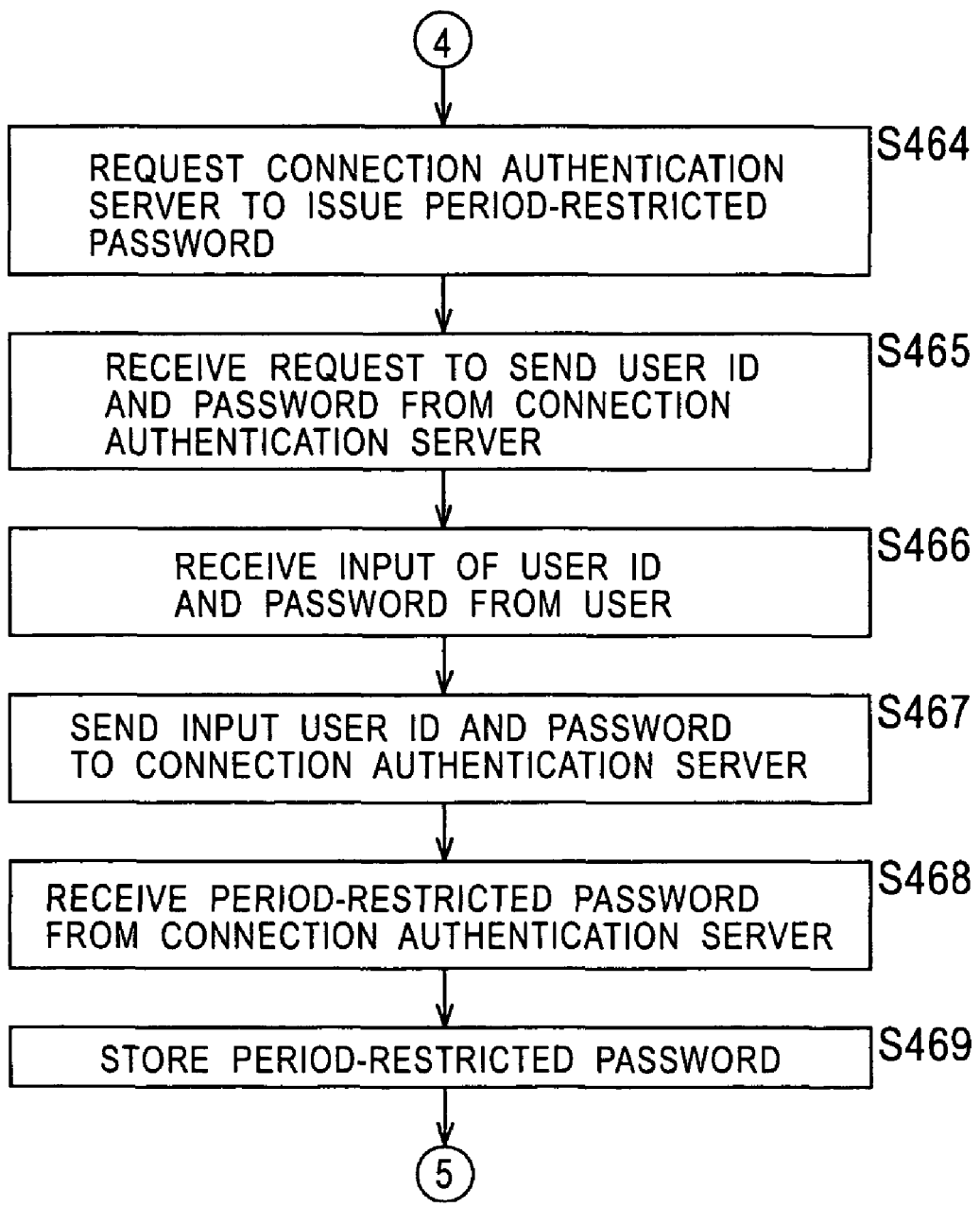
FIG. 44 is a flowchart continued from the flowchart of FIG. 43 illustrating car navigation system authentication processing performed by the car navigation system.
Figure 45:
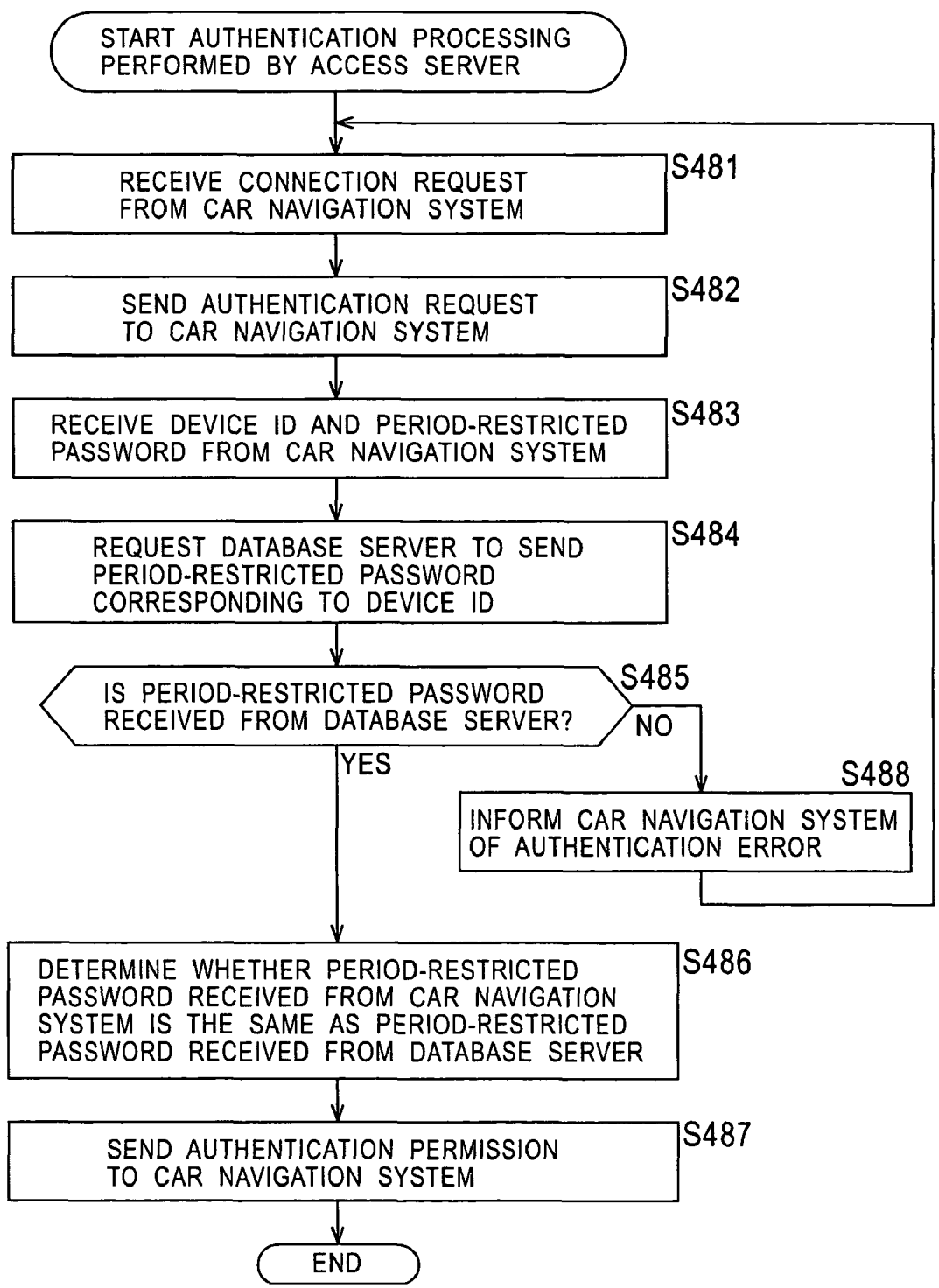
FIG. 45 is a flowchart illustrating car navigation system authentication processing performed by the access server.

In step S451 of FIG. 43, the car navigation system 112 receives a request to connect to the service providing server 145 from the user. In step S452, the communication control program 542 of the car navigation system 112 sends a request to connect to the Internet 1 to the access server 141.

In step S481, the access server 141 receives a request to connect to the Internet 1 from the car navigation system 112. In step S482, the communication control program 342 of the access server 141 sends an authentication request to the car navigation system 112.

In step S453, the car navigation system 112 receives an authentication request from the access server 141. In step S454, the storage control program 547 of the car navigation system 112 reads the device ID and the period-restricted password from the storage unit 272. In step S455, the communication control program 542 of the car navigation system 112 sends the device ID and the period-restricted password read in step S454 to the access server 141.

In step S483, the access server 141 receives the device ID and the period-restricted password from the car navigation system 112. In step S484, the communication control program 342 of the access server 141 sends the device ID received in step S483 to the database server 144, and also requests the database server 144 to send the period-restricted password corresponding to the device ID.

Figure 49:
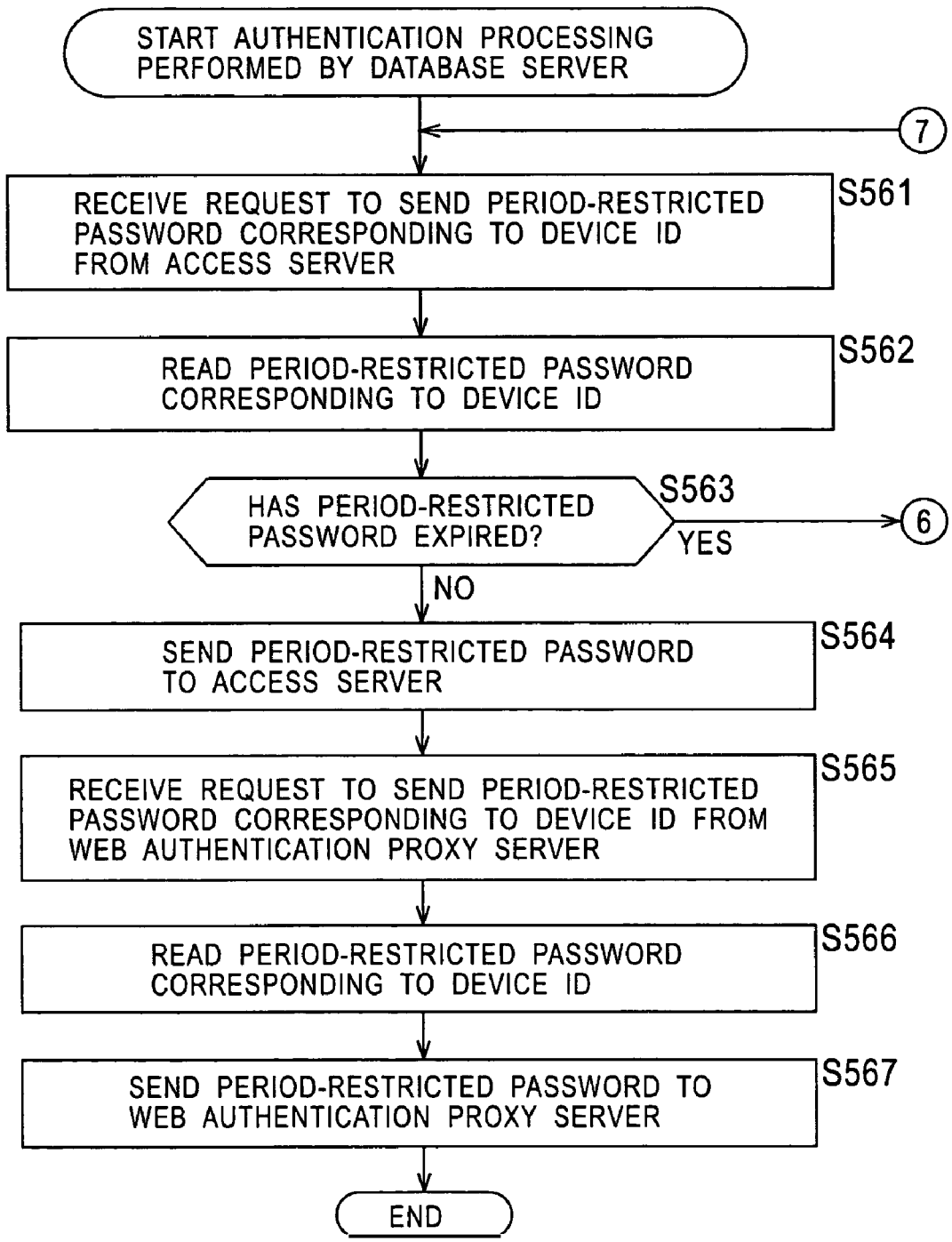
FIG. 49 is a flowchart illustrating car navigation system authentication processing performed by the database server.
Figure 50:
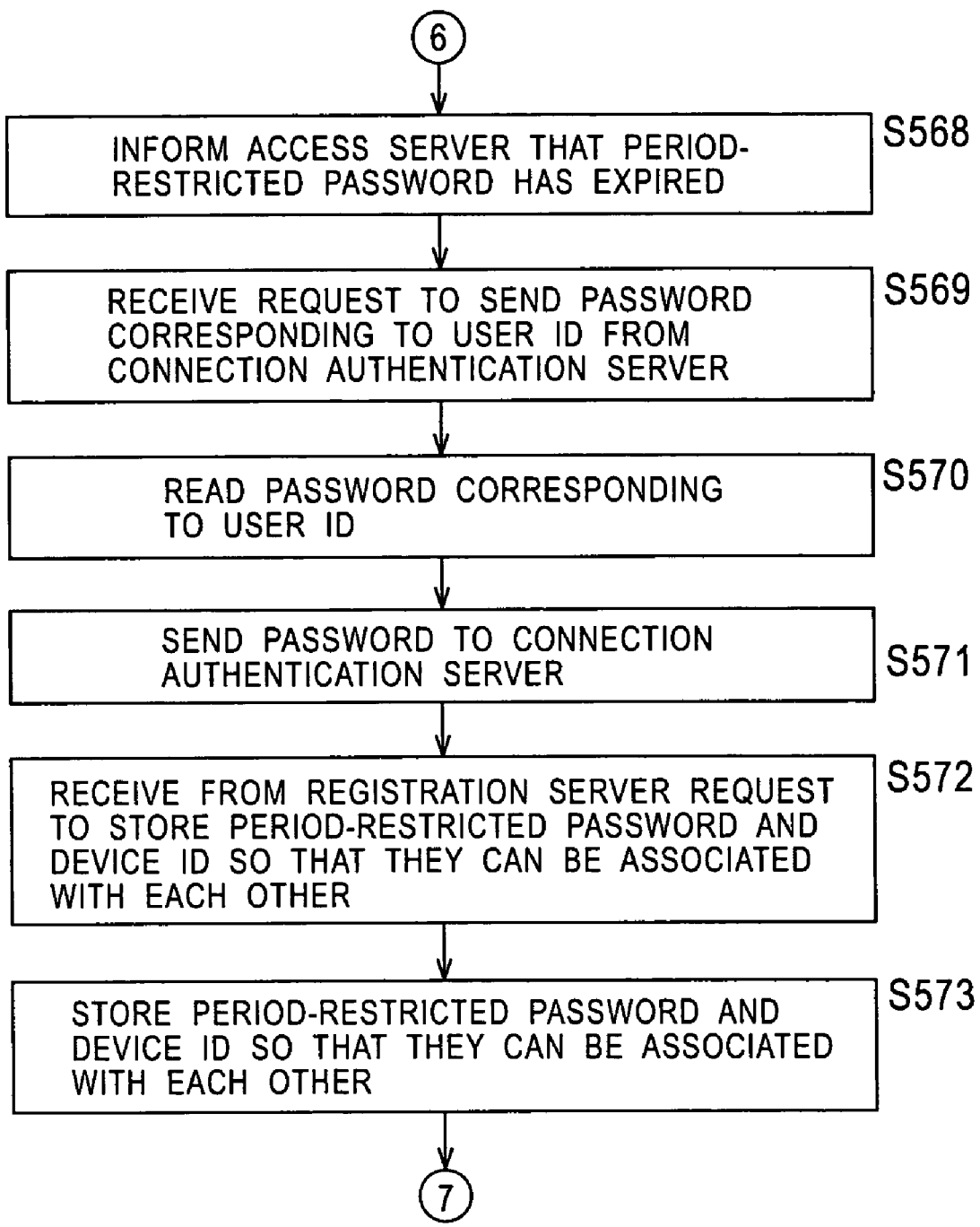
FIG. 50 is a flowchart continued from the flowchart of FIG. 49 illustrating car navigation system authentication processing performed by the database server.

In step S561 of FIG. 49, the database server 144 receives the device ID from the access server 141, and also receives a request to send the period-restricted password corresponding to the device ID. In step S562, the data search program 405 of the database server 144 reads the period-restricted password corresponding to the device ID. When storing the period-restricted password in the database (step S392), the time and date of the effective period is also stored. Accordingly, in step S563, the data search program 405 reads the time and date of the effective period together with the period-restricted password, and checks whether the period-restricted password has expired. If it is found that the period-restricted password has not expired, the process proceeds to step S564. In step S564, the communication control program 402 of the database server 144 sends the period-restricted password read in step S562 to the access server 141.

If it is found in step S485 that the access server 141 has received the period-restricted password from the database server 144, the process proceeds to step S486. In step S486, the authentication program 344 of the access server 141 determines whether the period-restricted password received from the car navigation system 112 in step S483 is the same as the period-restricted password received from the database server 144 in step S485. If it is found that the period-restricted password received from the car navigation system 112 in step S483 is the same as the period-restricted password received from the database server 144 in step S485, the process proceeds to step S487. In step S487, the communication control program 342 of the access server 141 sends a permission to connect to the Internet 1 to the car navigation system 112.

If it is found in step S456 that the car navigation system 112 has received a permission to connect to the Internet 1 from the access server 141, the process proceeds to step S457. In step S457, the browser 543 of the car navigation system 112 sends a request to connect to the service providing server 153 to the web authentication proxy server 146.

Figure 46:
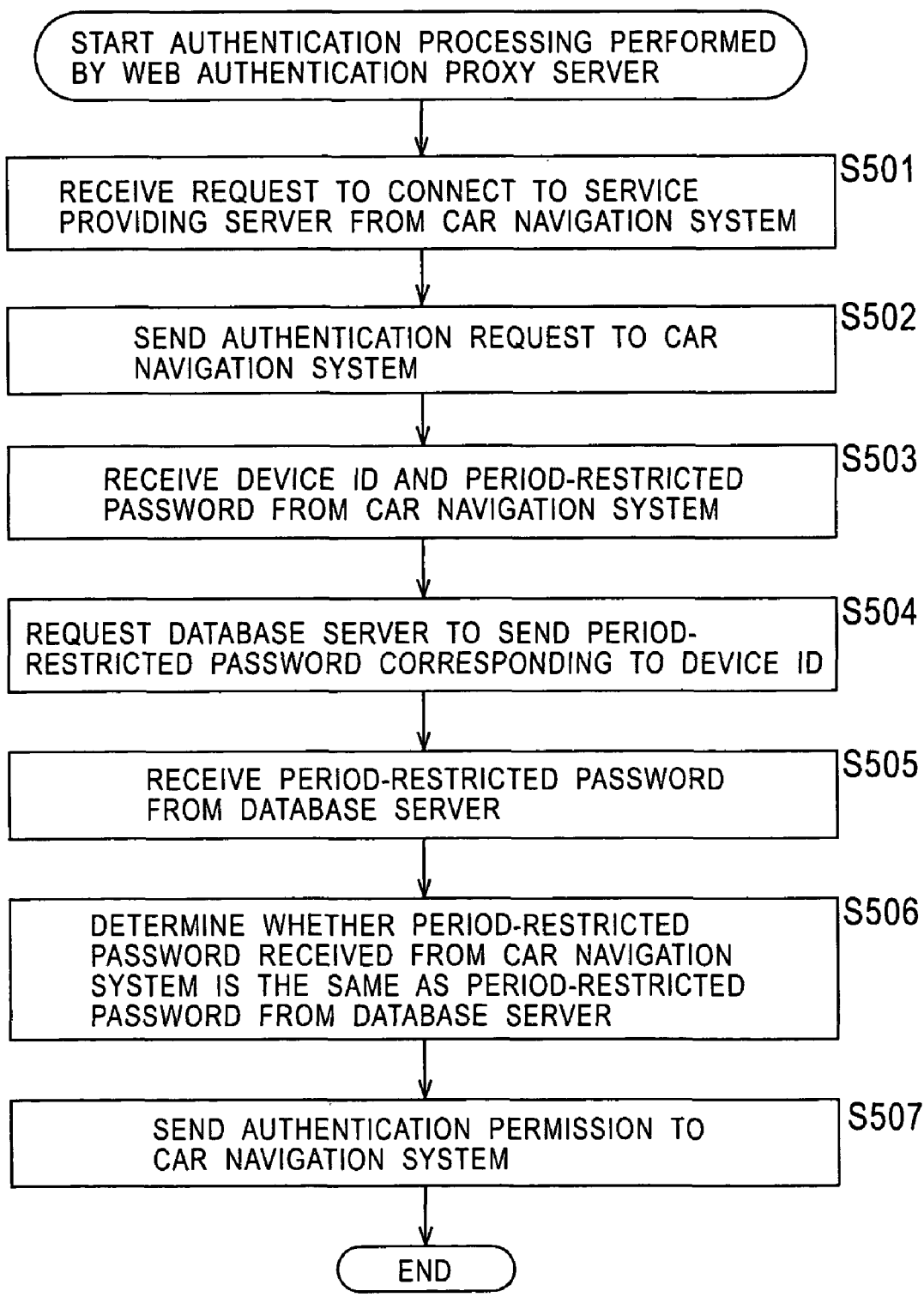
FIG. 46 is a flowchart illustrating car navigation system authentication processing performed by the web authentication proxy server.

In step S501 of FIG. 46, the web authentication proxy server 146 receives a request to connect to the service providing server 145 from the car navigation system 112.

In step S502, the communication control program 442 of the web authentication proxy server 146 sends an authentication request to the car navigation system 112.

In step S458, the car navigation system 112 receives an authentication request from the web authentication proxy server 146. In step S459, the storage control program 547 of the car navigation system 112 reads the device ID and the period-restricted password from the storage unit 272. In step S460, the browser 543 of the car navigation system 112 sends the device ID and the period-restricted password read by the storage control program 547 in step S459 to the web authentication proxy server 146.

In step S503, the web authentication proxy server 146 receives the device ID and the period-restricted password from the car navigation system 112. In step S504, the communication control program 442 of the web authentication proxy server 146 sends the device ID to the database server 144, and also requests the database server 144 to send the period-restricted password corresponding to the device ID.

In step S565, the database server 144 receives the device ID from the web authentication proxy server 146, and also receives a request to send the period-restricted password corresponding to the device ID. In step S566, the data search program 405 of the database server 144 reads the period-restricted password corresponding to the device ID. In step S567, the communication control program 402 of the database server 144 sends the period-restricted password read in step S566 to the web authentication proxy server 146.

In step S505, the web authentication proxy server 146 receives the period-restricted password from the database server 144. In step S506, the authentication program 443 of the web authentication proxy server 146 determines whether the period-restricted password received from the car navigation system 112 in step S503 is the same as the period-restricted password received from the database server 144 in step S505. If it is found that the period-restricted password received from the car navigation system 112 is the same as the period-restricted password received from the database server 144, the process proceeds to step S507. In step S507, the communication control program 442 of the web authentication proxy server 146 sends a permission to connect to the service providing server 145 to the car navigation system 112.

In step S461, the car navigation system 112 receives a permission to connect to the service providing server 145 from the web authentication proxy server 146. In step S462, the browser 543 of the car navigation system 112 accesses the service providing server 145.

Figure 51:
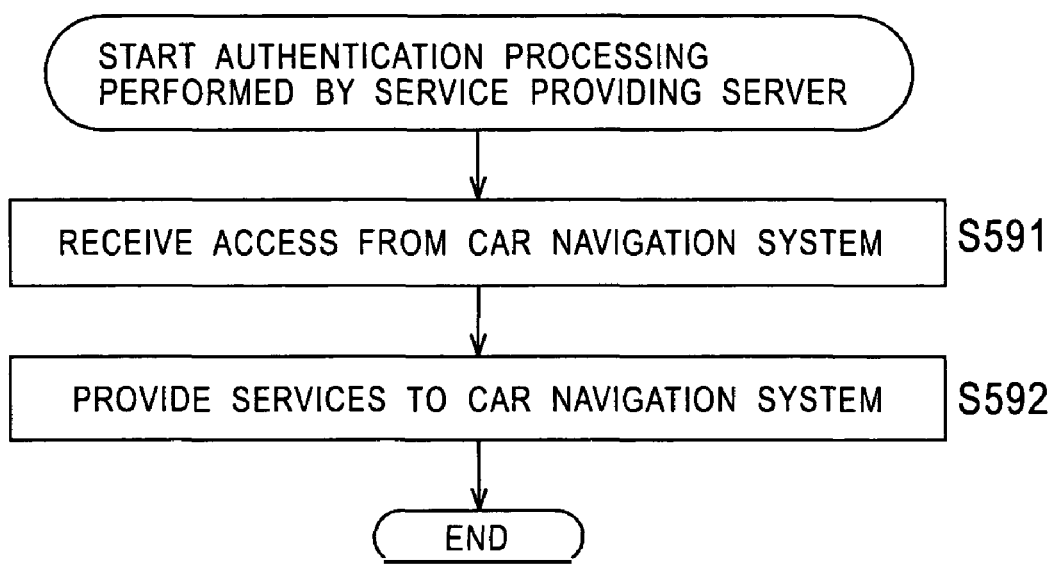
FIG. 51 is a flowchart illustrating car navigation system authentication processing performed by the service providing server.

In step S591 of FIG. 51, the service providing server 145 receives access from the car navigation system 112. In step S592, the service providing program 423 of the service providing server 145 provides the predetermined services possessed by the service providing server 145 to the car navigation system 112.

In step S463, the car navigation system 112 receives the predetermined services from the service providing server 145.

As described above, the car navigation system 112 is permitted to connect to the Internet 1 and to the service providing server 145, and receives services. If, however, the database server 144 determines in step S563 that the effective period of the period-restricted password has already passed, the process proceeds to step S568 of FIG. 50.

In step 568, the communication control program 402 of the database server 144 sends a message indicating that the period-restricted password has expired to the access server 141.

Then, in step S485, instead of receiving the period-restricted password, the access server 141 receives a message indicating that the period-restricted password has expired from the database server. The process then proceeds to step S488 in which the communication control program 342 of the access server 141 sends a message indicating that authentication for the car navigation system 112 has failed to the car navigation system 112.

In this case, in step S456, instead of receiving an authentication permission, the car navigation system 112 receives a message indicating that authentication for the car navigation system 112 has failed. The process then proceeds to step S464 of FIG. 44.

In step S464, the browser 543 of the car navigation system 112 requests the connection authentication server 143 to issue a period-restricted password.

Figure 47:
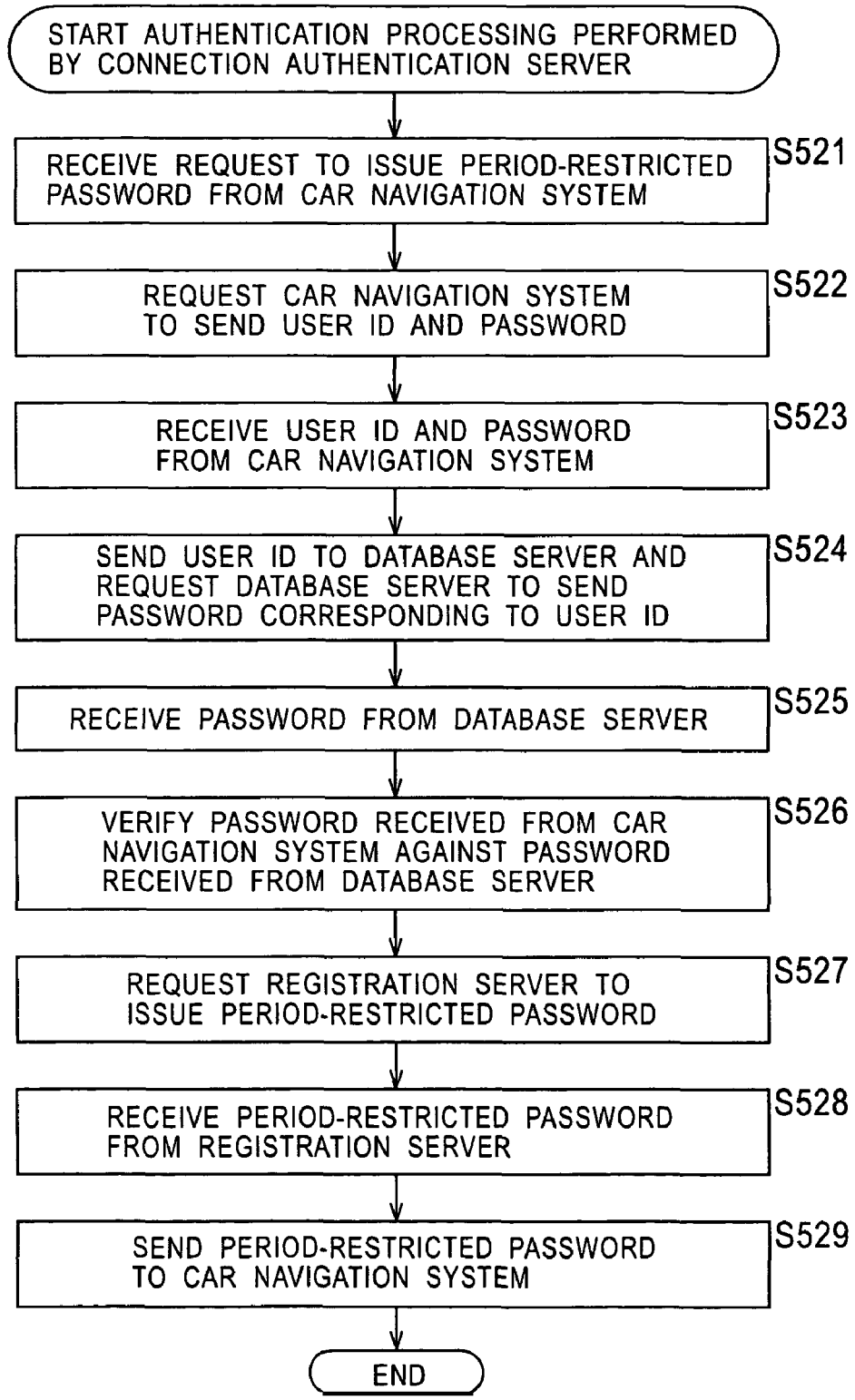
FIG. 47 is a flowchart illustrating car navigation system authentication processing performed by the connection authentication server.

In step S521 of FIG. 47, the connection authentication server 143 receives a request to issue a period-restricted password from the car navigation system 112. In step S522, the communication control program 382 of the connection authentication server 143 requests the car navigation system 112 to send the user ID and password.

In step S465, the car navigation system 112 receives a request to send the user ID and password from the connection authentication server 143. In step S466, the display control program 544 of the car navigation system 112 displays a message for instructing the user to input the user ID and password on the display unit 271. The operation-input control program 546 receives the input of the user ID and password from the user.

After receiving the input of the user ID and password from the user, in step S467, the browser 543 of the car navigation system 112 sends the user ID and password input in step S466 to the connection authentication server 143.

In step S523, the connection authentication server 143 receives the user ID and password from the car navigation system 112. In step S524, the communication control program 382 of the connection authentication server 143 sends the user ID to the database server 144, and requests the database server 144 to send the password corresponding to the user ID.

In step S569, the database server 144 receives the user ID from the connection authentication server 143, and also receives a request to send the password corresponding to the user ID. In step S570, the data search program 405 of the database server 144 reads the password corresponding to the user ID. In step S571, the communication control program 402 of the database server 144 sends the password read in step S570 to the connection authentication server 143.

In step S525, the connection authentication server 143 receives the password from the database server 144. In step S526, the authentication program 384 of the connection authentication server 143 checks whether the password received from the car navigation system 112 in step S523 is the same as the password received from the database server 144 in step S525 so as to determine whether the password is an authorized password. If it is found that the password received from the car navigation system 112 in step S523 is the same as the password received from the database server 144 in step S525, the process proceeds to step S527. In step S527, the connection authentication server 143 requests the registration server 142 to issue a period-restricted password.

Figure 48:
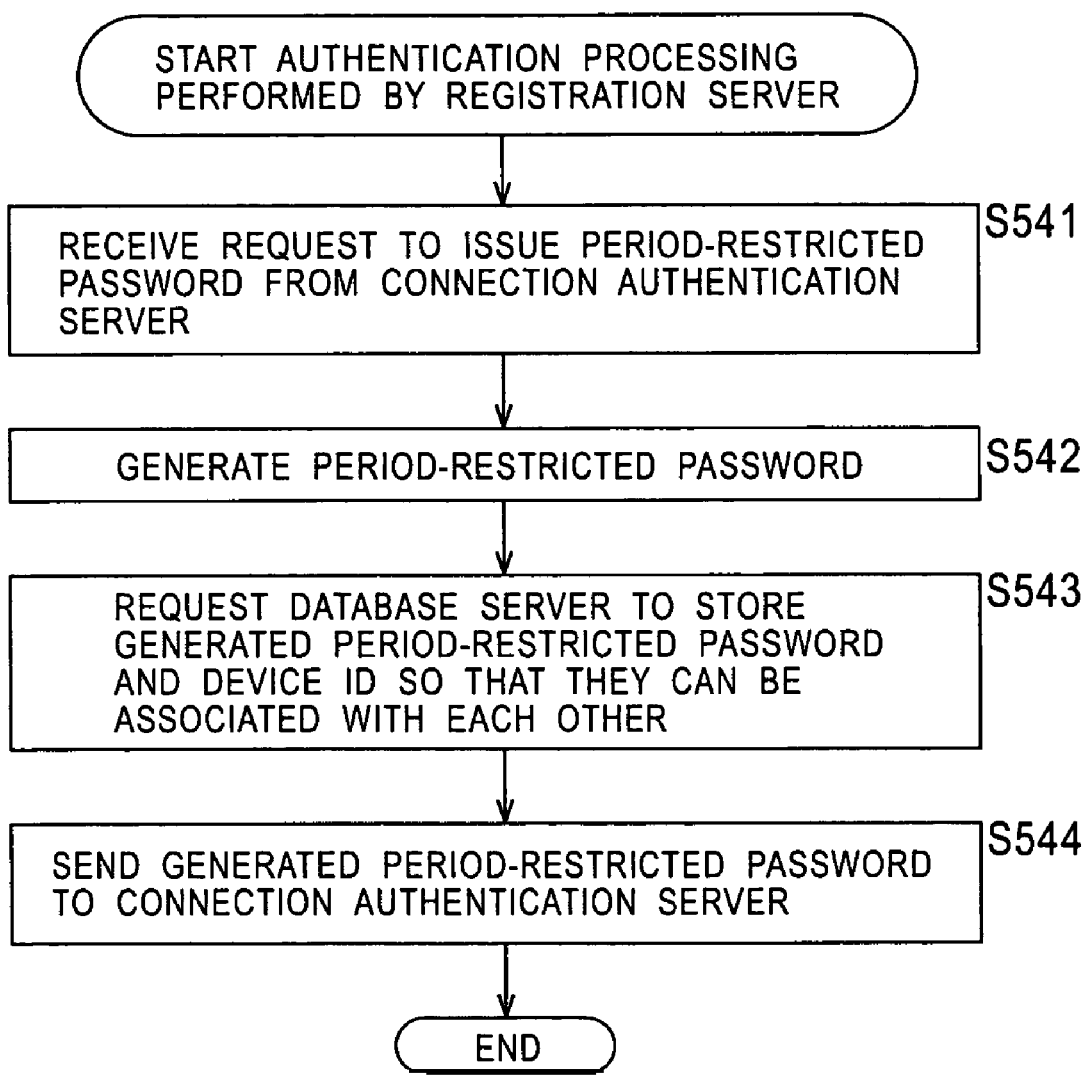
FIG. 48 is a flowchart illustrating car navigation system authentication processing performed by the registration server.

In step S541 of FIG. 48, the registration server 142 receives a request to issue a period-restricted password from the connection authentication server 143. In step S542, the user-ID/password/period-restricted-password generating program 362 of the registration server 142 generates a period-restricted password. In step S543, the communication control program 362 of the registration server 142 sends the period-restricted password generated in step S542 to the database server 144, and also requests the database server 144 to store the period-restricted password and the device ID so that they can be associated with each other.

In step S572, the database server 144 receives the period-restricted password from the registration server, and also receives a request to store the period-restricted password and the device ID so that they can be associated with each other. Then, in step S573, the storage control program 404 of the database server 144 stores the period-restricted password received in step S572 and the device ID so that they can be associated with each other. When storing the period-restricted password, the storage control program 404 of the database server 144 stores, together with the period-restricted password, the time and date at the end of the effective period of the period-restricted password. The time and date at the end of the effective period can be set to, for example, one month after.

In step S544, the communication control program 362 of the registration server 142 sends the period-restricted password generated in step S542 to the connection authentication server 143.

In step S528, the connection authentication server 143 receives the period-restricted password from the registration server 142. In step S529, the communication control program 382 of the connection authentication server 143 sends the period-restricted password received in step S528 to the car navigation system 112.

In step S468, the car navigation system 112 receives the period-restricted password from the connection authentication server 143. In step S469, the storage control program 547 of the car navigation system 112 stores the period-restricted password received in step S468 in the storage unit 272.

Subsequently, the process of the car navigation system 112 returns to step S452 of FIG. 43, and repeats the processing of step S452 and the subsequent steps.

In the CE device 132 provided with an input interface for receiving the input of operations by the user, for example, in the car navigation system 112, user registration for the CE device 132 and authentication for connecting to the Internet 1 and to the service providing server 145 are performed as described above.

Figure 1:
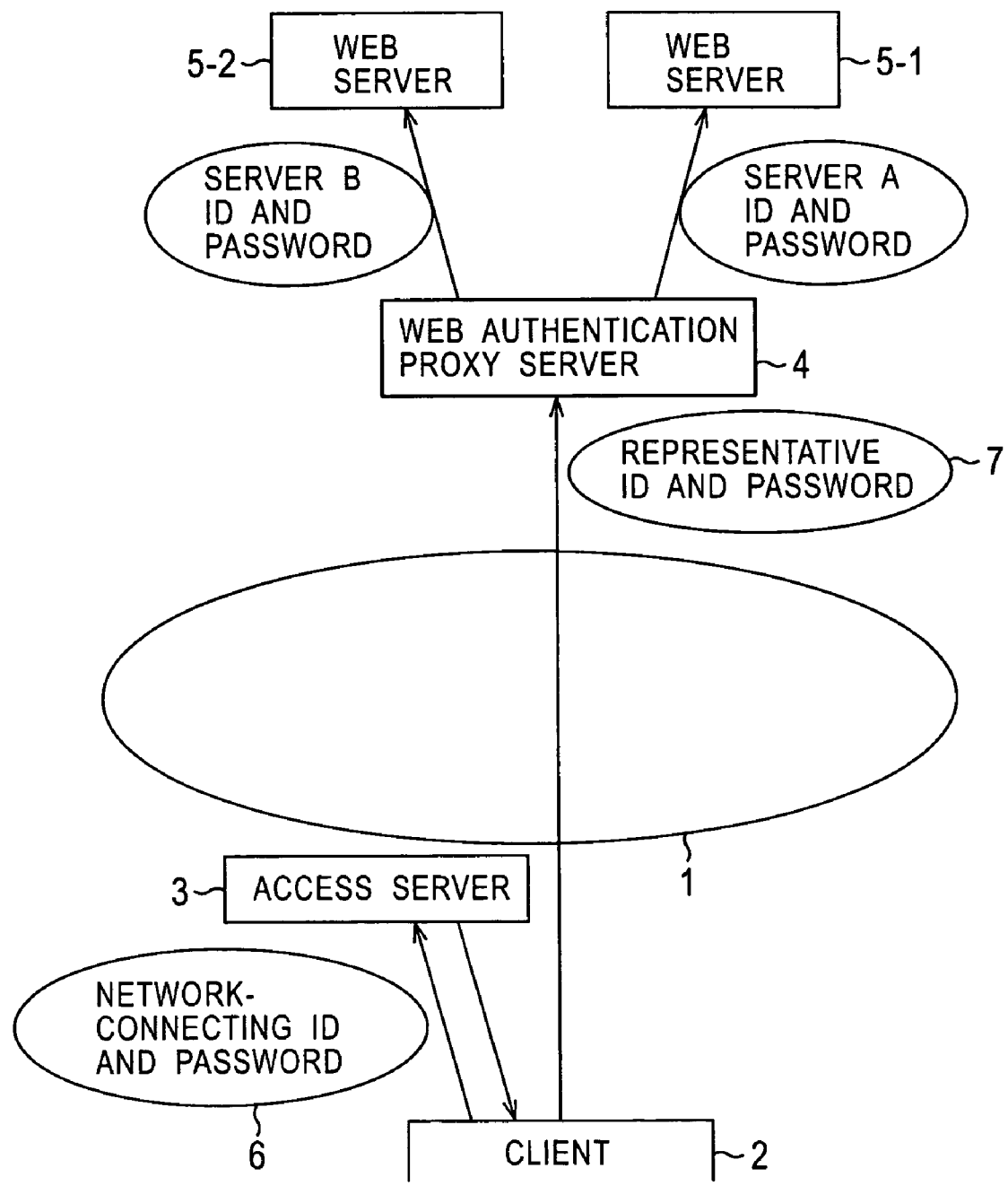
FIG. 1 illustrates a connection to the Internet in a known system.
Figure 52:
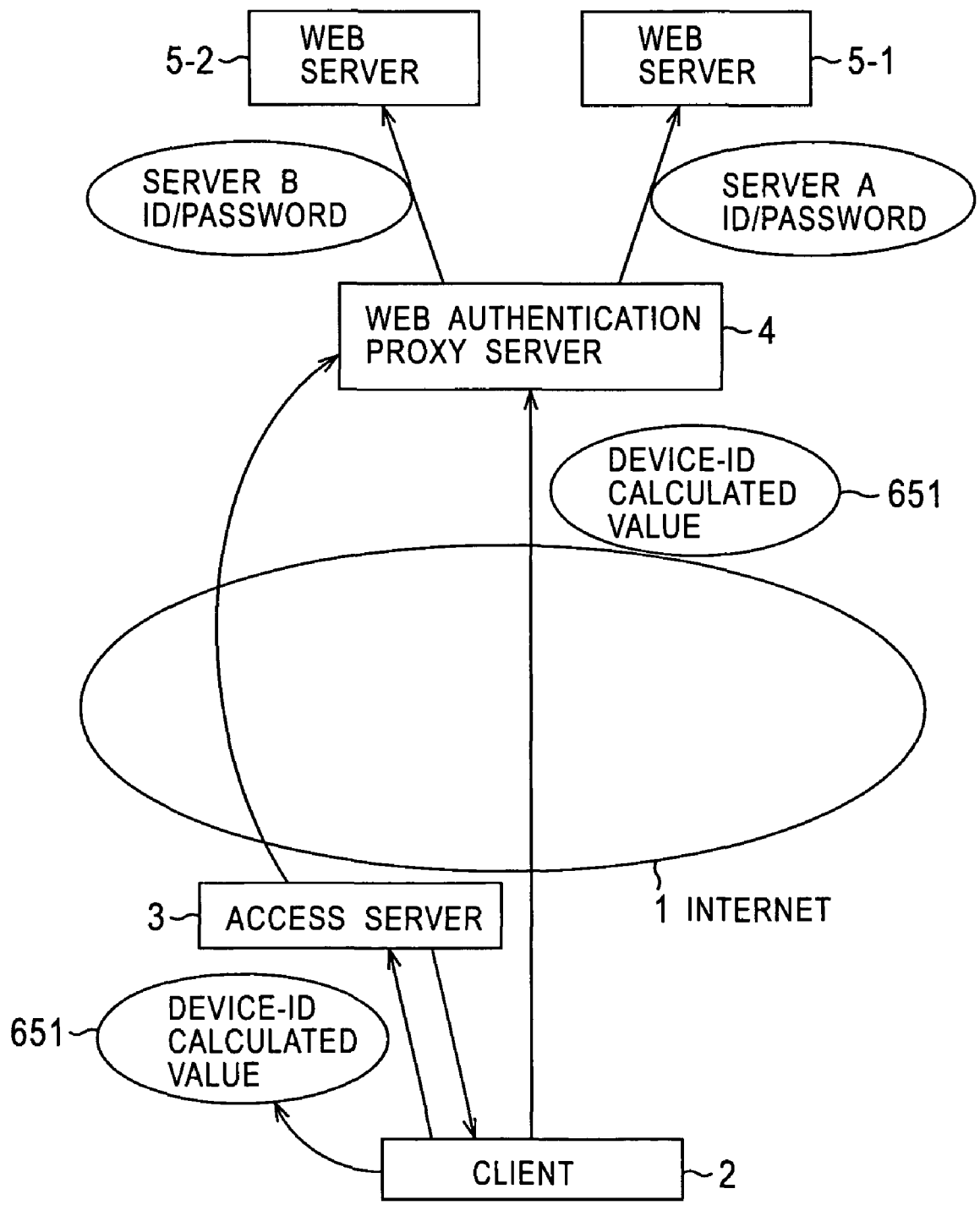
FIG. 52 illustrates a connection to a network when the present invention is applied in comparison with the example of FIG. 1.

By conducting authentication for the CE device 132 as described above, IDs and passwords input by a user can be integrated into one ID and one password. That is, when the CE device 132 is not provided with an input interface for receiving the input of operations by a user, as shown in FIG. 52 in comparison with FIG. 1, authentication processing of the access server 3 and the web authentication proxy server 4 can be performed by using a single device ID and calculated value (hash value) 651. The device ID and calculated value (hash value) 651 is stored in the CE device 132, and thus, the user is able to connect the CE device 132 to the Internet 1 and to the service providing server 145 without the need to memorize or write down the ID and password.

When the CE device 132 has an interface for receiving the input of operations by a user, the user is able to connect the CE device 132 to the Internet 1 and to the service providing server 145 by memorizing or writing down the single user ID and password. When the CE device 132 has an input interface for receiving the input of operations, the user is able to perform user registration for the CE device 132 without the need to use the setting terminal device 109. Even if the CE device 132 has an input interface for receiving the input of operations, user registration for the CE device 132 and authentication processing of the access server 3 and the web authentication proxy server 4 may be performed according to a method similar to the method for the CE device 132 without an input interface.

In the above description, the setting terminal device 109 is a personal computer owned by the user. However, the setting terminal device 109 is not restricted to a personal computer, and may be a PDA, a cellular telephone, or a dedicated multimedia kiosk terminal. The setting terminal device 109 may be installed in a store that sells the CE devices 132.

In the above description, the access server 141, the registration server 142, the connection authentication server 143, the database server 144, the service providing server 145, and the web authentication proxy server 146 are installed in the single ISP 107-1. However, these servers do not have to be installed in a single ISP 107. For example, as shown in FIG. 53, an authentication center 661 may be provided, and the database server 144 may be disposed in the authentication center 661.

Figure 53:
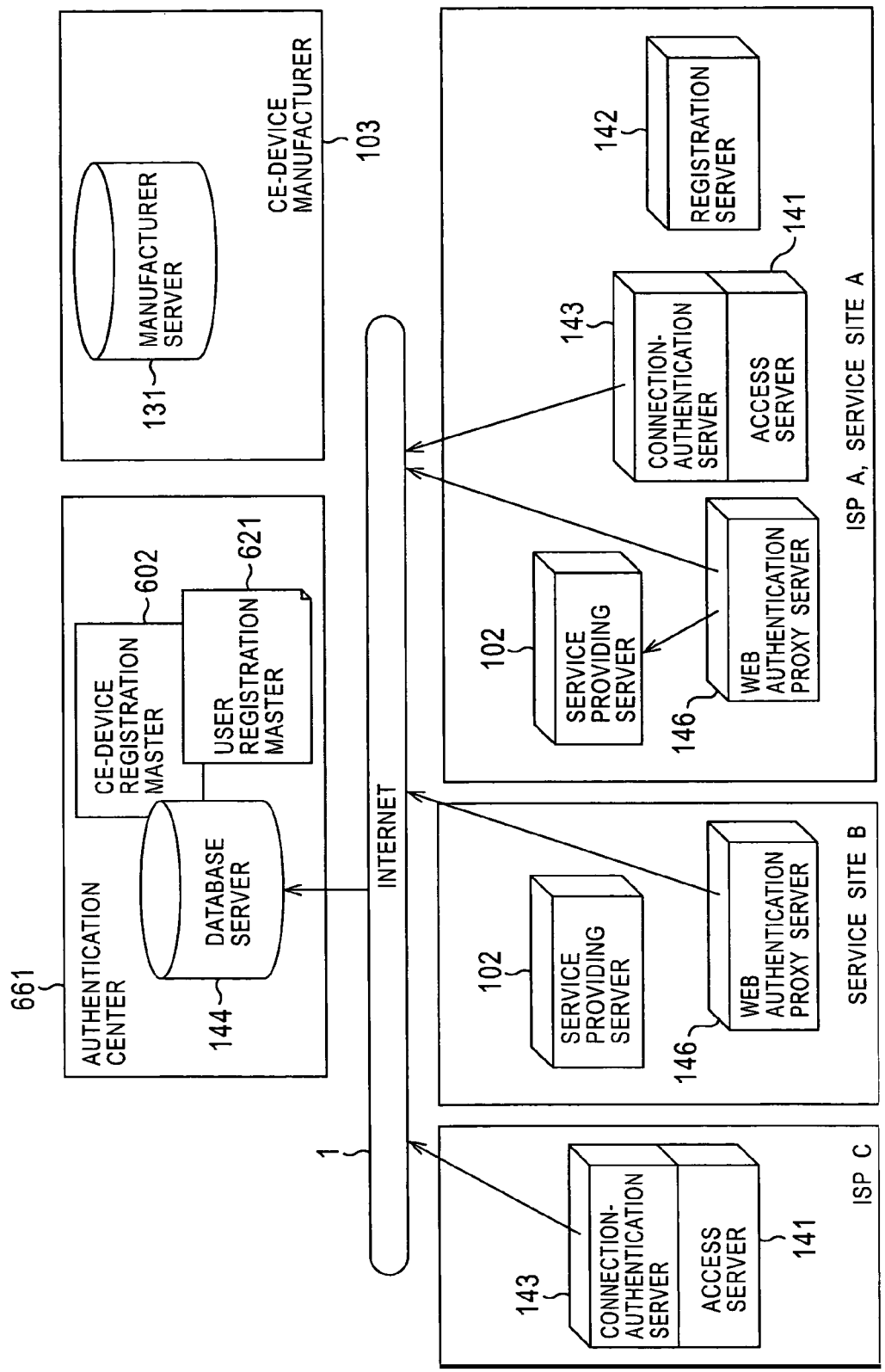
FIG. 53 illustrates the configuration of a system different from the system shown in FIG. 23, to which the present invention is applied.

In FIG. 53, the database server 144 is installed in the authentication center 661. As indicated at the bottom of FIG. 53 sequentially from the right, ISP A and service site A, service site B, and ISP C are independent entities. Within the ISP A and service site A, the service providing server 102, the access server 141, the registration server 142, the connection authentication server 143, and the web authentication proxy server 146 are installed. The service providing server 102 performs processing in a manner similar to the service providing server 145.

In service site B, the service providing server 102 and the web authentication proxy server 146 are installed. In ISP C, the access server 141 and the connection authentication server 143 are installed. In this manner, in the database server 144 of the authentication center 661, user information, user IDs, passwords, period-restricted passwords, device IDs of CE devices, and passphrases may be stored and managed. Then, the access server 141, the connection authentication server 143, and the web authentication proxy server 146 of the ISP A and service site A, the web authentication proxy server 146 of the service site B, and the access server 141 and the connection authentication server 143 of the ISP C may access the database server 144 of the authentication center 661 when conducting user registration or authentication for the CE device 132. In this case, operations performed by the access server 141, the registration server 142, the connection authentication server 143, the database server 144, the web authentication proxy server 146, and the service providing server 102 are similar to the above-described operations described with reference to the flowcharts of FIGS. 26 through 51.

According to the arrangement shown in FIG. 53, a plurality of ISPs 107 and a plurality of service providing servers 102 can be managed with the single database server 144.

Figure 54:
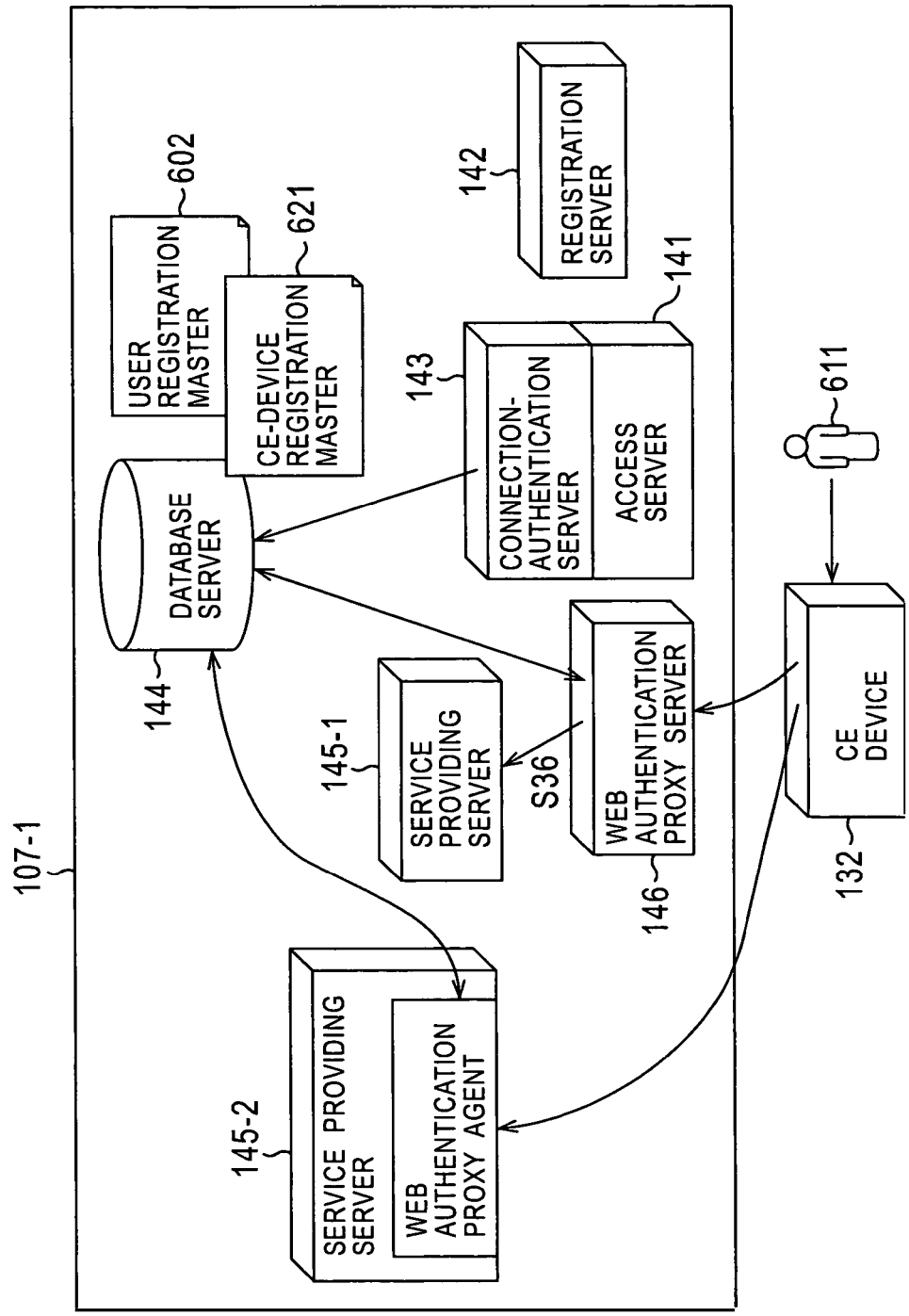
FIG. 54 illustrates the configuration of a system different from the systems shown in FIGS. 23 and 53, to which the present invention is applied.

Instead of separately providing the web authentication proxy server 146 and the service providing server 145, a web authentication proxy agent 671 may be disposed, as shown in FIG. 54, within a service providing server 145-2. The web authentication proxy agent 671 is a program for executing processing similar to the processing of the web authentication proxy server 146. That is, as shown in FIG. 54, the access server 141, the registration server 142, the connection authentication server 143, the database server 144, a service providing server 145-1, the service providing server 145-2, and the web authentication proxy server 146 are disposed within the ISP 107-1. When receiving services from the service providing server 145-1, the CE device 132 first accesses the access server 141 to obtain a permission to connect to a network. The CE device 132 then accesses the web authentication proxy server 146 to obtain an authentication for connecting to the service providing server 145-1. Subsequently, the CE device 132 receives services from the service providing server 145-1.

In contrast, when receiving services from the service providing server 145-2, the CE device 132 first accesses the access server 141 to obtain a permission to connect to a network. The CE device 132 then accesses the service providing server 145-2 to obtain an authentication for receiving services from the web authentication proxy agent 671 within the service providing server 145-2. Subsequently, the CE device 132 receives services from the service providing server 145-2.

By providing the web authentication proxy agent 671 within the service providing server 145-2, it is not necessary to separately provide the web authentication proxy server 146, thereby making it possible to construct a system with a reduced cost.

If the user has purchased the CE device 132 and already performed user registration in the service providing server 102 before performing the registration processing indicated by the flowcharts of FIGS. 27 through 30 or the flowcharts of FIGS. 36 through 42, the ID and password registered in the service providing server 102 can be changed into the common user ID and password of the CE device 132. A detailed description is given below, with reference to FIGS. 55 through 63, of the processing for changing the ID and password registered in the service providing server 102 into the common user ID and password of the CE device 132.

Figure 55:
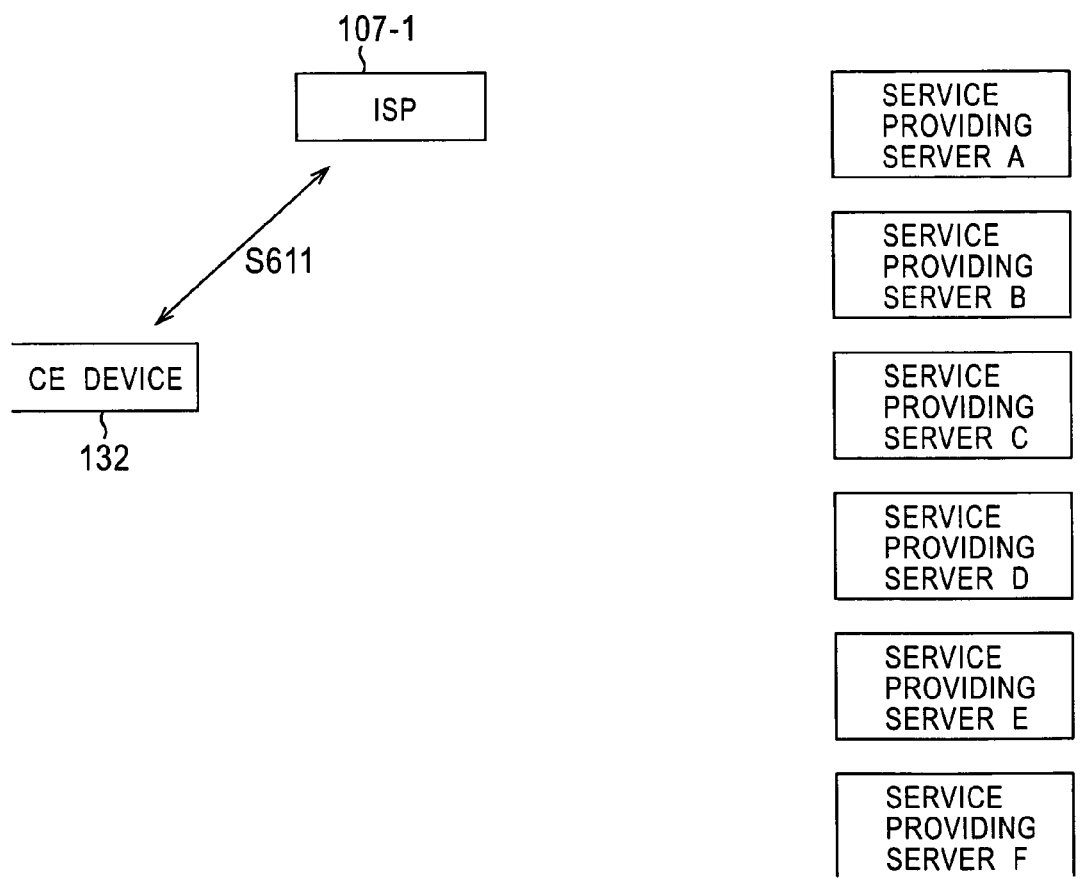
FIG. 55 illustrates an addition of a service to the present system.

In FIG. 55, service providing servers A through F are servers in which the user who purchased the CE device 132 has already performed user registration before registering the CE device 132 in the ISP 107-1. The user receives services from the service providing servers A through F by using, for example, a personal computer owned by the user, by suitably selecting the ID (hereinafter referred to as "ID-A") and password (hereinafter referred to as "password A") issued from the service providing server A, the ID (hereinafter referred to as "ID-B") and password (hereinafter referred to as "password B") issued from the service providing server B, the ID (hereinafter referred to as "ID-C") and password (hereinafter referred to as "password C") issued from the service providing server C, the ID (hereinafter referred to as "ID-D") and password (hereinafter referred to as "password D") issued from the service providing server D, the ID (hereinafter referred to as "ID-E") and password-(hereinafter referred to as "password E") issued from the service providing server E, and the ID (hereinafter referred to as "ID-F") and password (hereinafter referred to as "password F") issued from the service providing server F. When the user conducts user registration for the CE device 132 in the ISP 107-1, an issuance of a user ID (hereinafter also referred to as a "representative ID") and password (hereinafter also referred to as a "representative password") is received (for example, step S312 of FIG. 37).

In this case, a contract has been made between the entities that manage the service providing servers A, B, and F and the entity that manages the ISP 107-1. By receiving an authentication from the ISP 107-1 by using the representative ID and the representative password, the user is able to receive services from the service providing servers A, B, and F.

In this case, the following procedure can be taken for changing the ID-A and password A used for receiving services from the service providing server A by the user into the representative ID and the representative password.

For example, an "additional button" (not shown) is displayed on the browser of the CE device 132, and upon pressing this additional button, the screen shown in FIG. 56 is displayed on the display unit of the CE device 132. In FIG. 56, a message "Adding new service to SSO. Please input user ID and password." is displayed at the upper side of the screen, and under this message, a column for inputting the representative ID (user ID) and a column for inputting the representative password are displayed. When the "next" button displayed at the bottom of the screen is pressed after receiving the input of the representative ID and the representative password into the representative-ID input column and the representative-password input column, respectively, the screen shown in FIG. 57 is displayed on the display unit of the CE device 132.

In FIG. 57, a message "SSO service list" is displayed at the upper side of the screen, and under this message, a list of services that can be used by the representative ID and the representative password is displayed. That is, in FIG. 57, service A provided by the service providing server A, service B provided by the service providing server B, and service F provided by the service providing server F are displayed. When the operation for selecting the service A is input by the user, the screen shown in FIG. 58 is displayed on the display unit of the CE device 132.

Figure 58:
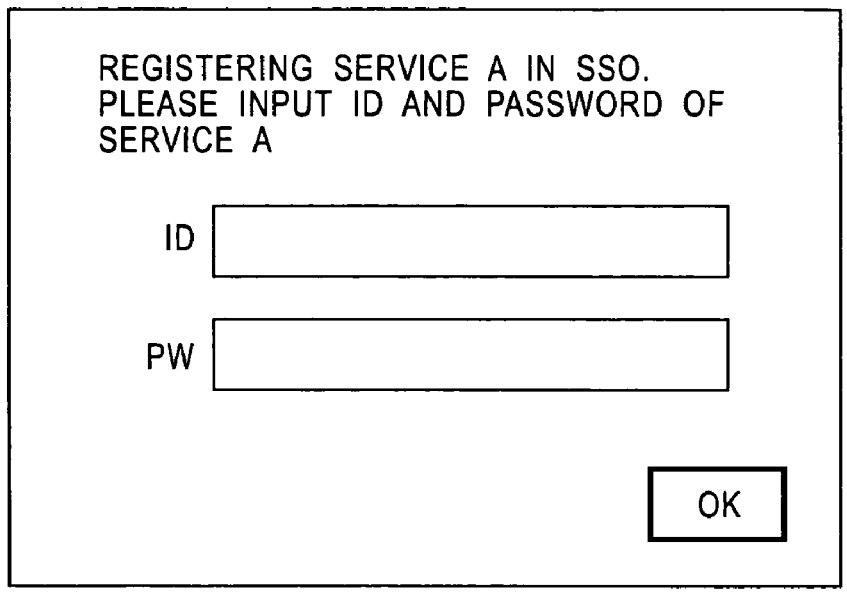
FIG. 58 illustrates still another example of screens of the display unit of a CE device.

In FIG. 58, a message "Registering service A in SSO. Please input ID and password of service A." is displayed at the upper side of the screen. Under this message, input columns for inputting the ID and password used for authenticating the user by the service providing server A are displayed. After inputting ID-A into the ID input column and password A into the password input column, the user presses an OK button displayed at the bottom of the screen, and then, the screen shown in FIG. 59 is displayed on the display unit of the CE device 132.

Figure 59:
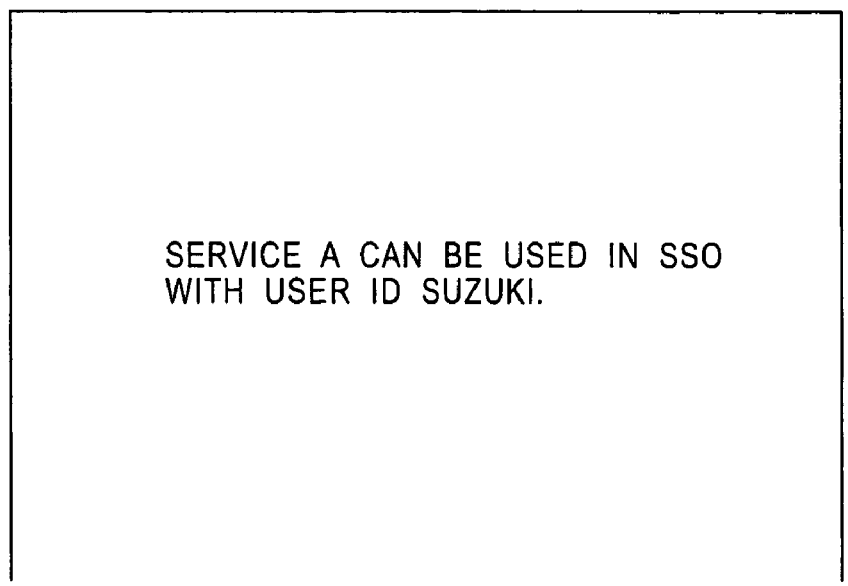
FIG. 59 illustrates an example of screens of the display unit of a CE device.

In FIG. 59, a message "Service A can be used in SSO with user ID SUZUKI." is displayed. FIG. 59 illustrates an example in which the user ID (representative ID) is "SUZUKI".

As a result of the above-described processing, ID-A and password A are stored in the database server 144 within the ISP 107-1 so that they can be associated with the representative ID and the representative password.

According to the above-described processing, the user is able to receive services from the service providing server A without the need to input the ID or password.

More specifically, when the user inputs an instruction to receive services into the CE device 132, the screen shown in FIG. 60 is displayed on the display unit 132. In FIG. 60, a message "Please input user ID and password." is displayed. Under this message, an input column for the representative ID and an input column for the representative password are displayed.

After inputting the representative ID into the representative-ID input column and the representative password into the representative-password input column, the user presses the "next" button at the bottom of the screen. Then, in step S621 of FIG. 61, the representative ID and the representative password are sent to the access server 141 of the ISP 107-1 from the CE device 132. The access server 141 authenticates the CE device 132 by using the received representative ID and the representative password, and in step S622, the access server 141 sends a list of services that can be received by the user to the CE device 132. Upon receiving a list of services that can be received by the user, the CE device 132 displays the screen shown in FIG. 62 on the display unit.

In FIG. 62, "SSO service list for Mr Taro Suzuki" is displayed at the upper side of the screen, and a list of services that can be received by the user, i.e., service A and service B, are displayed. In FIG. 62, it is assumed that the name of the user is Taro Suzuki. FIG. 62 illustrates an example in which not only service A, but also service B has been registered according to the processing described with reference to FIGS. 55 through 59.

Figure 61:
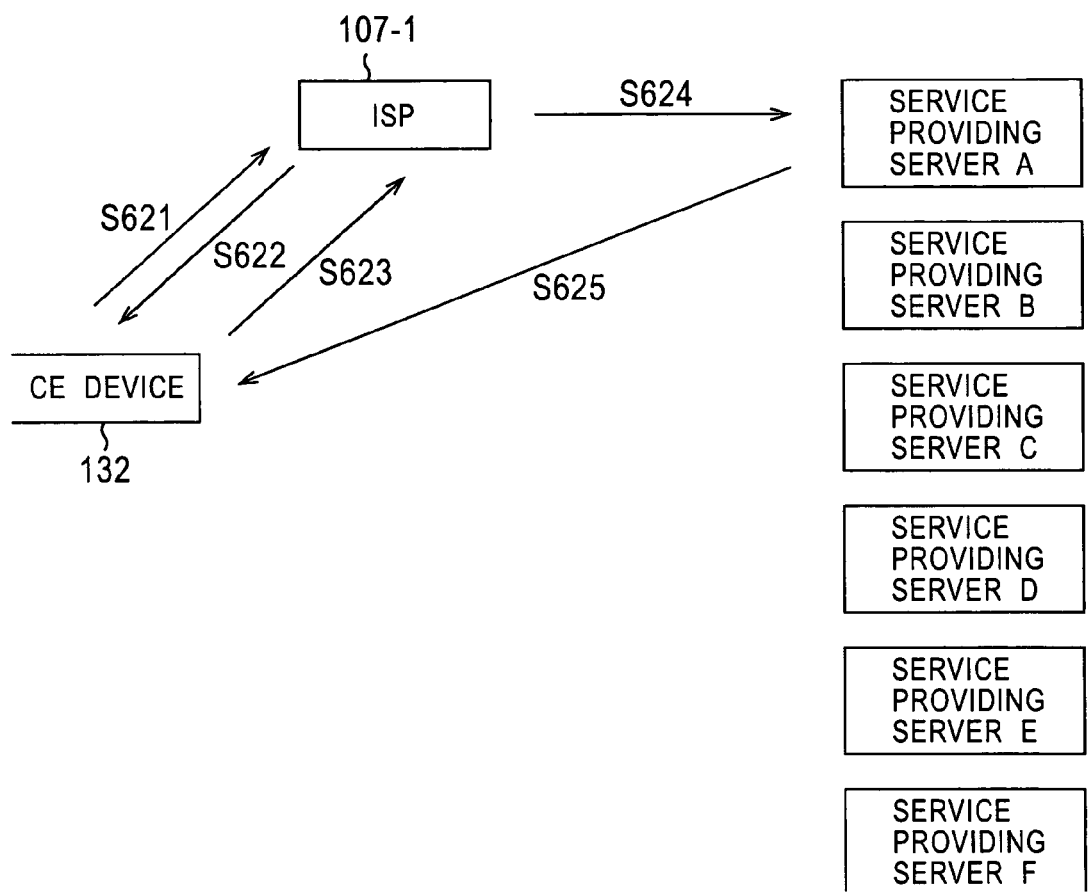
FIG. 61 illustrates the provision of an added service to a CE device.

When the user inputs the operation for selecting service A in FIG. 62, in step S623 of FIG. 61, the CE device 132 sends a message indicating that the user wishes to receive service A to the web authentication proxy server 146 of the ISP 107-1. Upon receiving the message from the CE device 132, the web authentication proxy server 146 obtains the ID-A and password A for the service providing server A, which are stored in association with the representative ID and the representative password, from the database server 144. Then, in step S624, the web authentication proxy server 146 conducts authentication for the CE device 132 by using the ID-A and password A. In step S625, the service providing server A informs the CE device 132 that the user has been authenticated, and provides services. The CE device 132 displays a message indicating that authentication for service A has been completed, such as that shown in FIG. 63, on the display unit and receives service A.

A service is registered in the ISP 107-1 as described above.

According to the registration processing for the refrigerator 113 described with reference to the flowcharts of FIGS. 27 through 30 and the registration processing for the car navigation system 112 described with reference to FIGS. 36 through 42, registration must be made in each CE device 132, and the users having many CE devices 132 must perform registration processing by the same number as the number of the CE devices 132. The users also have to memorize and write down the user IDs and passwords having the same number as the number of the CE devices 132.

A system that can overcome this drawback is described below.

Figure 64:
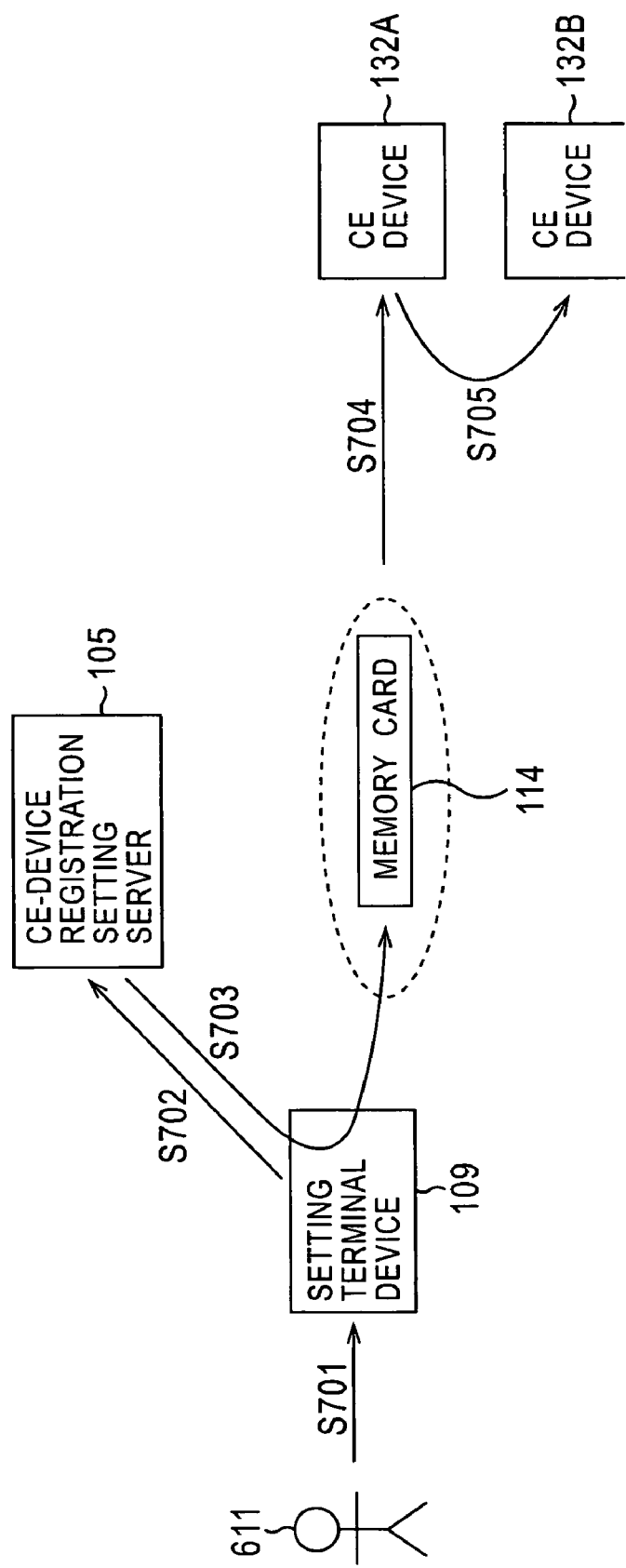
FIG. 64 illustrates overall processing for recording connection information in a memory card.

FIG. 64 illustrates an overview of a system that allows the use of a plurality of CE devices 132 by only one user registration. In FIG. 64, the setting terminal device 109 is, for example, a general-purpose personal computer owned by the user. When registering the CE device 132, the setting terminal device 109 receives the input of registration information from the user, and sends it to the CE-device registration setting server 105. The registration information includes information required for performing client registration for the CE device 132, user information, desired login ID used for logging in to the ISP 107, desired login password, information concerning the connection means for connecting to the ISP 107, payment method, service courses of the ISP 107, desired email address, email address, remainder and answers, user ID and password issued when performing user registration for the CE device 132, device ID, passphrase, access licensing information of connection information, and information required for performing user registration in the service providing server 102.

The registration information is not limited to the above-described items of information. That is, the registration information may include items other than the above-described items, or does not have to include all the above-described items. The registration information may be formed of desired items as required.

The setting terminal device 109 receives connection information required for connecting to a network from the CE-device registration setting server 105, and stores it in the memory card 144. Upon receiving the registration information from the setting terminal device 109, the CE-device registration setting server 105 stores the registration information, generates connection information, and send it to the setting terminal device 109. A CE device 132A and a CE device 132B can be connected to a network by inserting the memory card 114 storing the connection information therein into the CE devices 132A and 132B.

More specifically, in step S701 of FIG. 64, the setting terminal device 109 receives the input of registration information from the user 611. In step S702, the setting terminal device 109 sends the registration information input in step S701 to the CE-device registration setting server 105. The CE-device registration setting server 105 generates connection information based on the registration information, and in step S703, the CE-device registration setting server 105 sends the connection information to the setting terminal device 109. Upon receiving the connection information from the CE-device registration setting server 105, the setting terminal device 109 stores the connection information in the inserted memory card 114.

In step S704, the user 611 removes the memory card 114 from the setting terminal device 109, and inserts it into the CE device 132A. In this state, the CE device 132A can read and use the connection information stored in the memory card 114 so as to connect to a network. Then, if the user wishes to connect to a network by using the CE device 132B, in step S705, the user removes the memory card 114 from the CE device 132A, and inserts it into the CE device 132B. Then, the CE device 132B can read and use the connection information stored in the memory card 114 so as to connect to a network.

As described above, connection information is stored in the memory card 114, and when connecting to a network, the CE device 132 uses the connection information stored in the inserted memory card 14 to connect to a network. In this manner, the user can utilize the memory card 114 storing the connection information therein for a plurality of CE devices 132 so as to connect them to a network.

Figure 65:
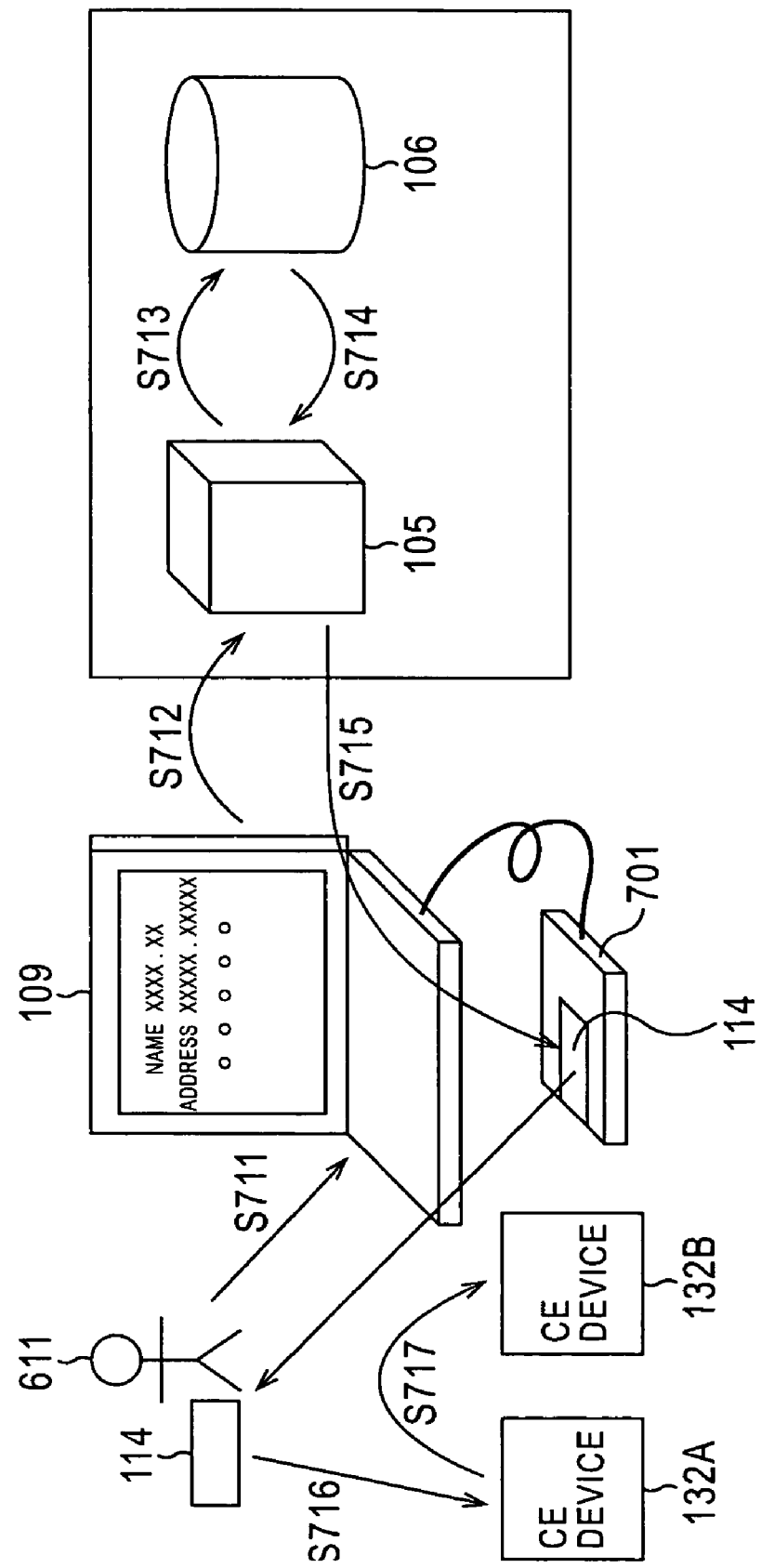
FIG. 65 illustrates detailed processing for recording connection information in a memory card.

Two patterns for storing connection information in the memory card 114 are now described with reference to FIGS. 65 and 66. One pattern is employed when the user owns a device, for example, a personal computer that can be used as the setting terminal device 109, which is described below with reference to FIG. 65. In step S711 of FIG. 65, the setting terminal device 109 owned by the user 611 receives the input of registration information from the user 611. After receiving the input of the registration information from the user 611, in step S712, the setting terminal device 109 sends the registration information input in step S711 to the CE-device registration setting server 105. Upon receiving the registration information, in step S713, the CE-device registration setting server 105 sends the registration information to the connection-setting database server 106, and also requests the connection-setting database server 106 to search for the access point (access server) of the ISP 107 that can minimize the communication cost.

The connection-setting database server 106 determines the access point (access server) of the ISP 107 that can minimize the communication cost by referring to the address and postal code of the user 611 contained in the registration information received from the CE-device registration setting server 105 in step S713. Then, in step S714, the connection-setting database server 106 sends the information concerning the determined access point (access server) of the ISP 107 to the CE-device registration setting server 105. The CE-device registration setting server 105 generates connection information based on the information concerning the access point (access server) of the ISP 107 received from the connection-setting database server 106, and in step S715, the CE-device registration setting server 105 sends the connection information to the setting terminal device 109.

The setting terminal device 109 stores the received connection information in the memory card 114 via a memory card drive 701.

Then, in step S716, the user 611 removes the memory card 114 from the memory card drive 701, and inserts it into the CE device 132A. According to the input of predetermined operations from the user 611, the CE device 132A reads the connection information stored in the inserted memory card 114, and accesses the predetermined access point (for example, the access server 141) based on the connection information so as to connect to a network, such as the Internet 1.

If the user 611 wishes to connect the CE device 132B to a network, the user 611 removes the memory card 114 from the CE device 132A and inserts it into the CE device 132B so as to connect the CE device 132B to a network. In this case, in step S717, the memory card 114 is removed from the CE device 132A and is inserted into the CE device 132B. According to the input of predetermined operations from the user 611, as in the CE device 132A, the CE device 132B reads the connection information stored in the memory card 114, and accesses the predetermined access point (for example, the access server 141) based on the connection information so as to connect to a network, such as the Internet 1.

As described above with reference to FIG. 65, the user 611 conducts user registration through the setting terminal device 109, such as a personal computer owned by the user 611. In this case, however, the user 611 must own the setting terminal device 109, such as a personal computer.

Figure 66:
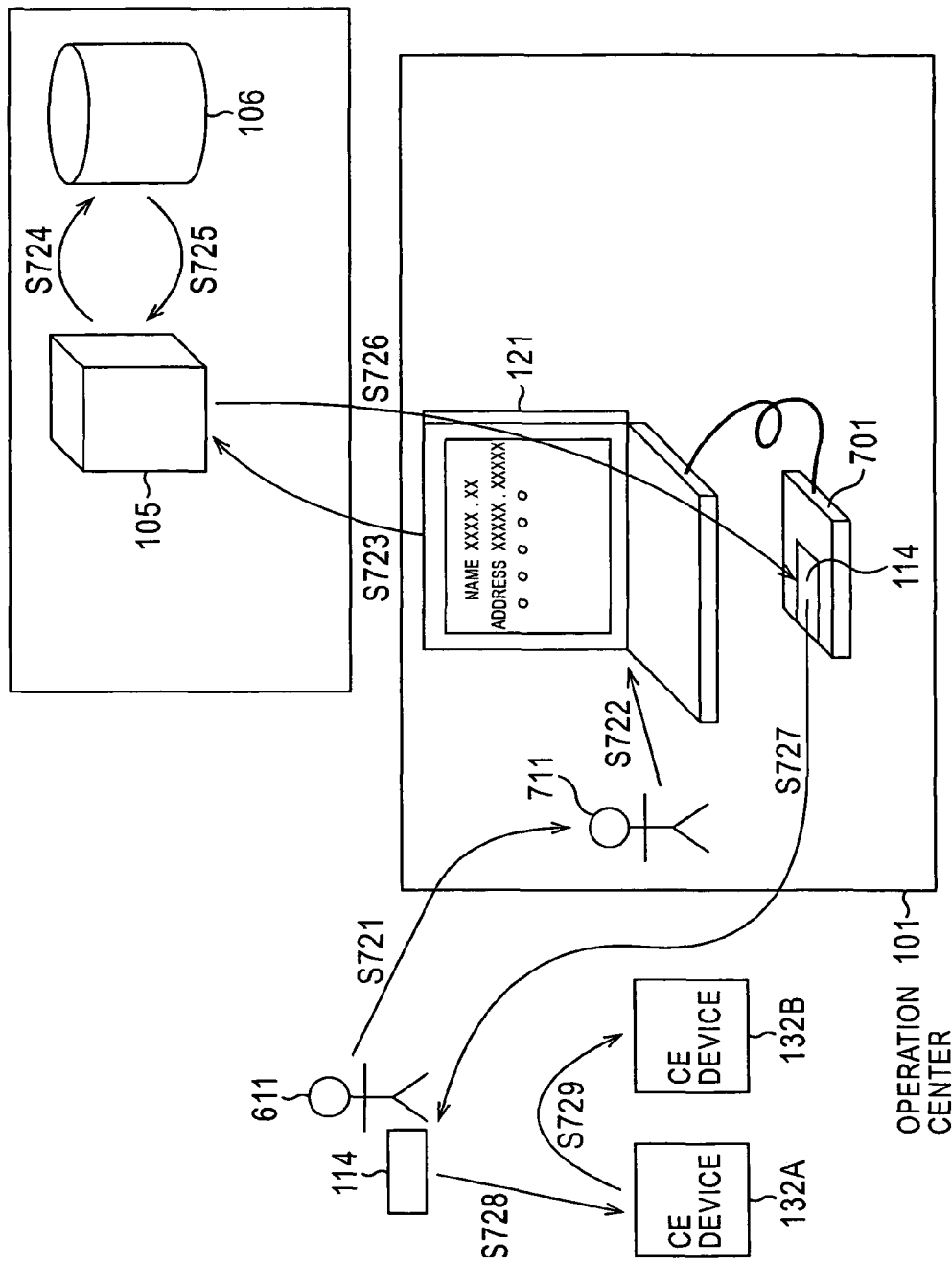
FIG. 66 illustrates another detailed processing for recording connection information in a memory card.

If the user 611 does not own the setting terminal device 109, the user 611 is able to perform registration processing by the method shown in FIG. 66. In FIG. 66, in step S721, the operation center 101 receives registration information from the user 611. The registration can be sent by means such as a predetermined web site, mail, a facsimile, or a telephone.

The setting terminal device 109 is not limited to a personal computer, and may be a PDA, a cellular telephone, or a dedicated multimedia kiosk terminal. The setting terminal device 109 may be installed in a store that sells the CE devices 132.

In step S722, the setting terminal device 121 installed in the operation center 101 receives the input of the registration information from an operator 711. The operator 711 inputs the registration information sent from the user 611 into the setting terminal device 121. After receiving the input of the registration information by the operator 711, in step S723, the setting terminal device 121 sends the registration information input in step S722 to the CE-device registration setting server 105. Upon receiving the registration information, in step S724, the CE-device registration setting server 105 sends the registration information to the connection-setting database server 106, and also requests the connection-setting database server 106 to search for an access point (access server) of the ISP 107 that can minimize the communication cost.

The connection-setting database server 106 determines the access point (access server) that can minimize the communication cost by referring to the address and postal code of the user 611 contained in the registration information received from the CE-device registration setting server 105 in step S724. Then, in step S725, the connection-setting database server 106 sends the information concerning the determined access point (for example, the access server 141) of the ISP 107 to the CE-device registration setting server 105. The CE-device registration setting server 105 generates connection information based on the information concerning the access point (for example, the access server 141) of the ISP 107 received from the connection-setting database server 106, and in step S726, the CE-device registration setting server 105 sends the connection information to the setting terminal device 109.

The setting terminal device 109 stores the received connection information in the memory card 114 via the memory card drive 701. In step S727, the memory card 114 storing the connection information therein is sent to the user 611 by mail.

Then, in step S728, the memory card 114 is inserted into the CE device 132A by the user 611. According to the input of predetermined operations by the user 611, the CE device 132A reads the connection information stored in the inserted memory card 114, and accesses the predetermined access point (for example, the access server 141) based on the connection information so as to connect to a network, such as the Internet 1. If the user 611 wishes to connect the CE device 132B to a network, the user 611 removes the memory card 114 from the CE device 132A and inserts it into the CE device 132B so as to connect the CE device 132B to a network. In this case, in step S729, the memory card 114 is removed from the CE device 132A and is inserted into the CE device 132B. According to the input of predetermined operations by the user 611, as in the CE device 132A, the CE device 132B reads the connection information stored in the inserted memory card 114, and accesses the predetermined access point (for example, the access server 141) based on the connection information so as to connect to a network, such as the Internet 1.

As described above, in place of the user 611, by utilizing the setting terminal device 121 of the operation center 101, connection information can be stored in the memory card 114. The processing performed by the setting terminal device 121 installed in the operation center 101 is basically similar to that by the setting terminal device 109 owned by the user 611.

Figure 67:
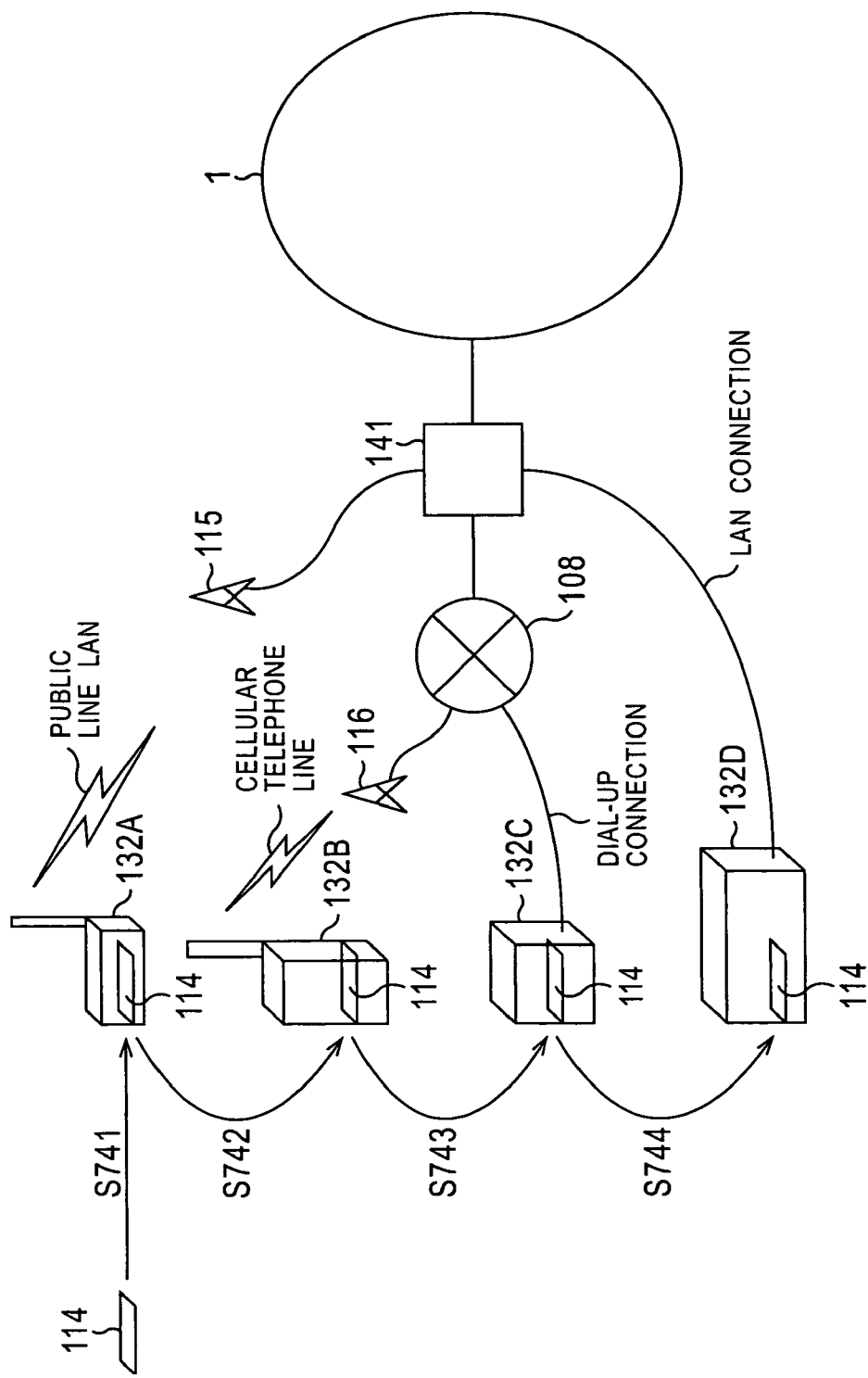
FIG. 67 illustrates a process for using a memory card in which connection information is recorded.

The memory card 114 storing the connection information therein as described above is inserted into a plurality of CE devices 132A through 132D, as shown in FIG. 67, so as to connect the CE devices 132A through 132D to the Internet 1. More specifically, in FIG. 67, the CE device 132A is connected to the access point 141 via the public wireless LAN base station 115, and is then connected to the Internet 1. The CE device 132B is connected to the access point 141 via the wireless base station 116 of the cellular telephone line and the telephone line network 108, and is then connected to the Internet 1. The CE device 132C is connected to the access point via the telephone line network 108 by dial-up connection, and is then connected to the Internet 1. The CE device 132D is connected to the access point 141 by LAN connection, and is then connected to the Internet 1.

For example, if the user who owns the four different CE devices 132A through 132D, such as those shown in FIG. 67, wishes to connect the CE devices 132A through 132D to the Internet 1, in step S741, the user first inserts the memory card 114 storing connection information therein into the CE device 132A. The user then connects the CE device 132A to the Internet 1 by inputting predetermined operations into the CE device 132A. Then, in step S742, the user removes the memory card 114 from the CE device 132A, and inserts it into the CE device 132B. The user then connects the CE device 132B to the Internet 1 by inputting predetermined operations into the CE device 132B.

Subsequently, in step S743, the user removes the memory card 114 from the CE device 132B, and inserts it into the CE device 132C. The user then connects the CE device 132C to the Internet 1 by inputting predetermined operations into the CE device 132C. Then, in step S744, the user removes the memory card 114 from the CE device 132C, and inserts it into the CE device 132D. The user then connects the CE device 132D to the Internet 1 by inputting predetermined operations into the CE device 132D.

In this manner, by utilizing the single memory card 114 for the plurality of CE devices 132A through 132D, the user is able to connect the CE devices 132A through 132D to the Internet 1.

Figure 68:
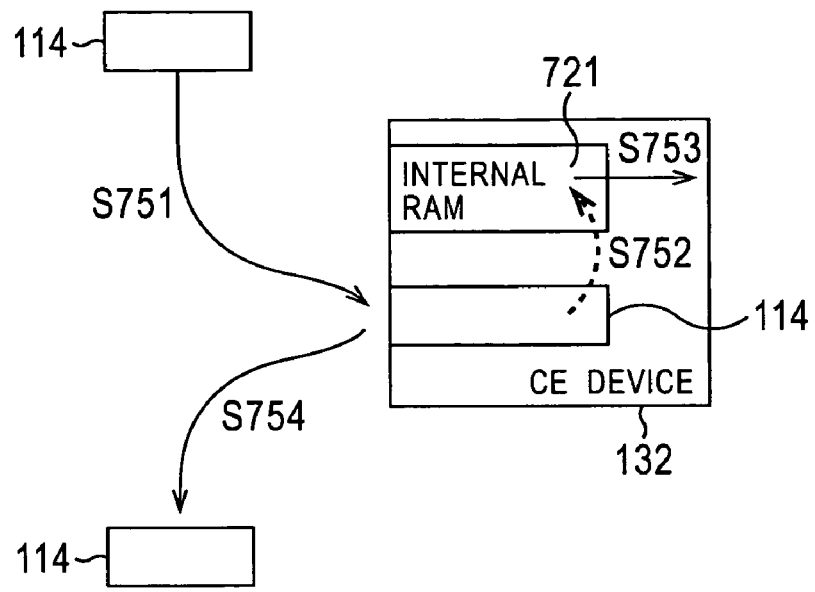
FIG. 68 illustrates a process for reading connection information from a memory card.

When the memory card 114 storing connection information therein is inserted into the CE device 132, the connection information can be stored in the CE device 132 according to the following two storage modes. One storage mode is described below with reference to FIG. 68. When the memory card 114 is inserted into the CE device 132 in step S751 of FIG. 68, the process proceeds to step S752. In step S752, the CE device 132 copies the connection information stored in the memory card 114 into an internal RAM 721 of the CE device 132. In this state, when an instruction to connect to the Internet 1 is given by the user, in step S753, the CE device 132 connects to the Internet 1 by using the connection information stored in the internal RAM 721 in step S752.

In the mode in which the CE device 132 is connected to the Internet 1 by utilizing the connection information copied into the internal RAM 721 from the memory card 114, once the connection information is copied into the internal RAM 721 of the memory card 114, the CE device 132 is able to connect to the Internet 1 as long as the connection information is stored in the internal RAM 721 even if the memory card 114 is removed. Accordingly, the user is able to connect a plurality of CE devices 132 to the Internet 1 at one time by using the single memory card 114.

Figure 69:
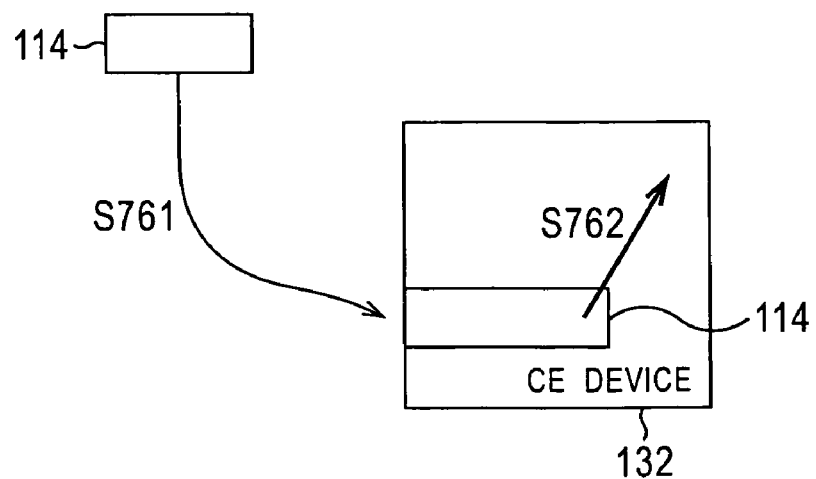
FIG. 69 illustrates another process for reading connection information from a memory card.

The other storage mode is described below with reference to FIG. 69. In step S761 of FIG. 69, the user inserts the memory card 114 into the CE device 132. In this state, when an instruction to connect to the Internet 1 is given by the user, in step S762, the CE device 132 reads the connection information from the memory card 114, and connects to the Internet 1.

In the mode in which connection information is read from the memory card 114 every time an instruction to connect to the Internet is input, even if the CE device 132 is stolen, it can be prevented from being dishonestly used and from being connected to the Internet 1 as long as the user possesses the memory card 114.

When the CE device 132 reads the connection information from the memory card 114, the user may be required to input a predetermined password, and only when the input password is correct, the connection information can be read from the memory card 114. With this arrangement, even if both the CE device 132 and the memory card 144 are stolen, it is possible to prevent a third party from connecting to the Internet 1 through the CE device 132.

The connection information stored in the memory card 114 may be stored in association with the device ID of the CE device 132. In this case, only when the device ID of the CE device 132 having the memory card 114 therein coincides with the device ID associated with the connection information, the CE device 132 is allowed to connect to the Internet 1 by using the connection information stored in the memory card 114.

The login ID and password required for connecting to the ISP 107, which is part of the connection information, may be stored in the memory card 114. Alternatively, the user may be requested to input the login ID and password required for connecting to the ISP 107 every time the user connects to the Internet 1 rather than storing the login ID and password in the memory card 114. Alternatively, the login ID for connecting to the ISP 107 may be stored in the memory card 114, and without storing the password in the memory card 114, the user may be required to input the password every time the user connects to the Internet 1.

Instead of inputting the login ID and password by using the input interface of the CE device 132, they may be input according to a different method. For example, the password may be stored in a memory card 114 different from the memory card 114 storing the connection information therein, and only when the two memory cards 114 are provided, the user is allowed to connect to the Internet 1 through the CE device 132. More specifically, for example, the memory card 114 storing a password therein is inserted into the CE device 132, and after reading the password by the CE device 132, the memory card 114 storing the connection information therein is inserted into the CE device 132, thereby allowing the CE device 132 to connect to the Internet 1. Of course, the memory card 114 storing the password therein may be inserted into the CE device 132 after inserting the memory card 114 storing the connection information to the CE device 132.

Means for identifying individuals, such as means for verifying fingerprints, may be provided for the CE device 132, and only when the identity of the user of the connection information is verified, the CE device 132 is allowed to connect to the ISP 107.

The login ID and password for receiving services from the service providing server 102 (or service providing server 145) may be stored in the memory card 114. Alternatively, instead of storing the login ID and password in the memory card 114, the user may be required to input the login ID and password for receiving services from the service providing server 102 every time the user receives services from the service providing server 102. Alternatively, the login ID may be stored in the memory card 114, and without storing the password in the memory card 114, the user may be required to input the password every time the user receives services from the service providing server 102.

As in the login ID and password for connecting to the ISP 107, instead of inputting the login ID and password by using the input interface of the CE device 132, the login ID and password for receiving services from the service providing server 102 (or service providing server 145) may be input according to a different method. For example, the password may be stored in a memory card 114 different from the memory card 114 storing the connection information therein, and only when the two memory cards 114 are provided, the user is allowed to connect to the Internet 1 through the CE device 132.

Means for identifying individuals, such as means for verifying fingerprints, may be provided for the CE device 132, and only when the identity of the user of the connection information is verified, the CE device 132 is allowed to connect to the service providing server 102.

A description is now given, with reference to FIGS. 70 through 76, of examples of screens displayed on the display unit of the setting terminal device 109 from when user registration is performed through the setting terminal device 109 to when connection information is stored in the memory card 114.

When an instruction to conduct user registration is given by the user, the setting terminal device 109 displays a screen, such as that shown in FIG. 70, on the display unit. In FIG. 70, a message "Is R/W drive for memory card connected?" is shown at the upper side of the screen. At the lower side of the screen, selection buttons, i.e., "YES" and "NO", are shown.

When the memory card drive 701 is not connected to the setting terminal device 109, the user selects "NO". Then, on the display unit of the setting terminal device 109, a message "User registration is suspended. Connect R/W drive for memory card, and then, restart user registration." is displayed.

When the memory card drive 701 is connected to the setting terminal device 109, the user selects "YES". Then, on the display unit of the setting terminal device 109, a screen, such as that shown in FIG. 71, is displayed.

In FIG. 71, a message "Please set memory card in R/W drive." is shown at the upper side of the screen, and selection buttons, such as "OK" and "CANCEL", are shown at the lower side of the screen. If the user wishes to cancel user registration, the user selects "CANCEL" to cancel user registration. If the user wishes to continue user registration, the user inserts the memory card 114 into the memory card drive 701 and selects "OK". Then, a confirmation screen, such as that shown in FIG. 72, is displayed on the display unit of the setting terminal device 109.

In FIG. 72, a message "Connecting to network." is shown at the upper side of the screen, and selection buttons, i.e., "OK" and "CANCEL", are shown at the lower side of the screen. If the user wishes to cancel user registration, the user selects "CANCEL" to cancel user registration. If the user wishes to continue user registration, the user selects "OK". Then, a screen, such as that shown in FIG. 73, is displayed on the display unit of the setting terminal device 109.

In FIG. 73, a message "Please input required items." is shown at the upper side of the screen, and "Name:" and an input column 751 for filling the user name is shown immediately under the above message, followed by "Name (phonetic symbols):" and an input column 752 for filling the phonetic symbols of the user name. Other input columns for required items are shown although they are omitted by " . . . " in FIG. 73. At the bottommost portion of the screen in FIG. 73, selection buttons, i.e., "CHECK" and "CANCEL", are shown. If the user wishes to cancel user registration, the user selects "CANCEL" to cancel user registration. If the user wishes to continue user registration, the user selects "CHECK" after inputting all the required items in the columns. Then, a screen, such as that shown in FIG. 74, is displayed on the display unit of the setting terminal device 109.

In FIG. 74, a message "Please check input information." is shown at the upper side of the screen, and immediately under this message, the "Name: xxxxxxxx" (in reality, the name input into the column 751 of FIG. 73 is displayed) is shown, followed by "Name (phonetic symbols): xxxxxxxx" (in reality, the phonetic symbols input into the column 751 of FIG. 73 is displayed). The required items input in FIG. 73 are shown though they are omitted by " . . . " in FIG. 74. At the bottommost portion of FIG. 74, selection buttons, i.e., "SEND" and "CANCEL", are shown. If there is an error in the displayed information, the user selects "CANCEL" to cancel registration. If there is no error in the displayed information, the user selects "SEND". Then, a screen, such as that shown in FIG. 75, is displayed on the display unit of the setting terminal device 109.

In FIG. 75, a message "Downloading the following connection information and storing it in memory card." is indicated at the upper side of the screen, and immediately under this message, "AP telephone No.: xxxxxxxx" (in reality, the telephone No. of the access point is shown in "xxxxxxxx") is indicated. Under the AP telephone No., "SMTP: xxxxxxxx" (in reality, the address of the SMTP server is indicated in "xxxxxxxx") is shown, followed by "POP: xxxxxxxx" (in reality, the address of the POP server is indicated in "xxxxxxxx"). Other items of connection information are indicated though they are omitted by "..." in FIG. 75. At the bottommost portion of FIG. 75, selection buttons, such as "OK" and "CANCEL", are shown. If the user wishes to cancel user registration, the user selects "CANCEL" to cancel user registration. If the user wishes to perform user registration with the connection information displayed in FIG. 75, the user selects "OK". Then, a screen, such as that shown in FIG. 76, is displayed on the display unit of the setting terminal device 109.

In FIG. 76, a message "Connection information is stored in memory card." is displayed on the upper side of the screen, and a selection button, i.e., "OK", is indicated under this message. After checking that the connection information is stored in the memory card 114, the user selects "OK". Accordingly, the above-described screens are displayed on the display unit of the setting terminal device 109 before the connection information is stored in the memory card 114.

Processing for setting the memory card 114 before connection information is stored in the memory card 114 is described below with reference to the flowcharts of FIGS. 77 through 79.

Figure 77:
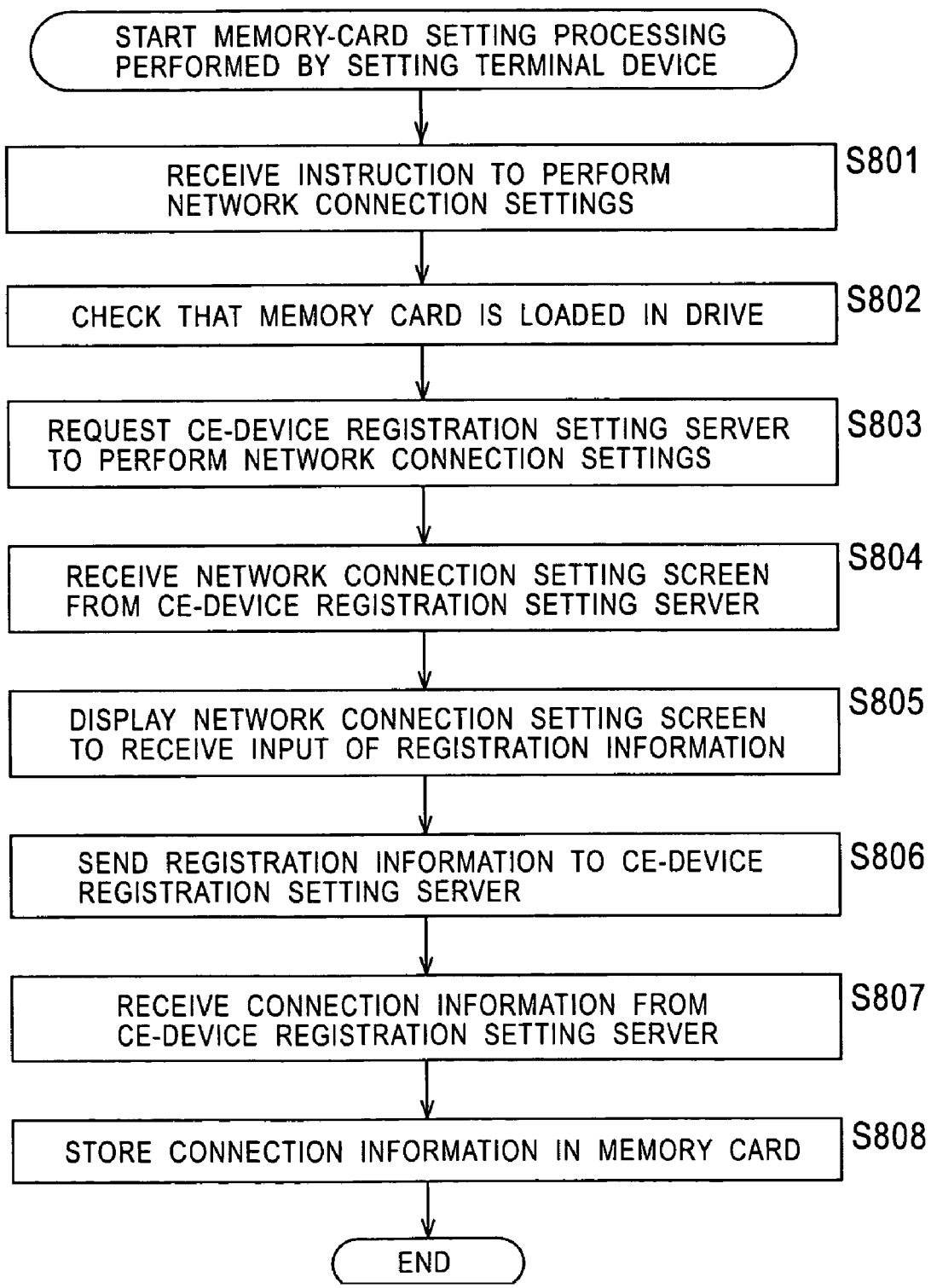
FIG. 77 is a flowchart illustrating memory card setting processing performed by the setting terminal device.

In step S801 of FIG. 77, the setting terminal device 109 receives from the user the input of an instruction to conduct user registration for connecting to a network. In step S802, the display control program 325 of the setting terminal device 109 displays the screen shown in FIG. 70 on the display unit. When "YES" is selected in FIG. 70, the display control program 325 displays the screen shown in FIG. 71 on the display unit. When "OK" is selected in FIG. 71, the display control program 325 of the setting terminal device 109 displays the screen shown in FIG. 72 on the display unit. When "OK" is selected in FIG. 72, the process proceeds to step S803.

In step S803, the browser 323 of the setting terminal device 109 requests the CE-device registration setting server 105 to perform network connection settings.

Figure 78:
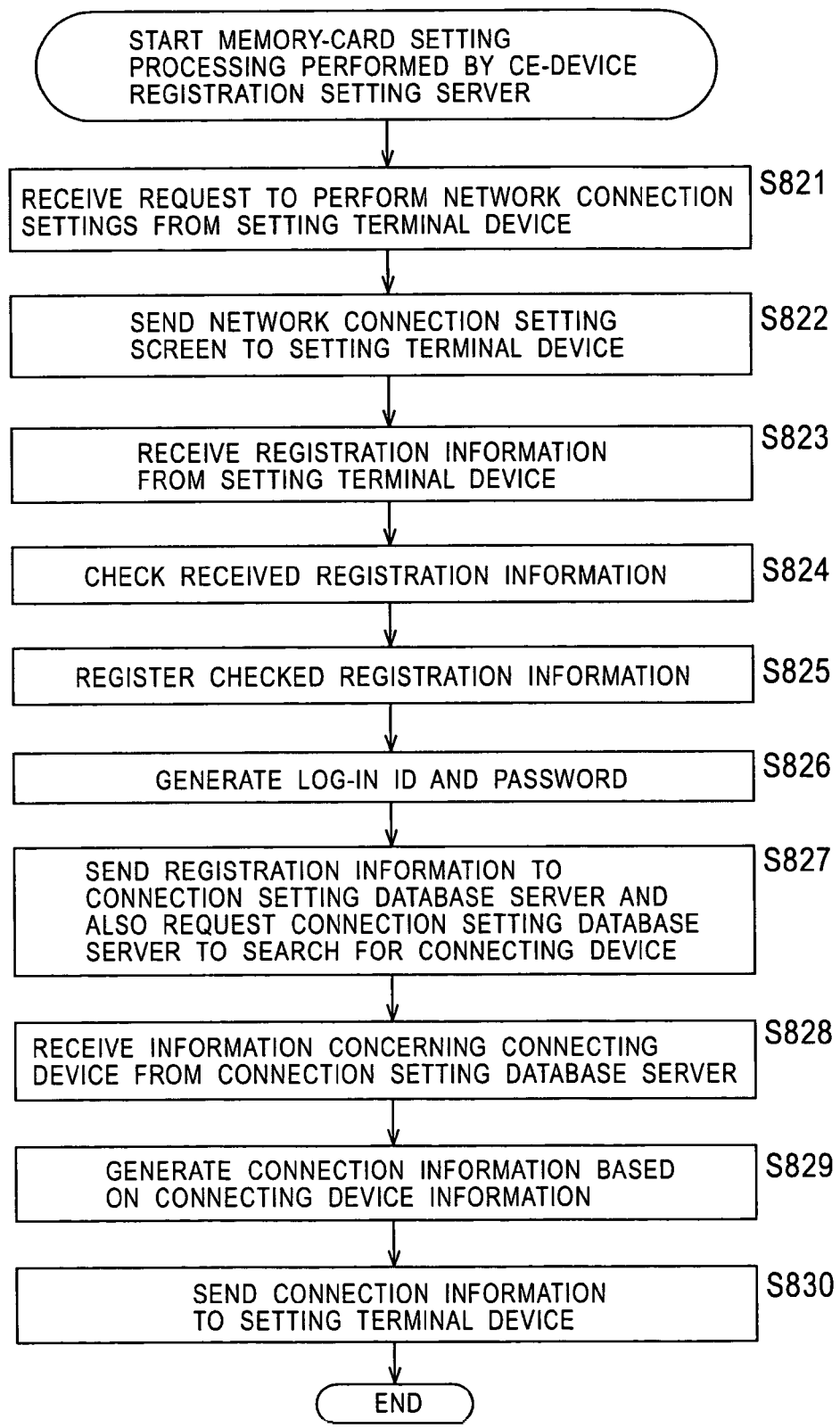
FIG. 78 is a flowchart illustrating memory card setting processing performed by the CE-device registration setting server.

In step S821 of FIG. 78, the CE-device registration setting server 105 receives a request to perform network connection settings from the setting terminal device 109.

In step S822, the communication control program 462 of the CE-device registration setting server 105 sends a network connection setting screen to the setting terminal device 109.

In step S804, the setting terminal device 109 receives the network connection setting screen from the CE-device registration setting server 105. In step S805, the display control program 325 of the setting terminal device 109 displays the screen shown in FIG. 73 on the display unit of the setting terminal device 109. When all the required items are input into the input columns in FIG. 73 to select "CHECK", the display control program 325 of the setting terminal device 109 displays the screen shown in FIG. 74 on the display unit of the setting terminal device 109. When the user selects "SEND" after checking the display shown in FIG. 74, the process proceeds to step S806. In step S806, the browser 323 of the setting terminal device 109 sends the registration information input in step S805 to the CE-device registration setting server 105.

In step S823, the CE-device registration setting server 105 receives the registration information from the setting terminal device 109. In step S824, the storage control program 465 of the CE-device registration setting server 105 checks whether there is no insufficiencies or errors in the registration information received in step S823. If it is determined that there is no insufficiencies or errors, in step S825, the storage control program 465 stores the registration information in the storage unit.

In step S826, the login-ID/password generating program 464 of the CE-device registration setting server 105 generates a login ID and a password. In step S827, the communication control program 462 of the CE-device registration setting server 105 sends the registration information to the connection-setting database server 106, and also requests the connection-setting database server 106 to search for the connecting access point.

Figure 79:
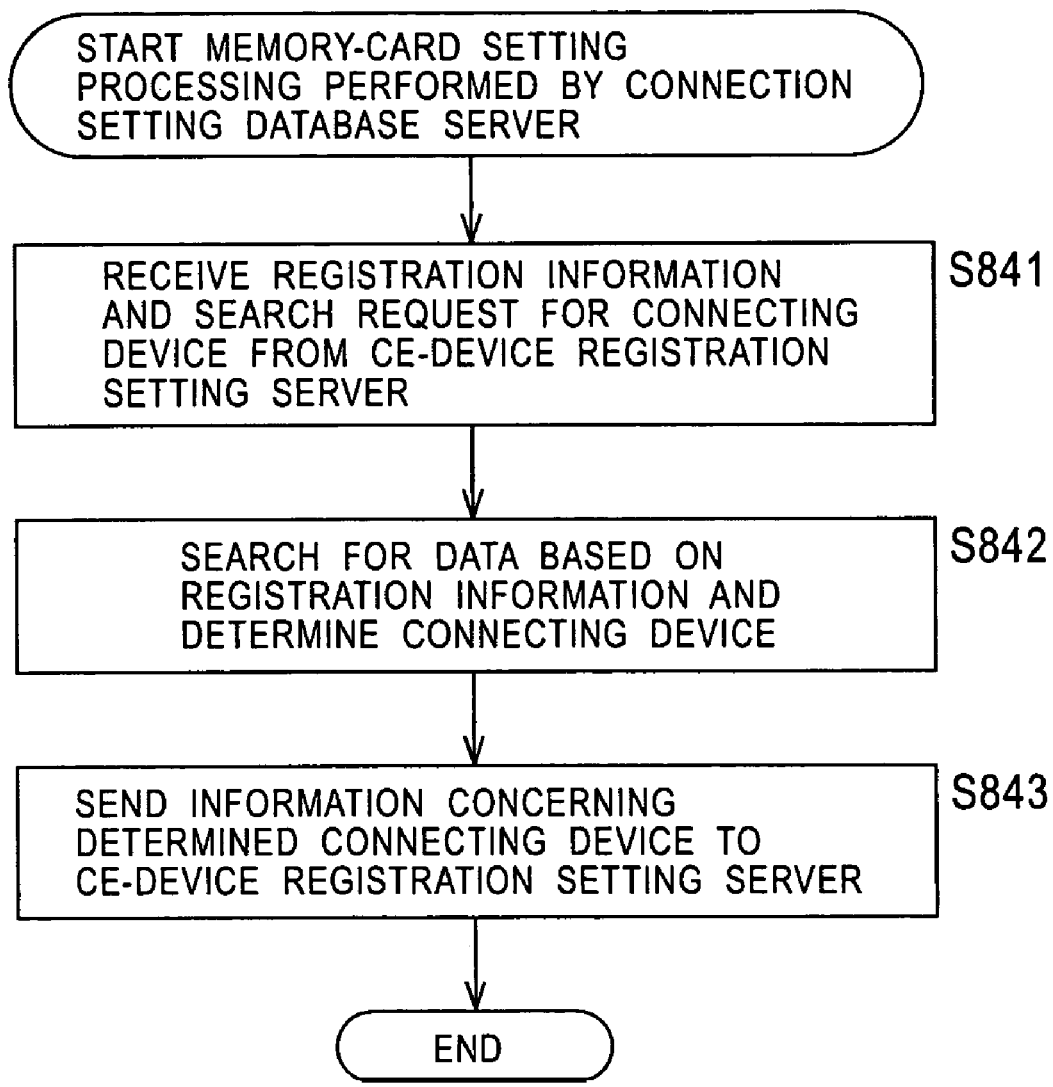
FIG. 79 is a flowchart illustrating memory card setting processing performed by the connection-setting database server.

In step S841 of FIG. 79, the connection-setting database server 106 receives the registration information and a request to search for the connecting access point from the CE-device registration setting server 105.

In step S842, the storage control program 484 of the connection-setting database server 106 stores the registration information received in step S841 in the storage unit, and also, the data search program 485 searches for the access point of the ISP 107 that can minimize the communication cost by referring to the address and postal code of the user contained in the registration information. When the access point is determined, the process proceeds to step S843 in which the communication control program 482 of the connection-setting database server 106 sends information concerning the access point determined as a result of the search in step S842 to the CE-device registration setting server 105.

In step S828, the CE-device registration setting server 105 receives information concerning the access point from the connection-setting database server 106. In step S829, the connection-information generating program 463 of the CE-device registration setting server 105 generates connection information based on the information concerning the access point received in step S828.

In step S830, the communication control program 462 of the CE-device registration setting server 105 sends the connection information generated in step S829 to the setting terminal device 109.

In step S807, the setting terminal device 109 receives the connection information from the CE-device registration setting server 105. In step S808, the drive control program 326 of the setting terminal device 109 stores the connection information received in step S807 in the memory card 114. The display control program 325 of the setting terminal device 109 displays the screen shown in FIG. 76 on the display unit. The connection information is stored in the memory card 114 as described above.

In the memory card 114, connection information for one user can be stored. In this case, only the user who has stored the connection information in the memory card 114 can carry the memory card 114, thereby reducing the possibility another user utilizing the connection information.

In the single memory card 114, connection information for a plurality of users can be stored. In this case, a unique password is assigned to each user, and when connecting to the Internet 1 through the CE device 132, the user is requested to input the password. Only when the password input by the user is correct, the CE device 132 is allowed to connect to the Internet 1. With this arrangement, it is possible to prevent another user from utilizing the connection information. Alternatively, authentication means for authenticating individuals, such as means for verifying fingerprints, may be provided for the CE device 132, and only when the user is verified as an authorized user by the authentication means, the connection information of the corresponding user stored in the memory card 114 may be read.

Figure 80:
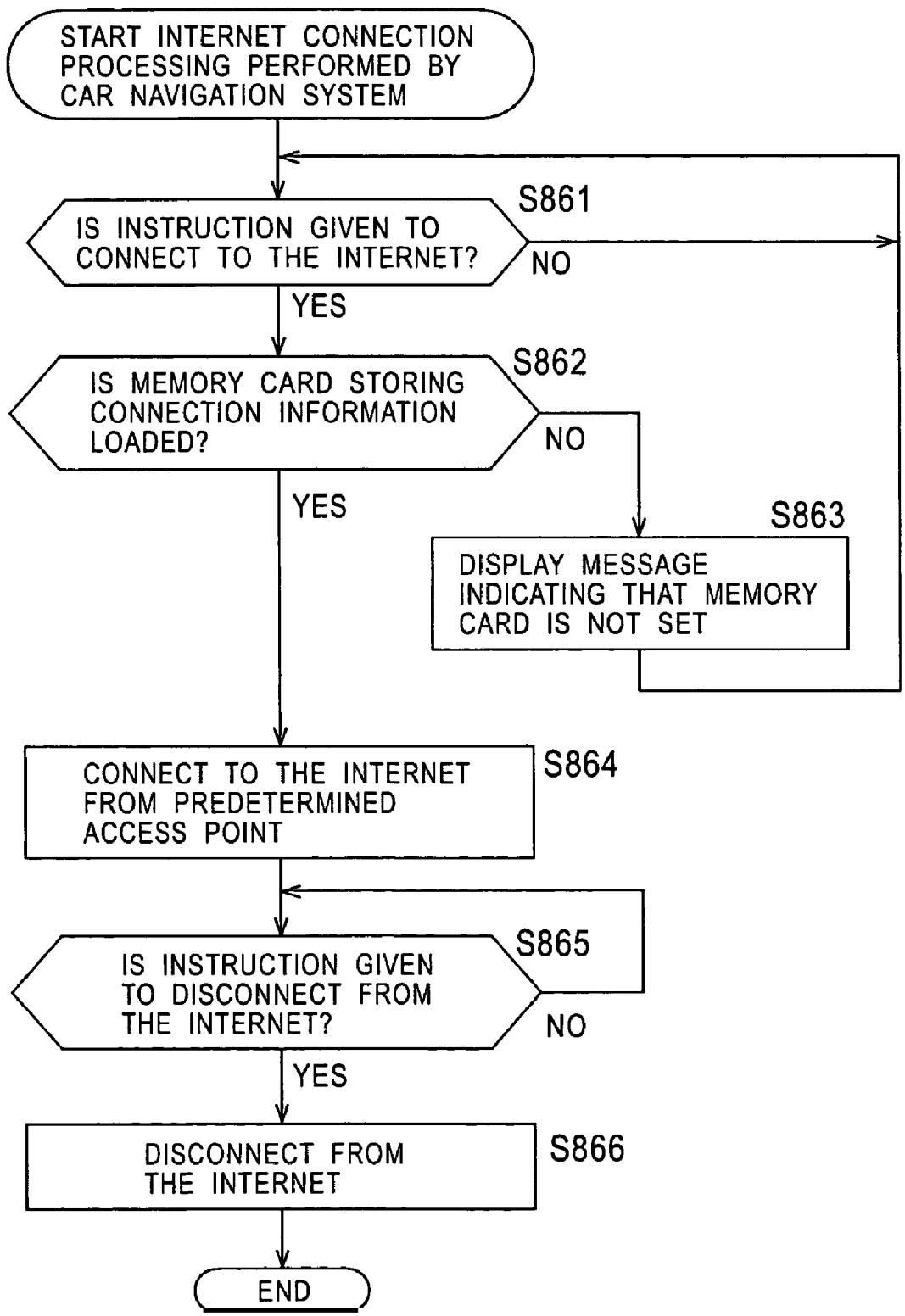
FIG. 80 is a flowchart illustrating Internet connection processing performed by the car navigation system.

A description is now given, with reference to the flowchart of FIG. 80, of processing for connecting the car navigation system 112 to the Internet 1 by using the memory card 114 storing connection information therein as described above.

In step S861, the operation-input control program 546 of the car navigation system 112 determines whether an instruction to connect to the Internet 1 is input. When an instruction to connect to the Internet 1 is input, the process proceeds to step S862.

In step S862, the operating system 541 of the car navigation system 112 determines whether the memory card 114 is loaded in the drive 274. If the memory card 114 is not loaded in the drive 274, the process proceeds to step S863. In step S863, the display control program 544 displays a message indicating that the memory card 114 is not loaded in the drive 274 on the display unit 271.

If the operating system 541 of the car navigation system 112 determines in step S862 that the memory card 114 is loaded in the drive 274, the process proceeds to step S864. In step S864, the browser 543 of the car navigation system 112 accesses a predetermined access point (for example, the access server 141) based on the connection information stored in the memory card 114 so as to connect to the Internet 1.

In step S865, the operation-input control program 546 of the car navigation system 112 determines whether an instruction to disconnect from the Internet 1 is input. If an instruction to disconnect from the Internet 1 is input, the process proceeds to step S866.

In step S866, the browser 543 of the car navigation system 112 disconnects the car navigation system 112 from the Internet 1.

According to the above-described processing, the CE device 132 connects to the Internet 1 based on the connection information stored in the memory card 114. As stated above, by connecting the CE device 132 to the Internet 1 by using the memory card 114 storing the connection information, the user does not have to input registration information for each CE device 132, thereby enhancing the ease of use. The memory card 114 can be small and is not cumbersome so that the user is able to easily carry the memory card 114. Thus, the user does not have to carry his/her own CE device 132, and instead, the user is able to connect to the Internet 1 to obtain information by utilizing the CE device 132 available for the user.

Since it is not necessary to input connection information into the CE device 132 every time the user connects the CE device 132 to the Internet 1, the input interface of the CE device 132 can be miniaturized or eliminated.

Additionally, the user is able to set a memory card by himself/herself as long as the user owns the setting terminal device 109, for example, a personal computer, and thus, the user does not have to visit a special agent for setting the memory card 114.

In the above description, the CE device 132 is provided with a function for performing connection settings by reading connection information from the memory card 114. The function for performing connection settings by reading connection information from the memory card 114 may be integrated into the CE device 132 when being manufactured. Alternatively, a program for reading connection information from the memory card 114 to perform connection settings may be recorded in the memory card 114 together with the connection information, and then, when the memory card 114 is inserted into the memory card drive of the CE device 132, the CE device 132 may start the program recorded in the memory card 114 to perform connection settings. When updating the program for reading the connection information from the memory card 114 to perform connection settings, the program may be sent to the CE device 132 by using a communication network and is installed into the CE device 132.

By recording a program for reading connection information from the memory card 114 to perform connection settings in the memory card 114 together with the connection information, the CE device 132 without a function for reading the connection information from the memory card 114 to perform connection settings is able to perform connection settings. In this case, the program for performing connection settings is sent to the setting terminal device 109 together with the connection information from the CE-device registration setting server 105, and is recorded in the memory card 114 by the setting terminal device 109.

More specifically, for example, the CE-device registration setting server 105 prestores the program for performing the connection settings by the CE device 132, and when sending the connection information to the setting terminal device 109 in step S830 of FIG. 78, the CE-device registration setting server 105 sends the program for performing the connection settings by the CE device 132 together with the connection information. The setting terminal device 109 receives the program for performing connection settings by the CE device 132 together with the connection information from the CE-device registration setting server 105 in step S807 of FIG. 77. Then, in step S808, the setting terminal device 109 stores the connection information and the program for performing connection settings by the CE device 132 received in step S807 in the memory card 114. Thus, when the memory card 114 recording the connection information and the program for performing connection settings by the CE device 132 therein is inserted into the CE device 132, the CE device 132 reads the program for performing connection settings from the memory card 114, and executes the program. That is, the CE device 132 connects to a network based on the connection information recorded in the memory card (for example, step S864 of FIG. 80).

The memory card 114 is used for storing connection information therein by way of example. However, the medium storing connection information is not restricted to the memory card 114. For example, connection information may be stored in an IC card. In this case, instead of the memory drive 701, an IC card reader/writer for reading and storing connection information from and in an IC card is installed in the setting terminal 109(121). An IC card reader for reading connection information from an IC card is provided for the CE device 132.

In the above description, when generating connection information, the access point that can minimize the communication cost is selected. However, in the present invention, it is not essential that the access point be selected under the condition of the communication cost. For example, the access point that achieves the fastest communication speed by wireless communication, or the access point that allows loads to be distributed may be selected. The access point may be selected under a condition other than the above-described conditions. Alternatively, the access point may be selected by more than one condition, for example, by using parameters of the communication cost and the communication speed. Of course, the access point can be selected by calculations considering a plurality of conditions other than the combination of the communication cost and the communication speed. Conditions for selecting the access point may be set by the user through the CE device 132, or may be set by the connection-setting database server 106.

As described above, when receiving services from the plurality of service providing servers 102-1 through 102-n shown in FIG. 2 after connecting to the Internet 1, the user is sometimes required to perform user registration in each of the service providing servers 102-1 through 102-n. In particular, when the user is charged for receiving services, user registration is almost essential. When receiving services from the plurality of service providing servers 102-1 through 102-n, user registration must be conducted on all of the service providing servers 102-1 through 102-n.

When performing user registration in each of the service providing servers 102-1 through 102-n, as stated above, information, such as the user name, address, email address, etc., is common information to be registered in most of the service providing servers 102-1 through 102-n. Information, such as the user address, name, age, gender, and telephone No., to be registered in most of the service providing servers 102-1 through 102-n is hereinafter referred to as "basic information". The user is required to input the same basic information every time user registration is conducted in each of the service providing servers 102-1 through 102-n.

Then, if the user does not have to input the basic information which has already been input when previously performing user registration in one service providing server 102 when performing user registration in another service providing server 102, it becomes very convenient for the user. In particular, if the input interface of the CE device 132 is difficult to use, the burden imposed on the user can be considerably decreased if the amount of information to be input is reduced.

More specifically, it is now assumed that the user must input a, b, c, d, and e (a through e are items of information—the same applies to f and g) required for first conducting user registration in the service providing server 102-1 (a through c are basic information), and that a, b, c, f, g, and h are required for subsequently conducting user registration in the service providing server 102-2. Conventionally, the user has to input all the items of information, such as a, b, c, f, g, and h, for performing user registration in the service providing server 102-2. That is, the user must input the same information a through c again, which is troublesome.

Then, when conducting user registration in the service providing server 102-2, it is very convenient if the user has to input only f through h without the need to input a through c (basic information).

A description is now given, with reference to FIGS. 81 and 82, a system in which the user does not have to input basic information that has already been input for previously conducting user registration in the service providing server 102 when the user subsequently performs user registration in another service providing server 102.

In the following description, among items of information required for performing user registration in the service providing server 102, information (d, e, f through h) other than the above-described basic information (a through c) is referred to as service dependent information.

Figure 81:
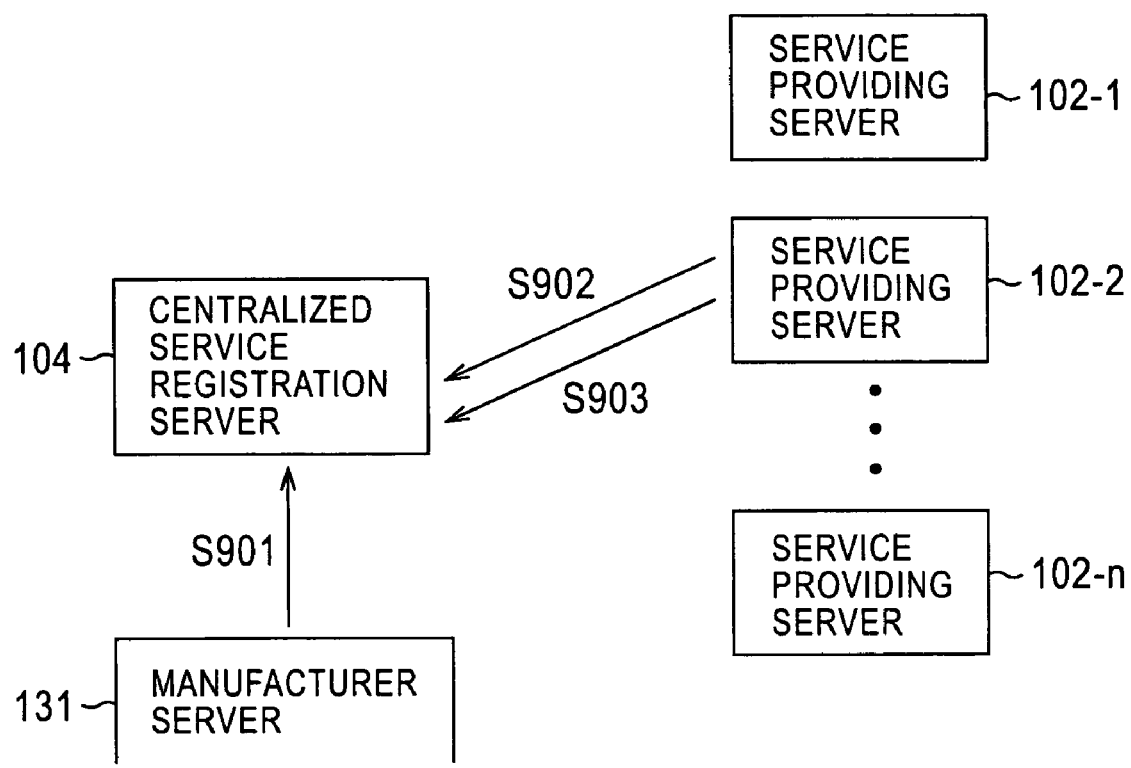
FIG. 81 is a diagram illustrating a data flow into the centralized service registration server.
Figure 82:
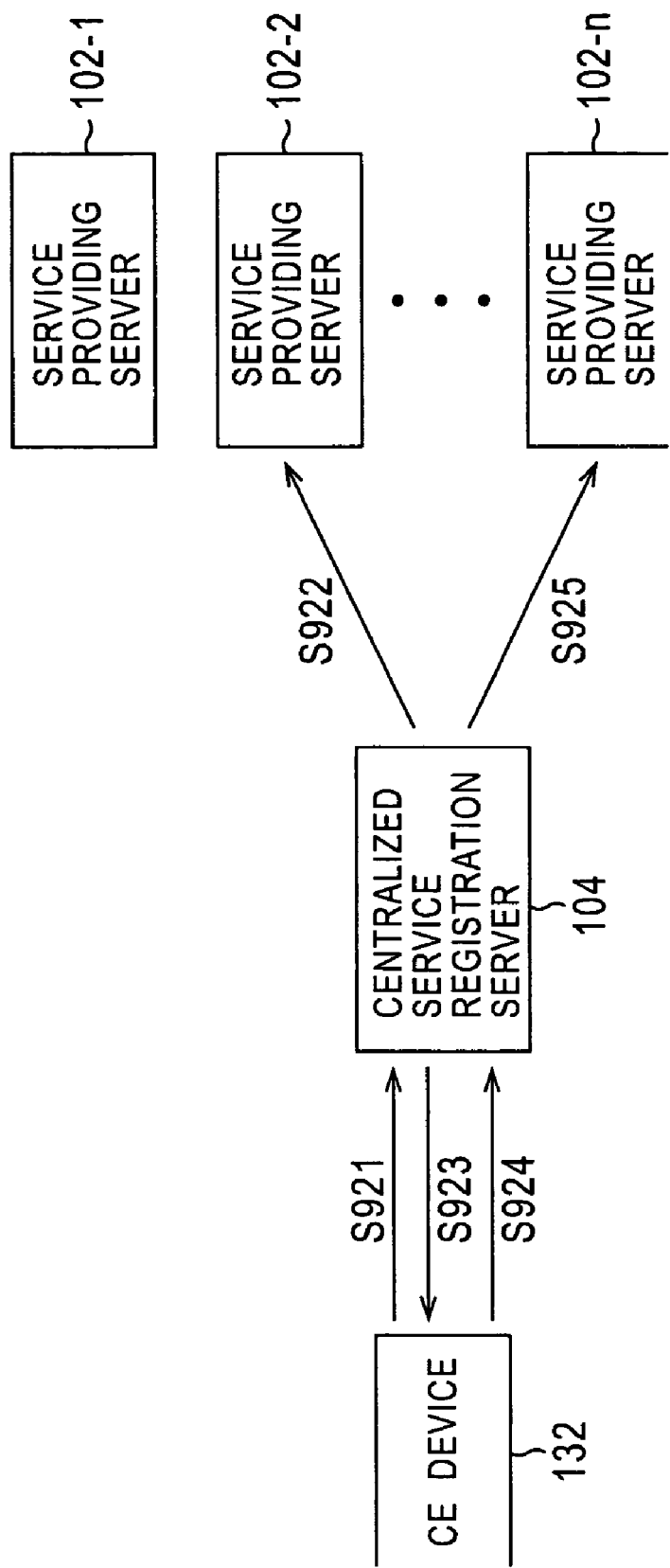
FIG. 82 is another diagram illustrating a data flow into the centralized service registration server.

In FIG. 81, the centralized service registration server 104 centrally stores and manages basic information. In step S901 of FIG. 81, the manufacturer server 131 sends the device IDs of the CE devices 132 shipped from the CE device manufacturer 103 to the centralized service registration server 104. The centralized service registration server 104 stores the device IDs received from the manufacturer server 131.

In step S902, the service providing server 102-2 sends items required to be input for user registration as the service dependent information to the centralized service registration server 104. The centralized service registration server 104 stores the received items to be input by the user as the service dependent information. In step S903, the service providing server 102-2 sends the centralized service registration server 104 the type of service (information indicating the type of service) provided by the service providing server 102-2 and the specifications (required functions) of the CE devices 132 that can receive the services. The centralized service registration server 104 stores the received type of service and the specification of the CE devices 132 that can receive the services.

As in the service providing server 102-2, the service providing servers 102-1, 102-3 through 102-n send service dependent information and the specifications of the CE devices 132 that can receive the services provided by the service providing servers 102-1, 102-3 through 102-n to the centralized service registration server 104. The centralized service registration server 104 stores the received service dependent information and the specifications of the CE devices 132 that can receive the services.

The centralized service registration server 104 verifies the specifications of the manufactured CE devices 132 received and stored from the manufacturer server 131 in step S901 against the specifications of the CE devices 132 that can receive the services received and stored from the service providing server 102 in step S903 so as to specify the CE devices 132 that can receive the services from the service providing server 102, and creates a database in which the services and the CE devices 132 are associated with each other. That is, in this database, a list of the CE devices 132 that can receive each of the services provided by the service providing servers 102-1 through 102-n is recorded.

In the database, a list of the CE devices 132 that can receive each of the services provided by the service providing servers 102-1 through 102-n is recorded, as stated above. Alternatively, a list of services to be received by each CE device 132 may be recorded.

Subsequently, when performing user registration in the service providing server 102-2, in step S921 of FIG. 82, the CE device 132 sends basic information and service dependent information required for conducting user registration in the service providing server 102-2 to the centralized service registration server 104. The centralized service registration server 104 stores the received basic information, and also sends the service dependent information received in step S921 to the service providing server 102-2 in step S922. The service providing server 102-2 stores the received service dependent information.

The centralized service registration server 104 issues a registration ID and a password, and sends the registration ID and password to the CE device 132 together with a message indicating that registration in the service providing server 102-2 has been completed in step S923. Upon receiving the registration ID and password together with a message indicating that registration in the service providing server 102-2 has been completed, the CE device 132 shows the registration ID and password together with the message to the user. The user memorizes or writes down the registration ID and password. The user is then able to receive services from the service providing server 102-2.

Subsequently, when the user performs user registration in another service providing server 102-n, the CE device 132 first sends the registration ID and password to the centralized service registration server 104. Then, the centralized service registration server 104 reads the registered basic information based on the registration ID, and also reads the items to be input by the user as the service dependent information of the service providing server 102-n, and sends them to the CE device 132. The CE device 132 receives from the user the input of only the service dependent information required for performing user registration in the service providing server 102-n, and in step S924, the CE device 132 sends the input service dependent information to the centralized service registration server 104. Upon receiving the service dependent information, in step S925, the centralized service registration server 104 sends the service dependent information to the service providing server 102-*n*. The service providing server 102-*n* stores the received service dependent information.

According to the above-described processing, the user does not have to input the basic information that has already been input for performing user registration in the service providing server 102-2 when subsequently conducting user registration in the service providing server 102-*n*.

Screens to be displayed on the display unit of the CE device 132 when conducting user registration are discussed below with reference to FIGS. 83 through 93.

Figure 83:
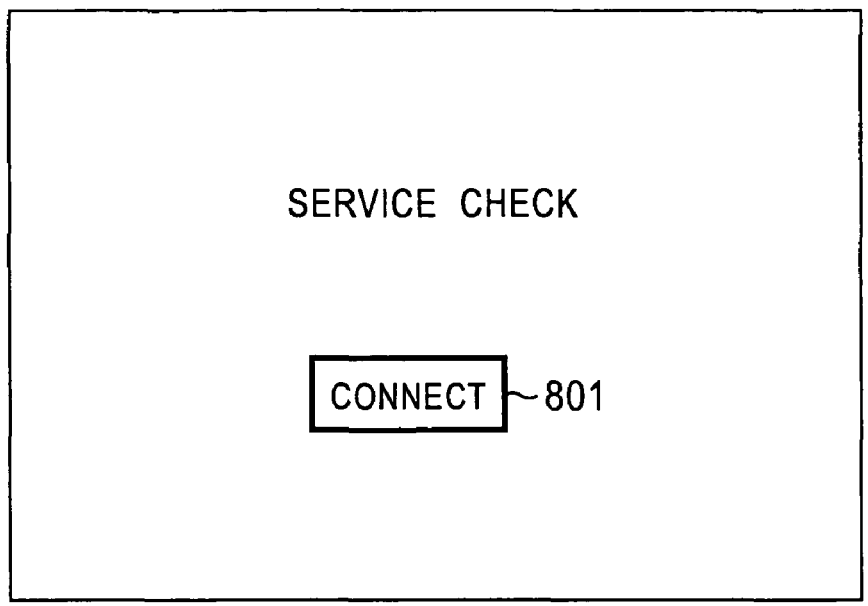
FIG. 83 illustrates an example of screens of the display unit of the setting terminal device.

When the user inputs an instruction to receive services into the CE device 132, the screen shown in FIG. 83 is displayed on the display unit of the CE device 132. In FIG. 83, at the upper side of the screen, a message "service check" is indicated, and a connect button 801 is shown under this message. When selecting the connect button 801 by inputting a predetermined operation, the screen shown in FIG. 84 is displayed on the display unit of the CE device 132.

Figure 84:
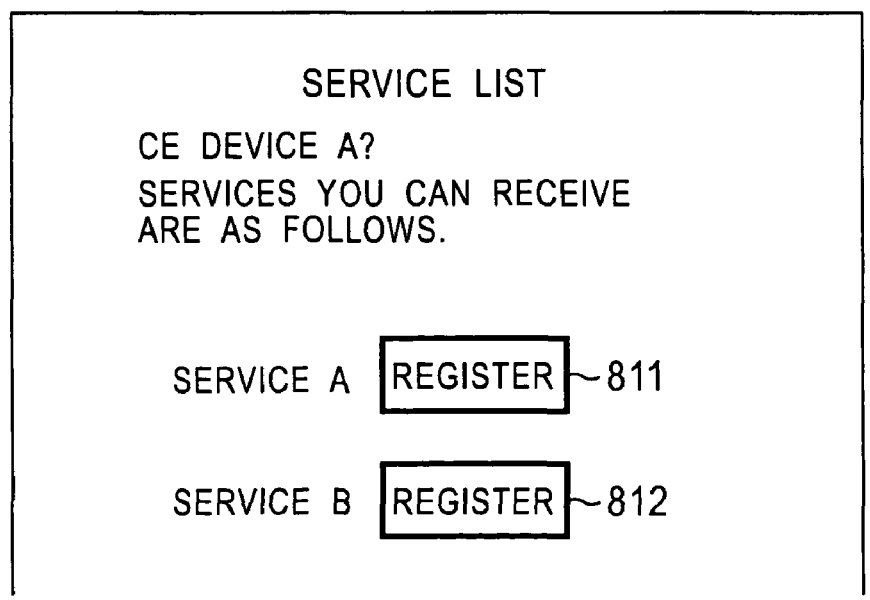
FIG. 84 illustrates an example of screens of the display unit of the setting terminal device.

In FIG. 84, at the upper side of the screen, a message "Service list CE device A? Services that you can receive are as follows." is indicated, and under this message, "Service A" and a registration button 811, and "Service B" and a registration button 812 are indicated. When the user wishes to perform user registration in service A, the user selects the registration button 811 by inputting a predetermined operation. Then, the screen shown in FIG. 85 is displayed on the display unit of the CE device 132.

In FIG. 85, at the upper side of the screen, a message "Do you have registration ID?" is indicated, and under this message, a "YES" button 821 and a "NO" button 822 are shown. Since this is the first time to conduct user registration, the user selects the "NO" button 822 according to a predetermined operation. Then, the screen shown in FIG. 86 is displayed on the display unit of the CE device 132.

In FIG. 86, at the upper side of the screen, a message "Input basic information" is indicated, and under this message, "Name:" and an input column 831 for filling the "name", "Address:" and an input column 832 for filling the "address", and "Email:" and an input column 833 for filling email address are indicated. A registration button 834 is shown under these input columns. The user inputs his/her name into the name input column 831, the address into the address input column 833, and the email address into the email-address input column 833 by predetermined operations, and selects the registration button 834. Then, the screen shown in FIG. 87 is displayed on the display unit of the CE device 132.

In FIG. 87, at the upper side of the screen, a message "Service-A dependent information" is indicated, and under this message, "age:" and an input column 841 for filling the user's age and "hobbies:" and an input column 842 for filling the user's hobbies are indicated. A registration button 843 is shown under these columns. The user inputs the user's age into the age input column 841, and user's hobbies into the hobby input column 842, and selects the registration button 843 according to predetermined operations. Then, the screen shown in FIG. 88 is displayed on the display unit of the CE device 132.

In FIG. 88, at the upper side of the screen, a message "Registration has completed!" is indicated, and under this message, "Your ID/PW is ID: xxxxxx PW:xxxxxxxx" is indicated (in reality, the registration ID is indicated in "xxxxxx" of "ID:xxxxxx", and the password is indicated in "xxxxxxxx" and "PW:xxxxxxxx"). User registration for service A has been completed as described above. Since the centralized service registration server 104 manages the users, CE devices, and services so that they can be associated with each other, the user is able to display a list of the CE devices registered by the user by inputting predetermined operations on the CE device. That is, in response to the user's operation, the CE device requests the centralized service registration server 104 to send a list of the CE devices associated with the user. The centralized service registration server 104 searches for the CE devices associated with the user, and sends a list of the CE devices to the CE device. The CE device indicates the list of the CE devices supplied from centralized service registration server 104 to the user. The user is then able to view the list of the registered CE devices.

Figure 89:
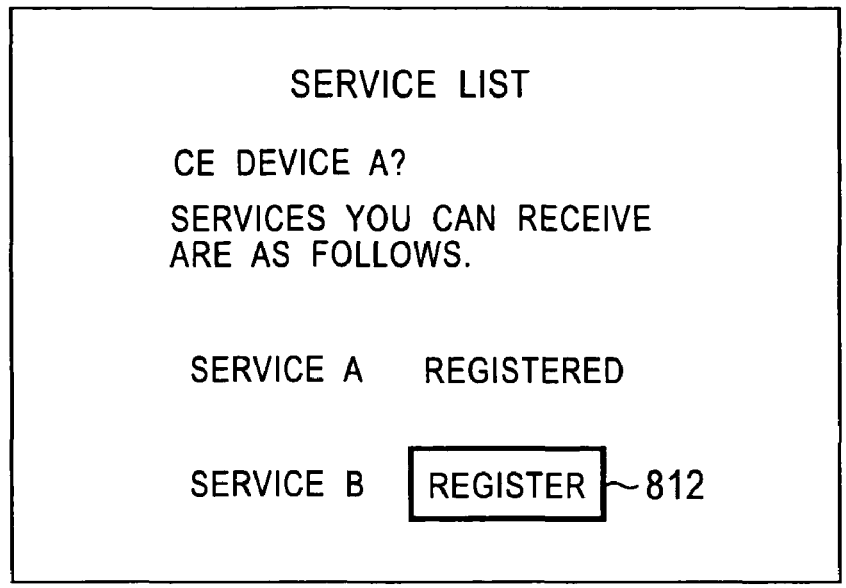
FIG. 89 illustrates still another example of screens of the display unit of the setting terminal device.

When conducting user registration in service B, in response to an instruction to register in the service from the user, the screen shown in FIG. 89 is displayed on the display unit of the CE device.

In FIG. 89, at the upper side of the screen, a message "Service list" is indicated, and under this message, "CE device A? Services you can receive are as follows." is indicated. Under this message, "Service A Registered" and "Service B" and a register button 812 are shown. The user selects the register button 812 according to a predetermined operation, and then, the screen shown in FIG. 90 is displayed on the display unit of the CE device 132.

Figure 90:
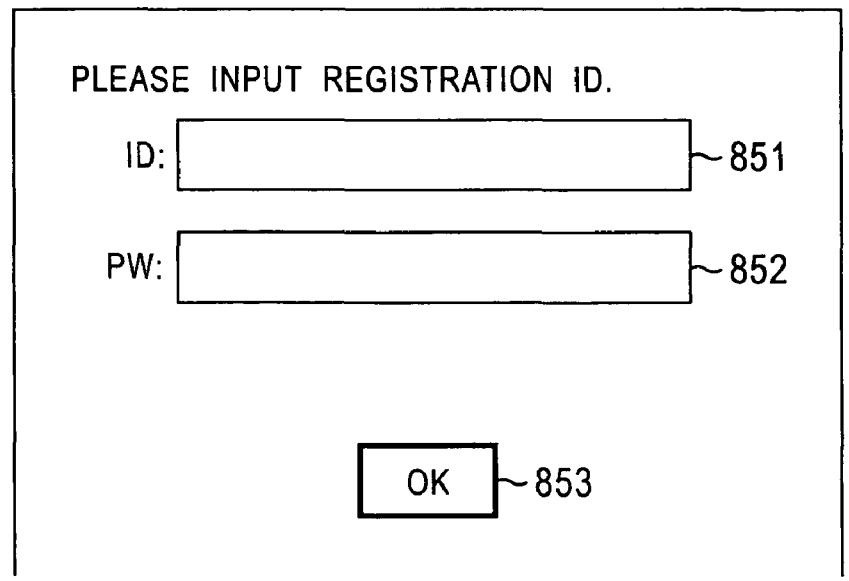
FIG. 90 illustrates an example of screens of the display unit of the setting terminal device.

In FIG. 90, at the upper side of the screen, a message "Please input registration ID." is indicated, and under this message, "ID:" and a registration-ID input column 851 and "PW:" and a password input column 842 are indicated. An OK button 853 is shown under these columns. The user inputs the registration ID indicated on the display unit in FIG. 88 into the registration-ID input column 851, and inputs the password indicated on the display in FIG. 88 into the password input column 852 according to predetermined operations, and then, selects the registration button 853. Then, the screen shown in FIG. 91 is displayed on the display unit of the CE device 132.

In FIG. 91, at the upper side of the screen, a message "Basic information check" is indicated, and under this message, "Name: xxxx xxxxxx" is indicated (in reality, the user name is indicated in "xxxx xxxxxx"). Then, "Address: xxxxxxxxxxxx" (in reality, the user address is indicated in "xxxxxxxxxxxx") and "email: xxxx@xxxxxxxx" (in reality, user email address is indicated in "xxxx@xxxxxxxx") are indicated. A check button 861 is shown under this information. After checking the basic information, the user selects the check button 861 according to a predetermined operation, and then, the screen shown in FIG. 92 is displayed on the display unit of the CE device 132.

In FIG. 92, at the upper side of the screen, a message "Service-B dependent information" is indicated, and under this message, "Credit number:" and an input column 871 for a credit number are indicated. A registration button 872 is shown under this input column. After inputting the credit number into the credit-number input column 871 according to a predetermined operation, the user selects the registration button 872, and then, the screen shown in FIG. 93 is displayed on the display unit of the CE device 132.

Figure 93:
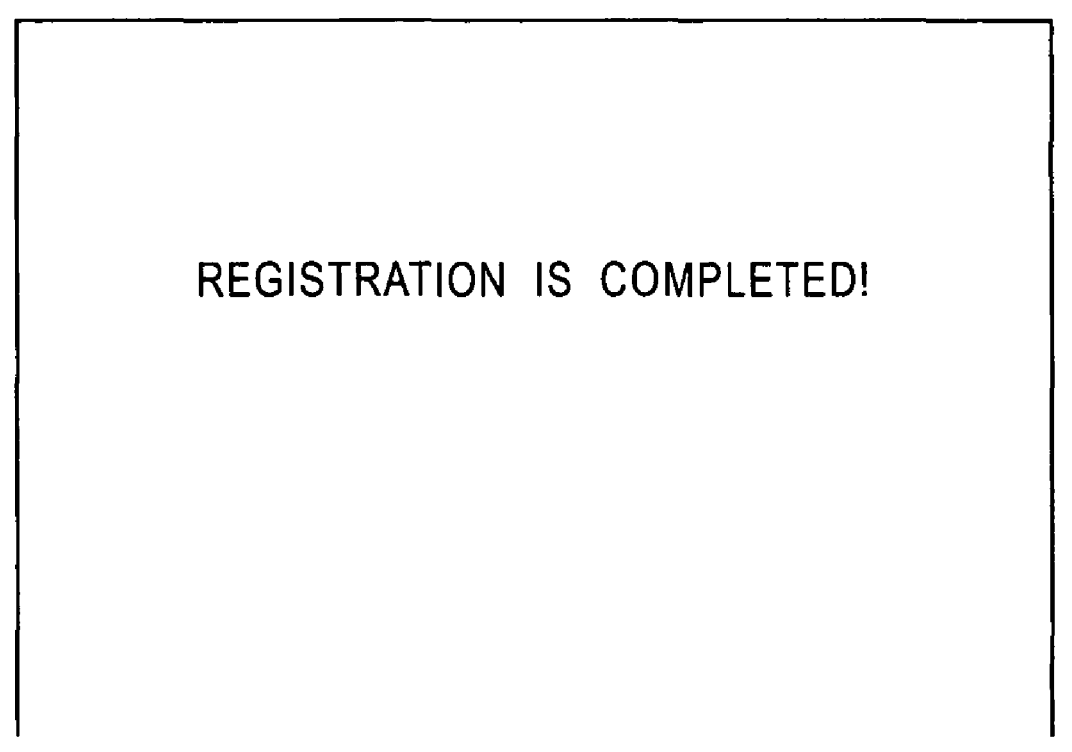

In FIG. 93, at the upper side of the screen, a message "Registration is completed!" is indicated. Accordingly, registration in service B has been completed.

As described above, it is not necessary to input the basic information that has already been registered for performing user registration in a service providing server 102 when subsequently conducting user registration in another service providing server 102, thereby giving a systematic impression to the user and enhancing the ease of operation.

In the above description, the password to be input into the password input column 851 of the screen in FIG. 90 by the user is the password indicated on the display unit in FIG. 88. However, after completing user registration in service A by the registration completion screen shown in FIG. 88, the user is able to change the password by predetermined procedures. In this case, the password input into the password input column 851 by the user in the screen of FIG. 90 is the new password. For example, if the user wishes to change the password after completing user registration in service A, the user accesses the centralized service registration server 104 from the CE device 132 or a personal computer owned by the user, and inputs the registration ID and password shown in FIG. 88, and a desired password, thereby making it possible to change the password. The password can be changed not only after conducting user registration for the first time, but also whenever the user desires (for example, after performing registration in service B).

Figure 94:
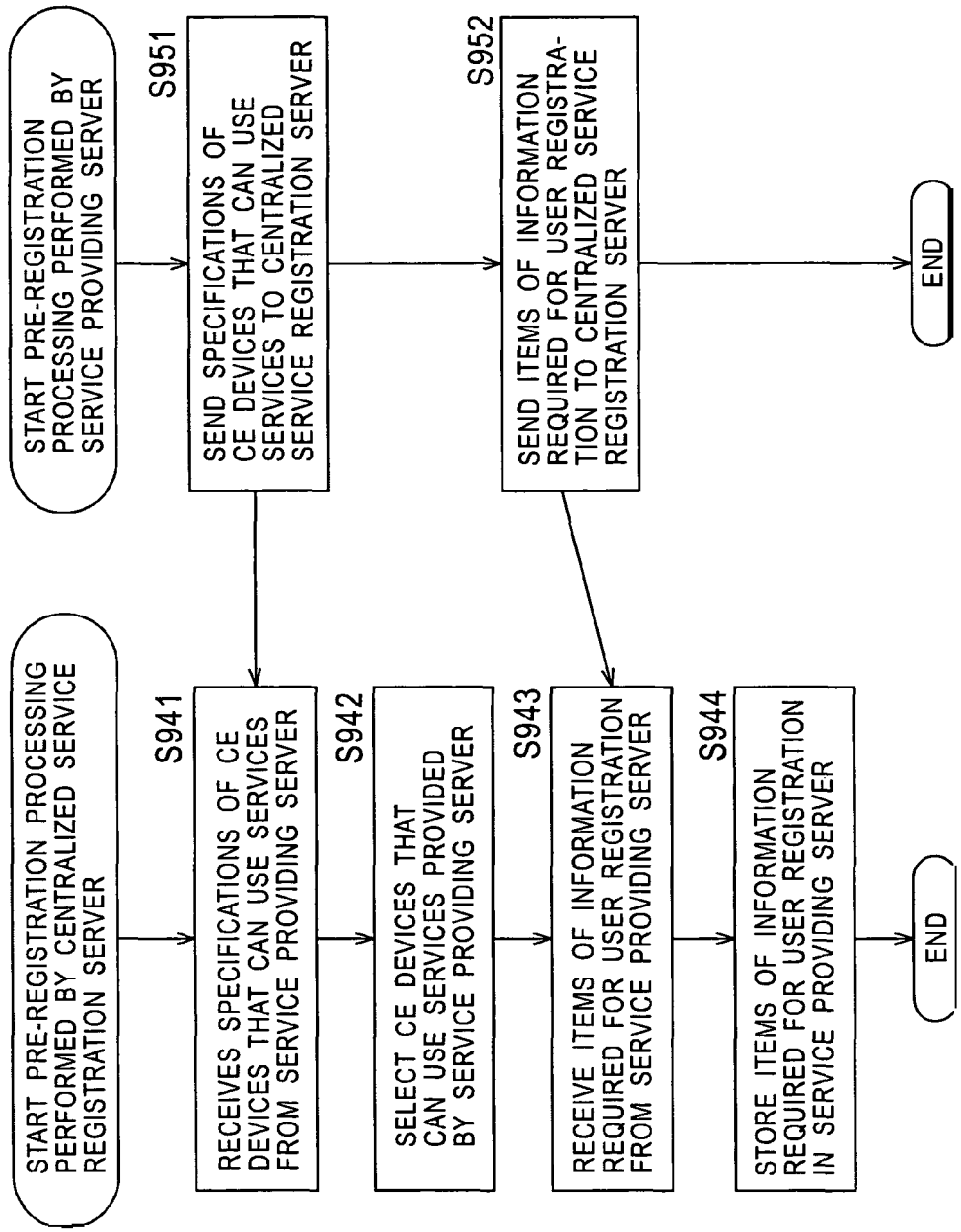
FIG. 94 is a flowchart illustrating pre-registration processing.

Pre-registration in the centralized service registration server 104 is described below with reference to the flowchart of FIG. 94.

In step S951, the communication control program 422 of the service providing server 102 sends the centralized service registration server 104 the specifications of the CE device 132 that can receive services from the service providing server 102. For example, if the service providing server 102 provides distribution services for music content, the service providing server 102 sends "having a speaker for playing back music" as the specifications of the CE device 132.

In step S941, the centralized service registration server 104 receives the specifications that can utilize the service providing server 102 from the service providing server 102.

The centralized service registration server 104 has received the data concerning the specifications of the manufactured CE devices 132 from the manufacturer server 131, and stored it. Then, in step S942, the data search program 505 of the centralized service registration server 104 selects all the CE devices 132 that can use the services provided by the service providing server 102 by referring to the stored data concerning the specifications of the CE devices 132. That is, if the specifications of the CE devices 132 received in step S941 indicate "having a speaker for playing back music", the data search program 505 of the centralized service registration server 104 picks up all the CE devices 132 provided with speakers for playing back music by referring to the stored data concerning the specifications of the CE devices 132.

Then, in step S952, the communication control program 422 of the service providing server 102 sends items of information required for conducting user registration in the service providing server 102 to the centralized service registration server 104. For example, the communication control program 422 of the service providing server 102 sends items, such as "favorite music fields" and "the number of CDs owned", to the centralized service registration server 104.

In step S943, the centralized service registration server 104 receives items of information required for conducting user registration in the service providing server 102 from the service providing server 102.

In step S944, the storage control program 504 of the centralized service registration server 104 stores items of information required for conducting user registration in the service providing server 102.

Pre-registration processing has been completed as described above.

Figure 95:
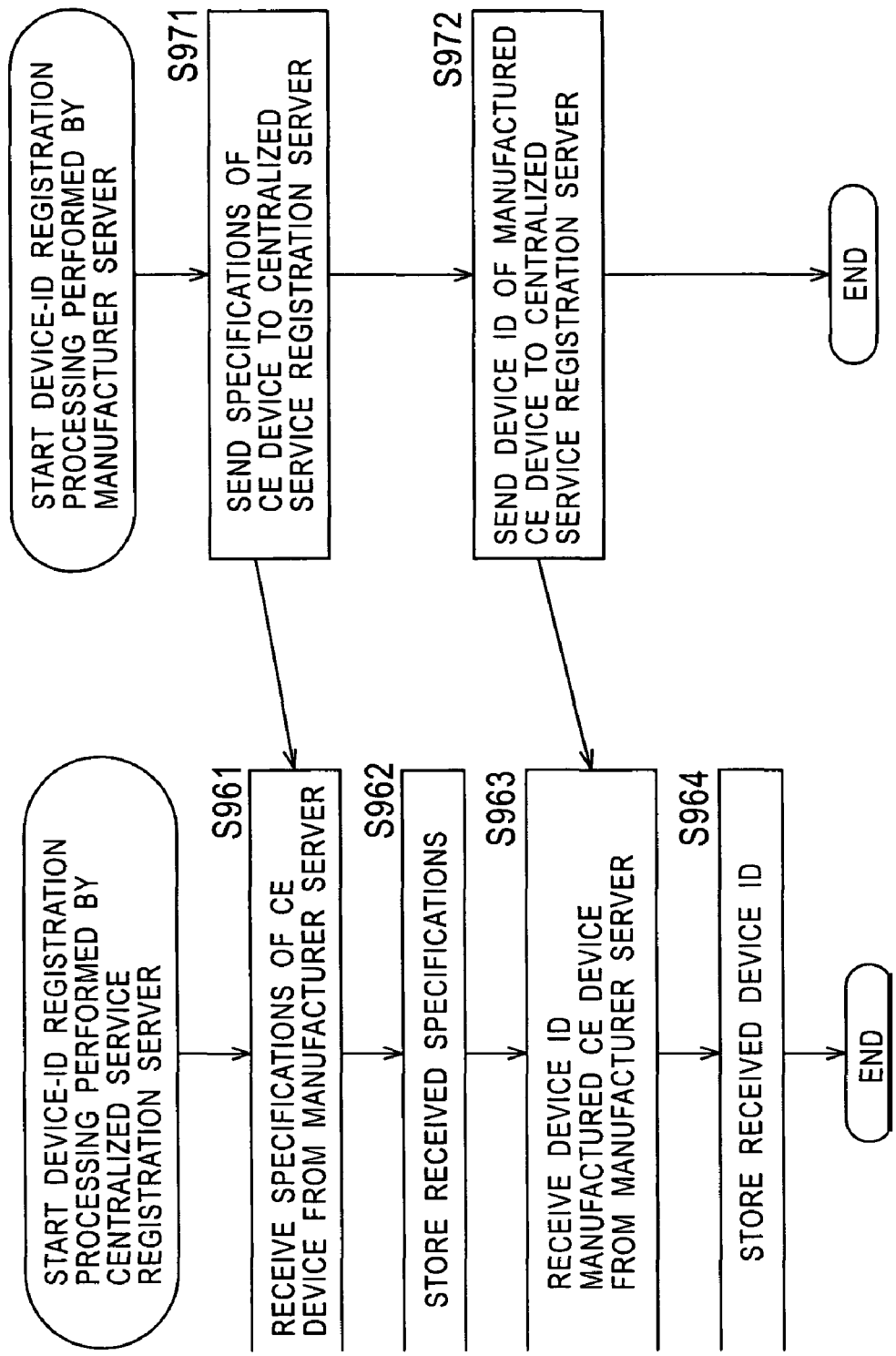
FIG. 95 is a flowchart illustrating device ID registration processing.

Registration processing for a device ID is described below with reference to the flowchart of FIG. 95.

In step S971, the communication control program 302 of the manufacturer server 131 sends the specifications of the CE device 132 to be manufactured to the centralized service registration server 104. If the CE device 132 to be manufactured has a display unit and a speaker, the display unit and the speaker are sent as the specifications of the CE device 132.

In step S961, the centralized service, registration server 104 receives the specifications of the CE device 132 to be manufactured from the manufacturer server 131.

In step S962, the storage control program 504 of the centralized service registration server 104 stores the specifications of the CE device 132 received in step S961 in the storage unit.

In step S972, the communication control program 302 of the manufacturer server 131 sends the device ID of the manufactured CE device 132 to the centralized service registration server 104.

In step S963, the centralized service registration server 104 receives the device ID of the manufactured CE device 132 from the manufacturer server 131.

In step S964, the storage control program 504 of the centralized service registration server 104 stores the device ID of the CE device 132 received in step S963 in the storage unit.

Registration processing for a device ID has been completed as described above.

A description is now given, with reference to the flowcharts of FIGS. 96 through 103, of service registration processing in the service providing server 102 by taking the car navigation system 112 as an example of the CE device 132.

Figure 96:
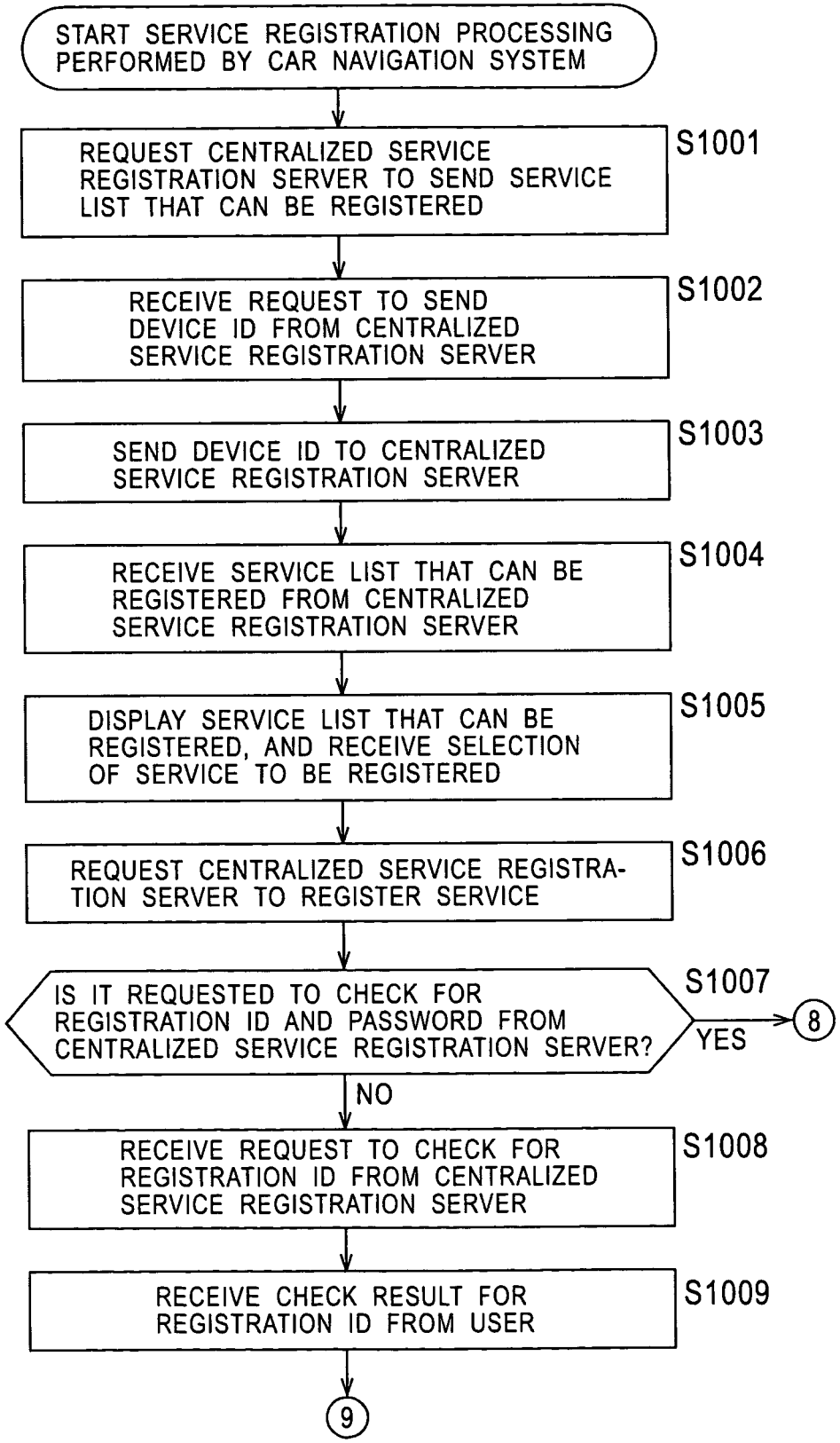
FIG. 96 is a flowchart illustrating service registration processing performed by the car navigation system.

In step S1001 of FIG. 96, based on an instruction to perform registration in services by the user, the browser 543 of the car navigation system 112 requests the centralized service registration server 104 to send a list of services that can be registered.

Figure 99:
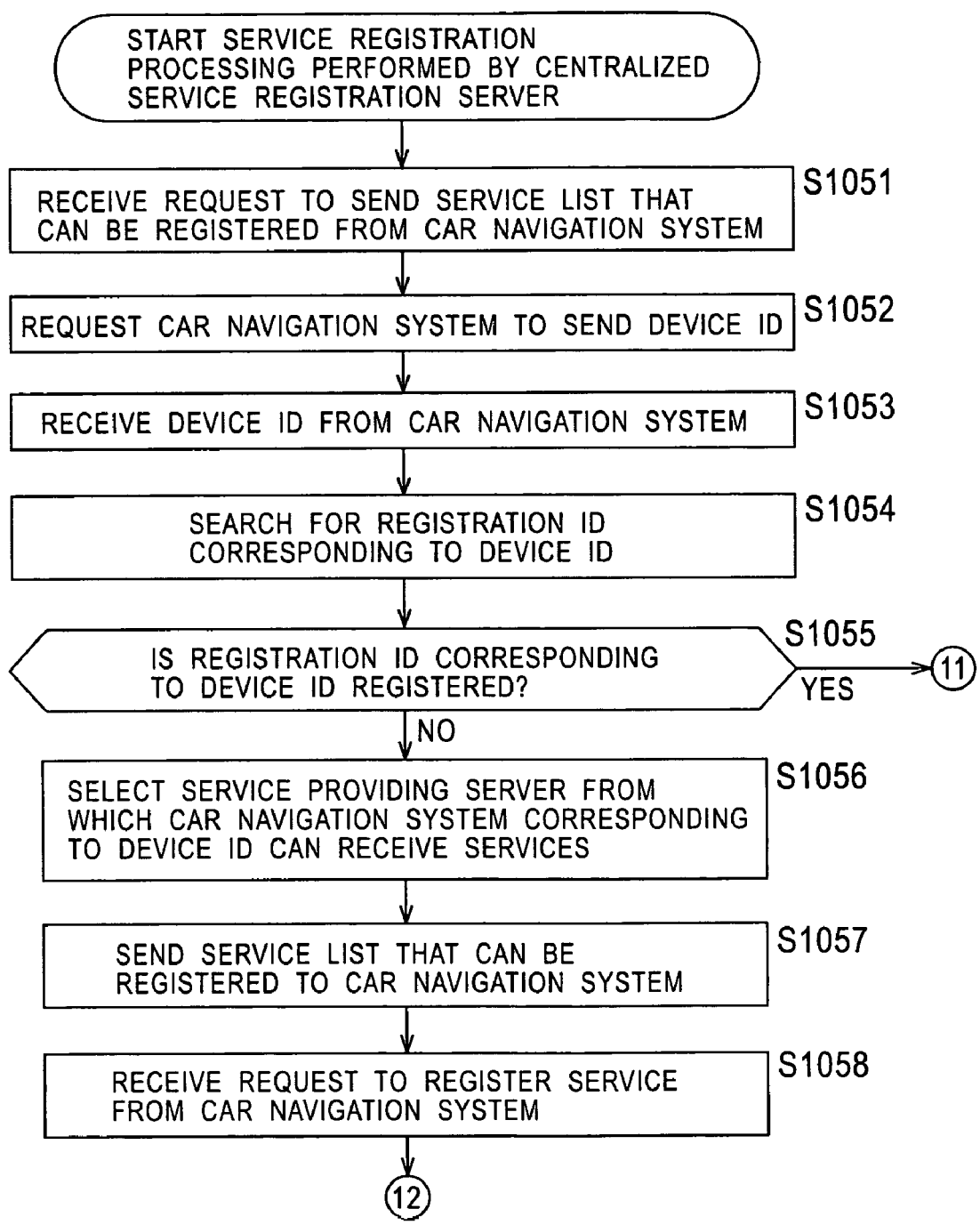
FIG. 99 is a flowchart illustrating service registration processing performed by the centralized service registration server.

In step S1051 of FIG. 99, the centralized service registration server 104 receives a request to send a list of services that can be registered from the car navigation system 112.

In step S1052, the communication control program 502 of the centralized service registration server 104 requests the car navigation system 112 to send the device ID.

In step S1002, the car navigation system 112 receives a request to send the device ID from the centralized service registration server 104.

In step S1003, the communication control program 542 of the car navigation system 112 sends the device ID to the centralized service registration server 104.

In step S1053, the centralized service registration server 104 receives the device ID from the car navigation system 112.

In step S1054, the data search program 505 of the centralized service registration server 104 searches the storage unit to determine whether the device ID received in step S1053 is associated with the registration ID.

If the data search program 505 of the centralized service registration server 104 determines in step S1055 that the device ID is not registered in the storage unit in association with the registration ID, the process proceeds to step S1056.

In step S1056, the data search program 505 of the centralized service registration server 104 reads the specifications of the CE device 132 (that is, the car navigation system 112) corresponding to the device ID received in step S1053, and selects the service providing server 102 from which the car navigation system 112 can receive services based on the specifications.

In step S1057, the communication control program 502 of the centralized service registration server 104 sends a list of services that can be registered to the car navigation system 112.

In step S1004, the car navigation system 112 receives a list of services that can be registered from the centralized service registration server 104.

In step S1005, the display control program 544 of the car navigation system 112 displays a list of services that can be registered received in step S1004 on the display unit 271, as shown in FIG. 84; and the operation-input control program 546 receives the selection of a service to be registered from the user.

In step S1006, the browser 543 of the car navigation system 112 sends a request to register the service received in step S1005 to the centralized service registration server 104.

In step S1058, the centralized service registration server 104 receives a request to register the service from the car navigation system 112.

Figure 100:
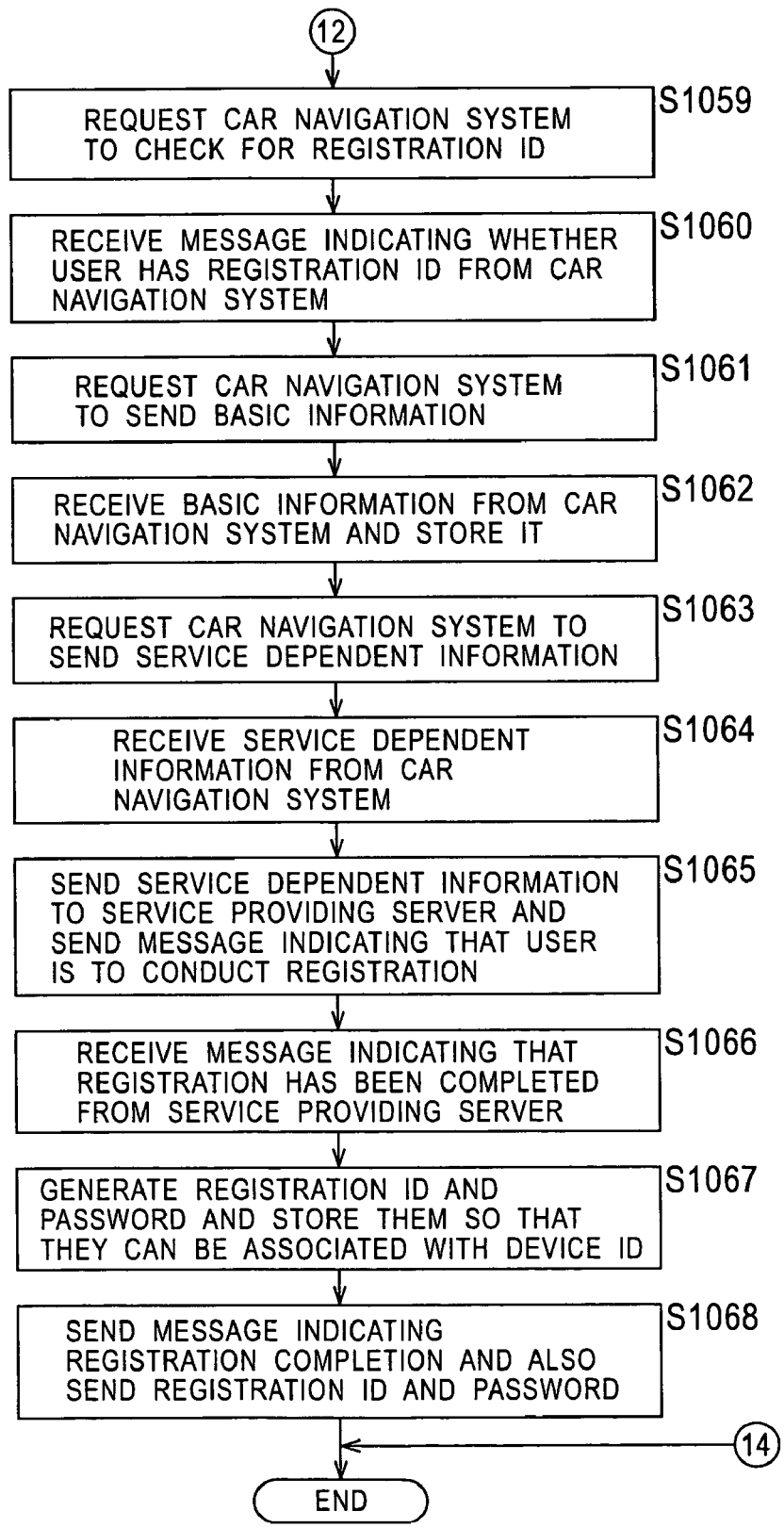
FIG. 100 is a flowchart continued from the flowchart of FIG. 99 illustrating service registration processing performed by the centralized service registration server.

After the processing of step S1058, in step S1059 of FIG. 100, the communication control program 502 of the centralized service registration server 104 requests the car navigation system 112 to check for the registration ID.

In step S1007, the car navigation system 112 determines whether it is requested to check for both the registration ID and password from the centralized service registration server 104. However, it is not requested to check for both the registration ID and password, and thus, in step S1008, the car navigation system 112 receives a request to check for the registration ID from the centralized service registration server 104.

In step S1009, the display control program 544 of the car navigation system 112 displays a screen, such as that shown in FIG. 85, on the display unit 271, and instructs the user to check for the registration ID.

Figure 97:
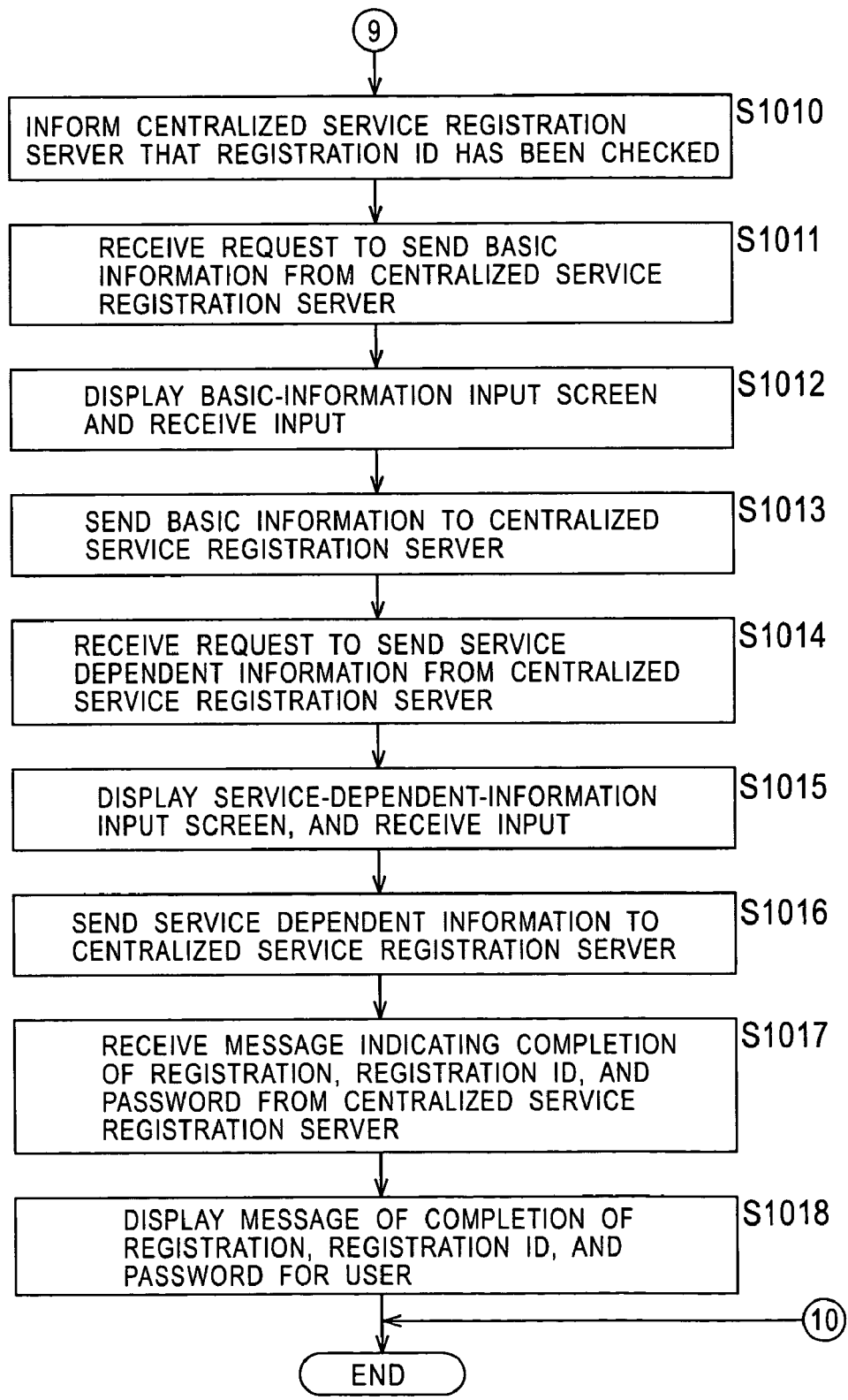
FIG. 97 is a flowchart continued from the flowchart of FIG. 96 illustrating service registration processing performed by the car navigation system.

After receiving the input from the user that the user does not have a registration ID (the "NO" button 822 in FIG. 85 is selected), the process proceeds to step S1010 of FIG. 97. In step S1010, the browser 543 of the car navigation system 112 sends a message indicating that it has been checked for the registration ID to the centralized service registration server 104.

In step S1060, the centralized service registration server 104 receives a message indicating that the user does not have a registration ID from the car navigation system 112.

In step S1061, the communication control program 502 of the centralized service registration server 104 requests the car navigation system 112 to send basic information.

In step S1011, the car navigation system 112 receives a request to send basic information from the centralized service registration server 104.

In step S1012, the display control program 544 of the car navigation system 112 displays a screen, such as that shown in FIG. 86, on the display unit 271, and the operation-input control program 546 receives the input of basic information from the user.

Then, in step S1013, the browser 543 of the car navigation system 112 sends the basic information received in step S1012 to the centralized service registration server 104.

In step S1062, the centralized service registration server 104 receives the basic information from the car navigation system 112, and the storage control program 504 of the centralized service registration server 104 stores the received basic information.

In step S1063, the communication control program 502 of the centralized service registration server 104 requests the car navigation system 112 to send service dependent information.

In step S1014, the car navigation system 112 receives a request to send service dependent information from the centralized service registration server 104.

In step S1015, the display control program 544 of the car navigation system 112 displays a screen, such as that shown in FIG. 87, on the display unit 271. The operation-input control program 546 receives the input of service dependent information from the user.

Then, in step S1016, the browser 543 of the car navigation system 112 sends the service dependent information received in step S1015 to the centralized service registration server 104.

In step S1064, the centralized service registration server 104 receives the service dependent information from the car navigation system 112.

In step S1065, the communication control program 502 of the centralized service registration server 104 sends the service dependent information received in step S1064 to the service providing server 102, and sends a message indicating that the user is to perform registration.

In step S1091 of FIG. 103, the service providing server 102 receives the service dependent information and a message indicating that the user is to conduct registration from the centralized service registration server 104.

In step S1092, the storage control program 425 of the service providing server 102 stores the service dependent information received in step S1091. Then, in step S1093, the communication control program 422 of the service providing server 102 sends a message indicating that registration has been completed to the centralized service registration server 104.

In step S1066, the centralized service registration server 104 receives a message indicating that registration has been completed from the service providing server 102.

In step S1067, the registration-ID/password generating program 507 of the centralized service registration server 104 generates a registration ID and a password. The storage control program 504 stores the generated registration ID and password so that they can be associated with the device ID received in step S1053.

In step S1068, the communication control program 502 of the centralized service registration server 104 sends a message indicating that registration has been completed, and also sends the registration ID and password generated in step S1067 to the car navigation system 112.

In step S1017, the car navigation system 112 receives a message indicating that registration has been completed, and also receives the registration ID and password from the centralized service registration server 104.

In step S1018, the display control program 544 of the car navigation system 112 displays a message indicating the completion of registration, the registration ID, and the password on the display unit 271, as shown in FIG. 88. The user sees this display to memorize or write down the registration ID and password.

Figure 101:
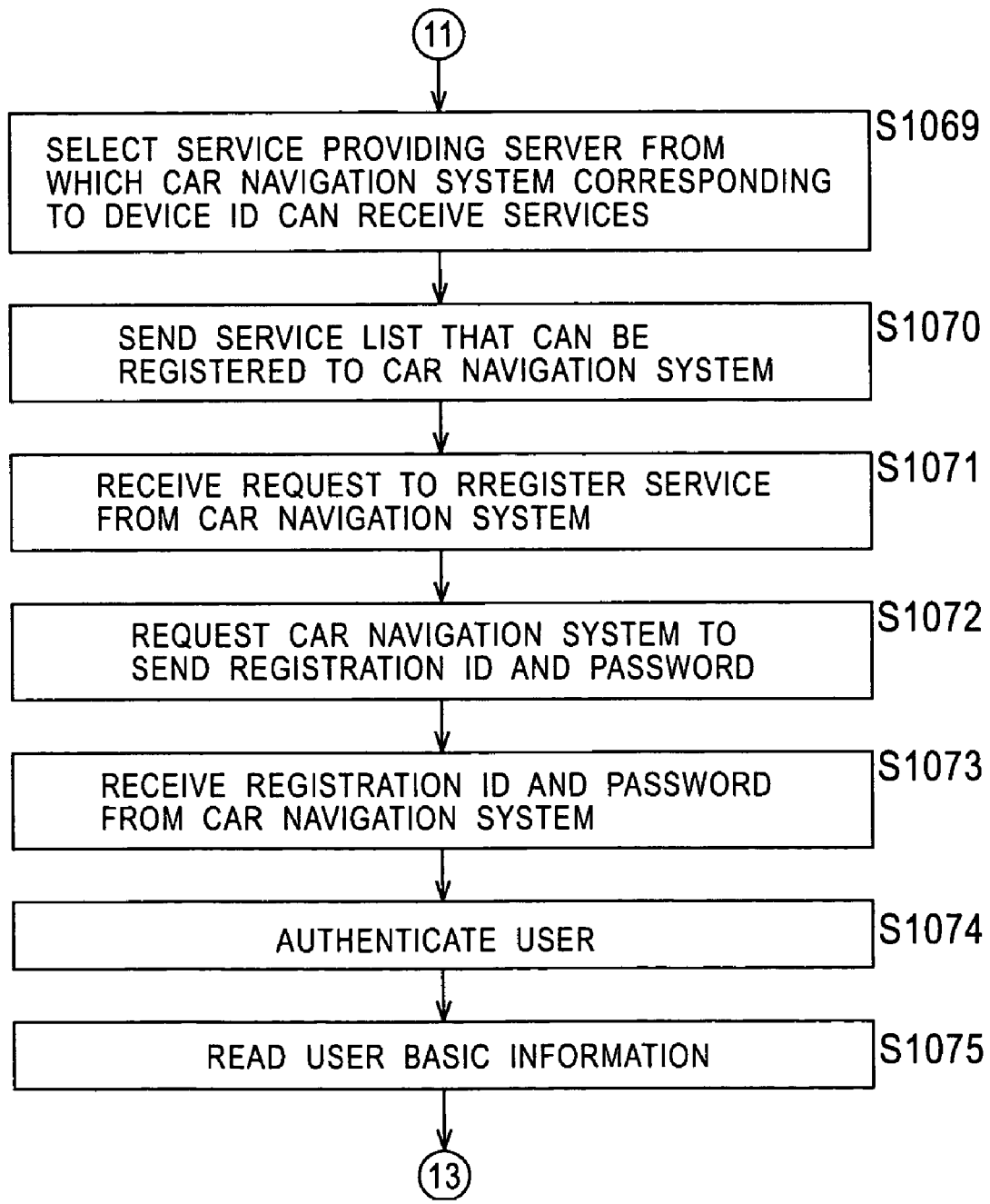
FIG. 101 is a flowchart continued from the flowchart of FIG. 99 illustrating service registration processing performed by the centralized service registration server.

If the data search program 505 of the centralized service registration server 104 determines in step S1055 that the registration ID corresponding to the device ID has been registered, the process proceeds to step S1069 of FIG. 101.

In step S1069, the data search program 505 of the centralized service registration server 104 reads the specifications of the CE device 132 (i.e., the car navigation system 112) corresponding to the device ID received in step S1053, and selects the service providing server 102 from which the car navigation system 112 can receive services based on the specifications.

In step S1070, the communication control program 502 of the centralized service registration server 104 sends a list of services that can be registered to the car navigation system 112.

In step S1004, the car navigation system 112 receives a list of services that can be registered from the centralized service registration server 104.

In step S1005, the display control program 544 of the car navigation system 112 displays a list of services that can be registered received in step S1004 on the display unit 271, as shown in FIG. 89, and the operation-input control program 546 receives the selection of a service to be registered from the user. If the car navigation system 112 has already been registered in service A, "Service A Registered" is indicated, as shown in FIG. 89.

After selecting the registration button 812 by the user in FIG. 89, the process proceeds to step S1006. In step S1006, the browser 543 of the car navigation system 112 sends a request to register the service selected in step S1005 to the centralized service registration server 104.

In step S1071, the centralized service registration server 104 receives a request to register the service from the car navigation system 112.

In step S1072, the communication control program 502 of the centralized service registration server 104 requests the car navigation system 112 to send the registration ID and password.

Figure 98:
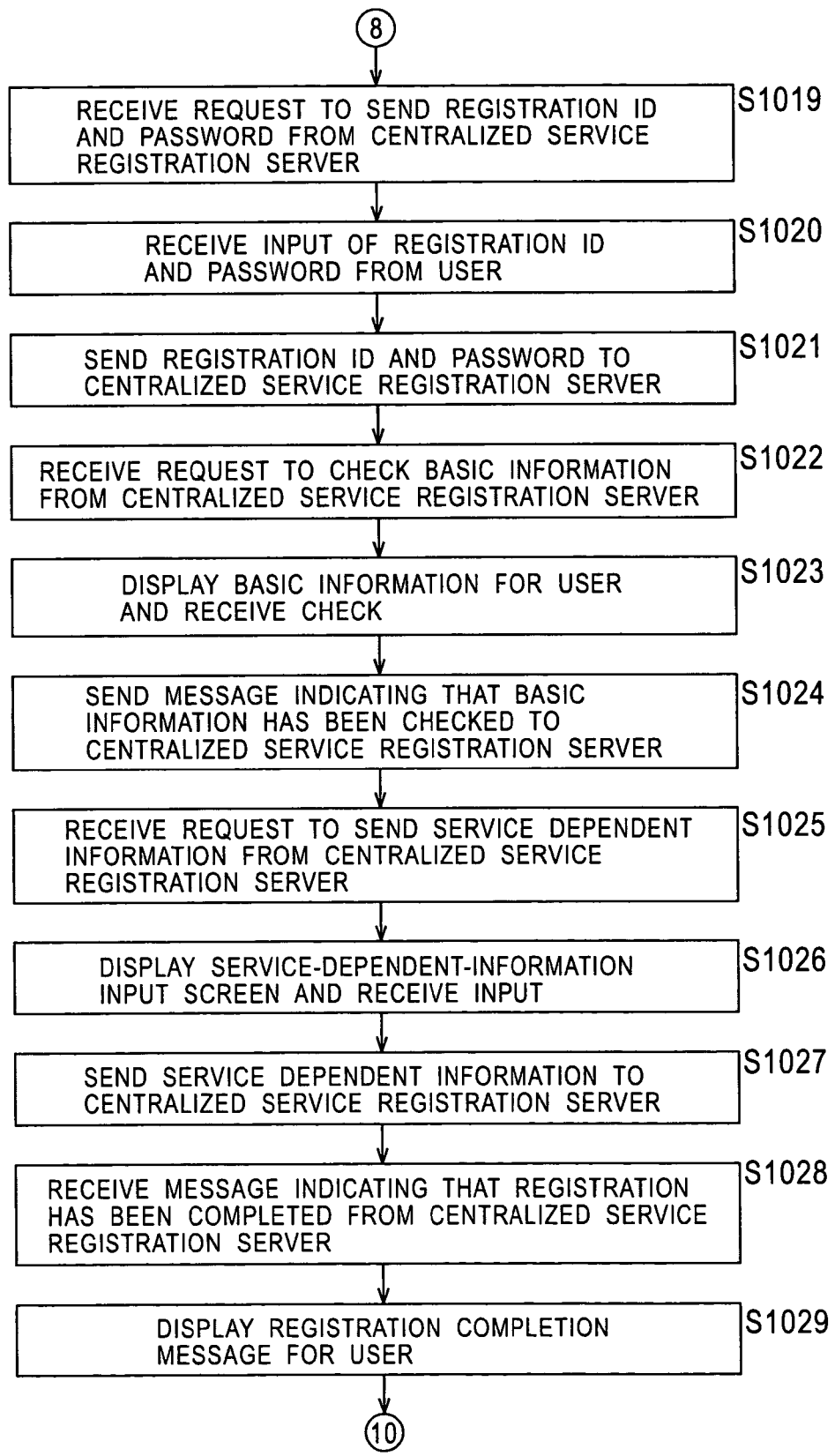
FIG. 98 is a flowchart continued from the flowchart of FIG. 96 illustrating service registration processing performed by the car navigation system.

Then, in step S1007, the car navigation system 112 is requested to send both the registration ID and password from the centralized service registration server 104, and the process proceeds to step S1019 of FIG. 98. In step S1019, the car navigation system 112 determines that it is requested to send both the registration ID and password from the centralized service registration server 104.

In step S1020, the display control program 544 of the car navigation system 112 displays a screen, such as that shown in FIG. 90, on the display unit 271. The operation-input control program 546 receives the input of the registration ID and password from the user. Then, in step S1021, the browser 543 of the car navigation system 112 sends the registration ID and password received in step S1020 to the centralized service registration server 104.

In step S1073, the centralized service registration server 104 receives the registration ID and password from the car navigation system 112. In step S1074, the authentication program 508 of the centralized service registration server 104 determines whether the registration ID and password coincide with those stored in association with the device ID in step S1067 when previously registering the car navigation system 112 in the service based on the device ID received in step S1053 and the registration ID and password received in step S1073. If it is determined that the registration ID and password are the same as those stored in association with the device ID in step S1067 when previously registering the car navigation system 112 in the service, the authentication program 508 authenticates the user, and the process proceeds to step S1075. In step S1075, the data search program 505 of the centralized service registration server 104 reads the basic information of the user stored in association with the device ID.

Figure 102:
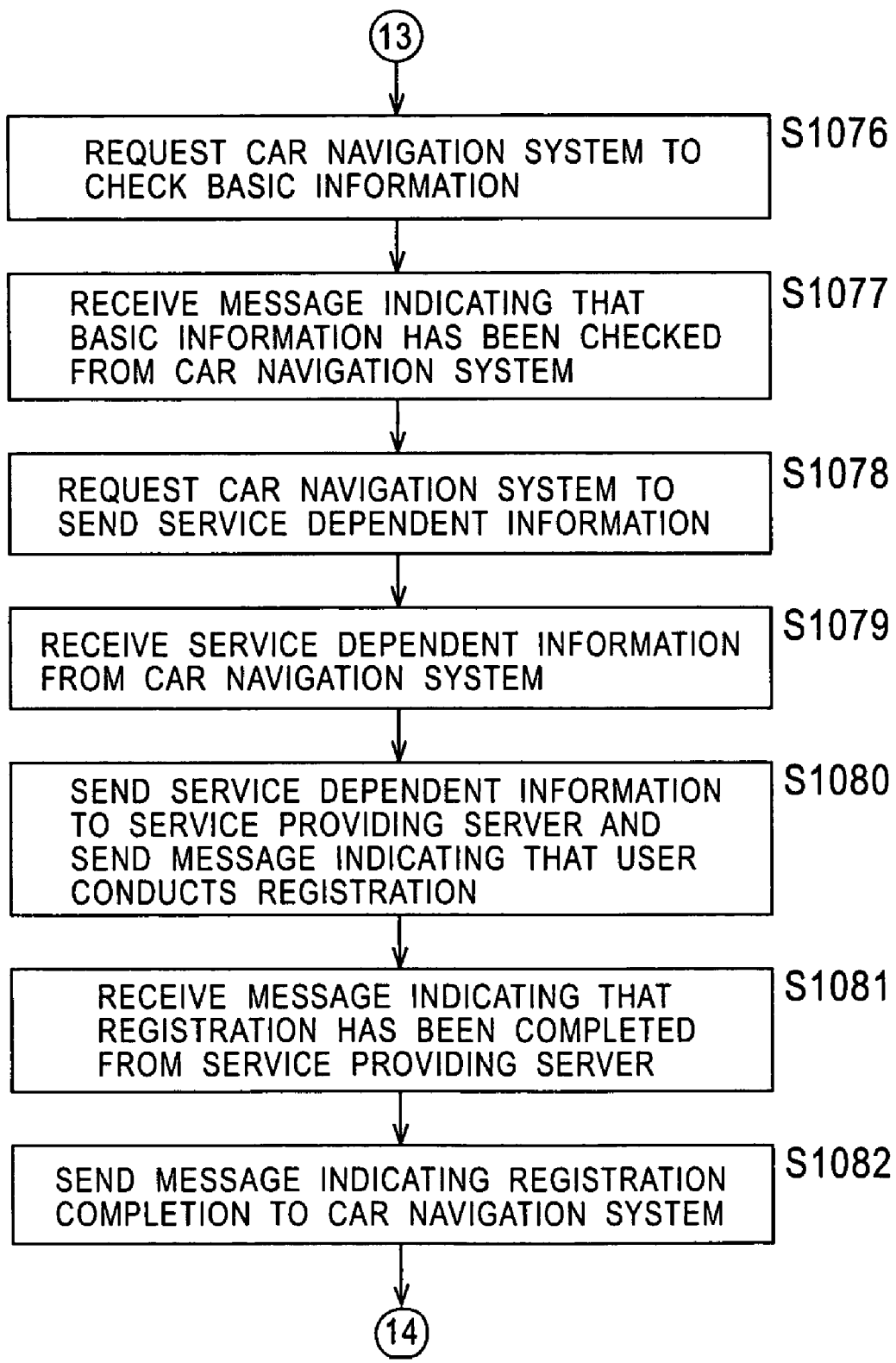
FIG. 102 is a flowchart continued from the flowchart of FIG. 101 illustrating service registration processing performed by the centralized service registration server.

After the processing of step S1075, in step S1076 of FIG. 102, the communication control program 502 of the centralized service registration server 104 sends the basic information read in step S1075 to the car navigation system 112, and also requests the car navigation system 112 to check whether the basic information is correct.

In step S1022, the car navigation system 112 receives the basic information from the centralized service registration server 104, and also receives a request to check whether the basic information is correct.

In step S1023, the display control program 544 of the car navigation system 112 displays the basic information received in step S1022 on the display unit 271, as shown in FIG. 91, and also displays a message (i.e., the check button 861) instructing the user to check whether the basic information is correct.

When the check button 861 is selected by the user, the process proceeds to step S1024. In step S1024, the browser 543 of the car navigation system 112 sends a message indicating that the basic information has been checked to the centralized service registration server 104.

In step S1077, the centralized service registration server 104 receives a message indicating that the basic information has been checked from the car navigation system 112.

In step S1078, the communication control program 502 of the centralized service registration server 104 requests the car navigation system 112 to send service dependent information of service B.

In step S1025, the car navigation system 112 receives a request to send the service dependent information of service B from the centralized service registration server 104.

In step S1026, the display control program 544 of the car navigation system 112 displays a screen, such as that shown in FIG. 92, on the display unit 271. The operation-input control program 546 then receives the input of the service dependent information from the user.

Then, in step S1027, the browser 543 of the car navigation system 112 sends the service dependent information received in step S1026 to the centralized service registration server 104.

In step S1079, the centralized service registration server 104 receives the service dependent information from the car navigation system 112.

In step S1080, the communication control program 502 of the centralized service registration server 104 sends the service dependent information received in step S1079 to the service providing server 102, and also sends a message indicating that the user is to conduct registration.

In step S1091, the service providing server 102 receives the service dependent information and a message indicating that the user is to perform registration from the centralized service registration server 104.

In step S1092, the storage control program 425 of the service providing server 102 stores the service dependent information received in step S1091. Then, in step S1093, the communication control program 422 of the service providing server 102 sends a message indicating that registration has been completed to the centralized service registration server 104.

In step S1081, the centralized service registration server 104 receives a message indicating that registration has been completed from the service providing server 102.

In step S1082, the communication control program 502 of the centralized service registration server 104 sends a message indicating that registration has been completed to the car navigation system 112.

In step S1028, the car navigation system 112 receives a message indicating that registration has been completed from the centralized service registration server 104.

In step S1029, the display control program 544 of the car navigation system 112 displays a registration completion message on the display unit 271, as shown in FIG. 93. The user sees this display and understands that registration has been completed.

According to the above-described processing, when performing registration in the plurality of service providing servers 102, the user has to input basic information only once when performing first registration in the service providing server 102.

Items of information to be input by the user as the basic information or as the service dependent information are not restricted to the above-described items. For example, in the screen in FIG. 86, items, such as the telephone No. and postal code, may be added to the items such as the name, address, and email address. Conversely, the item to be input, i.e., the address, may be deleted from the screen in FIG. 86. In FIG. 87, as the items to be input as the service dependent information, items, such as the occupation and family members, may be added to the age and hobbies. The item, i.e., hobbies, may be deleted from the screen in FIG. 87. That is, items to be input as the basic information or the service dependent information can be set as desired by the administrator of this service.

In particular, when the CE device 132 is connected to a network including the Internet 1 by using connection information recorded in the memory card 114 inserted into the CE device 132, the user is able to utilize the connection information for a plurality of devices. When connecting a device to the Internet, the amount of information to be input by the user can be reduced. Additionally, the size of the input interface of the device can be reduced.

The above-described processing performed by the browser 323 of the setting terminal device 109 or 121, the browser 523 of the refrigerator 113, the browser 543 of the car navigation system 112, and the browsers of the other CE devices 132 may be executed by dedicated application software. For example, dedicated application software for executing processing corresponding to the processing performed by the browser 323 may be installed into the setting terminal device 109, and processing similar to the processing performed by the browser 323 may be executed by the dedicated application software. Similarly, dedicated application software for executing processing similar to the processing performed by the browsers of the CE devices 132 may be installed into the CE devices 132 including the refrigerator 113 and the car navigation system 112, and processing similar to the processing performed by the browsers may be executed by the dedicated application software.

Among the CE devices 132 (including the microwave oven 110, television receiver 111, car navigation system 112, and refrigerator 113), the service providing server 102, the centralized service registration server 104, the CE-device registration setting server 105, the connection-setting database 106, the setting terminal devices 109 and 121, the manufacturer server 131, the access server 141, the registration server 142, the connection authentication server 143, the database server 144, the service providing server 145, and the web authentication proxy server 146, two or more predetermined devices send and receive information. Such information may be encrypted by predetermined means. Thus, information can be sent and received more securely.

In this specification, steps of programs to be stored in program storage media including the ROMs 202, 232, and 262 and RAMs 203, 233, and 263 may be executed in chronological order described above. Alternatively, the steps may be executed concurrently or individually.

In this specification, the system means the overall apparatus consisting of a plurality of devices.

INDUSTRIAL APPLICABILITY

As is seen from the foregoing description, according to the present invention, the user is able to utilize services provided on the Internet.

According to the present invention, the user is able to utilize connection information for a plurality of devices once the connection information is generated. When connecting a device to the Internet, the amount of information to be input by the user can be decreased. Additionally, the size of the input interface of the device can be reduced.

The invention claimed is:

1. An information processing system comprising:
   a first information processing apparatus for generating connection information for connecting to a network;
   a second information processing apparatus for recording the connection information generated by the first information processing apparatus in a predetermined recording medium; and
   a third information processing apparatus that connects to the network based on the connection information recorded in the recording medium by the second information processing apparatus,
   the first information processing apparatus comprising:
      a processor;
      a first receiving unit configured to receive registration information from the second information processing apparatus;
      a generating unit configured to generate the connection information used for allowing the third information processing apparatus to connect to the network based on a device identifier of the third information processing apparatus and the registration information received by the first receiving unit, wherein the registration information includes a registration code calculated from the device identifier of the third information processing apparatus; and
      a first transmitting unit configured to transmit the connection information generated by the generating unit to the second information processing apparatus,
   the second information processing apparatus comprising:
      a reception unit configured to receive input of the registration information;
      a second transmitting unit configured to transmit the registration information received by the reception unit to the first information processing apparatus;
      a second receiving unit configured to receive the connection information from the first information processing apparatus; and
      a recording unit configured to record the connection information received by the second receiving unit in the recording medium,
   the third information processing apparatus comprising:
      a reading unit configured to read the connection information recorded by the second information processing apparatus from the recording medium; and
      a connection unit configured to connect to the network based on the connection information read by the reading unit.

2. The information processing system of claim 1 wherein a device manufacturer calculates the registration code from the device identifier.

3. The information processing system of claim 2 wherein the registration code is recorded in or on the third information processing apparatus by the device manufacturer.

4. A first information processing apparatus comprising:
a processor;
a receiving unit configured to receive registration information from a first second information processing apparatus;
a generating unit configured to generate connection information used for allowing a third information processing apparatus, which is different from the second information processing apparatus, to connect to a network based on a device identifier of the third information processing apparatus and the registration information received by the receiving unit, wherein the registration information includes a registration code calculated from the device identifier of the third information processing apparatus; and
a transmitting unit configured to transmit the connection information generated by the generating unit to the second information processing apparatus.

5. A first information processing apparatus according to claim 4, wherein the network is the Internet.

6. A first information processing apparatus according to claim 4, wherein the registration information includes a postal code or an address at which the third information processing apparatus is connected to the network.

7. A first information processing apparatus according to claim 6, wherein the generating unit selects an access point for allowing the third information processing apparatus to connect to the network based on the postal code or the address so as to generate the connection information including information concerning the access point.

8. A first information processing apparatus according to claim 7, wherein the information concerning the access point includes a telephone number of the access point.

9. A first information processing apparatus according to claim 7, wherein the generating unit selects the access point based on at least one of the conditions consisting of a communication cost, a communication speed, and a load of the access point when the third information processing apparatus is connected to the network.

10. A first information processing apparatus according to claim 4, wherein the connection information includes an identifier required for the third information processing apparatus to receive authentication.

11. A first information processing apparatus according to claim 10, wherein the identifier includes at least one of an identifier for logging in to an Internet service provider, an identifier for specifying a user, the device identifier of the third information processing apparatus, and an identifier for specifying a service on the network.

12. A first information processing apparatus according to claim 10, wherein the connection information further includes a password required for the third information processing apparatus to receive the authentication.

13. A first information processing apparatus according to claim 4, wherein the transmitting unit transmits, together with the connection information, a program for executing processing for allowing the third information processing apparatus to connect to the network to the second information processing apparatus.

14. An information processing method comprising:
receiving, by a first information processing apparatus, registration information from a second information processing apparatus;
generating, by the first information processing apparatus, connection information used for allowing a third information processing apparatus, which is different from the second information processing apparatus, to connect to a network based on a device identifier of the third information processing apparatus and the registration information received by processing of the receiving step, wherein the registration information includes a registration code calculated from the device identifier of the third information processing apparatus; and
transmitting, by the first information processing apparatus, the connection information to the second information processing apparatus.

15. A recording medium recording a computer-readable program for causing a computer to execute an information processing method, the method comprising:
receiving, by a first information processing apparatus, registration information from a second information processing apparatus;
generating, by the first information processing apparatus, connection information used for allowing a third information processing apparatus, which is different from the second information processing apparatus, to connect to a network based on a device identifier of the third information processing apparatus and the registration information received by processing of the receiving step, wherein the registration information includes a registration code calculated from the device identifier of the third information processing apparatus; and
transmitting, by the first information processing apparatus, the connection information to the second information processing apparatus.

16. A first information processing apparatus comprising:
a processor;
a reception unit configured to receive an input of registration information from a user;
a transmitting unit configured to transmit the registration information received by the reception unit to a second information processing apparatus;
a receiving unit configured to receive connection information for connecting to a network from the second information processing apparatus, the connection information being generated based on a device identifier of a third information processing apparatus connecting to the network and the registration information transmitted by the transmitting unit, wherein the registration information includes a registration code calculated from the device identifier of the third information processing apparatus connecting to the network based on the connection information; and
a recording unit configured to record the connection information received by the receiving unit in a recording medium.

17. A first information processing apparatus according to claim 16, wherein the network is the Internet.

18. A first information processing apparatus according to claim 16, wherein the recording medium is a memory card which is attached to the first information processing apparatus, and is also removed from the first information processing apparatus and is attached to the third information processing apparatus, which is different from the first information processing apparatus.

19. A first information processing apparatus according to claim 16, wherein the connection information is information that allows a plurality of third information processing apparatuses, which are different from the first information processing apparatus, to connect to the Internet by utilizing the connection information.

20. A first information processing apparatus according to claim 16, wherein the registration information includes at least a postal code or an address at which the third information processing apparatus, which is different from the first information processing apparatus, is connected to the network.

21. A first information processing apparatus according to claim 16, wherein the connection information includes information concerning an access point for allowing the third information processing apparatus, which is different from the first information processing apparatus, to connect to the network.

22. A first information processing apparatus according to claim 21, wherein the information concerning the access point includes a telephone number of the access point.

23. A first information processing apparatus according to claim 16, wherein the connection information includes an identifier required for a third information processing apparatus, which is different from the first information processing apparatus, to receive authentication.

24. A first information processing apparatus according to claim 23, wherein the identifier includes at least one of an identifier for logging in to an Internet service provider, an identifier for specifying a user, an identifier for specifying the third information processing apparatus, the identifier of the connecting device, and an identifier for specifying a service on the network.

25. A first information processing apparatus according to claim 23, wherein the connection information further includes a password required for the third information processing apparatus to receive the authentication.

26. A first information processing apparatus according to claim 16, wherein:
the receiving unit receives, together with the connection information, a program for executing processing for allowing the third information processing apparatus, which is different from the first information processing apparatus, to connect to the network; and
the recording unit records the connection information and the program received by the receiving unit in the recording medium.

27. An information processing method comprising:
receiving, by a first information processing apparatus, registration information from a user;
transmitting, by the first information processing apparatus, the registration information to a second information processing apparatus;
receiving, by the first information processing apparatus, connection information for connecting to a network from the second information processing apparatus, the connection information being generated based on a device identifier of a third information processing apparatus connecting to the network and the registration information, wherein the registration information includes a registration code calculated from the device identifier of the third information processing apparatus connecting to the network based on the connection information; and
recording, by the first information processing apparatus, the received connection information in a recording medium.

28. A recording medium recording a computer-readable program for causing a computer to execute an information processing method, the method comprising:
receiving, by a first information processing apparatus, registration information from a user;
transmitting, by the first information processing apparatus, the registration information to a second information processing apparatus;
receiving, by the first information processing apparatus, connection information for connecting to a network from the second information processing apparatus, the connection information being generated based on a device identifier of a third information processing apparatus connecting to the network and the registration information, wherein the registration information includes a registration code calculated from the device identifier of the third information processing apparatus connecting to the network based on the connection information; and
recording, by the first information processing apparatus, the received connection information in a recording medium.

29. A first information processing apparatus comprising:
a processor;
a holding unit configured to detachably hold a recording medium;
a reading unit configured to read connection information, associated with a device identifier paired with a registration code calculated from the device identifier, and configured to connect to a network from the recording medium when the recording medium is held in the holding unit, the connection information being from a second information processing apparatus transferred to the recording medium while the recording medium is attached to the second information processing apparatus; and
a connection unit configured to connect to the network based on the connection information,
wherein the connection information is generated based on registration information,
the device identifier identifies the first information processing apparatus,
the registration calculation is performed by a third information processing apparatus that is different from the second information processing apparatus, and
the registration information includes the registration code calculated from the device identifier.

30. A first information processing apparatus according to claim 29, wherein the network is the Internet.

31. A first information processing apparatus according to claim 29, wherein the recording medium is a memory card.

32. A first information processing apparatus according to claim 29, wherein the connection information is information that allows a plurality of information processing apparatuses to connect to the Internet by using the connection information.

33. A first information processing apparatus according to claim 29, wherein the connection information includes information concerning an access point for allowing the first information processing apparatus to connect to the network.

34. A first information processing apparatus according to claim 33, wherein the information concerning the access point includes a telephone number of the access point.

35. A first information processing apparatus according to claim 29, wherein the connection information includes an identifier required for the first information processing apparatus to receive authentication.

36. A first information processing apparatus according to claim 35, wherein the identifier includes at least one of an identifier for logging in to an Internet service provider, an identifier for specifying a user, an identifier for specifying the first information processing apparatus, and an identifier for specifying a service on the network.

37. A first information processing apparatus according to claim 35, wherein the connection information further includes a password required for the first information processing apparatus to receive the authentication.

38. A first information processing apparatus according to claim 29, wherein:
the reading unit reads a program for executing processing for allowing the first information processing apparatus to connect to the network, the program being stored in the recording medium together with the connection information; and
the connection unit connects to the network by using the connection information by executing the program read by the reading unit.

39. A first information processing apparatus according to claim 29, further comprising a recording unit configured to record the connection information read by the reading unit, wherein the connection unit connects to the network based on the connection information recorded by the recording unit.

40. An information processing method for a first information processing apparatus to and from which a recording medium is attachable and detachable, the information processing method comprising:
reading connection information, associated with a device identifier paired with a registration code calculated from the device identifier, and configured to connect to a network from the recording medium when the recording medium is held in the holding unit, the connection information being from a second information processing apparatus transferred to the recording medium while the recording medium is attached to the second information processing apparatus; and
connecting to the network based on the connection information,
wherein the connection information is generated based on registration information,
the device identifier identifies the first information processing apparatus,
the registration calculation is performed by a third information processing apparatus that is different from the second information processing apparatus, and
the registration information includes the registration code calculated from the device identifier.

41. A recording medium recording a computer-readable program for controlling a first information processing apparatus to and from which a recording medium is attachable and detachable, for causing a computer to execute an information processing method, the method comprising:
reading connection information, associated with a device identifier paired with a registration code calculated from the device identifier, and configured to connect to a network from the recording medium when the recording medium is held in the holding unit, the connection information being from a second information processing apparatus transferred to the recording medium while the recording medium is attached to the second information processing apparatus; and
connecting to the network based on the connection information,
wherein the connection information is generated based on registration information,
the device identifier identifies the first information processing apparatus,
the registration calculation is performed by a third information processing apparatus that is different from the second information processing apparatus, and
the registration information includes the registration code calculated from the device identifier.

* * * * *